United States Patent
Zhang et al.

(10) Patent No.: US 11,695,507 B2
(45) Date of Patent: Jul. 4, 2023

(54) APPARATUS AND METHOD FOR IN MULTIPLE ACCESS IN WIRELESS COMMUNICATION

(71) Applicant: Samsung Electronics Co., Ltd, Suwon-si (KR)

(72) Inventors: Chuang Zhang, Beijing (CN); Qi Xiong, Beijing (CN); Chen Qian, Beijing (CN); Bin Yu, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 62 days.

(21) Appl. No.: 16/497,425

(22) PCT Filed: Mar. 26, 2018

(86) PCT No.: PCT/KR2018/003545
§ 371 (c)(1),
(2) Date: Sep. 24, 2019

(87) PCT Pub. No.: WO2018/174686
PCT Pub. Date: Sep. 27, 2018

(65) Prior Publication Data
US 2021/0297300 A1    Sep. 23, 2021

(30) Foreign Application Priority Data

Mar. 24, 2017 (CN) .......................... 201710186505.5
Apr. 14, 2017 (CN) .......................... 201710247455.7
Nov. 6, 2017 (CN) .......................... 201711079174.1

(51) Int. Cl.
*H04L 1/00* (2006.01)
*H04L 25/03* (2006.01)
(Continued)

(52) U.S. Cl.
CPC ...... *H04L 1/0071* (2013.01); *H04L 25/03866* (2013.01); *H04L 27/2626* (2013.01);
(Continued)

(58) Field of Classification Search
None
See application file for complete search history.

(56) References Cited

U.S. PATENT DOCUMENTS 6,188,717 B1 * 2/2001 Kaiser ................. H04L 25/0224
375/148
6,985,510 B2 * 1/2006 Willenegger .......... H04B 1/707
370/522

(Continued)

FOREIGN PATENT DOCUMENTS

CN    101232484 A    7/2008
CN    101695191 A    4/2010
(Continued)

OTHER PUBLICATIONS

Huawei, HiSilicon, et al., "Applying Multi-Dimensional Modulation to Non-Orthogonal Multiple Access", 3GPP TSG RAN WG1 Meeting #84bis, Apr. 11-15, 2016, R1-162163, 5 pages.
(Continued)

*Primary Examiner* — Ajit Patel
*Assistant Examiner* — Liem H. Nguyen

(57) ABSTRACT

A multiple access method, a multiple access transmitter, and a multiple access receiver includes performing, by a transmitter, channel coding on a bit sequence to determine a coded sequence. The method also includes interleaving and/or scrambling the coded sequence, and performing multidimensional constellation modulation on the interleaved and/or scrambled sequence; performing grid mapping on the modulated symbol sequence to determine a mapped sequence, and transmitting the mapped sequence.

(Continued)

The method also includes receiving, by a receiver, mixed signals from multiple transmitters, the mixed signals are obtained by performing, by each of the multiple transmitters, interleaving and/or scrambling, multidimensional constellation modulation and grid mapping on data. The method further includes decoding, by the receiver, mixed information according to interleaver information and/or scrambler information, multidimensional constellation information and grid mapping pattern information corresponding to each transmitter to obtain data corresponding to each transmitter.

13 Claims, 52 Drawing Sheets

(51) Int. Cl.
  *H04L 27/26* (2006.01)
  *H04L 5/00* (2006.01)
  *H04W 72/23* (2023.01)
(52) U.S. Cl.
  CPC ......... *H04L 27/2627* (2013.01); *H04W 72/23* (2023.01); *H04L 5/0046* (2013.01)

(56) References Cited

U.S. PATENT DOCUMENTS

| | | | | |
|---|---|---|---|---|
| 2002/0154620 | A1* | 10/2002 | Azenkot | H04L 27/0008 370/347 |
| 2004/0121730 | A1* | 6/2004 | Kadous | H04L 1/0071 455/562.1 |
| 2006/0215625 | A1* | 9/2006 | Hempel | H04W 36/10 370/342 |
| 2007/0014409 | A1* | 1/2007 | Batra | H04W 12/50 380/270 |
| 2008/0212694 | A1* | 9/2008 | Leach | H04L 27/2601 375/260 |
| 2009/0304094 | A1* | 12/2009 | Sherratt | H04L 25/022 375/260 |
| 2010/0201398 | A1* | 8/2010 | Zhao | H04L 1/0041 326/52 |
| 2011/0176532 | A1* | 7/2011 | Franceschini | H04L 5/0062 370/310 |
| 2011/0255635 | A1* | 10/2011 | Lee | H04B 7/0413 375/295 |
| 2013/0142206 | A1* | 6/2013 | Kota | H04L 27/0008 370/469 |
| 2014/0133593 | A1 | 5/2014 | Lim et al. | |
| 2014/0341320 | A1* | 11/2014 | Hua | H04L 1/0071 375/299 |
| 2014/0369434 | A1* | 12/2014 | Taherzadehboroujeni | H04B 7/0482 375/261 |
| 2015/0222472 | A1* | 8/2015 | Park | H04L 27/366 375/261 |
| 2015/0263825 | A1* | 9/2015 | Kim | H04L 1/0013 375/260 |
| 2015/0327243 | A1* | 11/2015 | Yin | H04W 52/281 370/329 |
| 2015/0358648 | A1* | 12/2015 | Limberg | H03M 13/253 725/109 |
| 2015/0365204 | A1* | 12/2015 | Baek | H04L 1/0045 375/267 |
| 2016/0227274 | A1* | 8/2016 | Oh | H04N 21/6336 |
| 2017/0054483 | A1* | 2/2017 | Taherzadeh Boroujeni | H04L 27/3444 |
| 2019/0007092 | A1* | 1/2019 | Bayesteh | H04L 27/3405 |
| 2019/0174567 | A1* | 6/2019 | Kusashima | H04L 5/0048 |
| 2020/0045650 | A1* | 2/2020 | Suzuki | H04W 76/11 |

FOREIGN PATENT DOCUMENTS

| | | | |
|---|---|---|---|
| CN | 101848061 A | 9/2010 | |
| CN | 102075487 A | 5/2011 | |
| CN | 102299735 A | 12/2011 | |
| CN | 102624495 A | 8/2012 | |
| CN | 102075487 B * | 2/2013 | |
| CN | 105530071 A | 4/2016 | |
| CN | 105530072 A | 4/2016 | |
| CN | 105556887 A | 5/2016 | |
| CN | 107070541 A | 8/2017 | |
| CN | 105721385 B * | 4/2019 | |
| CN | 105099614 B * | 4/2020 | H04L 1/00 |
| EP | 2966827 A1 | 1/2016 | |
| WO | 2017069510 A1 | 4/2017 | |

OTHER PUBLICATIONS

Samsung, "Non-orthogonal Multiple access candidate for NR", 3GPP TSG RAN WG1 Meeting #85, May 23-27, 2016, R1-163992, 7 pages.
International Telecommunications Union, "IMT Traffic estimates beyond year 2020", Document 5D/TEMP/466-E, Oct. 21, 2014, 35 pages.
International Telecommunications Union, "Future technology trends of terrestrial IMT systems", Report ITU-R M.2320-0, (Nov. 2014), 32 pages.
International Telecommunications Union, "IMT Vision—Framework and overall objectives of the future development of IMT for 2020 and beyond", Recommendation ITU-R M.2083-0, (Sep. 2015), 21 pages.
Li Ping et al., "Interleave-Division Multiple-Access", IEEE Transactions on Wireless Communications, vol. 5, No. 4, Apr. 2006, p. 938-947.
International Search Report dated Jul. 23, 2018 in connection with International Patent Application No. PCT/KR2018/003545, 2 pages.
Written Opinion of the International Searching Authority dated Jul. 23, 2018 in connection with International Patent Application No. PCT/KR2018/003545, 11 pages.
G. David Forney, Jr., "Multidimensional Constellations—Part II: Voronoi Constellations", IEEE Journal on Selected Areas in Communications, vol. 7, No. 6, Aug. 1989, p. 941-958.
Office Action dated Sep. 1, 2021, in connection with Chinese Application No. 201710186505.5, 20 pages.
Office Action dated Sep. 3, 2021, in connection with Chinese Application No. 201710247455.7, 23 pages.
China National Intellectual Property Administration, "Office Action," dated Feb. 15, 2022, in connection with Chinese Patent Application No. 201710186505.5, 19 pages.
China National Intellectual Property Administration, "The Second Office Action," dated Jun. 6, 2022, in connection with Chinese Patent Application No. 201710247455.7, 23 pages.
China National Intellectual Property Administration, "Notice of Allowance," dated Jan. 11, 2023, in connection with Chinese Patent Application No. CN201710186505.5, 5 pages.
Samsung, "Narrowband LTE Downlink Design (update of GP-150687)," 3GPP TSG GERAN#67 GP-150844, Yinchuan, China, Aug. 10-14, 2015, 12 pages.
China National Intellectual Property Administration, "Office Action," dated Apr. 7, 2023, in connection with Chinese Patent Application No. 201711079174.1, 21 pages.

* cited by examiner

[Fig. 1]
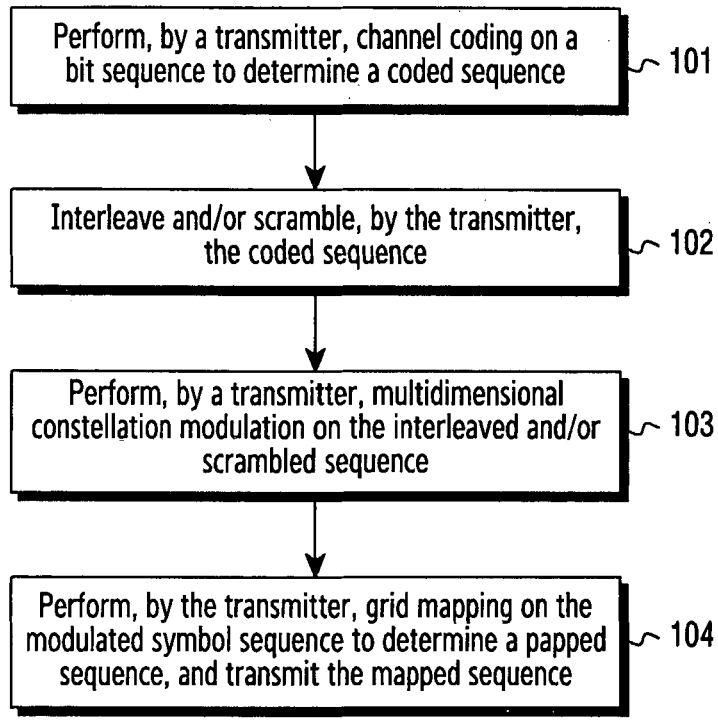
[Fig. 2]
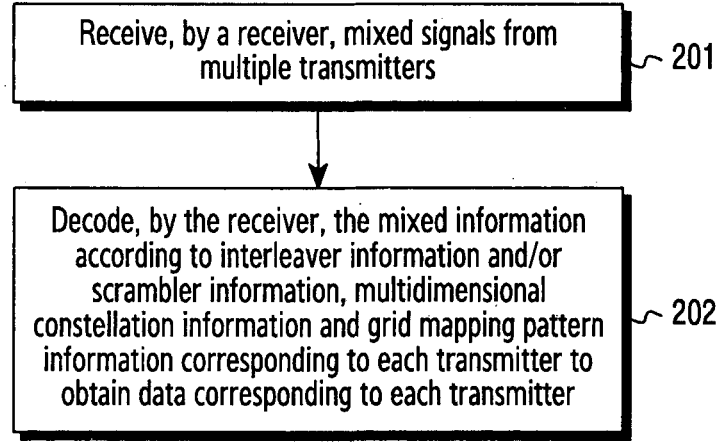
[Fig. 3]
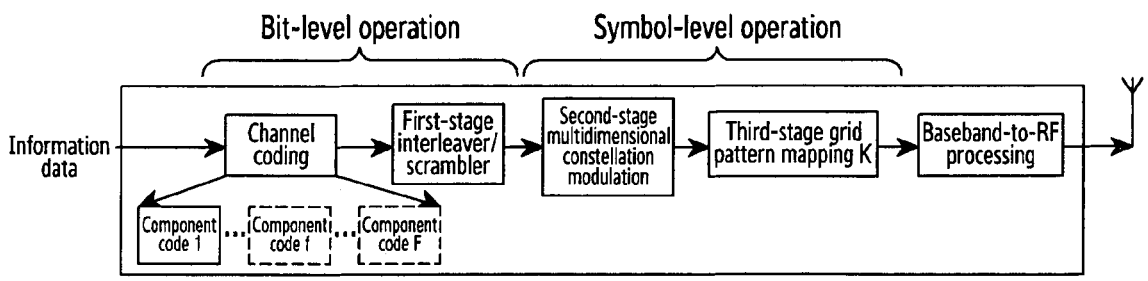

[Fig. 4]
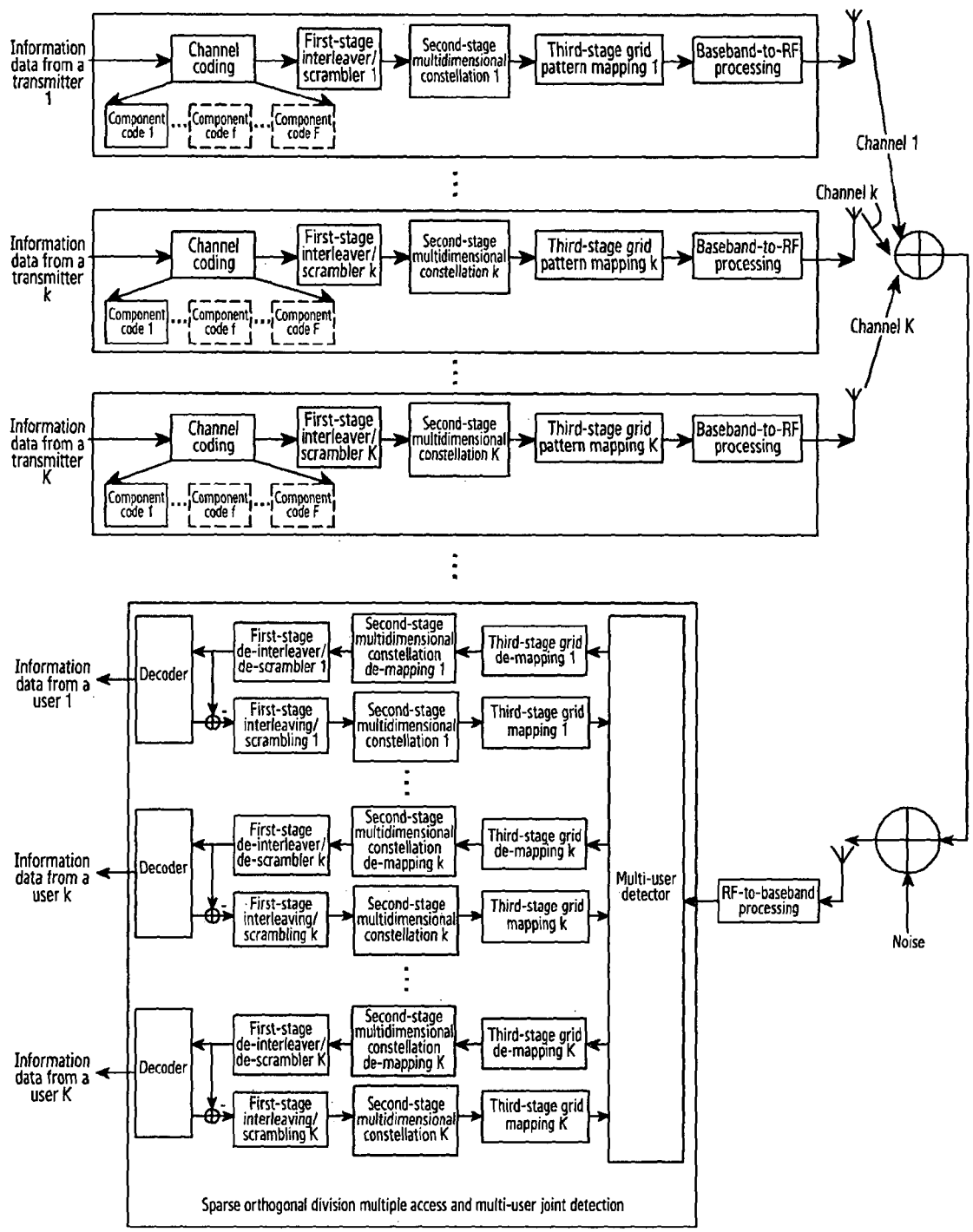

[Fig. 5]
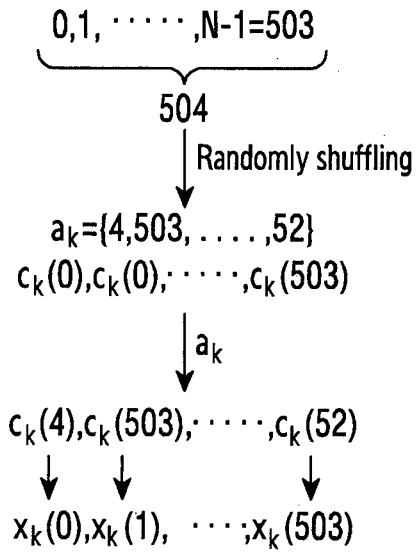
[Fig. 6]
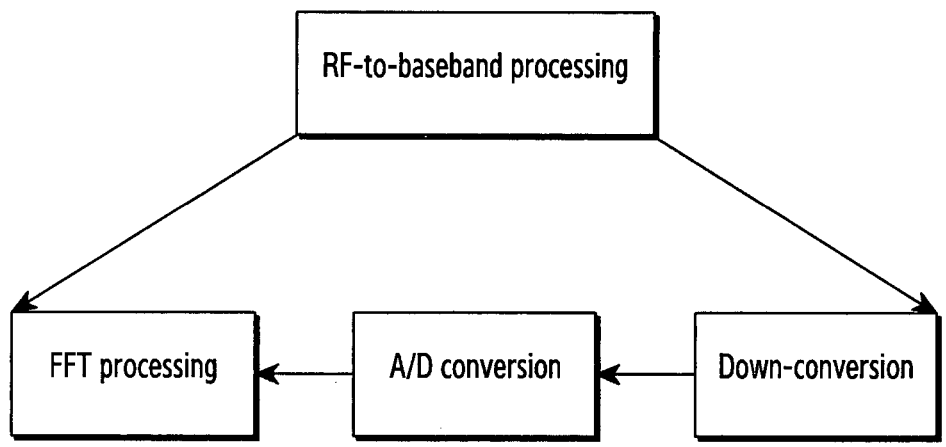

[Fig. 7]
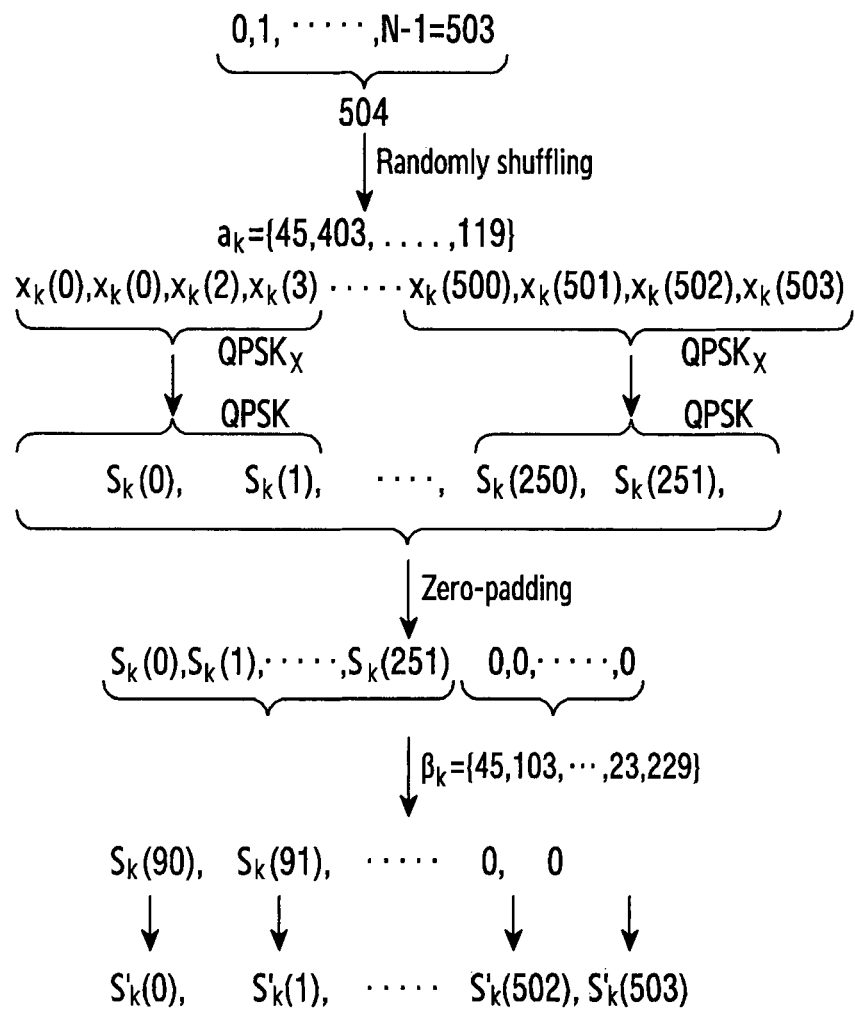

[Fig. 8]
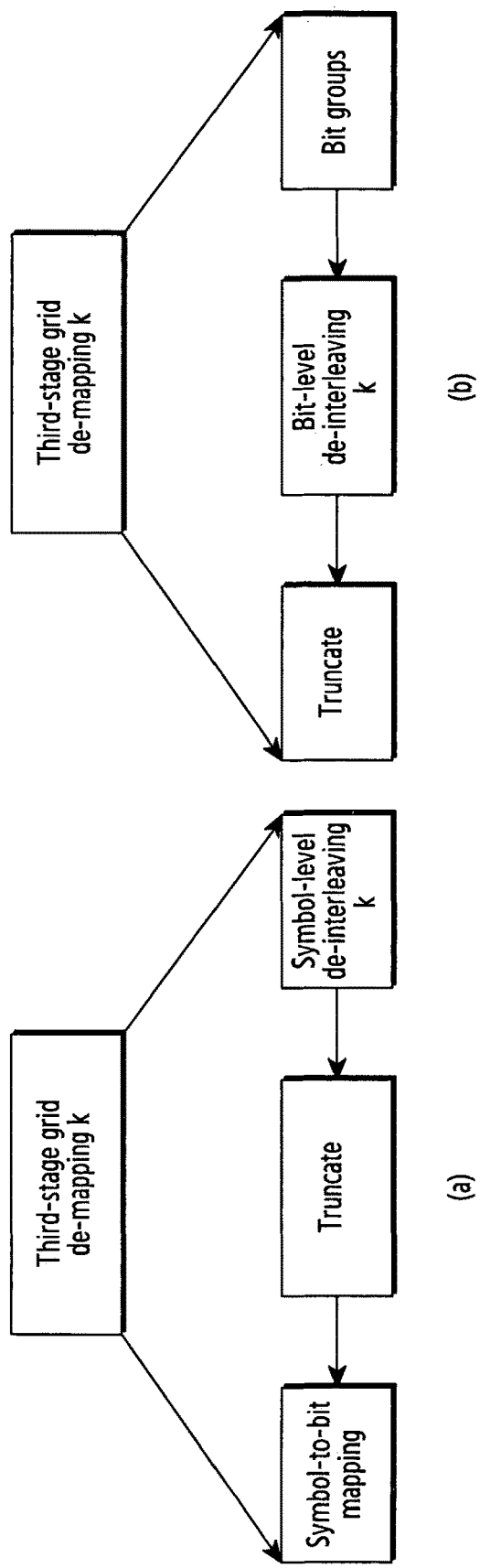

[Fig. 9]
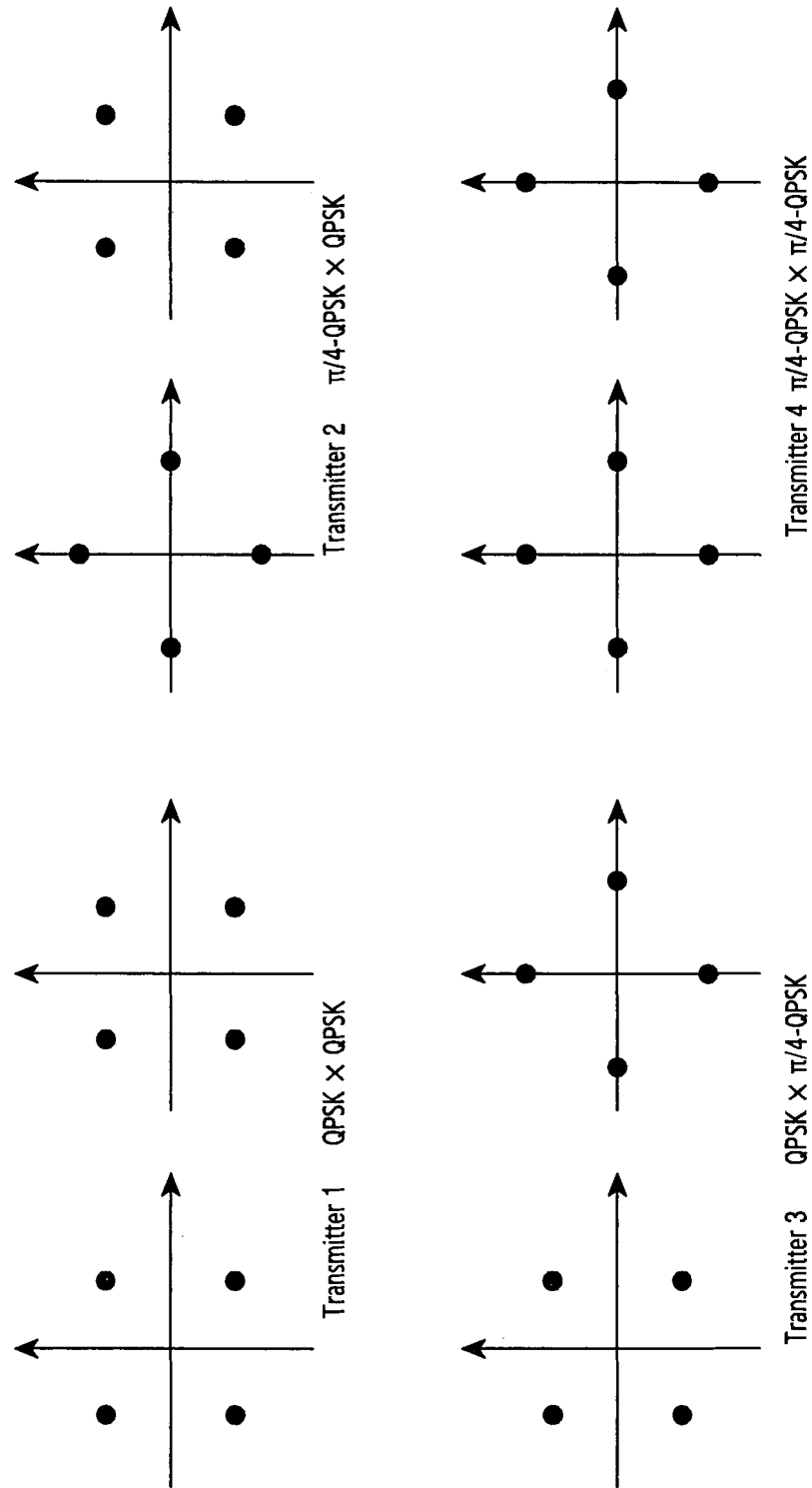

[Fig. 10]
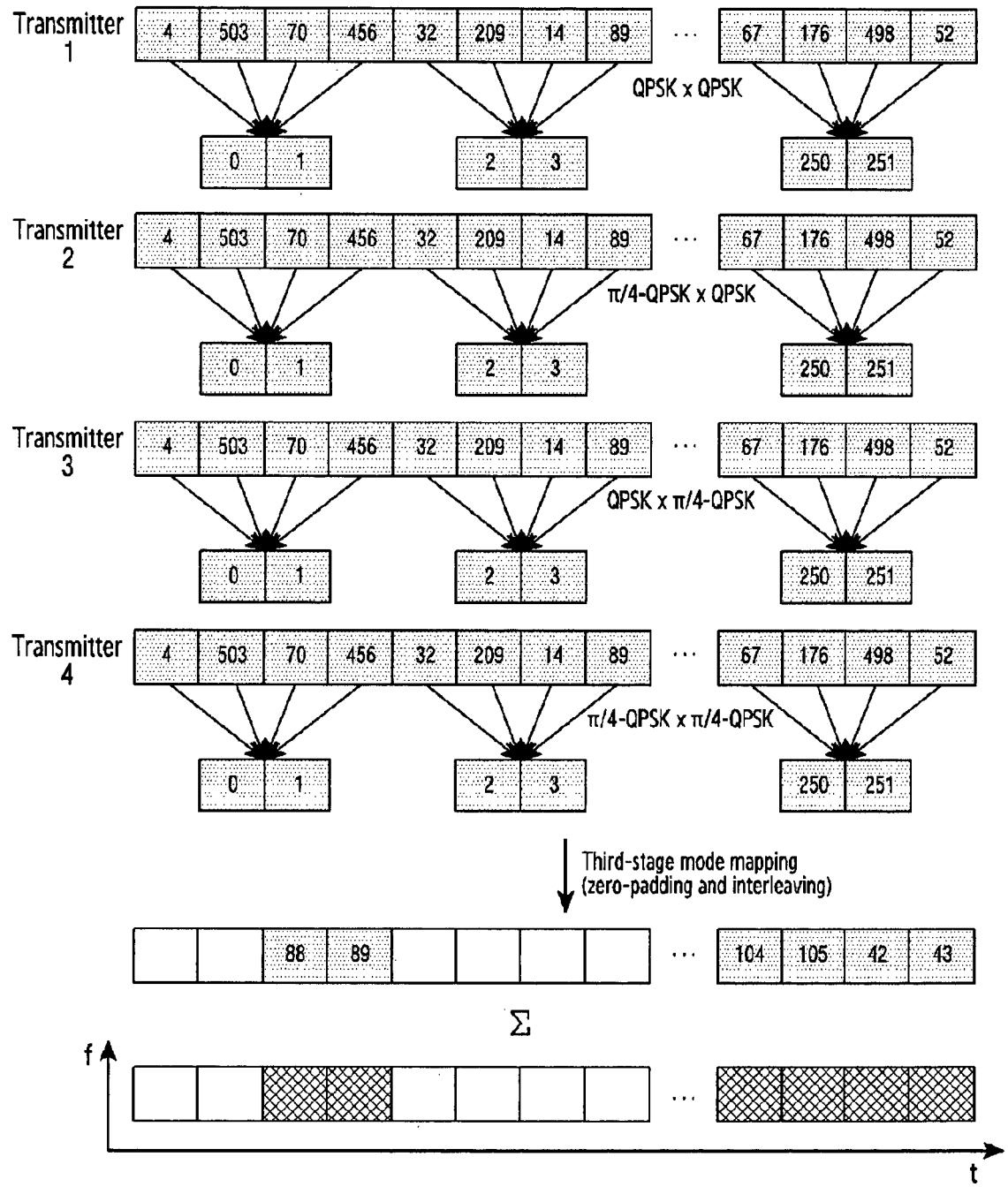

[Fig. 11]
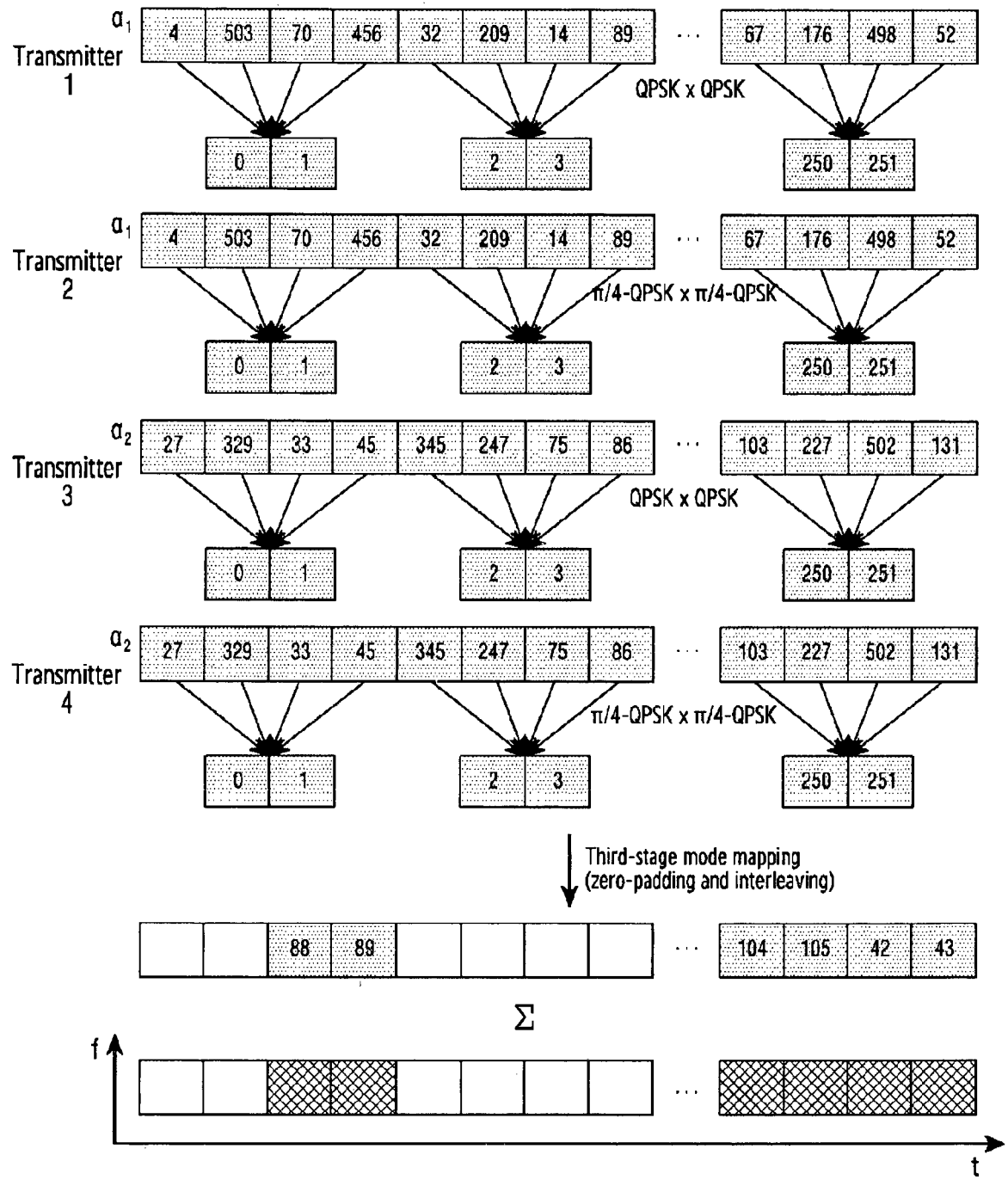

[Fig. 12]
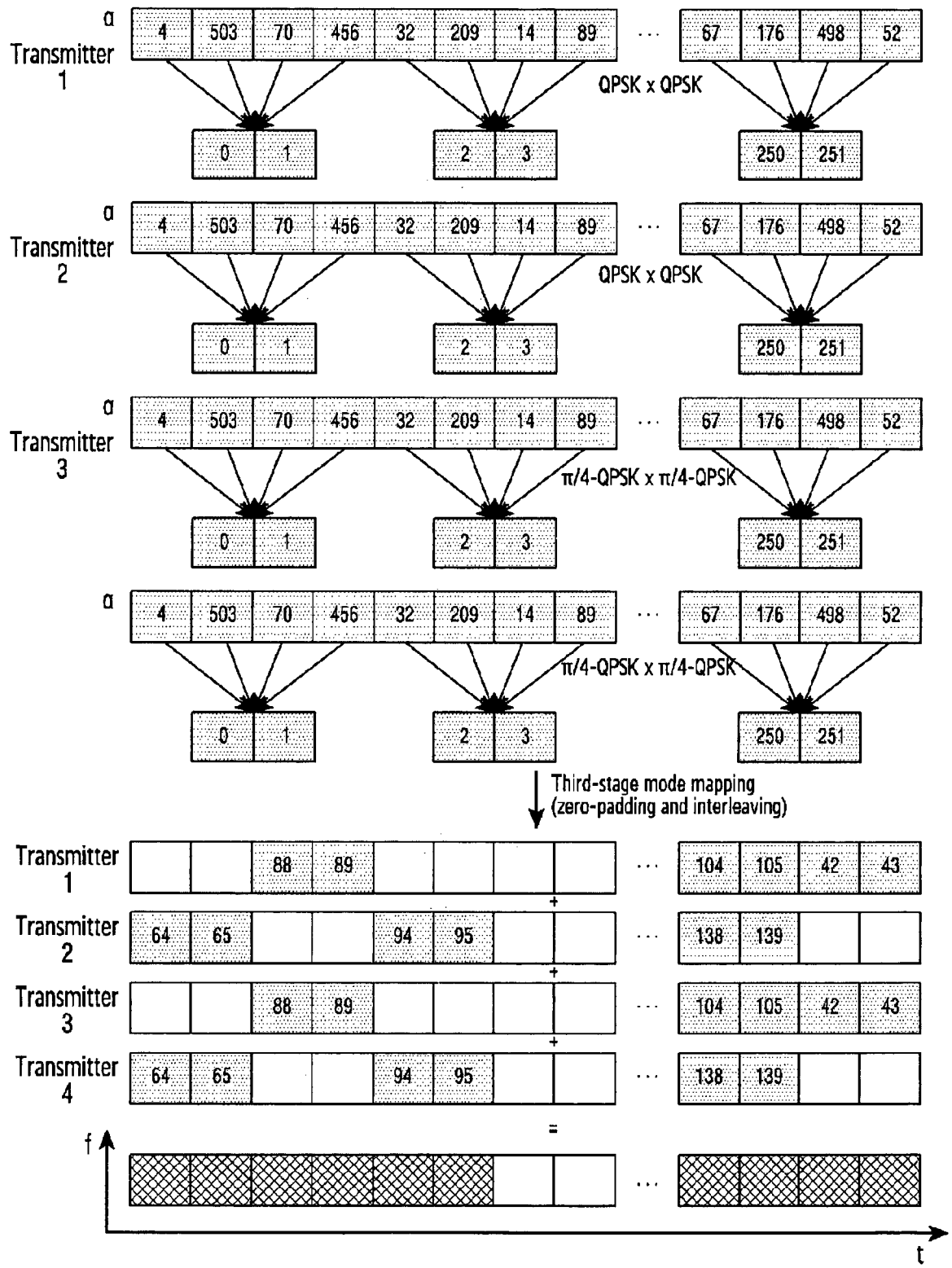

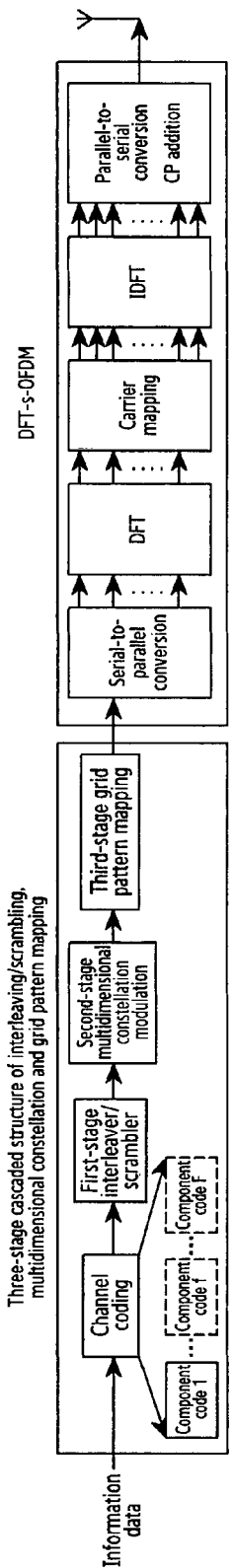
[Fig. 13]

[Fig. 14]
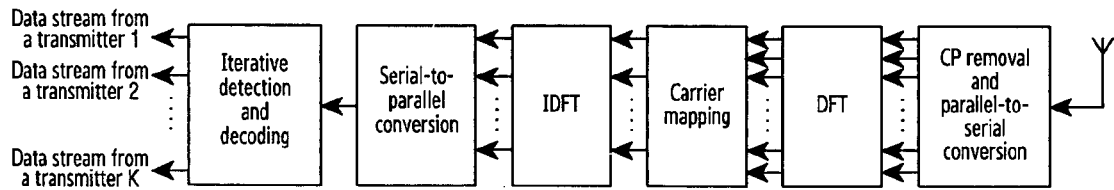
[Fig. 15]
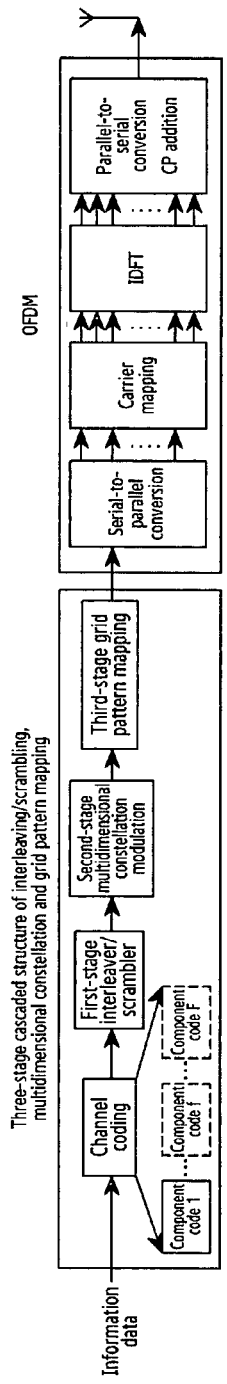

[Fig. 16]
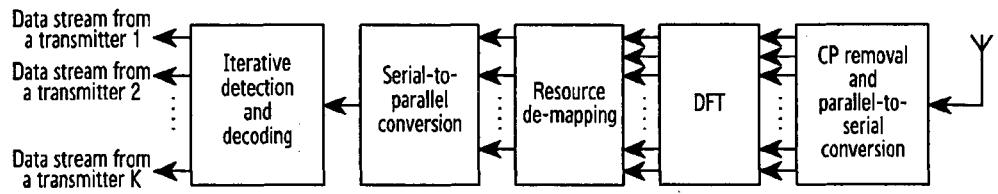
[Fig. 17]
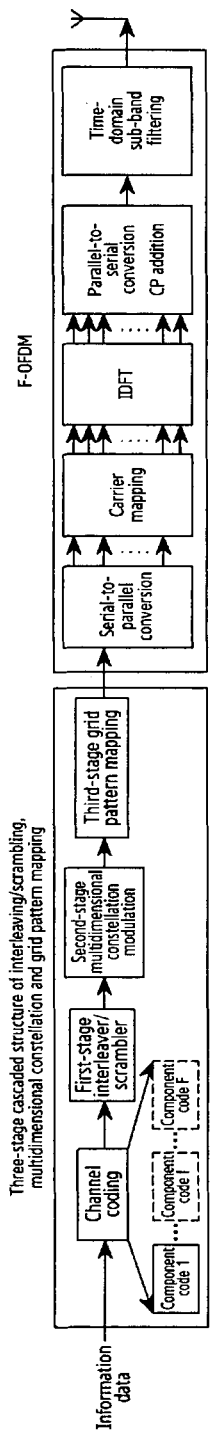

[Fig. 18]
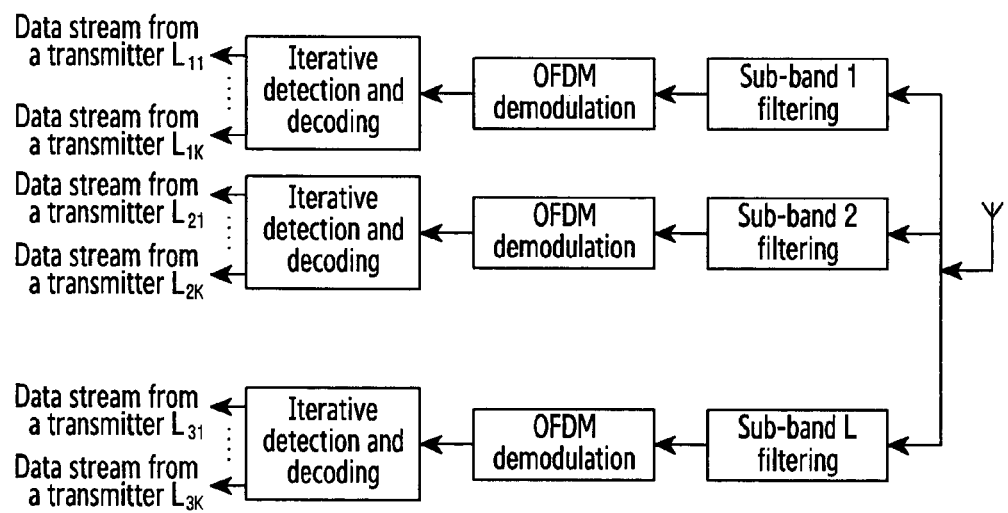

[Fig. 19]
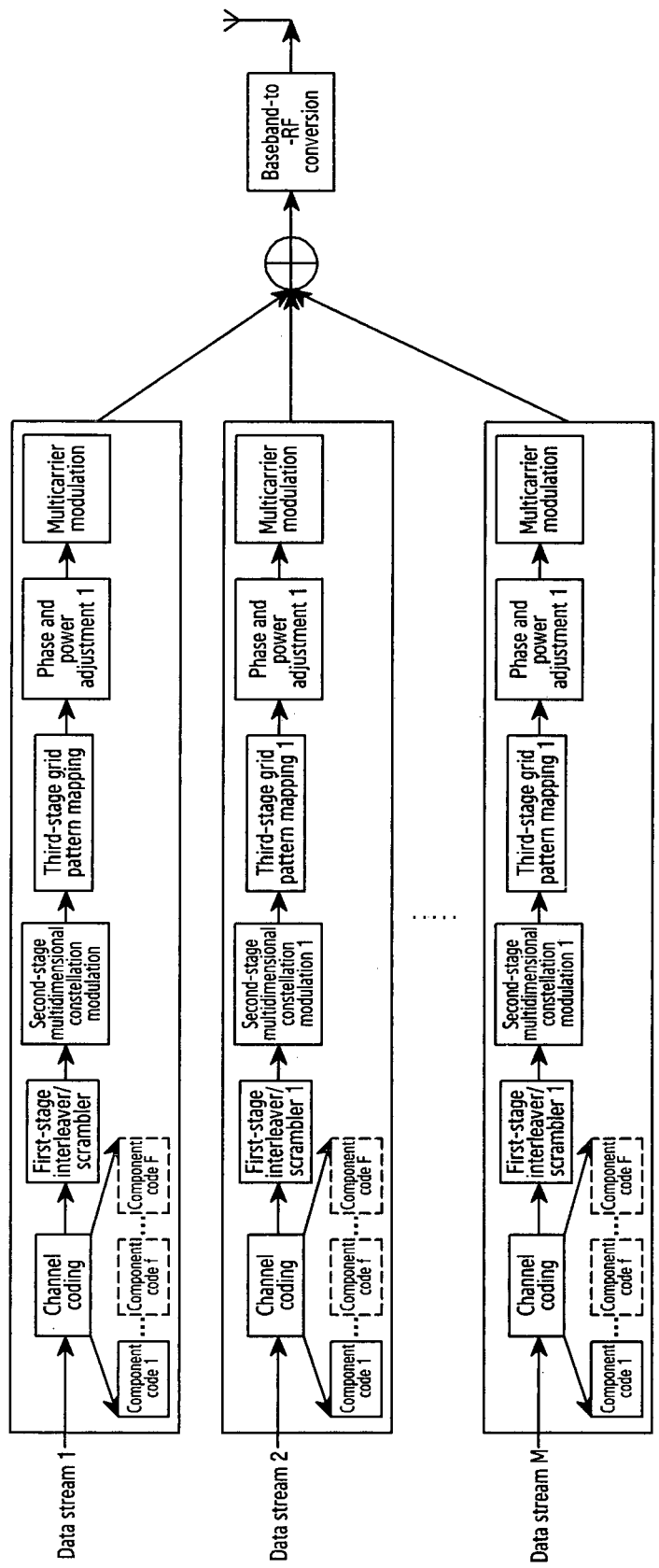

[Fig. 20]
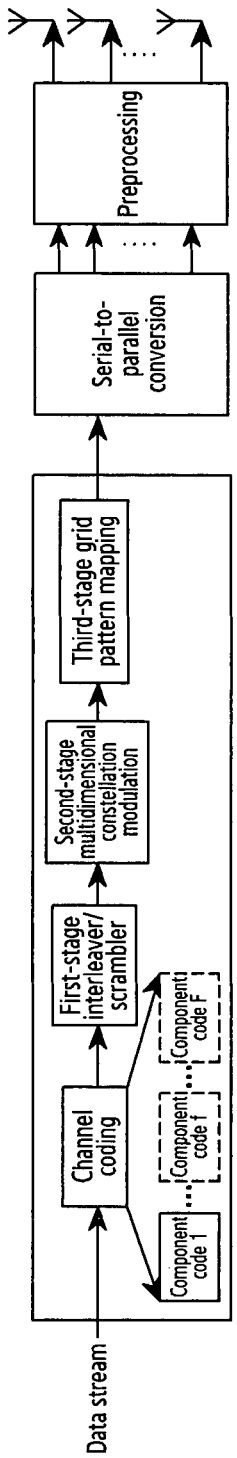

[Fig. 21]
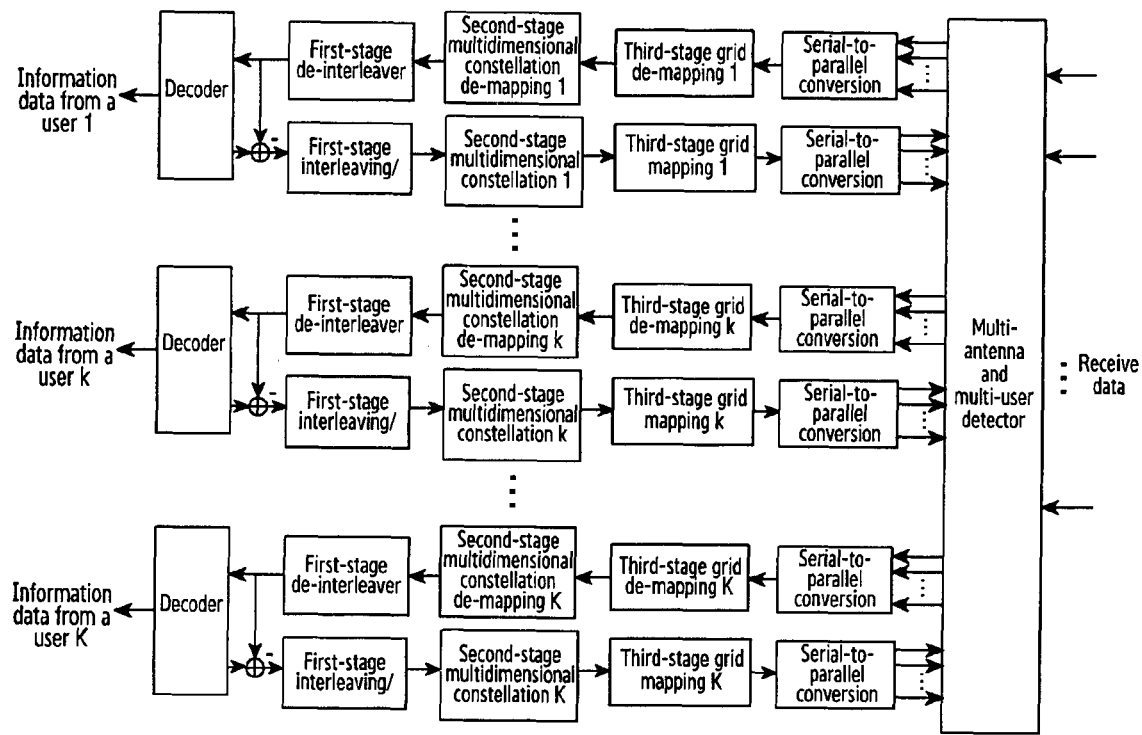
[Fig. 22]
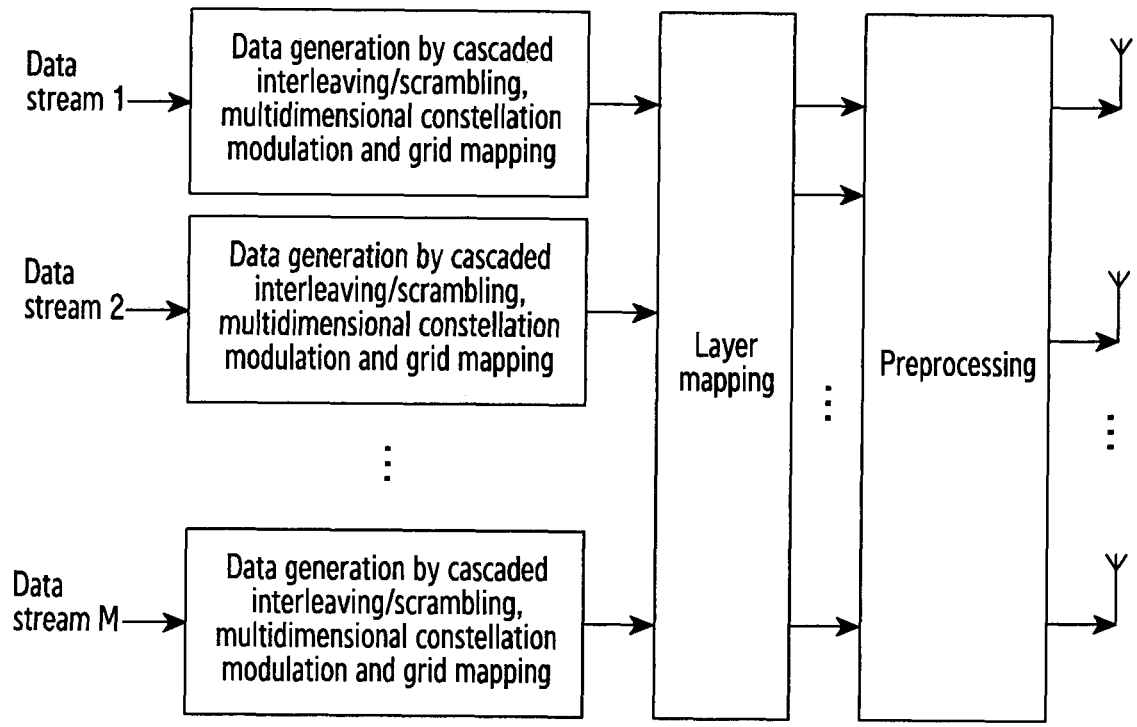

[Fig. 23]
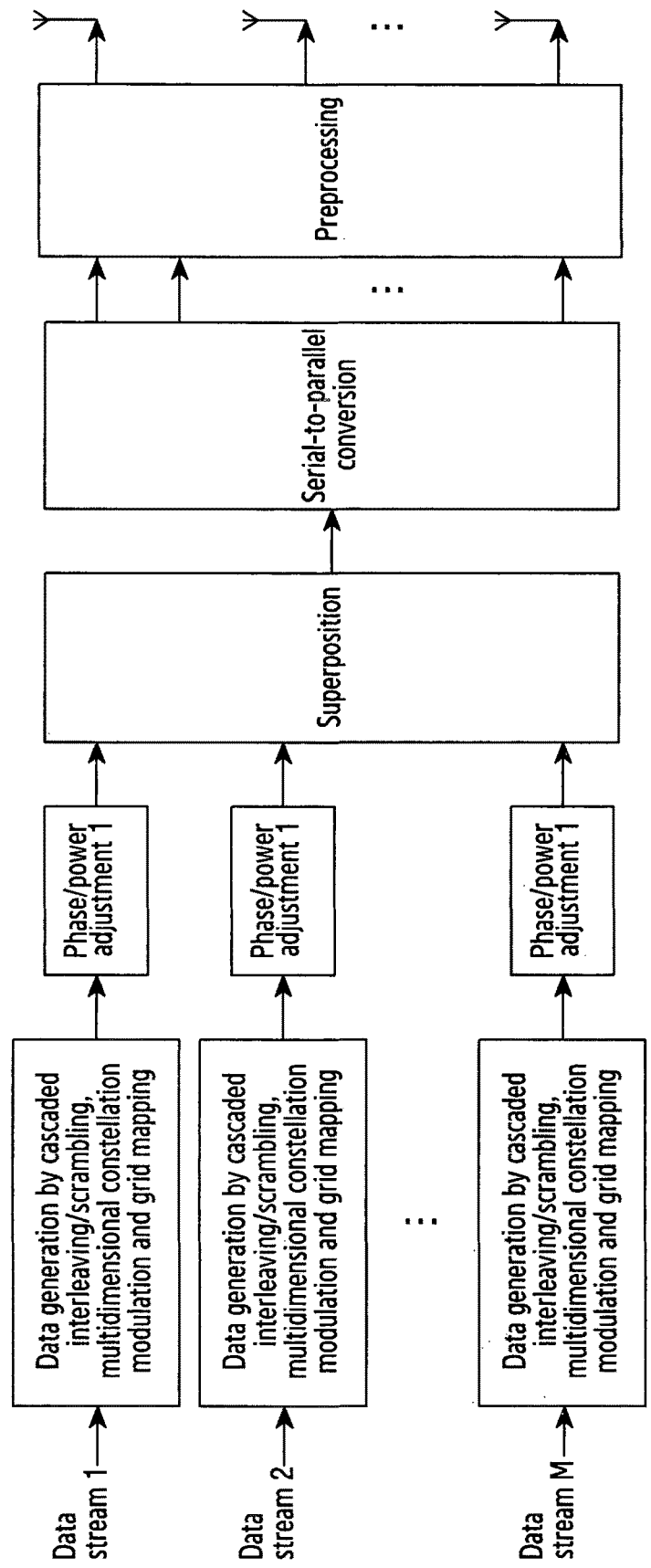

[Fig. 24]
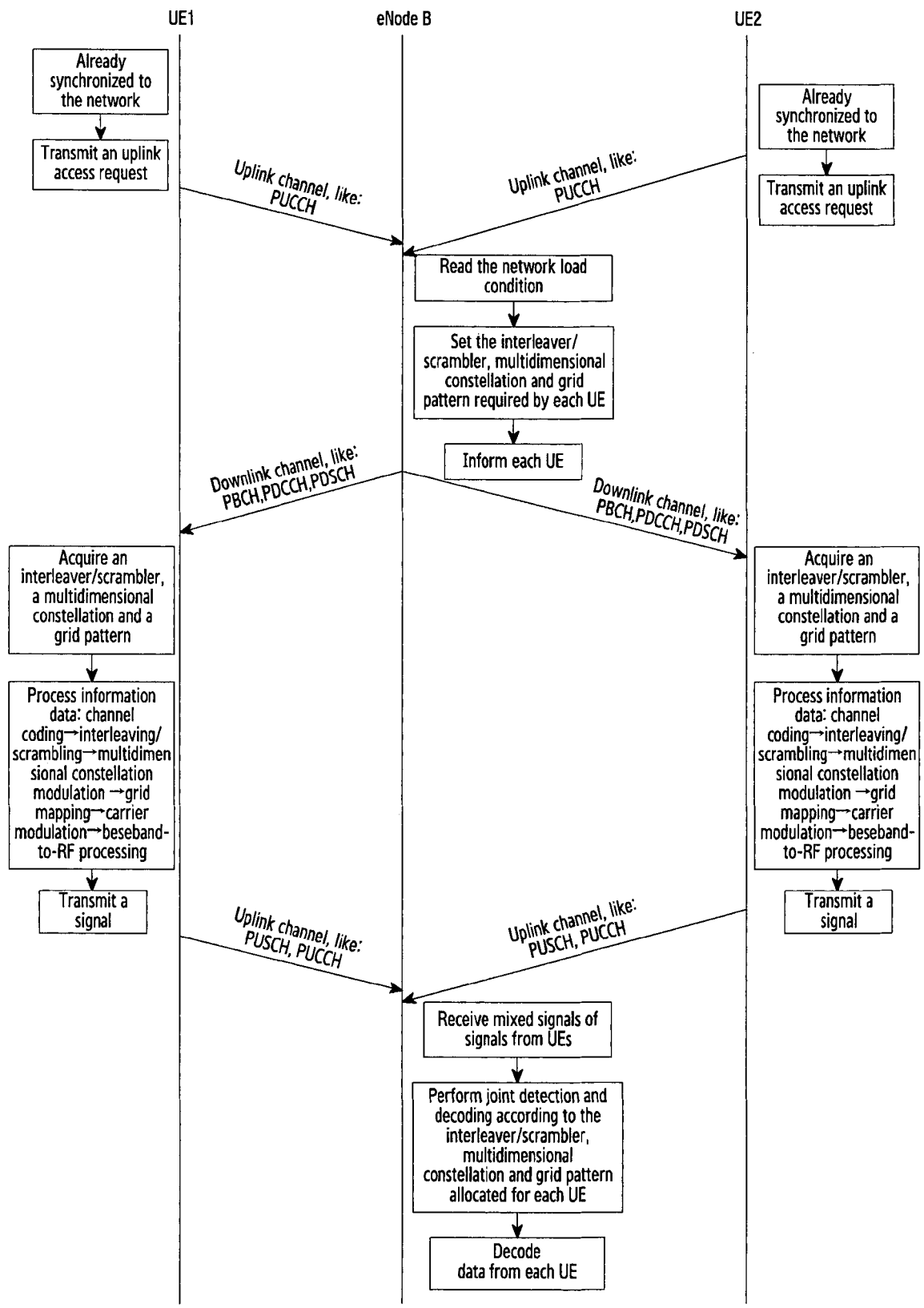

[Fig. 25]
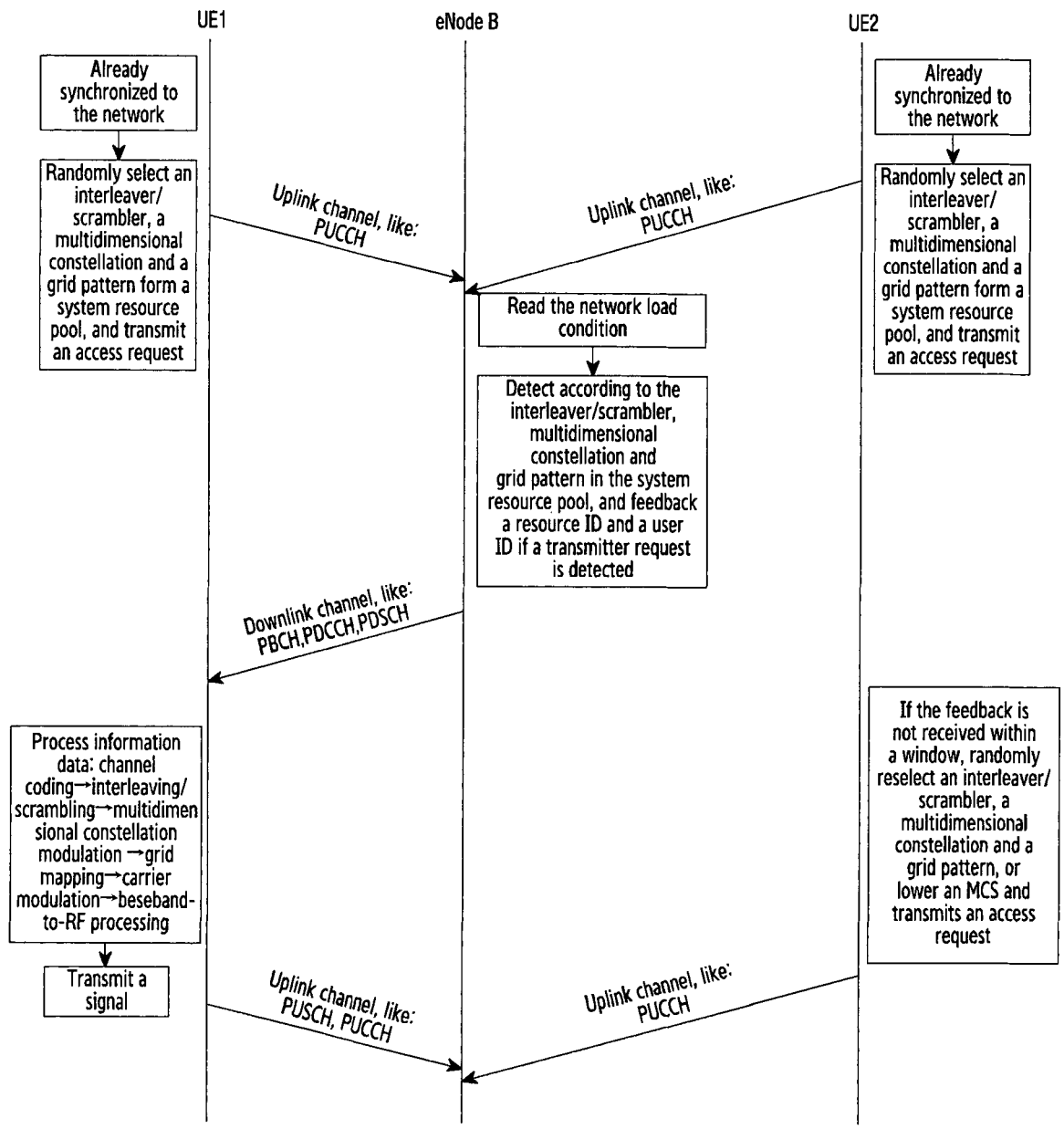

[Fig. 26]
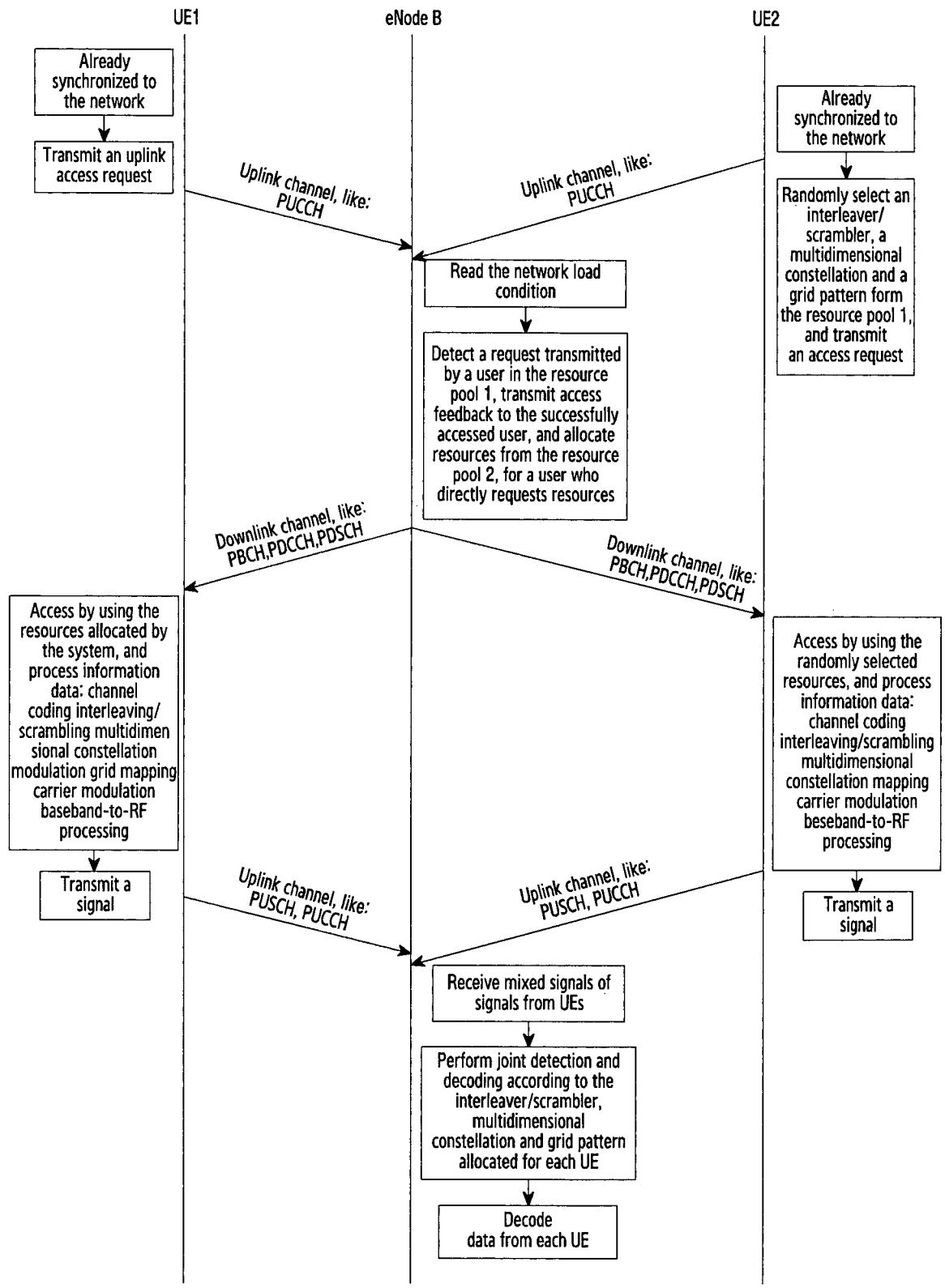

[Fig. 27]
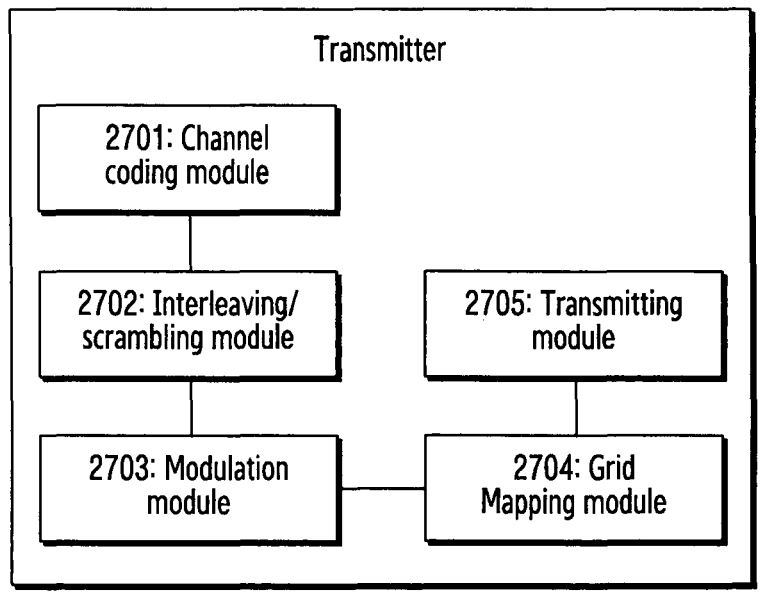
[Fig. 28]
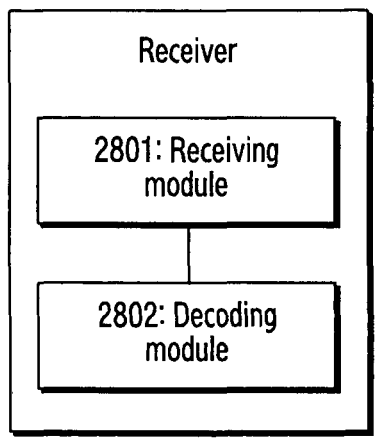
[Fig. 29]
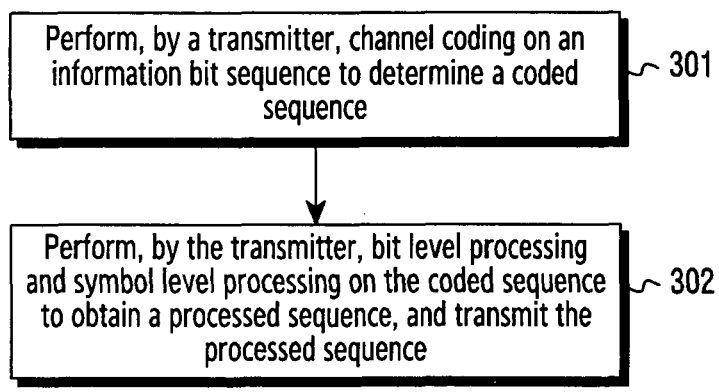

[Fig. 30]
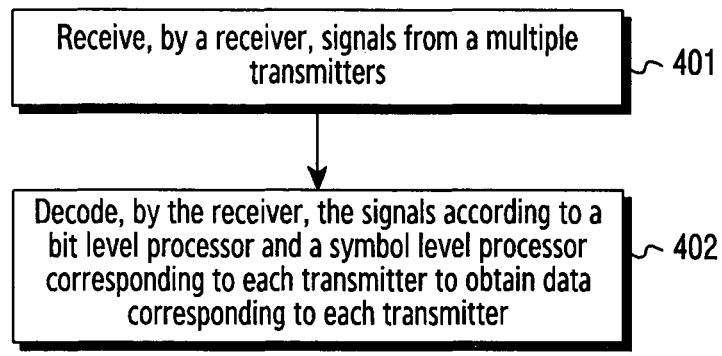
[Fig. 31]
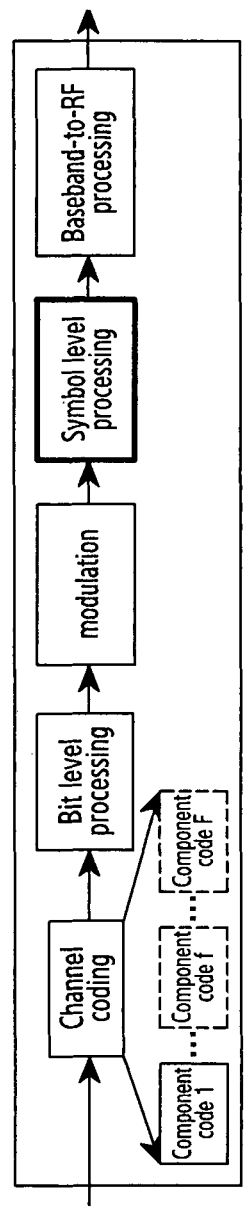

[Fig. 32]
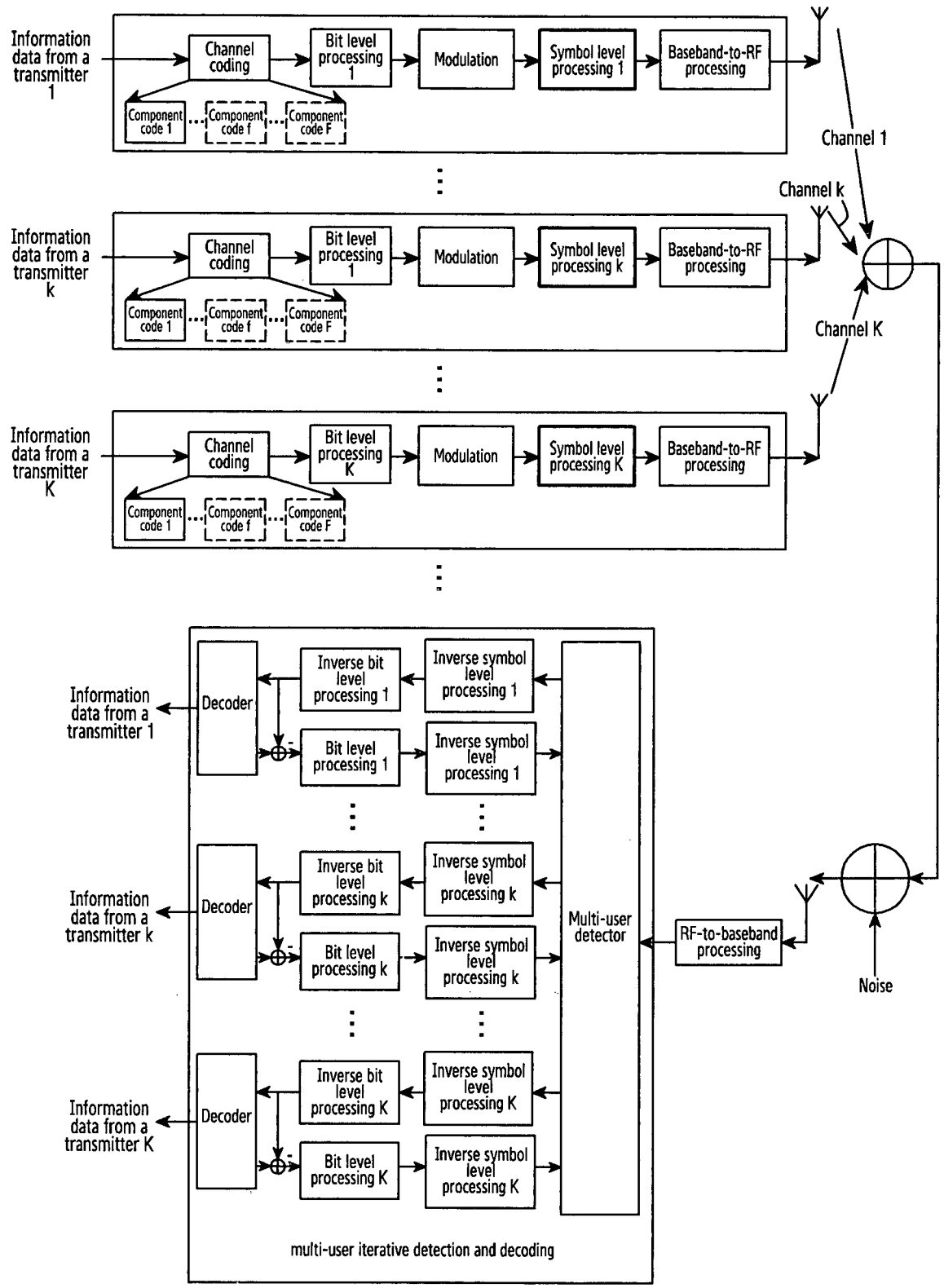

[Fig. 33]
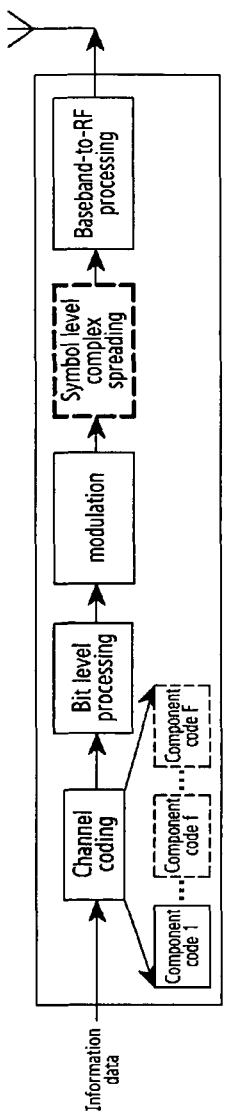
[Fig. 34]
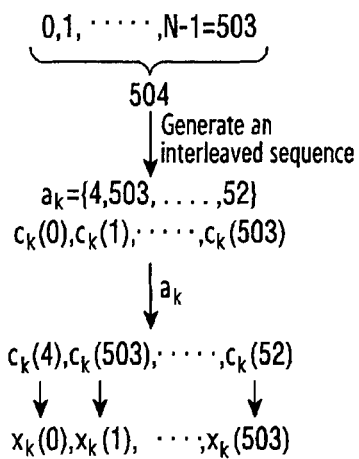

[Fig. 35]
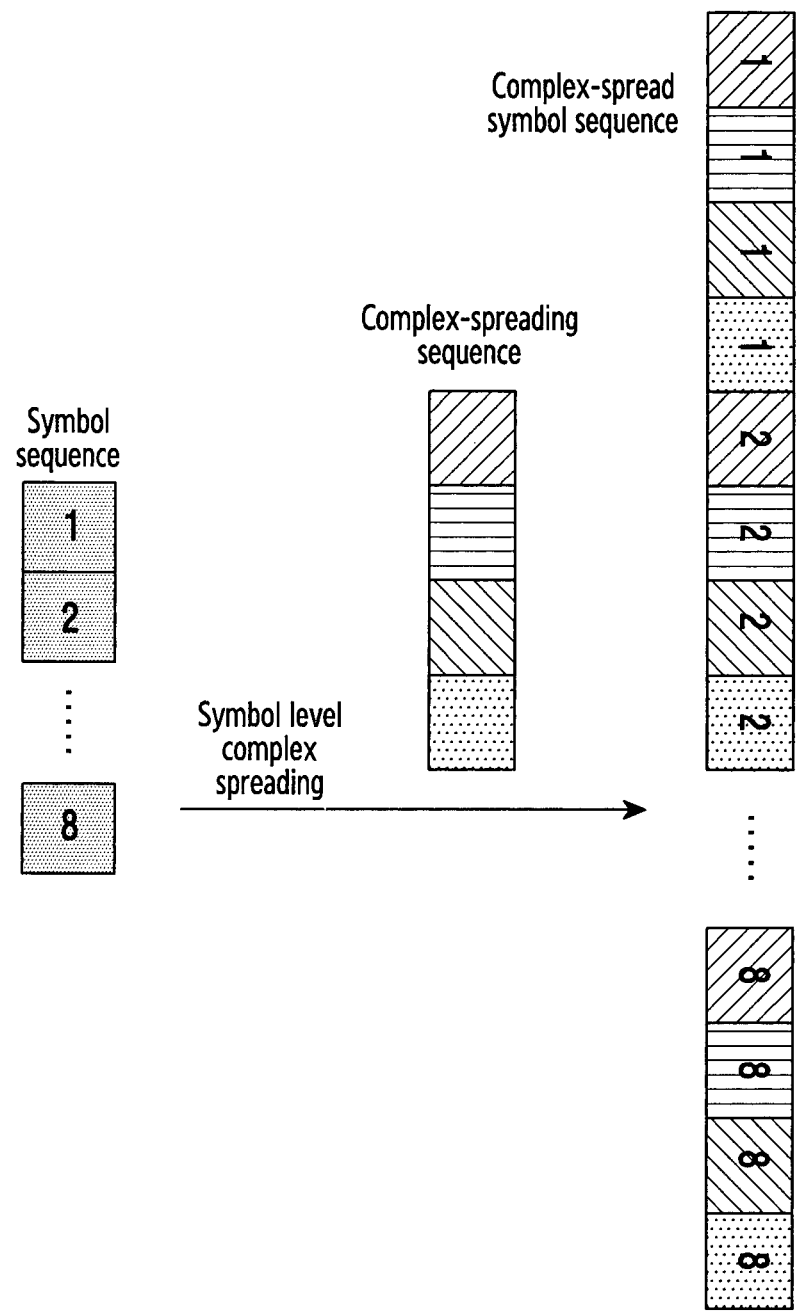

[Fig. 36]
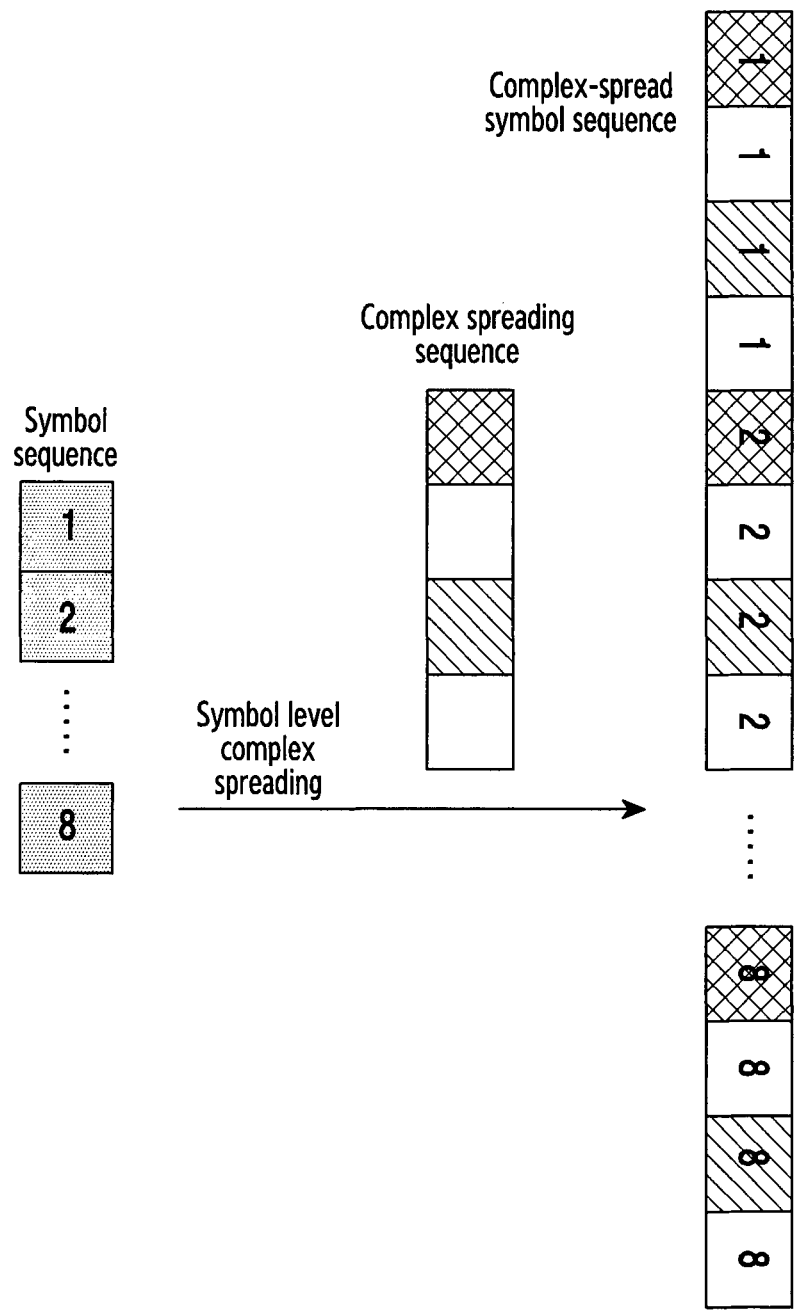

[Fig. 37]
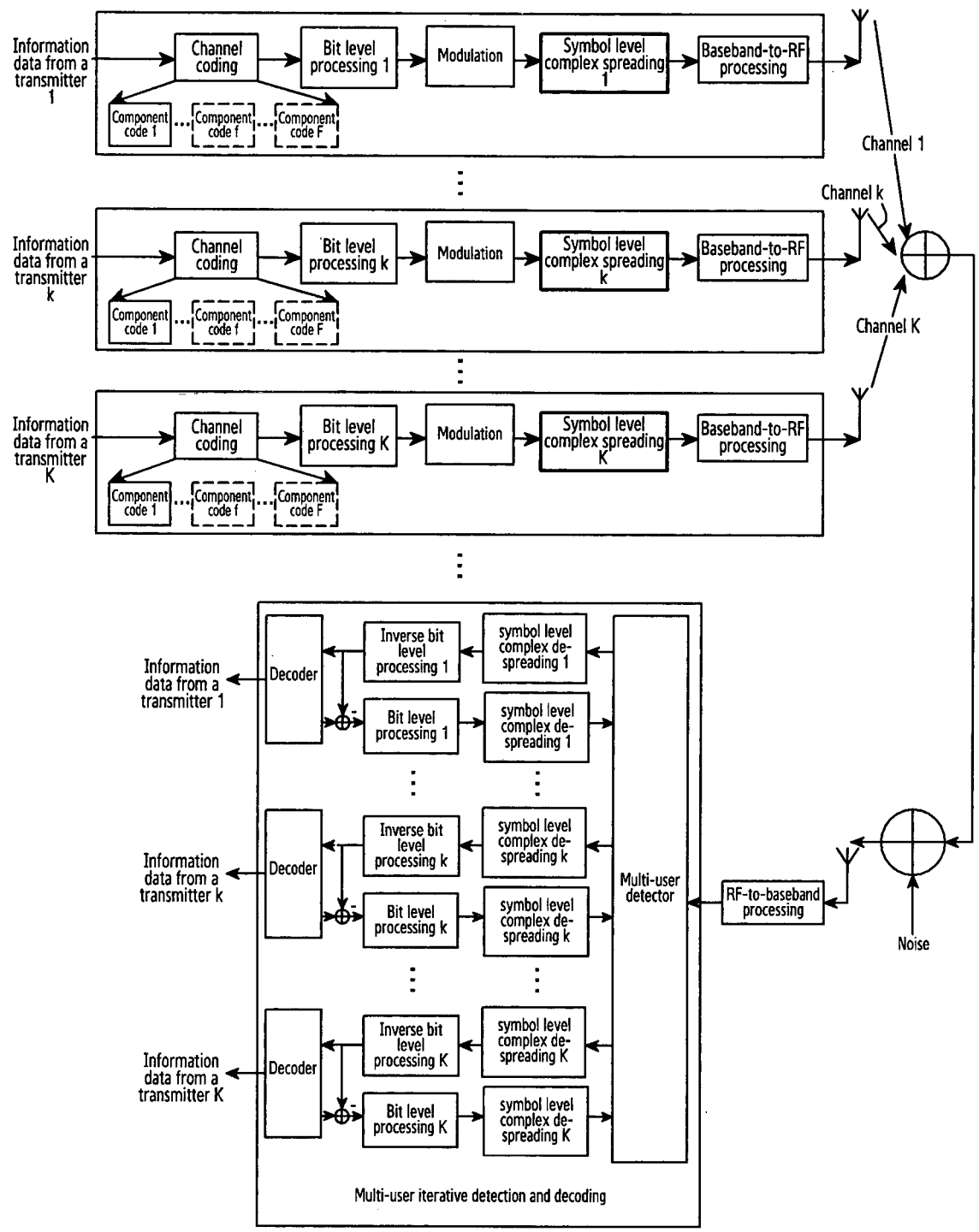

[Fig. 38]
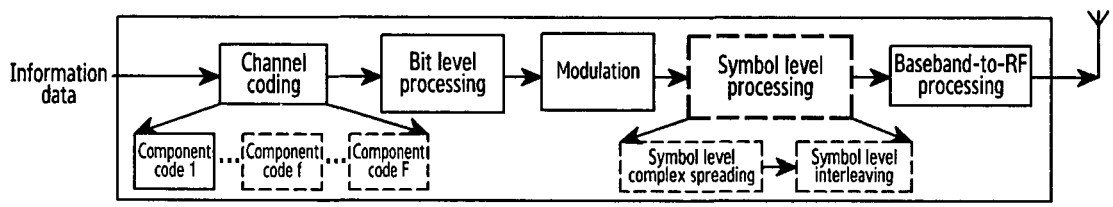
[Fig. 39]
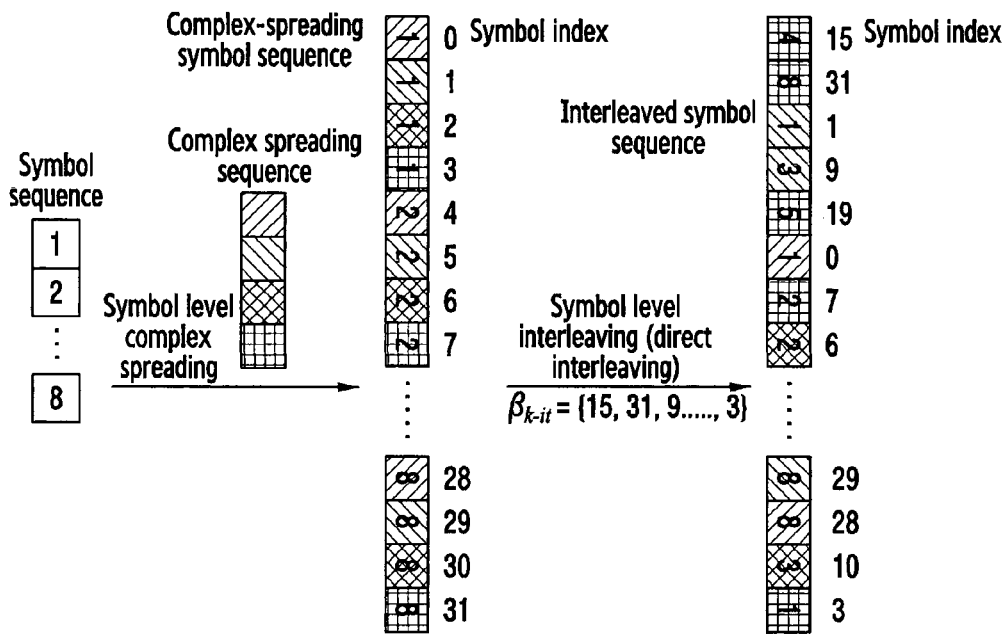
[Fig. 40]
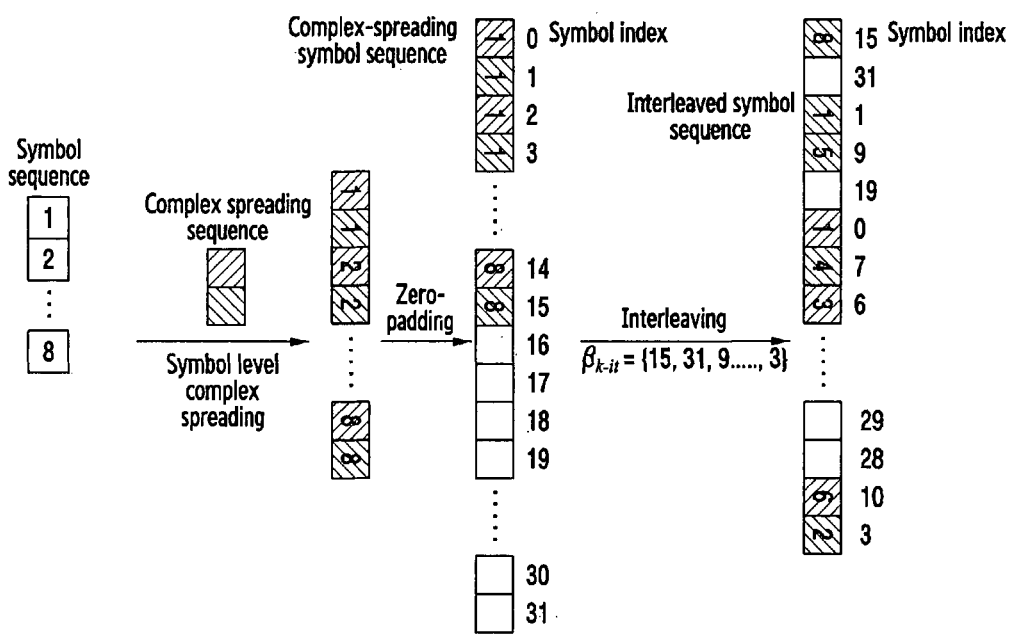

[Fig. 41]
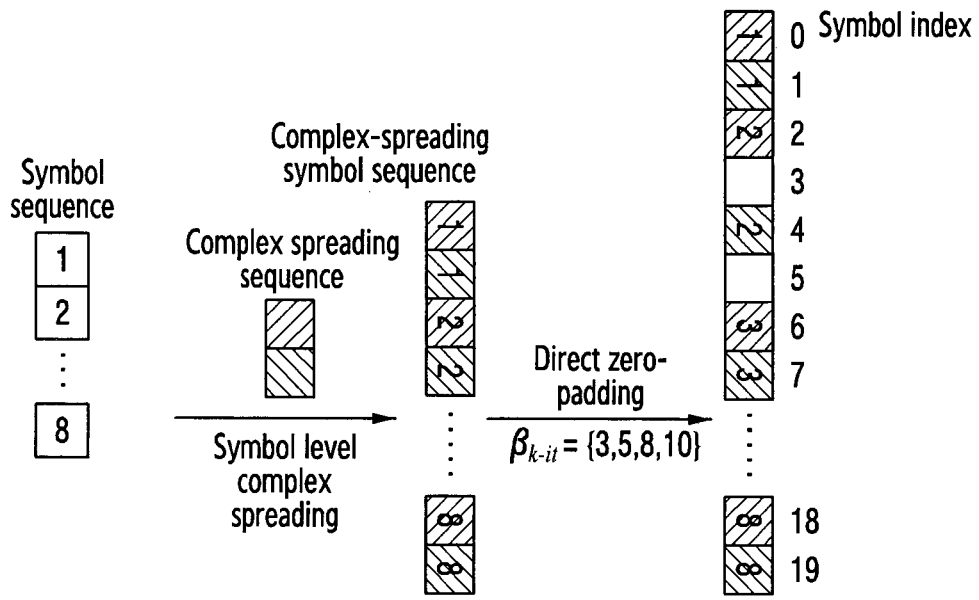
[Fig. 42]
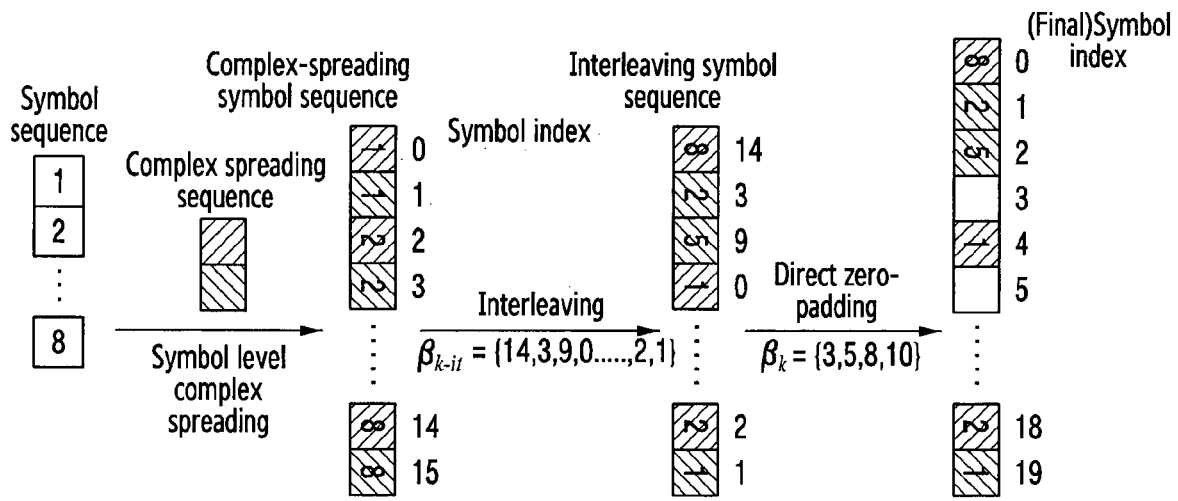

[Fig. 43]
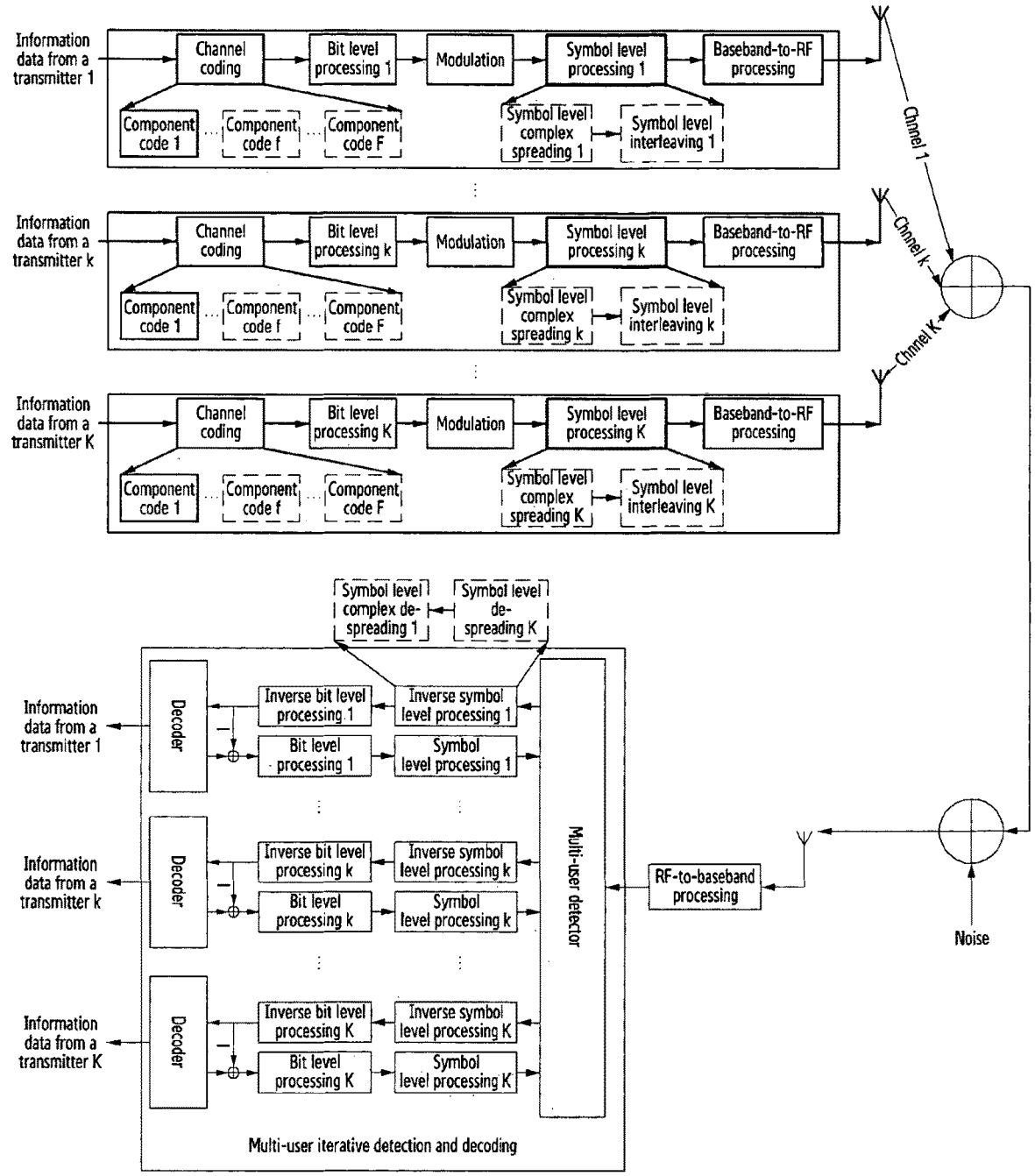

[Fig. 44]
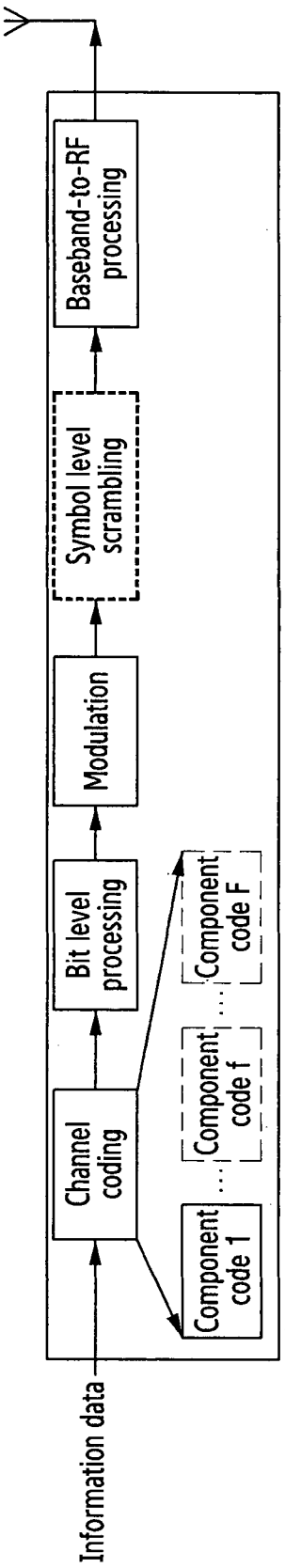

[Fig. 45]
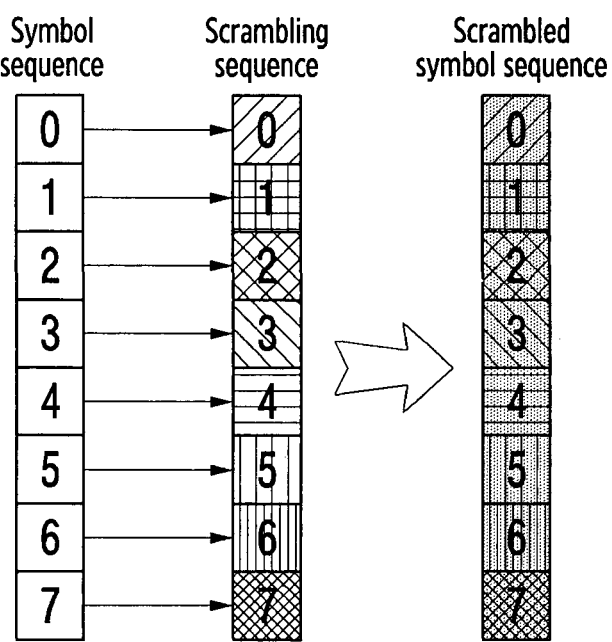

[Fig. 46]
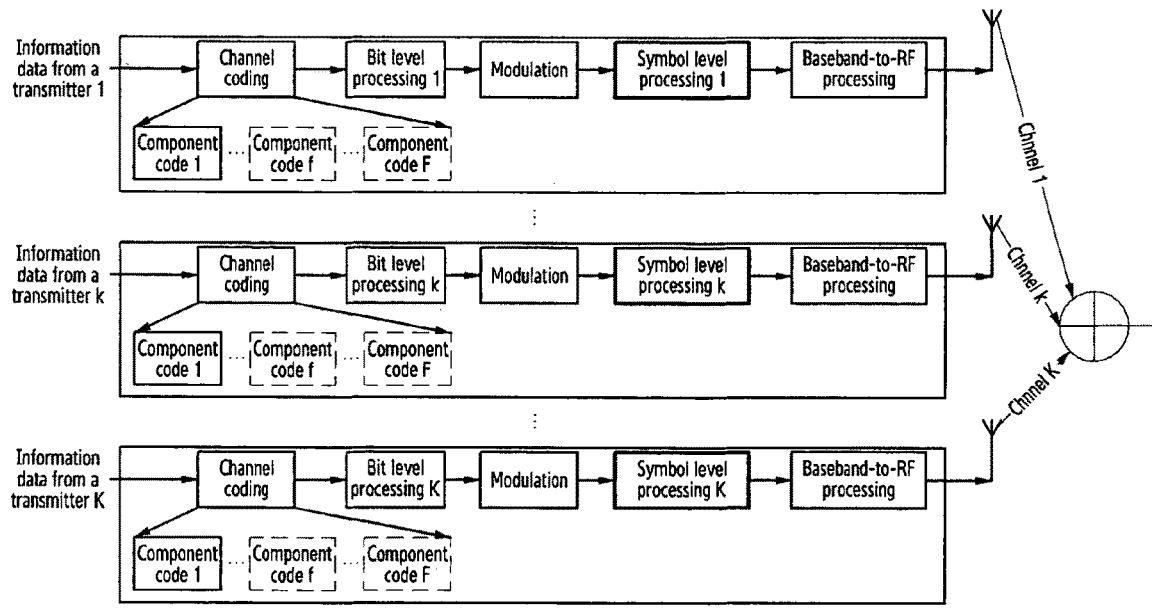
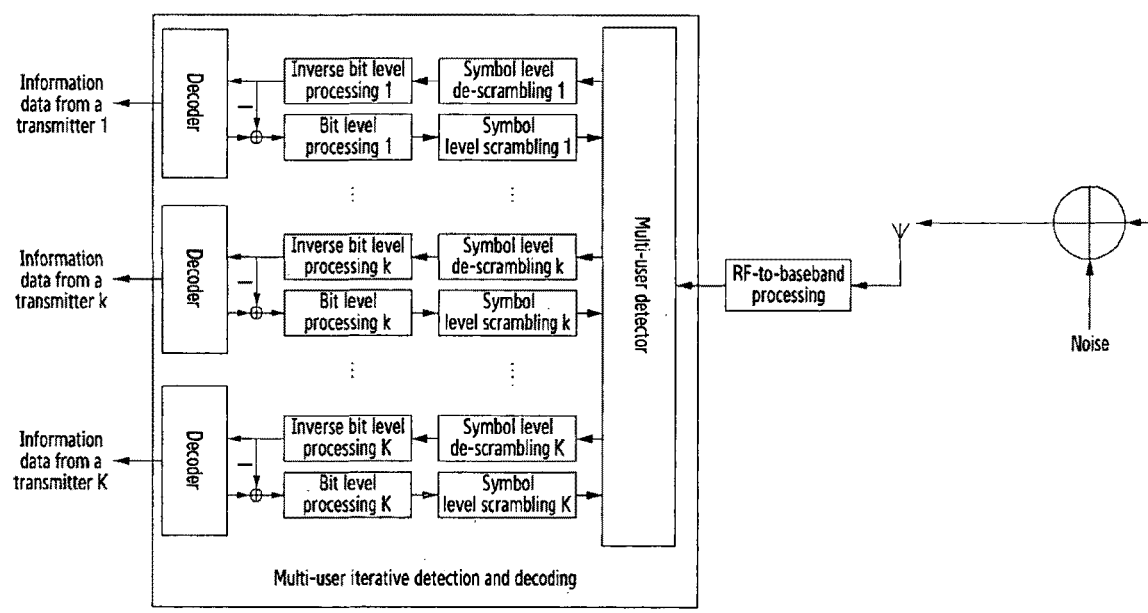

[Fig. 47]
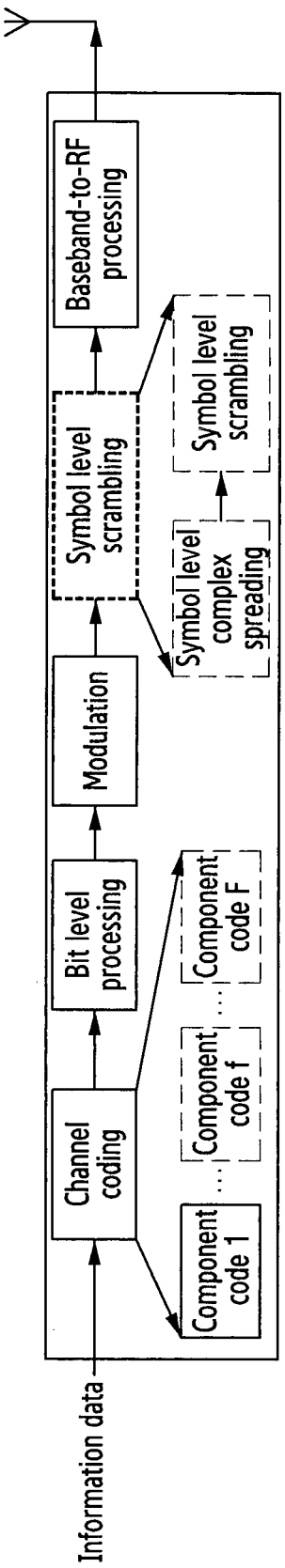

[Fig. 48]
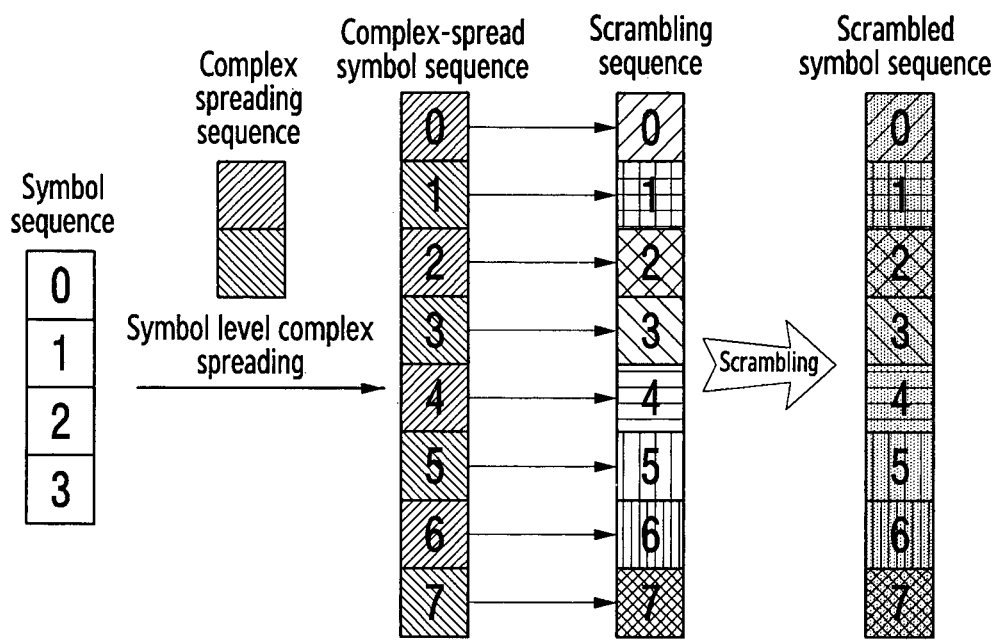

[Fig. 49]
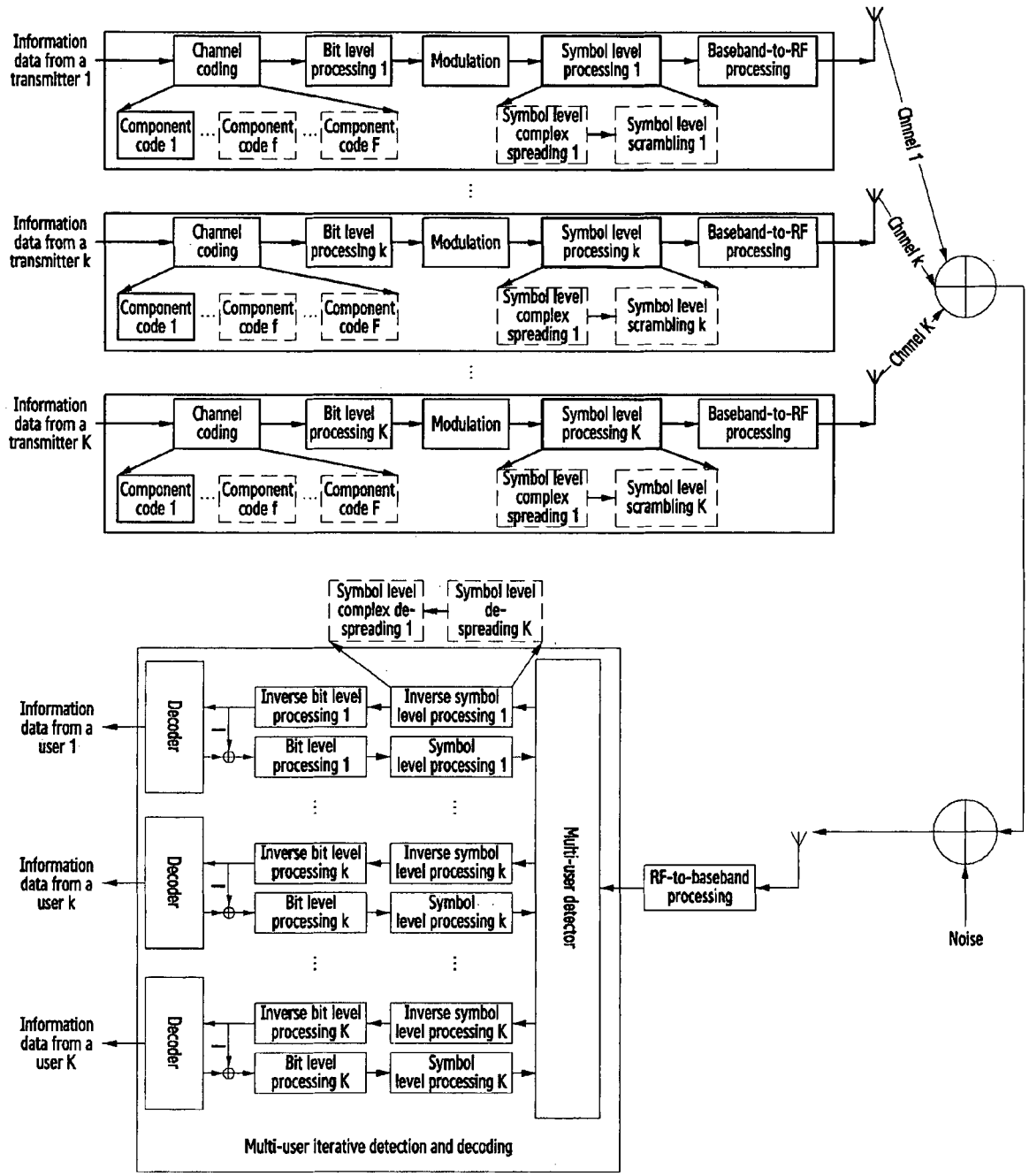

[Fig. 50]
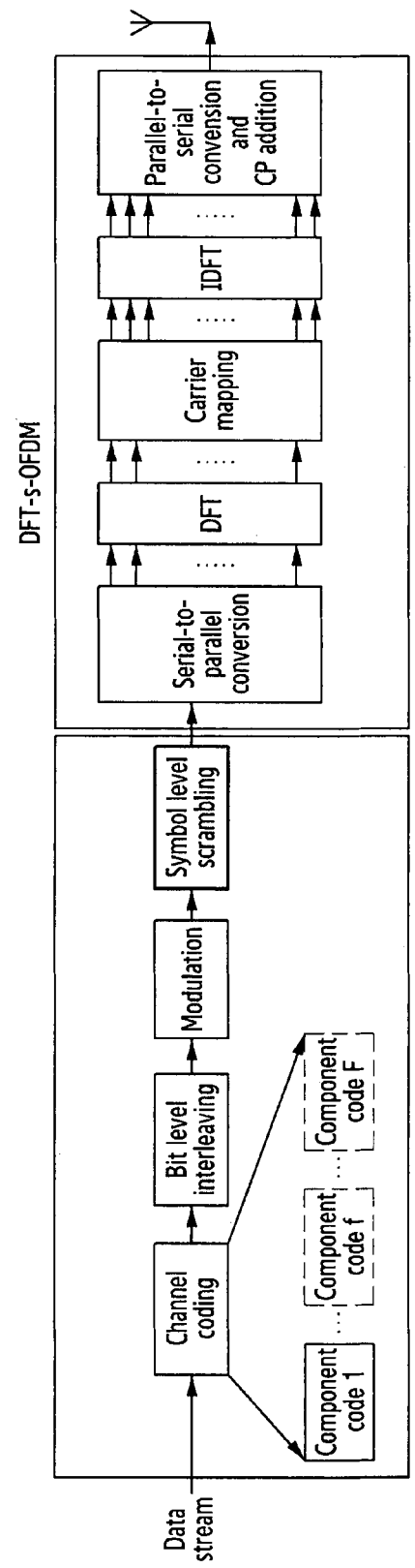

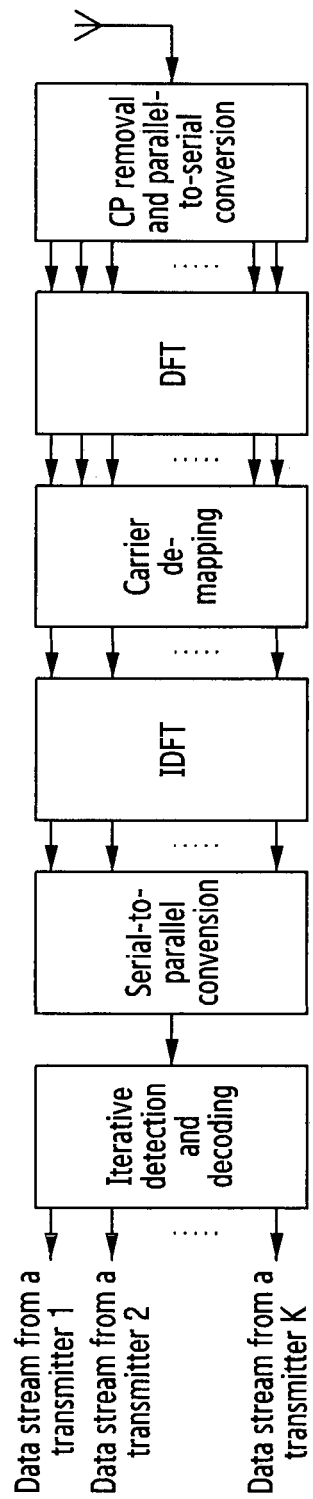
[Fig. 51]

[Fig. 52]
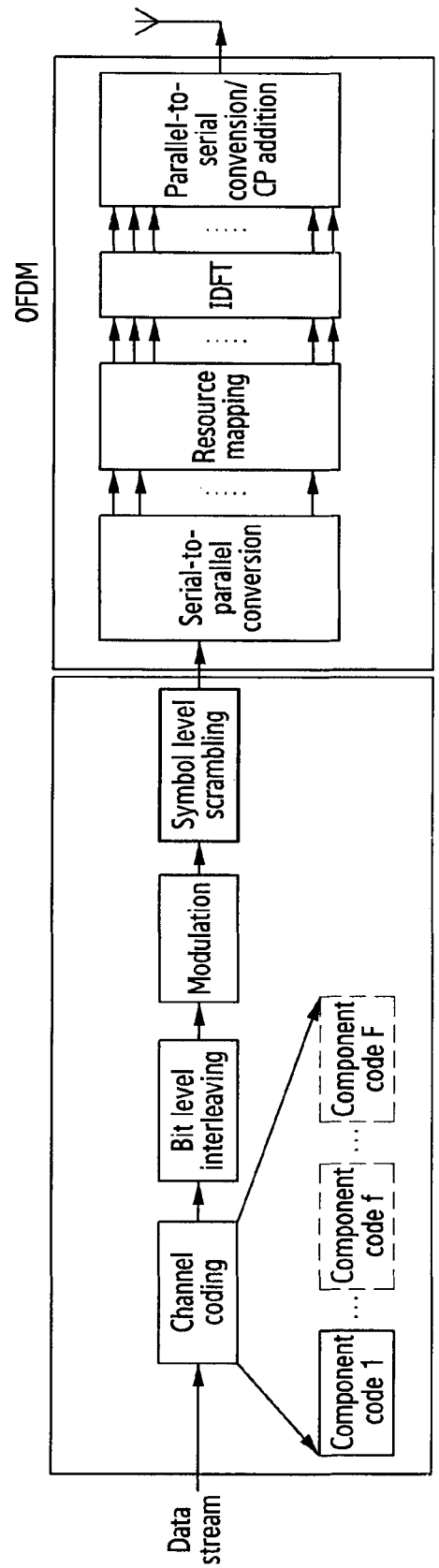

[Fig. 53]
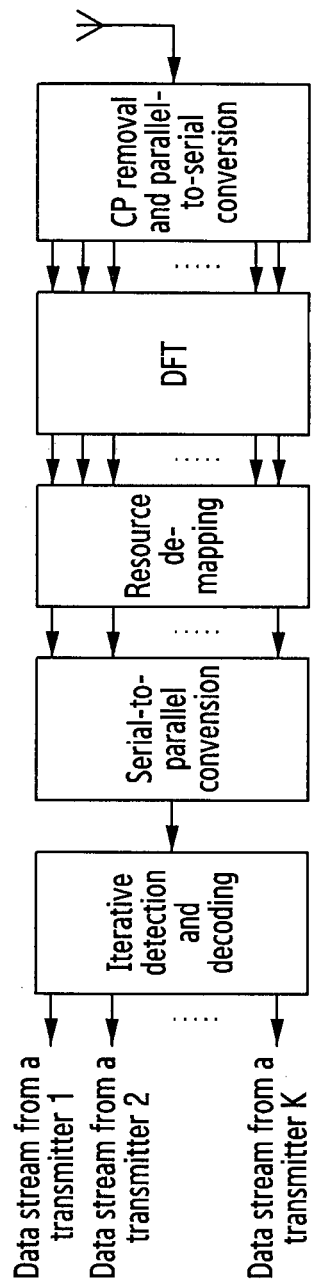

[Fig. 54]
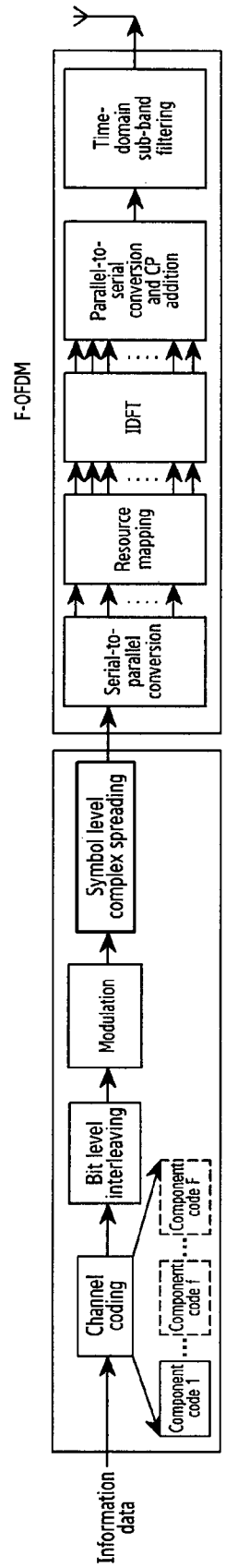

[Fig. 55]
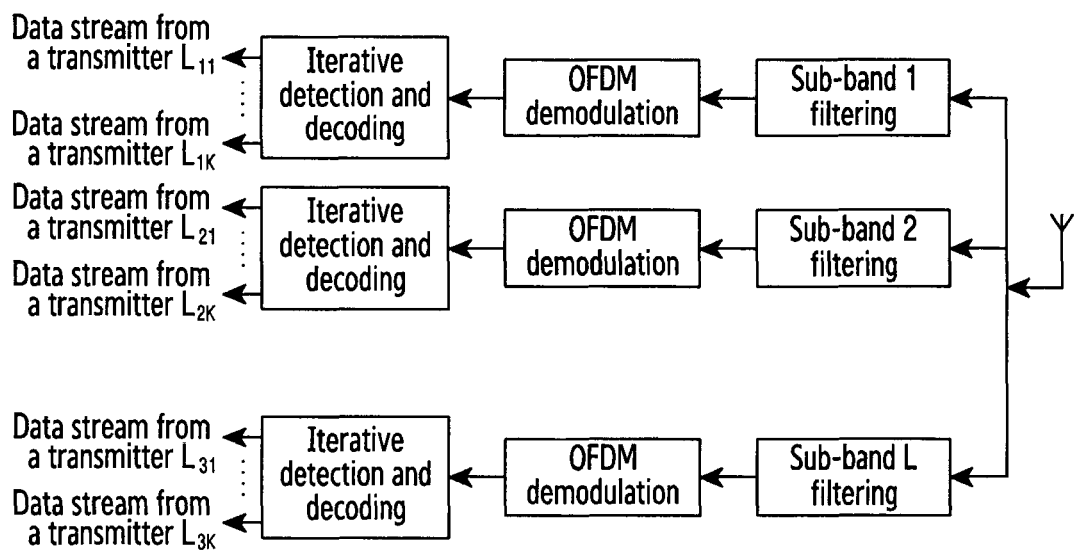

[Fig. 56]
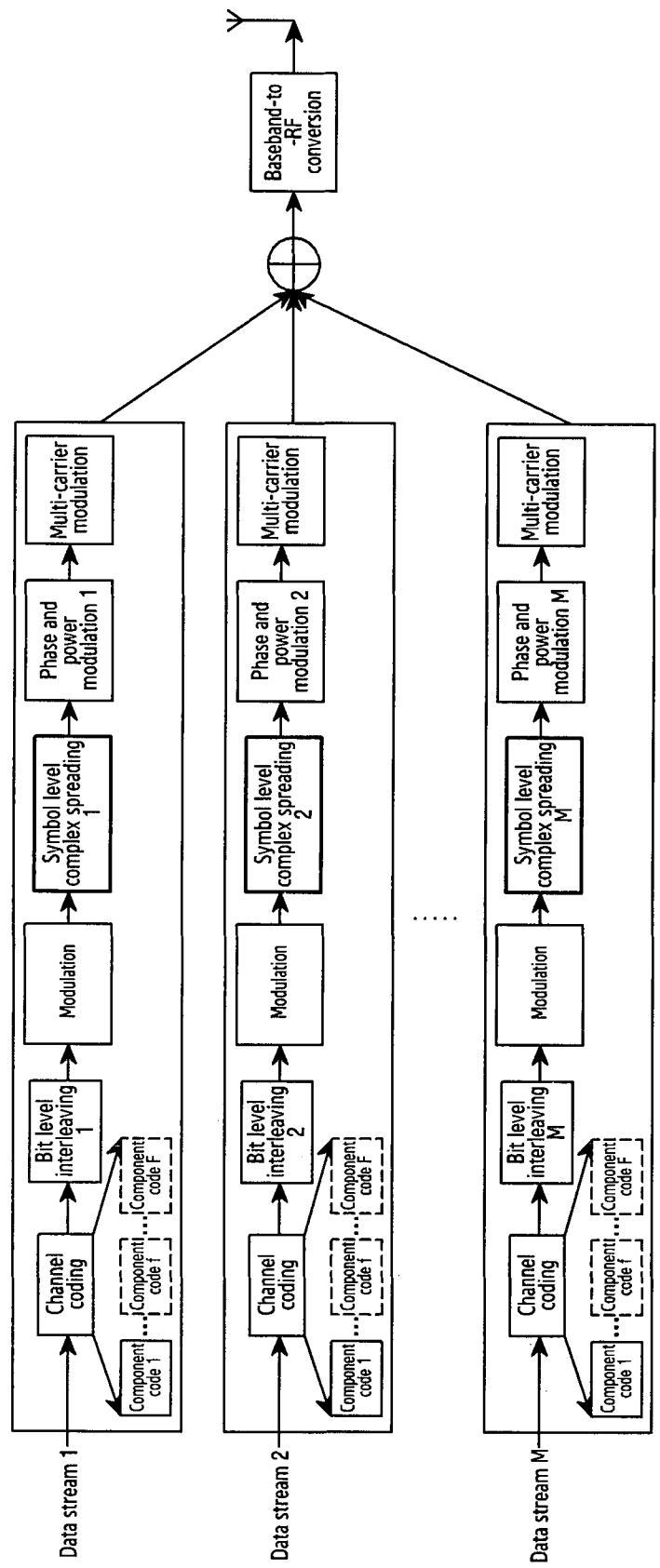

[Fig. 57]
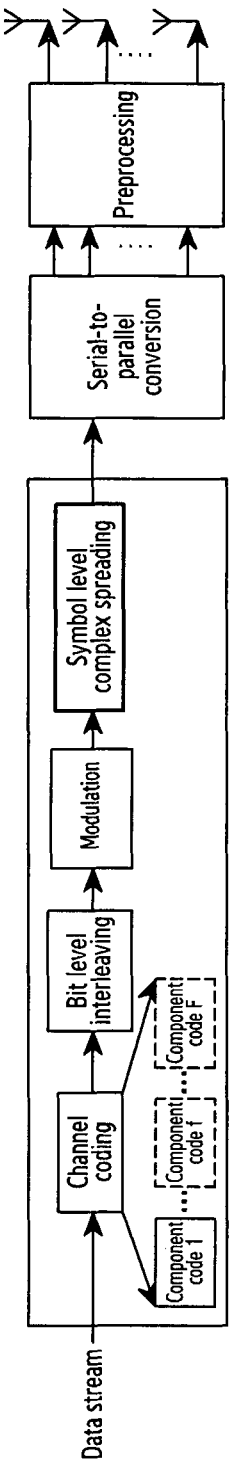

[Fig. 58]
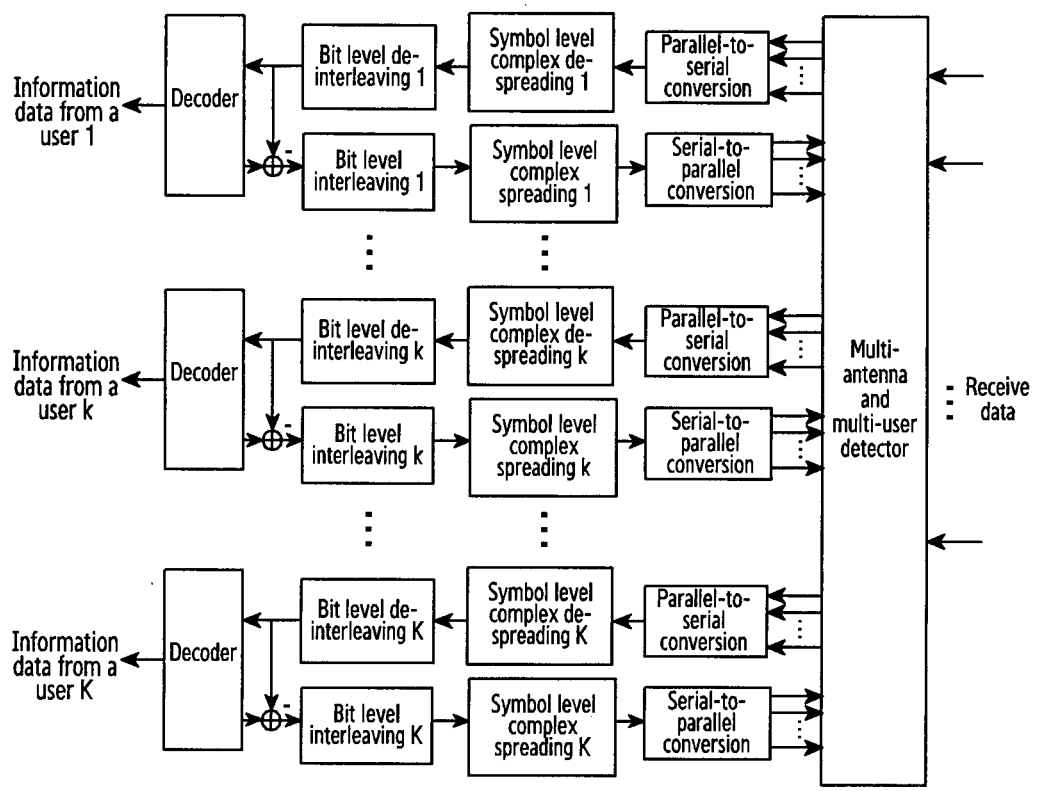
[Fig. 59]
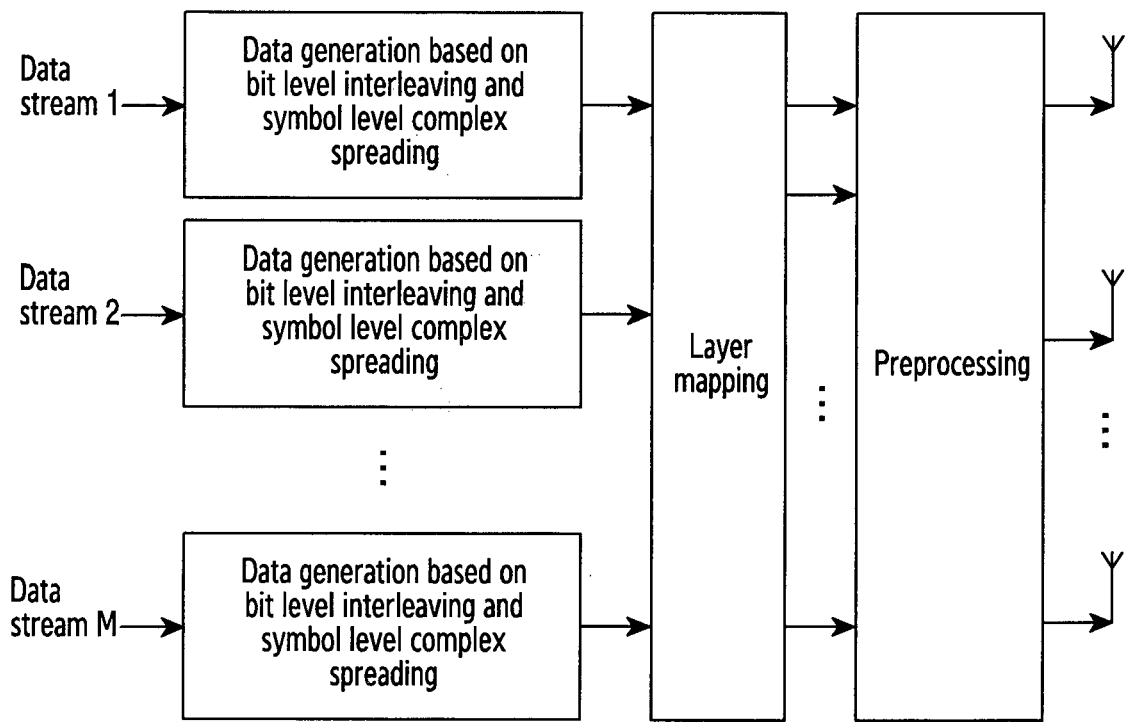

[Fig. 60]
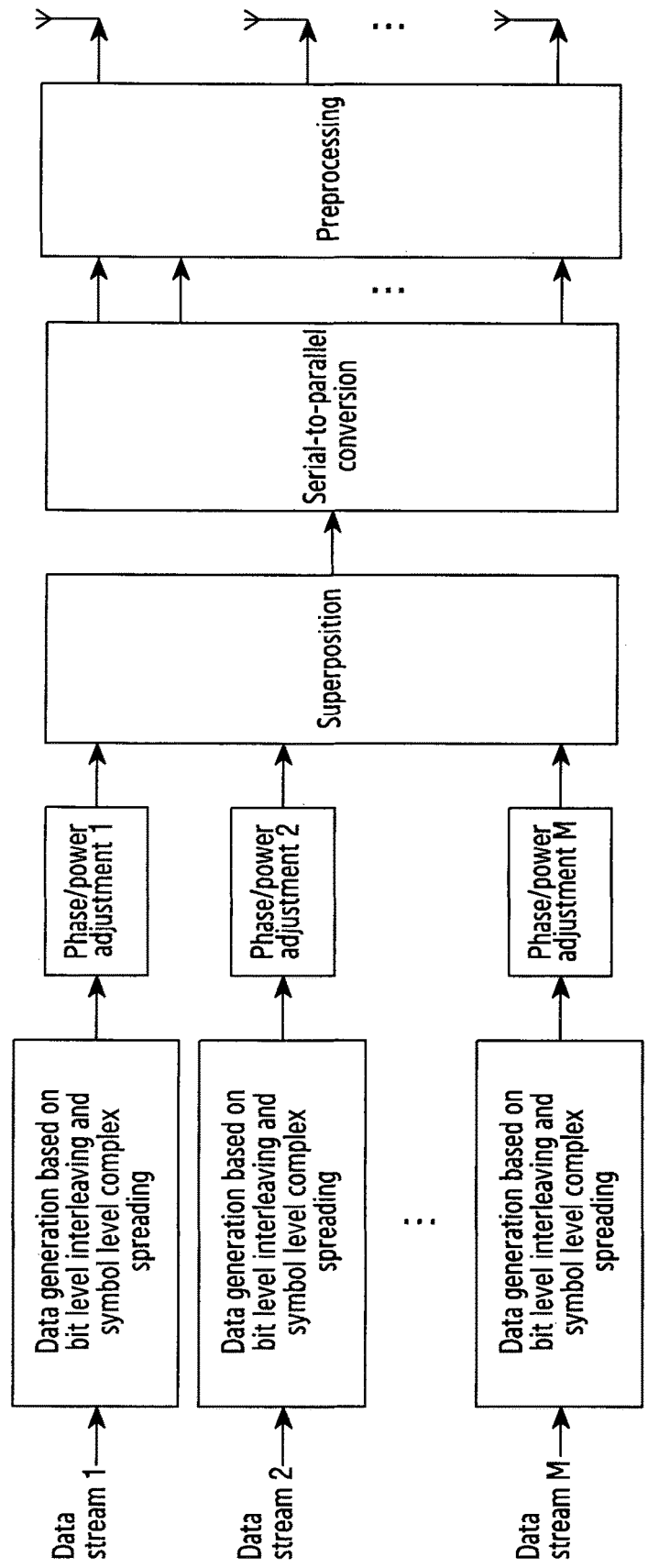

[Fig. 61]
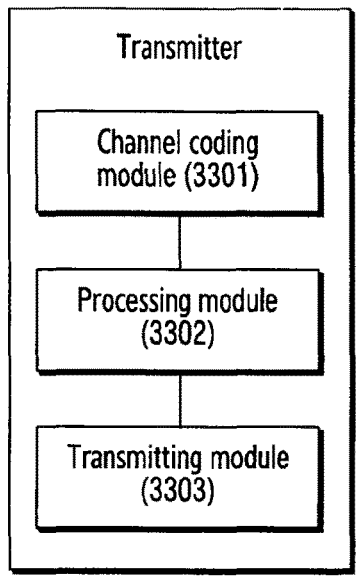
[Fig. 62]
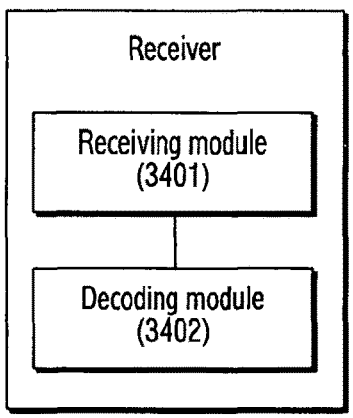
[Fig. 63]
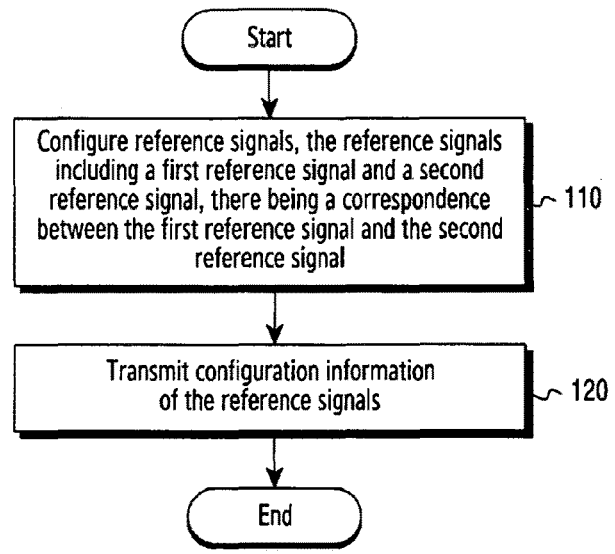

[Fig. 64]
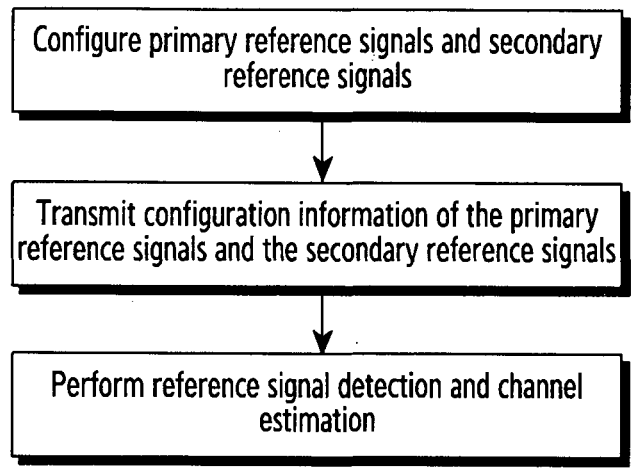
[Fig. 65]
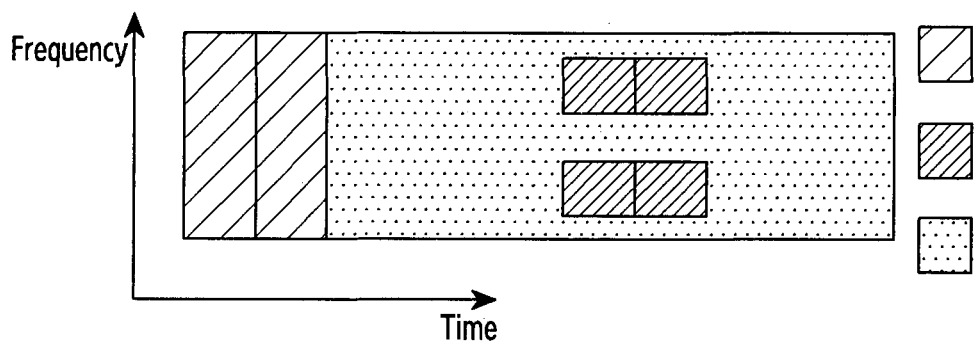
[Fig. 66]
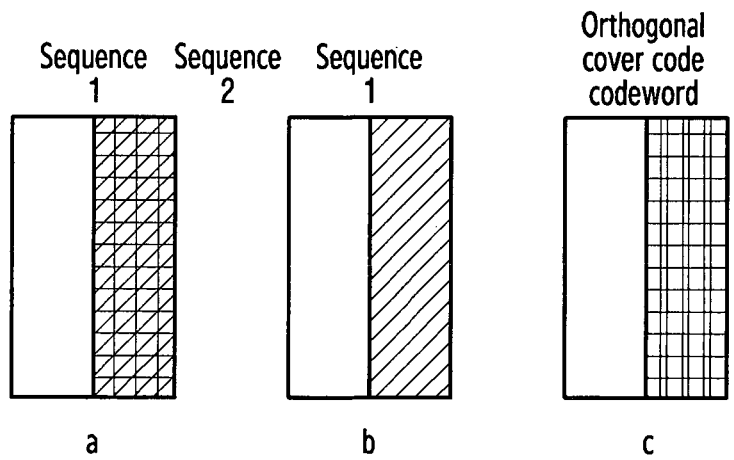

[Fig. 67]
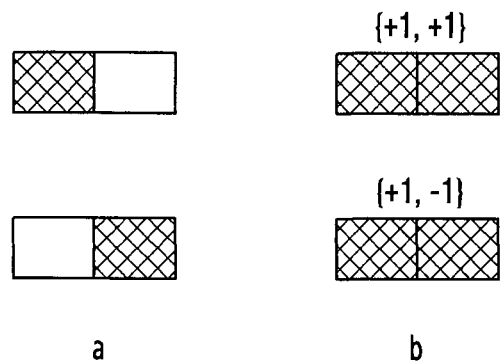
a  b
[Fig. 68]
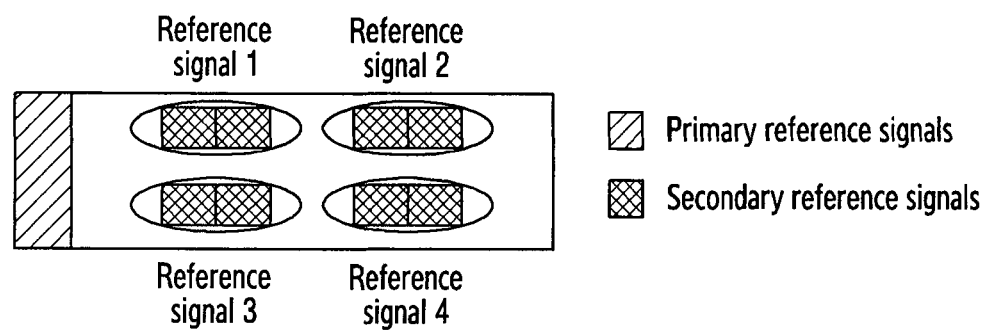
[Fig. 69]
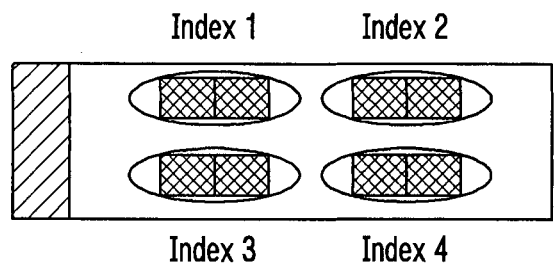

[Fig. 70]
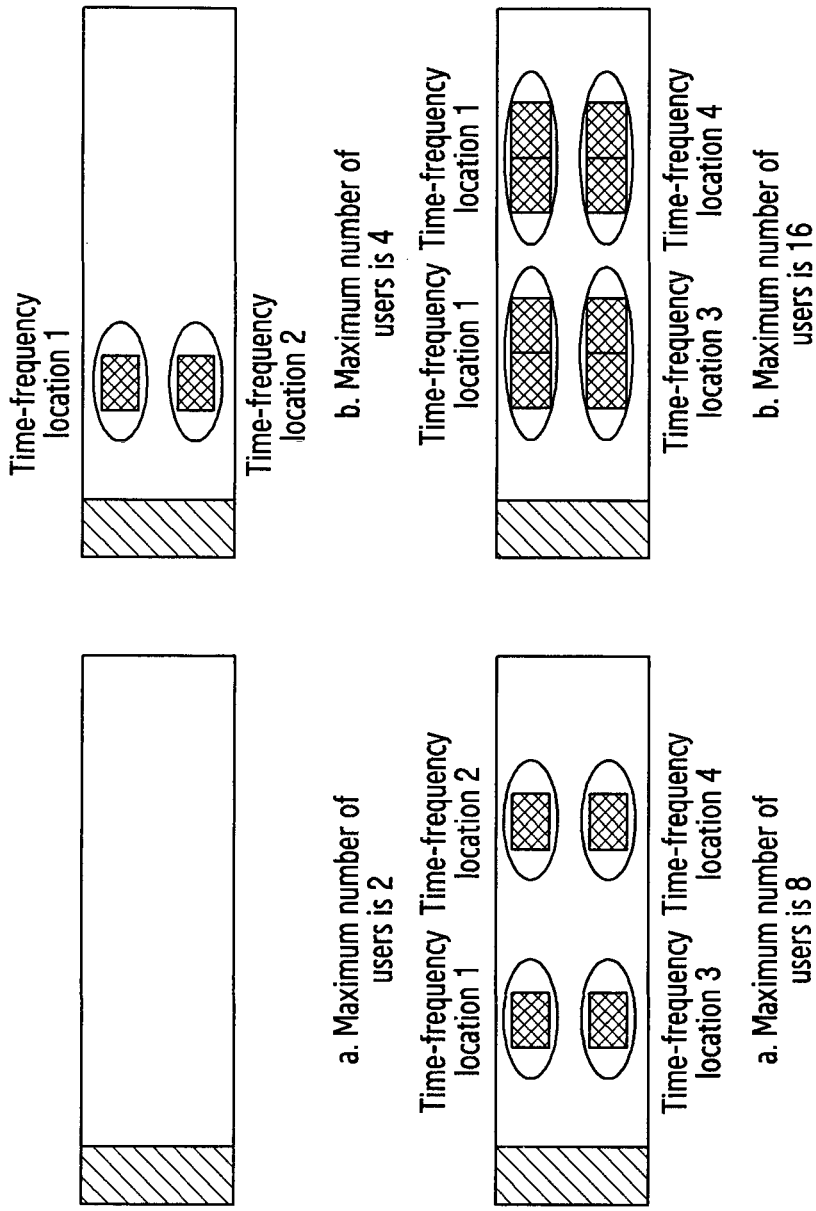

[Fig. 71]
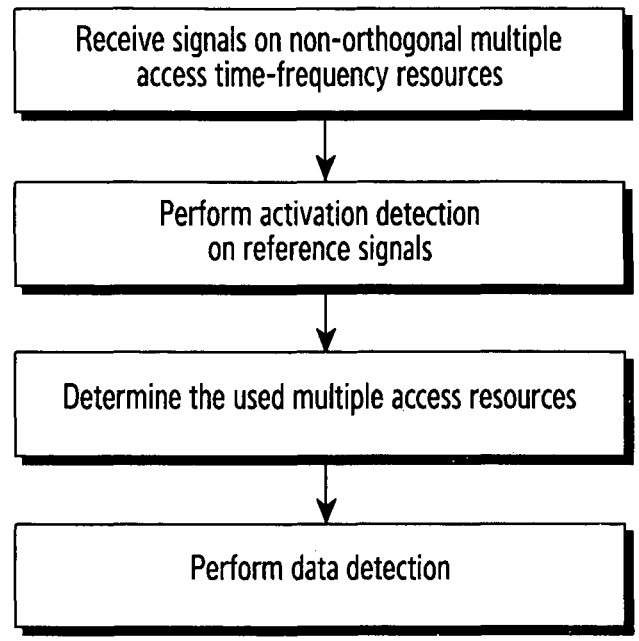
[Fig. 72]
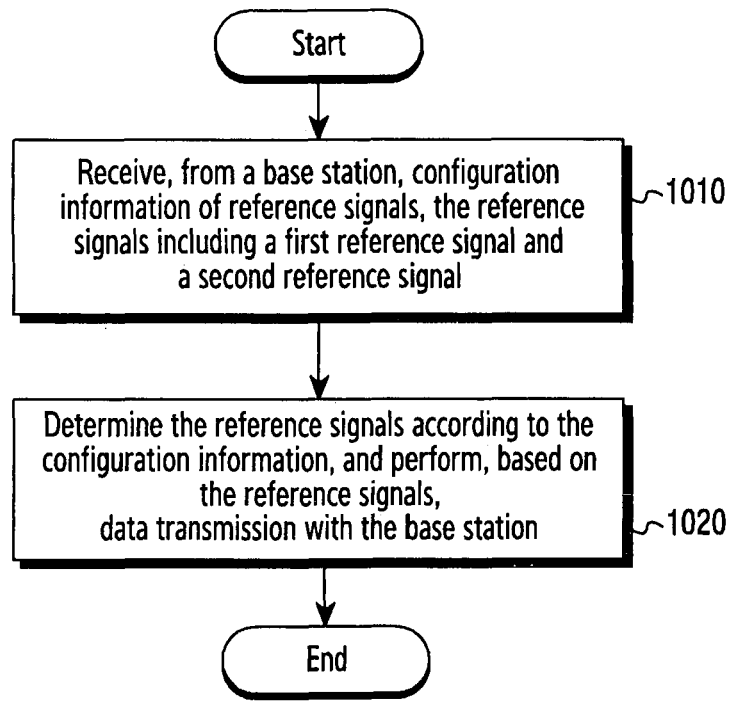
[Fig. 73]
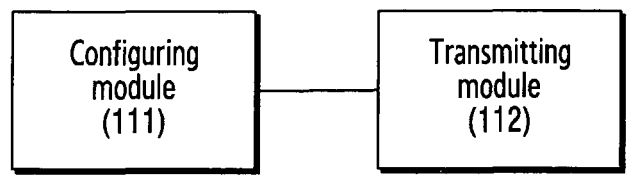

[Fig. 74]
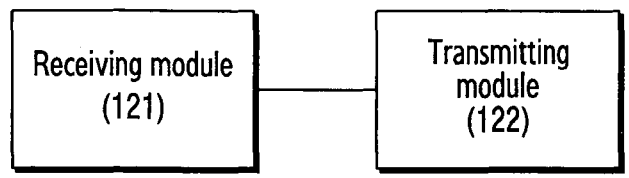
[Fig. 75]
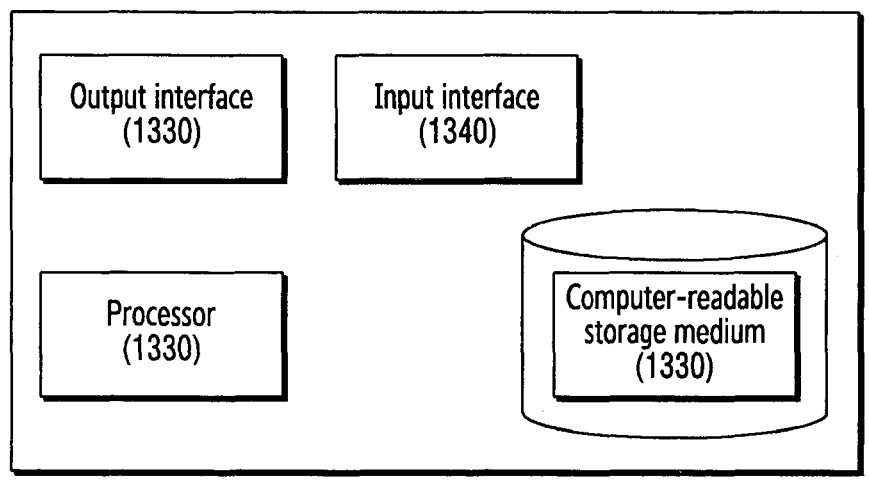

APPARATUS AND METHOD FOR IN MULTIPLE ACCESS IN WIRELESS COMMUNICATION

CROSS-REFERENCE TO RELATED APPLICATIONS

This application is a 371 of International Application No. PCT/KR2018/003545 filed on Mar. 26, 2018, which claims priority to Chinese Patent Application No. 201710186505.5 filed on Mar. 24, 2017, Chinese Patent Application No. 201710247455.7 filed on Apr. 14, 2017, and Chinese Patent Application No. 201711079174.1 filed on Nov. 6, 2017, the disclosures of which are herein incorporated by reference in their entirety.

BACKGROUND

1. Field

The present invention relates to the technical field of wireless communication, and in particular to a multiple access method, a multiple access transmitter and a multiple access receiver, another multiple access method, a transmitter and a receiver, a reference signal configuration method, a data transmission method and an equipment.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud Radio Access Network (RAN) as the above-described Big Data processing technology may also be considered to be as an example of convergence between the 5G technology and the IoT technology.

The rapid development of information industry, particularly the increasing demand from the mobile Internet and the Internet of Things (IoT), brings about unprecedented challenges in the future mobile communications technology. According to the ITU-R M. [IMT.BEYOND 2020.TRAFFIC] issued by the International Telecommunication Union (ITU), it is expected that, by 2020, mobile services traffic will grow nearly 1,000 times as compared with that in 2010 (4G era), and the number of user equipment connections will also be over 17 billion, and with a vast number of IoT devices expanding into the mobile communication network, the number of connected equipments will be even more astonishing. In response to this unprecedented challenge, the communications industry and academia have launched an extensive study of the fifth Generation mobile communications technology (5G). Currently, in ITU-R M. [IMT.VISION] from ITU, the framework and overall objectives of the future 5G have been discussed, where the demands, application scenarios and various important performance indexes of 5G have been described in detail. In terms of new demands in 5G, the ITU-R M. [IMT.FUTURE TECHNOLOGY TRENDS] from ITU provides information related to the 5G technology trends, which is intended to address prominent issues such as significant improvement on system throughput, consistency of the user experience, scalability so as to support IoT, delay, energy efficiency, cost, network flexibility, support for new services and flexible spectrum utilization, etc.

More diverse service scenarios in 5G need to be supported by more flexible multiple access technologies. For example, for a service scenario with massive connections, how to allow more users to access in limited resources becomes a core problem to be solved in the 5G multiple access technology. In the present 4G LTE network, the Orthogonal Frequency Division Multiplexing (OFDM) based multiple access technologies are employed, for example, downlink Orthogonal Frequency Division Multiple Access (OFDMA) and uplink Single-carrier Frequency Division Multiple Access (SC-FDMA). However, obviously, the existing orthogonal access methods cannot meet the requirements of improving the spectrum efficiency by 5 to 15 times and supporting access of millions of users per square kilometer in 5G. The Non-orthogonal Multiple Access (NMA) technology can greatly increase the number of supported user connections since multiple users can share the same resources. Since there are more opportunities for users to access, the overall throughput of network and the spectrum efficiency are improved. In addition, for the massive Machine Type Communication (mMTC) scenario, considering the cost of the terminal and the complexity in implementation, it may need more simple operated multiple access technologies. For service scenarios requiring low delay or low power consumption, the use of the non-orthogonal multiple access technology can well achieve scheduling-free and contention-based access and shorten the startup time and reduce the power consumption of the equipment.

The current major non-orthogonal multiple access technologies are Multiple User Shared Access (MUSA), Non-Orthogonal Multiple Access (NOMA), Pattern Division Multiple Access (PDMA), Sparse Code Multiple Access (SCMA) and Interleave Division Multiple Access (IDMA) etc. For MUSA, users are distinguished by code words; for SCMA, users are distinguished by a codebook; for NOMA, users are distinguished by power; for PDMA, users are distinguished by different feature patterns; and for IDMA, different users are distinguished by interleaved sequences.

In the existing interleave grid multiple access method, different users are distinguished by different bit-level interleaving and symbol-level grid mapping. However, in the next-generation communication system, there will be more user equipments to access the network simultaneously, but the existing interleave grid multiple access method is unable to support even more simultaneous wireless access of user equipments. Therefore, it is necessary to provide some more capable solutions to support even larger number of simultaneous wireless access of user equipments.

Besides, existing non-orthogonal multiple access methods like SCMA, PDMA, MUSA are based on the code division multiple access, and the number of access users is increased by frequency spreading, so that a certain coding gain is lost. Meanwhile, in the above technical solutions, it is necessary to define different codebooks or sequences for different numbers of access users, so that the difficulty of standardization becomes larger. For the non-orthogonal multiple access technology, to enable a receiver to successively detect and decode transmitting data streams from different terminals, it is necessary to ensure that the receiver can distinguish channels from different terminals. Accordingly, different reference signals need to be allocated to different terminals. The number of accessible terminals is directly limited by the number of reference signals. However, if different terminals use identical reference signals or reference signals having low orthogonality, the detection performance will be reduced significantly, or even the base station cannot distinguish the terminals.

By an existing reference signal configuration method in the LTE, it is unable to provide effective and sufficient reference signals for the orthogonal multiple access technology or the non-orthogonal multiple access technology, so that the number of accessible terminals is limited. Therefore, an effective method needs to be proposed to improve the capacity of reference signals and thus increase the number of available reference signals.

SUMMARY

To solve the technical problems, the following solutions are provided.

In one aspect, the embodiments of the present invention provide a multiple access method, comprising the steps of:
performing, by a transmitter, channel coding on a bit sequence to determine a coded sequence;
interleaving and/or scrambling the coded sequence;
performing multidimensional constellation modulation on the interleaved and/or scrambled sequence; and
performing grid mapping on the modulated symbol sequence to determine a mapped sequence, and transmitting the mapped sequence.

In another aspect, the embodiments of the present invention provide another multiple access method, comprising the steps of:
receiving, by a receiver, mixed signals from multiple transmitters, the mixed signals being signals obtained by performing, by each of the multiple transmitters, interleaving and/or scrambling, multidimensional constellation modulation and grid mapping on data; and
decoding, by the receiver, the mixed information according to interleaver information and/or scrambler information, multidimensional constellation information and grid mapping pattern information corresponding to each of the transmitters to obtain data corresponding to each of the transmitters.

In one aspect, the embodiments of the present invention provide a transmitter, comprising:
a channel coding module configured to perform channel coding on a bit sequence to determine a coded sequence;
an interleaving and/or scrambling module configured to interleave and/or scramble the coded sequence coded by the channel coding module;
a modulation module configured to perform multidimensional constellation modulation on the interleaved and/or scrambled sequence processed by the interleaving and/or scrambling module;
a grid mapping module configured to perform grid mapping on the symbol sequence modulated by the modulation module to determine a mapped sequence; and
a transmitting module configured to transmit the sequence mapped by the grid mapping module.

In another aspect, the embodiments of the present invention provide a receiver, comprising:
a receiving module configured to receive mixed signals from multiple transmitters, the mixed signals being signals obtained by performing, by each of the multiple transmitters, interleaving and/or scrambling, multidimensional constellation modulation and grid mapping on data; and
a decoding module configured to decode the mixed information received by the receiving module according to interleaver information and/or scrambler information, multidimensional constellation information and grid mapping pattern information corresponding to each of the transmitters to obtain data corresponding to each of the transmitters.

The present invention provides a multiple access method, a transmitter and a receiver. Compared with the existing interleave grid multiple access method, in the present invention, a transmitter performs channel coding on a bit sequence to determine a coded sequence, then performs interleaving and/or scrambling, multidimensional constellation modulation and grid mapping on the coded sequence to determine a mapped sequence, and transmits the mapped sequence; subsequently, a receiver receives mixed signals from each transmitter and then decodes the mixed information according to interleaver information and/or scrambler information, multidimensional constellation information and grid mapping pattern information corresponding to each transmitter to obtain data corresponding to each transmitter. In other words, the transmitter can process corresponding bit sequences of different user equipments by using different interleaver information and/or scrambler information, different multidimensional constellation information and different grid mapping pattern information and then transmit the processed bit sequences to the receiver, so that the receiver can distinguish the mixed signals transmitted by the transmitters by using different interleaver information and/or scrambler information, different multidimensional constellation information and different grid mapping pattern information, so as to distinguish different users. Accordingly, the requirements of simultaneous wireless access of more user equipments can be met.

According to one aspect, the embodiments of the present invention provide another multiple access method, comprising the steps of:
  performing, by a transmitter, channel coding on an information bit sequence to determine a coded sequence; and
  performing bit level processing and symbol level processing on the coded sequence to obtain a processed sequence, and transmitting the processed sequence.

Further, the step of performing bit level processing and symbol level processing on the coded sequence to obtain a processed sequence comprises:
  performing bit level processing on the coded sequence by a bit level processor;
  performing bit-to-symbol modulation on the sequence which passed through the bit level processing, to obtain a symbol sequence; and
  performing symbol level processing on the symbol sequence by a symbol level processor to obtain a processed symbol sequence.

Further, the mode for performing bit level processing on the coded sequence by a bit level processor comprises any one of the following:
  interleaving the coded sequence by a bit level interleaver;
  scrambling the coded sequence by a bit level scrambler; and
  spreading the coded sequence by a bit level spreader.

The transmitter acquires bit level interleaver information, bit level scrambler information and/or bit level spreader information via any one of the following, for performing bit level processing on the coded sequence:
  a physical broadcast channel, a physical downlink control channel and a physical downlink shared channel.

Further, the mode for performing symbol level processing on the symbol sequence comprises any one of the following:
  performing symbol level spreading on the symbol sequence;
  performing symbol level spreading and symbol level interleaving on the symbol sequence;
  performing symbol level scrambling on the symbol sequence; and
  performing symbol level spreading and symbol level scrambling on the symbol sequence.

Further, the mode for performing symbol level spreading on the symbol sequence comprises:
  performing symbol level spreading on the symbol sequence by a complex spreading code;
  the mode for performing symbol level interleaving on the symbol sequence comprises:
  performing symbol level interleaving on the symbol sequence by a symbol level interleaver; and
  the mode for performing symbol level scrambling on the symbol sequence comprises:
  performing symbol level scrambling on the symbol sequence by a symbol level scrambling sequence.

The mode for the symbol level interleaving comprises any one of the following: direct interleaving; zero-padding and interleaving; direct zero-inserting and interleaving; and interleaving and zero-inserting.

Further, the direct interleaving is to perform symbol level interleaving on the symbol sequence by a symbol level interleaver;
  the zero-padding and interleaving is to perform zero-padding on the symbol sequence and perform symbol level interleaving on the zero-padded symbol sequence by a symbol level interleaver;
  the direct zero-inserting and interleaving is to perform zero-inserting on the symbol sequence according to zero-inserting pattern information; and
  the interleaving and zero-inserting is to perform symbol level interleaving on the symbol sequence according to a symbol level interleaver and perform zero-inserting on the processed symbol sequence according to zero-inserting pattern information.

The transmitter acquires the complex spreading code, the symbol level interleaver and/or the symbol level scrambling sequence via any one of the following:
  a physical broadcast channel, a physical downlink control channel and a physical downlink shared channel.

The method further comprises the step of:
  if the transmitter is configured with multiple antennas and the data to be transmitted currently is single-stream data, converting, by the transmitter, the data which passed through the symbol level processing into multi-stream data or multi-layer data, and transmitting the multi-stream data or multi-layer data via the antennas.

The method further comprises the step of:
  if the data to be transmitted by the transmitter is multi-stream data and the transmitter is configured with multiple antennas, processing by at least one of the following modes:
  performing channel coding, bit level processing, modulation and symbol level processing, layer mapping and preprocessing on the multi-stream data to obtain a processed multi-stream data, and transmitting the processed multi-stream data via the antennas; and
  performing channel coding, bit level processing, modulation and symbol level processing, phase and/or power adjustment, superposition, serial-to-parallel conversion and preprocessing on the multi-stream data to obtain a processed multi-stream data, and transmitting the processed multi-stream data via the antennas.

According to one aspect, the embodiments of the present invention provide a transmitter, comprising:
  a channel coding module configured to perform channel coding on an information bit sequence to determine a coded sequence;
  a processing module configured to perform bit level processing and symbol level processing on the coded sequence coded by the channel coding module to obtain a processed sequence; and
  a transmitting module configured to transmit the processed sequence.

According to another aspect, the embodiments of the present invention provide another multiple access method, comprising the steps of:
  receiving, by a receiver, signals from multiple transmitters, the signals being signals obtained by performing bit level processing and symbol level processing on data from each of multiple transmitters; and decoding, by the receiver, the signals according to a bit level processor and a symbol level processor corresponding to each transmitter to obtain data corresponding to the each transmitter.

Further, the step of decoding, by the receiver, the signals according to a bit level processor and/or a symbol level processor corresponding to each transmitter to obtain data corresponding to the each transmitter comprises:

performing, by a symbol level processor corresponding to each transmitter, symbol level decoding on the signals; and performing, by a bit level processor corresponding to each transmitter, bit level decoding on the data which passed through the symbol level decoding.

The mode for decoding the signals according to a bit level processor and a symbol level processor corresponding to each transmitter comprises any one of the following situations:

performing, by the receiver, symbol level decoding and bit level decoding on the signals according to a same symbol level processor and a different bit level processor corresponding to each transmitter;

performing, by the receiver, symbol level decoding and bit level decoding on the signals according to a different symbol level processor and a same bit level processor corresponding to each transmitter; and performing, by the receiver, symbol level decoding and bit level decoding on the signals according to a different combinations of symbol level processors and bit level processors corresponding to each transmitter.

Further, the method further comprises the steps of:

if the signals are signals which are received from each transmitter by the receiver and obtained by performing bit level processing according to different bit level processors and then symbol level processing by a symbol level processor on the data to be transmitted, performing, by the receiver and according to different bit level processors, bit level decoding on the data which passed through the decoding by the symbol level processor;

if the signals are signals which are received from each transmitter by the receiver and obtained by performing, according to different symbol level processors, symbol level processing on the data processed by a bit level processor, performing, by the receiver and according to different symbol level processors, symbol level decoding on the mixed signals; and if the signals are signals which are received from each transmitter by the receiver and obtained by performing, according to a different combination of bit level processors and symbol level processors, bit level processing and symbol level processing on the data to be transmitted, performing, by the receiver and according to a different combination of bit level processors and symbol level processors, symbol level decoding and bit level decoding on the signals.

Further, the different combination of bit level processors and symbol level processors comprises any one of the following combinations:

same bit level processors and different symbol level processors;

different bit level processors and same symbol level processors; and different bit level processors and different symbol level processors.

Further, multiple pieces of data, which are obtained by performing, by the receiver and according to a different combination of bit level processors and symbol level processors corresponding to each transmitter, symbol level decoding and bit level decoding on the signals, are different from each other.

The mode for performing bit level decoding by a bit level processor comprises any one of the following situations:

performing de-interleaving by a bit level interleaver;
performing de-scrambling by a bit level scrambler; and
performing de-spreading by a bit level spreader; and
wherein the mode for performing symbol level decoding by a symbol level processor comprises any one of the following situations:

performing symbol level de-spreading by a complex spreading code;

performing symbol level de-spreading and symbol level de-interleaving by a complex spreading code and a symbol level interleaver, respectively;

performing symbol level de-scrambling by a symbol level scrambling sequence; and performing symbol level de-spreading and symbol level de-scrambling by a complex spreading code and a symbol level scrambling sequence, respectively.

According to one aspect, the embodiments of the present invention provide a receiver, comprises a receiving module configured to receive signals from multiple transmitters, the signals being signals obtained by performing bit level processing and symbol level processing on data from each of multiple transmitters, and a decoding module configured to decode the signals received by the receiving module according to a bit level processor and a symbol level processor corresponding to each transmitter to obtain data corresponding to the each transmitter.

The signals are signals which are received from each transmitter by the receiver and obtained by performing carrier modulation on the data which passed through the symbol level processing and then performing baseband-to-RF conversion on the modulated data.

The carrier modulation comprises any one of the following: single-carrier modulation and multi-carrier modulation.

The single-carrier modulation at least comprises: DFT (Discrete Fourier Transformation)-spread-OFDM (Orthogonal Frequency Division Multiplexing) modulation; and the multi-carrier modulation comprises at least one of the following: OFDM modulation, filter-based OFDM modulation, universal-filtered multi-carrier modulation (UFMC), N-continuous OFDM modulation (NC-OFDM) and filter-bank multi-carrier modulation (BMC).

The method further comprises the steps of:

receiving, by the receiver, signals from a same transmitter, the signals being obtained by performing bit level processing and symbol level processing on multiple data streams from a same transmitter; and decoding, according to a bit level processor and a symbol level processor corresponding to each data stream, the signals to obtain multiple data streams from a same transmitter.

Further, the method further comprises the steps of:

if the signals received by the receiver are obtained by performing bit level processing by using different bit level processors and then performing symbol level processing on multiple data streams from a same transmitter, performing, by the receiver and according to different bit level processors, bit level decoding on the data which passed through the symbol level decoding;

if the signals received by the receiver are obtained by performing, by different symbol level processors, symbol level processing on the data which passed through the bit level processing among multiple data streams from a same transmitter, performing, by the receiver and according to different symbol level processors, symbol level decoding on the received signals; and if the signals received by the receiver are obtained by performing, by a different combination of bit level processors and symbol level processors, bit level processing and symbol level processing on multiple data streams from a same transmitter, performing, by the receiver and according to a different combination of bit level processors and symbol level processors, symbol level decoding and bit level decoding on the received signals.

The signals received by the receiver are obtained by performing bit level processing, symbol level processing, and phase and/or power adjustment on multiple data streams from a same transmitter.

The method further comprises the steps of:

if the receiver performs, according to different bit level processors, bit level decoding on the data from multiple transmitters which passed through the symbol level decoding, performing, by the receiver and according to different symbol level processors, symbol level decoding on signals of multiple data streams from a same transmitter;

if the receiver performs, according to different symbol level processors, symbol level decoding on the signals from multiple transmitters, performing, by the receiver and according to different bit level processors, bit level decoding on the data which passed through the symbol level decoding among multiple data streams from a same transmitter; and performing, by the receiver and according to a different combination of bit level processors and symbol level processors, symbol level decoding and bit level decoding on signals of multiple data streams from different transmitters.

According to another aspect, the embodiments of the present invention provide a receiver, comprising:

a receiving module configured to receive signals from multiple transmitters, the signals being signals obtained by performing bit level processing and symbol level processing on data from each of multiple transmitters; and a decoding module configured to decode the signals received by the receiving module according to a bit level processor and a symbol level processor corresponding to each transmitter to obtain data corresponding to the each transmitter.

The present invention provides a multiple access method, a transmitter and a receiver. Compared with the existing orthogonal multiple access modes, in the present invention, since a receiver decodes the received data by different symbol level processors and/or bit level processors, the data transmitted by different transmitters can be distinguished, and there will be no limitations from orthogonal time-frequency resources; furthermore, since transmitters process data by bit level processors and symbol level processors, it is advantageous for multiple transmitters to transmit data in same time-frequency resources. Thus, the receiver can simultaneously receive uplink data transmitted by multiple transmitters, and it is advantageous to share the same time-frequency resources to multiple transmitters. Accordingly, the number of servable transmitters is increased, and the number of users served by the receiver can be further increased.

Another objective of the present invention is to solve at least one of the above technical defects, particularly the technical defect that it is unable to provide effective and sufficient reference signals for the non-orthogonal multiple access technology.

According to one aspect, the embodiments of the present invention provide a reference signal configuration method, includes:

configuring reference signals; and transmitting configuration information of the reference signals;

wherein the reference signals include a first reference signal and a second reference signal, and there is a correspondence between the first reference signal and the second reference signal.

According to another aspect, the embodiments of the present invention further provide a data transmission method, includes:

receiving, from a base station, configuration information of reference signals, the reference signals including a first reference signal and a second reference signal, there being a correspondence between the first reference signal and the second reference signal; and determining the first reference signal and the second reference signal according to the configuration information, and performing, based on the first reference signal and the second reference signal, data transmission with the base station.

According to another aspect, the embodiments of the present invention further provide a base station, includes:

a configuring module configured to configure reference signals; and a transmitting module configured to transmit configuration information of the reference signals;

wherein the reference signals include a first reference signal and a second reference signal, and there is a correspondence between the first reference signal and the second reference signal.

According to another aspect, the embodiments of the present invention further provide a terminal, includes:

a receiving module configured to receive, from a base station, configuration information of reference signals, the reference signals including a first reference signal and a second reference signal, there being a correspondence between the first reference signal and the second reference signal; and a transmitting module configured to determine the first reference signal and the second reference signal according to the configuration information, and perform, based on the first reference signal and the second reference signal, data transmission with the base station.

According to another aspect, the embodiments of the present invention further provide a base station equipment, includes: a processor; and a memory configured to store machine-readable instructions which, when executed by the processor, enable the processor to execute the reference signal configuration method described above.

According to another aspect, the embodiments of the present invention further provide a terminal equipment, includes: a processor; and a memory configured to store machine-readable instructions which, when executed by the processor, enable the processor to execute the data transmission method described above.

In the reference signal configuration method provided by the embodiments of the present invention, reference signals are configured, with the reference signals including a first reference signal and a second reference signal and there being a correspondence between the first reference signal and the second reference signal. Thus, reference signals are configured by configuring a first reference signal and a second reference signal, so that the number of available reference signals is increased greatly, that is, the capacity of reference signals is improved, and a prerequisite is provided for the subsequent data transmission based on reference signals. Moreover, configuration information of the reference signals is transmitted, that is, the configuration information of the reference signals is notified to a UE, so that the UE can perform data transmission with a base station on the basis of the configuration information, and a reliable guarantee is provided for the UE to perform data transmission.

Additional aspects and advantages of the present invention will be partially appreciated and become apparent from the descriptions below, or will be well learned from the practices of the present invention.

BRIEF DESCRIPTION OF THE DRAWINGS

The above and/or additional aspects and advantages of the present invention will become apparent and be more readily appreciated from the following descriptions of embodiments, with reference to the accompanying drawings, in which:

FIG. 1 is a flowchart of a multiple access method according to an embodiment of the present invention;

FIG. 2 is a flowchart of another multiple access method according to an embodiment of the present invention;

FIG. 3 is a principle diagram of a transmit side for a multiple access technology based on cascaded interleaving/scrambling, multidimensional constellation and grid mapping according to an embodiment of the present invention;

FIG. 4 is a schematic block diagram of a multiple access technology based on cascaded interleaving/scrambling, multidimensional constellation and grid mapping according to an embodiment of the present invention;

FIG. 5 is a schematic flowchart of the generation and operation of a first-stage interleaver/scrambler according to an embodiment of the present invention;

FIG. 6 is a schematic diagram of an RF-to-baseband process according to an embodiment of the present invention;

FIG. 7 is a schematic flowchart of a zero-padding, interleaving and grid mapping process according to an embodiment of the present invention;

FIG. 8 is a schematic diagram of a zero-de-padding, de-interleaving and grid de-mapping according to an embodiment of the present invention;

FIG. 9 is a diagram of different multidimensional constellation of K=4 transmitters according to an embodiment of the present invention;

FIG. 10 is a schematic diagram of distinguishing users by multidimensional constellation according to an embodiment of the present invention;

FIG. 11 is a schematic diagram of distinguishing users by a combination of a first-stage interleaver/scrambler and a second-stage multidimensional constellation according to an embodiment of the present invention;

FIG. 12 is a schematic diagram of distinguishing users by a combination of a second-stage multidimensional constellation and third-stage grid mapping according to an embodiment of the present invention;

FIG. 13 is a schematic structure diagram of a transmitter with cascaded interleaving/scrambling, multidimensional constellation and grid mapping, in combination with DFT-s-OFDM, according to an embodiment of the present invention;

FIG. 14 is a schematic structure diagram of a receiver with cascaded interleaving/scrambling, multidimensional constellation and grid mapping, in combination with DFT-s-OFDM, according to an embodiment of the present invention;

FIG. 15 is a schematic structure diagram of a transmitter with cascaded interleaving/scrambling, multidimensional constellation information and grid mapping, in combination with OFDM, according to an embodiment of the present invention;

FIG. 16 is a schematic structure diagram of a receiver with cascaded interleaving/scrambling, multidimensional constellation and grid mapping, in combination with OFDM, according to an embodiment of the present invention;

FIG. 17 is a block diagram of a transmitter with cascaded interleaving/scrambling, multidimensional constellation and grid mapping, in combination with F-OFDM, according to an embodiment of the present invention;

FIG. 18 is a schematic structure diagram of a receiver with cascaded interleaving/scrambling, multidimensional constellation and grid mapping, in combination withF-OFDM, according to an embodiment of the present invention;

FIG. 19 is a schematic structure diagram of a transmitter with cascaded interleaving/scrambling, multidimensional constellation and grid mapping, in combination with data stream superposition, according to an embodiment of the present invention;

FIG. 20 is a schematic diagram of a combining manner of multiple antennas only transmitting a single data stream according to an embodiment of the present invention;

FIG. 21 is a schematic structure diagram of a receiver with a combining manner of multiple antennas only transmitting a single data stream according to an embodiment of the present invention;

FIG. 22 is a schematic diagram of a combining manner of multiple antennas which transmit multiple data streams and which are in a separate mapping according to an embodiment of the present invention;

FIG. 23 is a schematic diagram of a combining manner of multiple antennas based on data stream superposition according to an embodiment of the present invention;

FIG. 24 is a signaling flowchart of allocating, by a base station, access resources to all users according to an embodiment of the present invention;

FIG. 25 is a schematic signaling flowchart of randomly selecting access resources by users according to an embodiment of the present invention;

FIG. 26 is a schematic signaling flowchart of randomly selecting random resources by part of users and allocating access resources to by the system for the rest of users according to an embodiment of the present invention;

FIG. 27 is a schematic diagram of a device structure of a transmitter according to an embodiment of the present invention; and FIG. 28 is a schematic diagram of a device structure of a receiver according to an embodiment of the present invention.

FIG. 29 is a flowchart of a multiple access method according to an embodiment of the present invention;

FIG. 30 is a flowchart of another multiple access method according to an embodiment of the present invention;

FIG. 31 is a principle diagram of a transmitting terminal for a multiple access technology according to an embodiment of the present invention;

FIG. 32 is a schematic block diagram of the multiple access based on bit level processing and symbol level processing according to an embodiment of the present invention;

FIG. 33 is a principle diagram of a transmitting terminal for multiple access based on bit level processing and symbol level complex spreading according to an embodiment of the present invention;

FIG. 34 is a schematic flowchart of the generation and operation of a bit level interleaver according to an embodiment of the present invention;

FIG. 35 is a schematic flowchart of a symbol level complex spreading process according to an embodiment of the present invention;

FIG. 36 is a schematic flowchart of a symbol level complex spreading process (with sparsity) according to an embodiment of the present invention;

FIG. 37 is a schematic block diagram of the multiple access based on bit level processing and symbol level complex spreading according to an embodiment of the present invention;

FIG. 38 is a schematic block diagram of a transmitting terminal for multiple access based on bit level processing and symbol level processing (complex spreading+interleaving) according to an embodiment of the present invention;

FIG. 39 is a schematic flowchart of an operation of symbol level complex spreading and symbol level direct interleaving according to an embodiment of the present invention;

FIG. 40 is a schematic flowchart of a process of symbol level complex spreading and symbol level zero-padding and interleaving according to an embodiment of the present invention;

FIG. 41 is a schematic flowchart of a process of symbol level complex spreading and symbol level direct zero-inserting according to an embodiment of the present invention;

FIG. 42 is a schematic flowchart of a process of symbol level complex spreading and symbol level interleaving and zero-inserting according to an embodiment of the present invention;

FIG. 43 is a schematic block diagram of the multiple access based on bit level processing and symbol level complex spreading and interleaving according to an embodiment of the present invention;

FIG. 44 is a schematic block diagram of a transmitting terminal for multiple access based on bit level processing and symbol level scrambling according to an embodiment of the present invention;

FIG. 45 is a schematic flowchart of a symbol level scrambling process according to an embodiment of the present invention;

FIG. 46 is a schematic block diagram of the multiple access based on bit level processing and symbol level scrambling according to an embodiment of the present invention;

FIG. 47 is a schematic block diagram of a transmitting terminal for multiple access based on bit level processing and symbol level processing (complex spreading+scrambling) according to an embodiment of the present invention;

FIG. 48 is a schematic flowchart of a process of symbol level complex spreading and scrambling according to an embodiment of the present invention;

FIG. 49 is a schematic block diagram of the multiple access based on bit level processing and symbol level complex spreading and scrambling according to an embodiment of the present invention;

FIG. 50 is a schematic structure diagram of a transmitter complying with the multiple access based on bit level interleaving and symbol level complex spreading, in combination with DFT-s-OFDM, according to an embodiment of the present invention;

FIG. 51 is a schematic structure diagram of a receiver complying with the multiple access based on bit level interleaving and symbol level complex spreading, in combination with DFT-s-OFDM, according to an embodiment of the present invention;

FIG. 52 is a schematic structure diagram of a transmitter complying with the multiple access based on bit level interleaving and symbol level complex spreading, in combination with OFDM, according to an embodiment of the present invention;

FIG. 53 is a schematic structure diagram of a receiver complying with the multiple access based on bit level interleaving and symbol level complex spreading, in combination with OFDM, according to an embodiment of the present invention;

FIG. 54 is a schematic structure diagram of a transmitter complying with the multiple access based on bit level interleaving and symbol level complex spreading, in combination with F-OFDM, according to an embodiment of the present invention;

FIG. 55 is a schematic structure diagram of a receiver complying with the multiple access based on bit level interleaving and symbol level complex spreading, in combination with F-OFDM, according to an embodiment of the present invention;

FIG. 56 is a schematic structure diagram of a transmitter complying with the multiple access based on bit level interleaving and symbol level complex spreading, in combination with superposed data stream, according to an embodiment of the present invention;

FIG. 57 is a schematic diagram of a solution of combining multiple antennas only transmitting a single data stream according to an embodiment of the present invention;

FIG. 58 is a schematic structure diagram of a receiver with combined multiple antennas only transmitting a single data stream according to an embodiment of the present invention;

FIG. 59 is a schematic diagram of a solution of combining antennas which transmit multiple data streams and which are in a separate mapping according to an embodiment of the present invention;

FIG. 60 is a schematic diagram of a solution of combining multiple antennas based on data stream superposition according to an embodiment of the present invention;

FIG. 61 is a schematic diagram of a device structure of a transmitter according to an embodiment of the present invention; and FIG. 62 is a schematic diagram of a device structure of a receiver according to an embodiment of the present invention.

FIG. 63 is a schematic flowchart of a reference signal configuration method according to an embodiment of the present invention;

FIG. 64 is a schematic flowchart of the configuration of primary reference signals and secondary reference signals on the base station side according to an embodiment of the present invention;

FIG. 65 is a schematic structure diagram of reference signals according to an embodiment of the present invention;

FIG. 66 is a schematic structure diagram of the primary reference signals according to an embodiment of the present invention;

FIG. 67 is a schematic structure diagram of the secondary reference signals according to an embodiment of the present invention;

FIG. 68 is a possible correspondence between the primary reference signals and the secondary reference signals according to an embodiment of the present invention;

FIG. 69 is a possible schematic diagram of time-frequency resource locations for secondary reference signals according to an embodiment of the present invention;

FIG. 70 is a schematic diagram of time-frequency resource locations for different secondary reference signals, when the maximal number of bearable terminals is different, according to an embodiment of the present invention;

FIG. 71 is a flowchart of data detection according to an embodiment of the present invention;

FIG. 72 is a schematic flowchart of an uplink transmission method according to another embodiment of the present invention;

FIG. 73 is a schematic diagram of a basic structure of a base station according to another embodiment of the present invention;

FIG. 74 is a schematic diagram of a basic structure of a terminal according to another embodiment of the present invention; and FIG. 75 is a block diagram of a computing system for implementing the base station or user equipment disclosed by the embodiments of the present invention.

DETAILED DESCRIPTION

Embodiments of the present invention will be described in detail hereinafter. The examples of these embodiments have been illustrated in the accompanying drawings throughout which the same or similar reference numerals refer to the same or similar elements or elements having the same or similar functions. The embodiments described with reference to the accompanying drawings are illustrative, merely used for explaining the present invention and should not be regarded as any limitations thereto.

It should be understood by one person of ordinary skill in the art that singular forms "a", "an", "the", and "said" used herein may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements there between. In addition, "connected to" or "coupled to" as used herein can comprise wireless connection or coupling. As used herein, the term "and/or" comprises all or any of one or more associated listed items or all combinations thereof.

It should be understood by one person of ordinary skill in the art that, unless otherwise defined, all terms (including technical and scientific terms) used herein have the same meaning as commonly understood by one person of ordinary skill in the art to which the present invention belongs. It should be further understood that terms, such as those defined in commonly used dictionaries, should be interpreted as having a meaning that is kept consistent with their meanings in the context of the prior art and will not be interpreted in an idealized or overly formal sense unless expressly so defined herein.

It should be understood by one person of ordinary skill in the art that the term "terminal" and "terminal equipment" as used herein comprises not only devices with a wireless signal receiver having no emission capability but also devices with receiving and emitting hardware capable of carrying out bidirectional communication over a bidirectional communication link. Such devices can comprise cellular or other communication devices with a single-line display or multi-line display or without a multi-line display; Personal Communication Systems (PCSs) with combined functionalities of speech, data processing, facsimile and/or data communication; Personal Digital Assistants (PDAs), which may include RF receivers, pagers, internet networks/intranet accesses, web browsers, notepads, calendars and/or Global Positioning System (GPS) receivers; and/or conventional laptop and/or palmtop computers or other devices having and/or including a RF receiver. The "terminal" and "terminal equipment" as used herein can be portable, transportable, mountable in transportations (air, sea and/or land transportations), or suitable and/or configured to run locally and/or distributed in other places in the earth and/or space for running. The "terminal" or "terminal equipment" as used herein may be a communication terminal, an internet terminal, a music/video player terminal. For example, it can be a PDA, a Mobile Internet Device (MID) and/or a mobile phone with a music/video playback function, or can be equipment such as a smart TV and a set-top box.

FIG. 1 is a schematic flowchart of a transmitting method for multiple access according to an embodiment of the present invention.

Step 101: A transmitter performs channel coding on a bit sequence to determine a coded sequence; step 102: the transmitter interleaves and/or scrambles the coded sequence; step 103: the transmitter performs multidimensional constellation modulation on the interleaved and/or scrambled sequence; and, step 104: the transmitter performs grid mapping on the modulated symbol sequence to determine a mapped sequence, and transmits the mapped sequence.

The channel coding method comprises: channel coding by a component code, or channel coding by multiple cascaded component codes.

The component code comprises at least one of the following types:

a Turbo code, a low-density parity check code, a repetition code and a spreading code.

The method of performing channel coding can be channel coding by one component code with a code rate of $R_1$ or by the combination of multiple component codes.

For example, a Turbo code of a code rate $R_1$ and a repetition spreading code of a code rate $R_2$ are combined to generate a lower coding rate $R_3 = R_2 R_1$. Alternatively, the method of performing channel coding can be constituted directly by a Turbo code with a code rate of $R_3$.

In this embodiment of the present invention, the multiple access method mainly comprises: cascaded applications of a first-stage interleaver/scrambler, second-stage multidimensional constellation modulation and third-stage grid mapping in a transmitter, and processing of the corresponding interleaver/scrambler, multidimensional constellation modulation and grid mapping in a receiver.

In this embodiment of the present invention, the transmitter interleaves and/or scrambles the coded sequence by an interleaver/scrambler. The interleaver of the transmitter is generated by randomly shuffling, or specially designed according to particular requirements, for example, a requirement that the average distance between different interleavers is not less than a defined value; or, the interleaver of the transmitter is generated according to a mother interleaver/scrambler configured by the system and based on a certain generation rule, or generated by using a scrambling sequence. This will not be defined in this embodiment of the present invention.

In this embodiment of the present invention, the grid mapping by the transmitter is implemented by using the modulated symbol sequence according to a zero-padding, interleaving and grid mapping process configured by the system.

The zero-padding, interleaving and grid mapping process is a process in which the symbol sequence is zero-padded and interleaved according to the configured zero-padding and interleaving pattern and then resource mapping is performed on the symbol sequence.

In the step 102, the transmitter interleaves/scrambles the coded sequence by using interleaving/scrambling pattern information.

The interleaver/scrambling pattern information is configured by the receiver and obtained by the transmitter from a physical broadcast channel, a physical downlink control channel or a physical downlink shared channel.

Further, the interleaver of the transmitter is generated by randomly shuffling, or specially designed according to particular requirements, for example, a requirement that the average distance between different interleavers is not less than a defined value; or, the interleaver of the transmitter is generated according to a mother interleaver/scrambler configured by the system and based on a certain generation rule, or generated by using a scrambling sequence.

In the step 103, the transmitter performs multidimensional constellation modulation on the interleaved/scrambled sequence by using a multidimensional constellation.

The multidimensional constellation of the transmitter can include a mother constellation and a constellation operator. The mother constellation can be a Cartesian product form having multiple QAM constellations, where one point is selected from each QAM constellation to form a vector and this vector is used as a constellation point; or, can also be a form of directly selecting constellation vector points in a multidimensional space according to a preset optimization criterion; or, can also be a certain multidimensional constellation having a special structure, for example, a Lattice constellation.

Further, the constellation operator can be phase rotation, power adjustment or other methods.

Further, the mother constellation and constellation operator used by each transmitter are configured by the receiver, and obtained by the transmitter from a physical broadcast channel, a physical downlink control channel or a physical downlink shared channel.

Further, before the step 104, the transmitter acquires interleaving/scrambling pattern information, multidimensional constellation information and grid mapping pattern information.

Further, the step of acquiring, by the transmitter, interleaving/scrambling pattern information, multidimensional constellation information and grid mapping pattern information comprises at least one of the following situations (a and b):

a. the transmitter receives interleaving/scrambling pattern information, multidimensional constellation information and grid mapping pattern information transmitted through a downlink control channel by the receiver; and b. the transmitter acquires, from a system resource pool, interleaving/scrambling pattern information, multidimensional constellation information and grid mapping pattern information.

Further, after the step b, the transmitter can further perform the following operations: transmitting, by the transmitter, an access request to a receiver according to the acquired interleaving/scrambling pattern information, multidimensional constellation information and grid mapping pattern information; when the transmitter has received a feedback message transmitted by the receiver within a preset time window, processing, by the transmitter, data to be transmitted according to the acquired interleaving/scrambling pattern information, multidimensional constellation information and grid mapping pattern information; when the transmitter has not received the feedback message transmitted by the receiver within the preset time window, reacquiring, by the transmitter and from the system resource pool, interleaving/scrambling pattern information, multidimensional constellation information and grid mapping pattern information, and transmitting an access request to the receiver according to the reacquired interleaving/scrambling pattern information, multidimensional constellation information and grid mapping pattern information until the feedback information transmitted by the receiver is received within the preset time window; and, when the transmitter has not received the feedback message transmitted by the receiver within the preset time window, transmitting, by the transmitter, an access request to the receiver by lowering a Modulation and Coding Strategy (MCS) until the feedback message transmitted by the receiver is received within the preset time window.

In the step 104, the transmitter performs grid mapping on the modulated symbol sequence to determine a mapped sequence.

Further, the grid mapping by the transmitter is implemented by using the modulated symbol sequence according to a zero-padding, interleaving and grid mapping process configured by the transmitter. The zero-padding, interleaving and grid mapping process is a process in which the symbol sequence is first zero-padded and interleaved according to the configured zero-padding and interleaving pattern and then resource mapping is performed on the symbol sequence.

Further, the zero-padding, interleaving and grid mapping pattern information used in the grid mapping by the transmitter is configured by the system and obtained by the transmitter from a physical broadcast channel, a physical downlink control channel or a physical downlink shared channel.

Still further, grid mapping patterns of different lengths are selected according to the modulation and coding mode used by the transmitter and the size of the allocated time-frequency resource.

Further, the power used by the bit-to-symbol modulation is determined by the total power allocated to the transmitter and the number of zero values (or the number of idle resources) in the grid mapping pattern, and the symbol power of the transmitter is positively proportional to the number of zero values in the grid mapping pattern.

Still further, the allocated total power information is informed to the transmitter by the receiver through a physical broadcast channel, a physical downlink control channel or a physical downlink shared channel, and the information about the number of zero values in the grid mapping is contained in the grid mapping information.

Further, after the step 104, the transmitter performs carrier modulation on the mapped sequence to obtain modulated data and then transmits the modulated data.

The carrier modulation method is any one of the following: Discrete Fourier Transformation (DFT)-spread-Orthogonal Frequency Division Multiplexing (OFDM) modulation, orthogonal frequency division multiplexing modulation, filtered OFDM modulation, universal-filtered multi-carrier modulation, N-continuous OFDM modulation, and filter-bank multi-carrier modulation.

Further, if the data to be transmitted by the transmitter is multi-stream data, the transmitter performs channel coding, interleaving/scrambling, multidimensional constellation modulation, grid mapping and carrier modulation on the multi-stream data to obtain modulated data, superposes the modulated data to obtain superposed data, and then transmits the superposed data; or, the transmitter performs channel coding, interleaving and/or scrambling, multidimensional constellation modulation, grid mapping and superposition on the multi-stream data to obtain superposed data, performs carrier modulation on the superposed data to obtain modulated data, and then transmits the modulated data.

Further, if the transmitter is configured with multiple antennas and the data to be transmitted currently is single-stream data, the transmitter converts the grid-mapped data into multi-stream data or multi-layer data and then transmits the multi-stream data or multi-layer data through the antennas.

In some embodiments, the step of interleaving and/or scrambling the coded sequence comprises interleaving and/or scrambling the coded sequence according to the interleaving and/or scrambling pattern information. The step of performing multidimensional constellation modulation on the interleaved and/or scrambled sequence comprises performing multidimensional constellation modulation on the interleaved and/or scrambled sequence according to the multidimensional constellation information. The step of performing grid mapping on the modulated symbol sequence to determine a mapped sequence comprises performing grid mapping on the modulated symbol sequence according to the grid mapping pattern information to determine a mapped sequence.

In some embodiments, the multidimensional constellation information comprises at least one of the following: a mother constellation and a constellation operator, the mother constellation is in any one of the following forms: a Cartesian product form having multiple QAM constellations, a multidimensional constellation having a special structure, and a form of directly selecting constellation vector points in a multidimensional space according to a preset optimization criterion; and the constellation operator comprises at least one of the following functions a phase rotation and/or a power adjustment.

In some embodiments, after the step of transmitting the mapped sequence, further comprising the step of performing carrier modulation on the mapped sequence to obtain the modulated data, and transmitting the modulated data, wherein the carrier modulation method is any one of the following: Discrete Fourier Transformation (DFT)-spread-Orthogonal Frequency Division Multiplexing (OFDM) modulation mode, orthogonal frequency division multiplexing modulation mode, filtered OFDM modulation mode, universal-filtered multi-carrier modulation mode, N-continuous OFDM modulation mode, and filter-bank multi-carrier modulation mode.

In some embodiments, the multiple access method further comprises the step of: if the data to be transmitted by the transmitter is multi-stream data, performing channel coding, interleaving and/or scrambling, multidimensional constellation modulation, grid mapping and carrier modulation on the multi-stream data to obtain modulated data, superposing the modulated data to obtain superposed data, and transmitting the superposed data; or, performing, by the transmitter, channel coding, interleaving and/or scrambling, multidimensional constellation modulation, grid mapping and superposition on the multi-stream data to obtain the superposed data, performing carrier modulation on the superposed data to obtain modulated data, and transmitting the modulated data.

In some embodiments, the multiple access method further comprises the step of: if the transmitter is configured with multiple antennas and the data to be transmitted currently is single-stream data, converting, by the transmitter, grid-mapped data into multi-stream data or multi-layer data, and transmitting the multi-stream data or multi-layer data through the antennas.

FIG. 2 is a schematic flowchart of a multiple access method according to another embodiment of the present invention.

The method comprises steps 201 and 202. In the step 201, a receiver receives mixed signals from multiple transmitters. The mixed signals are signals obtained by performing, by each of the multiple transmitters, interleaving and/or scrambling, multidimensional constellation modulation and grid mapping on data. In the step 202, the receivers decode the mixed information according to interleaver information and/or scrambler information, multidimensional constellation information and grid mapping pattern information of each transmitter to obtain data corresponding to each transmitter.

The multidimensional constellation modulation may at least include phase rotation and/or power adjustment.

Before the step 201, the receiver allocates interleaving and/or scrambling pattern information, multidimensional constellation information and grid mapping pattern information for each transmitter.

The receiver determines, according to network loads, interleaving/scrambling pattern information, multidimensional constellation information and grid mapping pattern information used by each of the multiple transmitters; and, the receiver transmits, to each transmitter, the determined interleaving/scrambling pattern information, multidimensional constellation information and grid mapping pattern information used by each of the multiple transmitters.

The step 202 can specifically comprise steps 2021 to 2023 (not shown), wherein, in the step 2021, the receiver de-maps the mixed signals by using grid mapping pattern information corresponding to each transmitter; in the step 2022, the receiver performs multidimensional constellation demodulation on the de-mapped data by using multidimensional constellation information corresponding to each transmitter; and, in the step 2023, the receiver de-interleaves/de-scrambles the multidimensional constellation demodulated data, by using interleaving and/or scrambling pattern information corresponding to each transmitter to obtain data corresponding to the each transmitter.

The method of decoding the mixed signals comprises but is not limited to any one of the following:

- performing, by the receiver, grid de-mapping, multidimensional constellation demodulation, and de-interleaving/de-scrambling on the mixed signals according to the same grid mapping pattern information, same multidimensional constellation information and different interleaving/scrambling pattern information corresponding to each transmitter;
- performing, by the receiver, grid de-mapping, multidimensional constellation demodulation and de-interleaving/de-scrambling on the mixed signals according to the same grid mapping pattern information, different multidimensional constellation information and same interleaving and/or scrambling pattern information corresponding to each transmitter;
- performing, by the receiver, grid de-mapping, multidimensional constellation demodulation and de-interleaving/de-scrambling on the mixed signals according to different grid mapping pattern information, same multidimensional constellation information and same interleaving/scrambling pattern information corresponding to each transmitter;
- performing, by the receiver, grid de-mapping, multidimensional constellation demodulation and de-interleaving/de-scrambling on the mixed signals according to a different combination of grid mapping pattern information and multidimensional constellation information as well as same interleaving/scrambling pattern information corresponding to each transmitter;
- performing, by the receiver, grid de-mapping, multidimensional constellation demodulation and de-interleaving/de-scrambling on the mixed signals according to a different combination of grid mapping pattern information and interleaving/scrambling pattern information as well as same multidimensional constellation information corresponding to each transmitter;
- performing, by the receiver, grid de-mapping, multidimensional constellation demodulation and de-interleaving/de-scrambling on the mixed signals according to the same grid mapping pattern information and a different combination of multidimensional constellation information and interleaving/scrambling pattern information corresponding to each transmitter; and,
- performing, by the receiver, grid de-mapping, multidimensional constellation demodulation and de-interleaving/de-scrambling on the mixed signals according to a different combination of grid mapping pattern information, multidimensional constellation information and interleaving/scrambling pattern information corresponding to each transmitter.

Preferably, if the mixed signals are signals which are received from each transmitter by the receiver and obtained by performing interleaving/scrambling according to different interleaving/scrambling pattern information and then multidimensional constellation and grid mapping on the data to be transmitted, the receiver de-interleaves, according to different interleaving pattern information, the de-mapped and multidimensional constellation demodulated data.

Preferably, if the mixed signals are signals which are received from each transmitter by the receiver and obtained by performing modulation according to different multidimensional constellation information and then grid mapping on the interleaved and/or scrambled data, the receiver performs, according to different multidimensional constellation information, multidimensional constellation demodulation on the de-mapped data.

Preferably, if the mixed signals are signals which are received from each transmitter by the receiver and obtained by performing, according to different grid mapping pattern information, grid mapping on the interleaved scrambled and the multidimensional constellation modulated data, the receiver de-maps the mixed signals according to different grid mapping patterns.

Preferably, if the mixed signals are signals which are received from each transmitter by the receiver and obtained by performing interleaving/scrambling and multidimensional constellation modulation according to a different combination of interleaving/scrambling pattern information and multidimensional constellation information and then mapping on the data to be transmitted, the receiver performs, according to a different combination of interleaving/scrambling pattern information and multidimensional constellation information, multidimensional constellation demodulation and de-interleaving/de-scrambling on the de-mapped data.

Preferably, if the mixed signals are signals which are received from each transmitter by the receiver and obtained by performing, according to a different combination of interleaving/scrambling pattern information and grid mapping pattern information, same multidimensional constellation modulation and grid mapping on the interleaved/scrambled data, the receiver performs, according to a different combination of interleaving/scrambling pattern information and grid mapping pattern information, grid de-mapping, multidimensional constellation demodulation and de-interleaving/de-scrambling on the mixed signals.

Preferably, if the mixed signals are signals which are received from each transmitter by the receiver and obtained by performing, according to a different combination of multidimensional constellation information and grid mapping pattern information, multidimensional constellation modulation and grid mapping on the interleaved/scrambled data, the receiver performs, according to a different combination of multidimensional constellation information and grid mapping pattern information, grid de-mapping and multidimensional constellation demodulation on the mixed signals.

Preferably, if the mixed signals are signals which are received from each transmitter by the receiver and obtained by performing, according to a different combination of interleaving/scrambling pattern information, multidimensional constellation information and grid mapping pattern information, interleaving/scrambling, multidimensional constellation modulation and grid mapping on the data to be transmitted, the receiver performs, according to a different combination of interleaving/scrambling pattern information, multidimensional constellation information and grid mapping pattern information, grid de-mapping, multidimensional constellation demodulation and de-interleaving/de-scrambling on the mixed signals.

Further, if the receiver performs, according to different interleaving and/or scrambling pattern information, de-interleaving/de-scrambling on the grid de-mapped and multidimensional constellation demodulated data from multiple transmitters, the receiver performs, according to different grid mapping pattern information, grid de-mapping on signals among multiple data streams from the same transmitter; or, the receiver performs, according to different multidimensional constellation information, multidimensional constellation demodulation on the grid de-mapped data among multiple data streams from the same transmitter; or, the receiver performs, according to a different combination of multidimensional constellation information and grid mapping pattern information, grid de-mapping and multidimensional constellation demodulation on signals among multiple data streams from the same transmitter.

Further, if the receiver performs, according to different grid mapping pattern information, grid de-mapping on the mixed signals from multiple transmitters, the receiver performs, according to different interleaving/scrambling pattern information, de-interleaving/de-scrambling on the grid de-mapped and the multidimensional constellation demodulated data which passed through among multiple data streams from the same transmitter; or, the receiver performs, according to different multidimensional constellation information, multidimensional constellation demodulation on the grid de-mapped data among multiple data streams from the same transmitter; or, the receiver performs, according to different multidimensional constellation information and interleaving/scrambling pattern information, multidimensional constellation demodulation and de-interleaving/de-scrambling on the de-mapped data among multiple data streams from the same transmitter.

Further, if the receiver performs, according to different multidimensional constellation information, multidimensional constellation demodulation on the grid de-mapped data from multiple transmitters, the receiver performs, according to different grid mapping pattern information, de-mapping on multiple data streams from the same transmitter; or, the receiver performs, according to different interleaving/scrambling pattern information, de-interleaving/de-scrambling on the grid de-mapped and the multidimensional constellation demodulated data among multiple data streams from the same transmitter; or, the receiver performs, according to a different combination of grid mapping pattern information and interleaving/scrambling pattern information, grid de-mapping and de-interleaving/de-scrambling on multiple data streams from the same transmitter.

Further, if the receiver performs, according to a different combination of multidimensional constellation information and grid mapping pattern information, de-mapping and multidimensional constellation demodulation on the mixed signals from multiple transmitters, the receiver performs, according to different interleaving/scrambling pattern information, de-interleaving and/or de-scrambling on the grid de-mapped and the multidimensional constellation demodulated data among multiple data streams from the same transmitter.

Further, if the receiver performs, according to a different combination of interleaving/scrambling pattern information and grid mapping pattern information, de-mapping, multidimensional constellation demodulation and then de-interleaving/de-scrambling on the de-mapped data from multiple transmitters, the receiver performs, according to different multidimensional constellation information, multidimensional constellation demodulation on multiple data streams from the same transmitter.

Further, if the receiver performs, according to a different combination of interleaving/scrambling pattern information and multidimensional constellation information, multidimensional constellation demodulation and de-interleaving/de-scrambling on the de-mapped data from multiple transmitters, the receiver performs, according to different grid mapping pattern information, grid de-mapping on multiple data streams from the same transmitter.

Further, the receiver performs, according to a different combination of interleaving/scrambling pattern information, multidimensional constellation information and grid mapping pattern information, grid de-mapping, multidimensional constellation demodulation and de-interleaving/de-scrambling on signals among multiple data streams from different transmitters.

A different combination of interleaving/scrambling pattern information and multidimensional constellation information comprises any one of the following combinations:
  same interleaving/scrambling pattern information and different multidimensional constellation information;
  different interleaving/scrambling pattern information and same multidimensional constellation information; and
  different interleaving/scrambling pattern information and different multidimensional constellation information.

A different combination of multidimensional constellation information and grid mapping pattern information comprises any one of the following combinations:
  same multidimensional constellation information and different grid mapping pattern information;
  different multidimensional constellation information and same grid mapping pattern information; and
  different multidimensional constellation information and different grid mapping pattern information.

A different combination of interleaving/scrambling pattern information, multidimensional constellation information and grid mapping pattern information comprises any one of the following combinations:
  same interleaving/scrambling pattern information, same multidimensional constellation information and different grid mapping pattern information;
  same interleaving/scrambling pattern information, same grid mapping pattern information and different multidimensional constellation information;
  same grid mapping pattern information, same multidimensional constellation information and different interleaving/scrambling pattern information;
  same interleaving/scrambling pattern information, different multidimensional constellation information and different grid mapping pattern information;
  same multidimensional constellation information, different interleaving/scrambling pattern information and different grid mapping pattern information;
  different interleaving/scrambling pattern information, different multidimensional constellation information and same grid mapping pattern information; and
  different interleaving/scrambling pattern information, different multidimensional constellation information and different grid mapping pattern information.

Further, the receiver receives signals from the same transmitter, the signals being obtained by performing interleaving/scrambling, multidimensional constellation modulation and grid mapping on multiple data streams from the same transmitter; and, the receiver decodes, according to interleaving/scrambling pattern information, multidimensional constellation information and grid mapping pattern information corresponding to each data stream, the signals to obtain multiple data streams from the same transmitter.

Still further, if the signals received by the receiver are obtained by performing interleaving/scrambling by using different interleaving/scrambling pattern information and then multidimensional constellation modulation and grid mapping on multiple data streams from the same transmitter, the receiver performs, according to different interleaving/scrambling pattern information, de-interleaving/de-scrambling on the grid de-mapped and the multidimensional constellation demodulated data.

Still further, if the signals received by the receiver are obtained by performing multidimensional constellation modulation by using different multidimensional constellation information and then grid mapping on the interleaved/scrambled data among multiple data streams from the same transmitter, the receiver performs, according to different multidimensional constellation information, multidimensional constellation demodulation on the grid de-mapped data.

Still further, if the signals received by the receiver are obtained by performing, by using different grid mapping pattern information, grid mapping on the interleaved/scrambled and the multidimensional constellation modulated data among multiple data streams from the same transmitter, the receiver performs, according to different grid mapping pattern information, grid de-mapping on the received signals.

Still further, if the signals received by the receiver are obtained by performing interleaving/scrambling by using different interleaving/scrambling pattern information, multidimensional constellation modulation and grid mapping by using different grid mapping pattern information on multiple data streams from the same transmitter, the receiver performs grid de-mapping, multidimensional constellation demodulation and de-interleaving/de-scrambling according to different grid mapping pattern information, same multidimensional constellation information and different interleaving/scrambling pattern information.

Still further, if the signals received by the receiver are obtained by performing, by using a different combination of interleaving/scrambling pattern information and multidimensional constellation information, interleaving/scrambling and multidimensional constellation modulation and then grid mapping on multiple data streams from the same transmitter, the receiver performs, according to a different combination of interleaving/scrambling pattern information and multidimensional constellation information, multidimensional constellation demodulation and de-interleaving/de-scrambling on the grid de-mapped data.

Still further, if the signals received by the receiver are obtained by performing, by using a different combination of multidimensional constellation information and grid mapping pattern information, multidimensional constellation modulation and grid mapping on the interleaved/scrambled data among multiple data streams from the same transmitter, the receiver performs, according to a different combination of multidimensional constellation information and grid mapping pattern information, grid de-mapping and multidimensional constellation demodulation on the received signals.

Still further, if the signals received by the receiver are obtained by performing, by using different interleaving/scrambling patterns, different multidimensional constellation information and different grid mapping pattern information, interleaving/scrambling, multidimensional constellation modulation and grid mapping on multiple data streams from the same transmitter, the receiver performs, according to a different combination of interleaving/scrambling patterns, multidimensional constellation information and grid mapping pattern information, grid de-mapping, multidimensional constellation demodulation and de-interleaving/de-scrambling on the received signals.

This embodiment of the present invention provides a multiple access method. In this embodiment of the present invention, a transmitter performs channel coding on a bit sequence to determine a coded sequence, then performs interleaving and/or scrambling, multidimensional constellation modulation and grid mapping on the coded sequence to determine a mapped sequence, and transmits the mapped sequence; subsequently, a receiver receives mixed signals from each transmitter and then decodes the mixed information according to interleaver information and/or scrambler information, multidimensional constellation information and grid mapping pattern information of each transmitter to obtain data corresponding to each transmitter. In other words, the transmitter can process bit sequences corresponding to different user equipments by using different interleaver information and/or scrambler information, different multidimensional constellation information and different grid mapping pattern information and then transmit the processed bit sequences to the receiver, so that the receiver can distinguish the mixed signals transmitted by the transmitters by using different interleaver information and/or scrambler information, different multidimensional constellation information and different grid mapping pattern information, so as to distinguish different users. Accordingly, the requirements for simultaneous wireless access of more user equipments can be met.

FIG. 3 is a principle diagram of a transmitter for a multiple access technology based on cascaded interleaving/scrambling, multidimensional constellation modulation and grid mapping. As shown in FIG. 3, this embodiment of the present invention provides a transmitter for cascaded interleaving/scrambling, multidimensional constellation modulation and grid mapping. First, channel coding is performed on an information bit sequence $d_k = \{d_k(m), m=0, \ldots, M-1\}$ (where M is the length of the information bit sequence). The method of performing channel coding can be channel coding by one component code (a Turbo code, an LDPC code, a Polar code or more) with a code rate of $R_1$ or by the combination of multiple component codes. For example, a turbo code of a code rate $R_1$ and a repetition spreading code of a code rate $R_2$ are combined to generate a lower coding rate $R_3 = R_2 R_1$. Alternatively, the method of performing channel coding can be constituted directly by a Turbo code with a code rate of $R_3$. Channel coding is performed on the information bit sequence $d_k$ to obtain a coded sequence $c_k = \{c_k(n), n=0, \ldots, N-1\}$ (where N is the length of the channel-coded sequence), and the coded sequence $c_k$ is interleaved or scrambled by a first interleaver/scrambler $\alpha_k$ to obtain an interleaved/scrambled sequence $x_k = \{x_k(n), n=0, \ldots, N-1\}$.

The first-stage interleaver/scrambler $\alpha_k$ is a bit(chip)-level interleaver/scrambler, and the length of the interleaved/scrambled sequence is kept consistent with the length of the sequence fed into the interleaver/scrambler. The first-stage interleaver $\alpha_k$ can be generated by randomly shuffling $\{0, 1, \ldots, N-1\}$ or generated by shuffling based on a predetermined rule. In addition, the interleaver can be replaced with a scrambler. Numerical values from 0 to N−1 denote an order of positions in which data occupies.

Further, the obtained interleaved/scrambled sequences are divided into different groups, and there are b bits in each group. By using a multidimensional constellation (represented by Ω here), b bits are directly mapped into constellation vector points of J-dimensional real number, wherein each vector point is equivalent to q complex-valued symbols, where q=J/2. After the multidimensional constellation mapping, a symbol sequence $S_k = \{S_k(l), l=0, \ldots, L-1\}$ is generated (where L is the length of the symbol sequence and is related to the used modulation mode and the length of the interleaved sequence; generally, L can be an integral multiple of q). The symbol sequence $S_k$ will generate a sparse symbol sequence through third-stage grid mapping. The grid mapping pattern used in the third-stage grid mapping is represented by $\beta_k$.

In this embodiment of the present invention, through the processing by using the third-stage grid mapping pattern, symbols carrying user information can be sparsely mapped onto the allocated time-frequency resources, so that it is beneficial to resist against interference and fading, and advantageous to support more users in the same time-frequency resources. Subsequently, baseband-to-RF processing or more operations are performed on the generated data sequence, and the processed data sequence is eventually transmitted.

Further, based on the transmitter shown in FIG. 3, this embodiment of the present invention provides a multiple access method of cascaded interleaving/scrambling, multi-dimensional constellation modulation and grid mapping. As shown in FIG. 4, K transmitters acquire respective interleaver/scrambler information, multidimensional constellation information and grid mapping information from a physical broadcast channel, a physical downlink control channel or a physical downlink shared channel.

Further, the interleaver/scrambler information, multidimensional constellation information and grid mapping information indicate first-stage interleavers/scramblers, second-stage multidimensional constellations and third-stage grid mapping patterns, respectively. The interleaver/scrambler information, multidimensional constellation information and grid mapping information can indicate first-stage interleavers/scramblers, second-stage multidimensional constellation information and third-stage grid mapping patterns in a lookup table manner or more; or, the receiver can directly configure specific information of the interleavers/scramblers; or, the transmitters can be allowed to generate respective interleavers/scramblers according to the configured mother interleaver/scrambler and based on a certain generation rule.

The interleaver/scrambler information, multidimensional constellation information and grid mapping information are unique identifiers for distinguishing different users by the receiver.

Further, K transmitters transmit signals in the same way as the transmitter shown in FIG. 4, and the signals are mixed together at the receiver through respective channels $h_k$. Since the signals are corrupted by noise, the receiver can employ multi-user iterative detection. Specifically, the receiver performs RF-to-baseband processing on the received mixed signals, and the obtained signals as baseband received signals are fed to a multi-user detector. The multi-user detector calculates, according to the baseband received signals and prior probability information of each bit generated by previous iteration, posterior probability information of each bit or each symbol; then, extrinsic information is calculated in combination with the prior probability information input into the multi-user detector; and, inverse grid mapping is performed on the extrinsic information output from the detector according to the third-stage grid mapping pattern $\beta_k$ corresponding to each transmitter. The restored soft information sequence is demodulated according to the second-stage multidimensional constellation corresponding to each transmitter, and the demodulated soft information is input into a de-interleaver/de-scrambler for de-interleaving/-descrambling. Subsequently, the de-interleaved/-descrambled soft information is input into a decoder, wherein, in the decoder, corresponding decoding is performed according to the component code used by the transmitter. Eventually, the data corresponding to each transmitter is obtained.

Further, for next iterative detection, the same channel coding as in the transmitter will be performed on the decoded soft information again, and will be then subtracted by its own previous soft information to obtain extrinsic information. The obtained extrinsic information is re-interleaved/re-scrambled by the first-stage interleaver/scrambler, then re-modulated by using the second-stage multidimensional constellation and re-mapped by the third-stage grid mapping. The eventually obtained extrinsic information sequence as prior probability information is input into the multi-user detector. Hereto, an iterative detection completes once, and the above operations are repeated for next iterative detection and decoding.

During the above process, information transferred in the iterative detection and decoding is all probability information, i.e., probability that the bit is 0 or 1 or probability that a symbol has a value. Such information is called soft information which can be represented by a log-likelihood ratio or a log probability. During the first iteration, since there is no prior probability information, the prior probability input into the multi-user detector is an equal probability distribution; and, during the subsequent iteration, the extrinsic information updated by the previous iteration is used as prior probability information. When the number of iterations reaches a preset maximum value, a process of hard decision is performed in the decoder to obtain the final information data result of a user. The multi-user signal detector can be an Elementary Signal Estimator (ESE), or a detector based on a Message Passing Algorithm (MPA), Successive Interference Cancellation (SIC) or more.

In a first specific embodiment of the present invention, description will be given to how a transmitter of the present invention operates in combination with specific channel coding parameters, interleaving pattern/scrambler and grid mapping design parameters and other system configurations. The schematic diagram of the principle of the multiple access method in this embodiment is shown in FIG. 4. It is assumed that a transmitter has an information bit sequence $d_k=d_k=\{d_k(m), m=0, \ldots, M-1\}$ having a length of M=126, that is, this transmitter has 126 information bits. Channel coding is performed on this information bit sequence. The channel coding is performed by an LTE standard Turbo code of a code rate $R_1=1/2$ and a repetition spreading code of a length 2 (an equivalent code rate of $R_2=1/2$), so that the code rate of the whole channel coding is $R_3=R_2R_1=1/4$; or, the channel coding is directly performed by a Turbo code of a code rate 1/4 or other component codes.

Further, the information bit sequence $d_k$ will be channel coded to obtain a coded sequence $c_k=\{c_k(n), n=0, \ldots, N-1\}$, where N is the length of the channel-coded sequence and N=M/$R_3$=126*4=504. Subsequently, the coded sequence $c_k$ is interleaved/scrambled by a first-stage interleaver/scrambler $\alpha_k$ to obtain an interleaved/scrambled sequence $x_k=\{x_k(n), n=0, \ldots, N-1\}$, where the first-stage interleaver/scrambler $\alpha_k$ is a bit(chip)-level interleaver/scrambler, and the length of the interleaved/scrambled sequence is kept consistent with the length of the sequence input into the interleaver/scrambler. The transmitter acquires respective interleaver/scrambler, multidimensional constellation and grid mapping information from a physical broadcast channel, a physical downlink control channel or a physical downlink shared channel. The interleaver/scrambler, multidimensional constellation and grid mapping information indicates the first-stage interleaver/scrambler, a second-stage multidimensional constellation and a third-stage grid mapping pattern, which can be indicated in a lookup table manner; or, the receiver can directly configure the specific information of the interleaver/scrambler; or, the transmitter can be allowed to generate the respective interleaver/scrambler according to the configured mother interleaver/scrambler and based on a certain generation rule. For example, a mother interleaver/scrambler is configured, and the $k^{th}$ transmitter performs k-bit cyclic shifting to obtain its interleaver/scrambler, wherein the first-stage interleaver/scrambler $\alpha_k$ can be generated by randomly shuffling $\{0, 1, \ldots, N-1\}$, and numerical values from 0 to N-1 denote an order of positions in which data occupies. For example, if $\alpha_k = (4,503, \ldots, 52)$, $x_k(0) = c_k(4)$, $x_k(1) = c_k(503)$, ..., $x_k(503) = c_k(52)$, as shown in FIG. 5.

Further, multidimensional constellation modulation is performed on the obtained interleaved sequence $x_k$ to generate a symbol sequence $S_k = \{S_k(l), l=0, \ldots, L-1\}$, where L is the length of the symbol sequence and is related to the used modulation mode and the length of the interleaved/scrambled sequence. In this embodiment, the multidimensional constellation can be QPSK×QPSK, i.e., a Cartesian product form having two QPSK constellations. Correspondingly, the constellation points of one multidimensional constellation consist of two QPSK symbols. In this embodiment of the present invention, the transmitter can generate a symbol sequence by some other constellation modulations. For example, other constellations can be a constellation based on a Lattice partition chain $Z^4/2Z^4$, where $Z^4$ is a 4-dimensional integer Lattice. In this embodiment of the present invention, phase rotation or power adjustment is performed on these constellations to generate other constellations. Correspondingly, every M, =4 bits are mapped to a constellation point of the constellation, and one constellation point corresponds to complex-valued symbols. In this embodiment of the present invention, the mapping mode can be optimized. For example, the Hamming distance between bit sequences corresponding to two constellation points having a small Euclidean distance will also be small. Therefore, the length of the symbol is $$L = 2\frac{N}{M_s} = 252,$$

the third-stage grid mapping will be performed on the symbol sequence $S_k$ to generate a symbol sequence $S'_k = \{S'_k(l'), l=0, \ldots, L'-1\}$, where L' is the length of the third-stage grid mapped sequence.

In this embodiment of the present invention, the third-stage grid mapping can be performed in various ways in order to allow symbols carrying user information to be sparsely mapped onto the allocated time-frequency resources, so that it can better resist against interference and fading, and more users can be supported in the same time-frequency resources. In addition, it is to be noted that, since the signals are sparsely mapped onto resources, the overall equivalent code rate R of the transmitter is further reduced relative to the coding rate $R_3$. The degree of reduction is related to the sparseness in the third-stage grid mapping. In this embodiment, since the length of the symbol sequence is doubled, the equivalent code rate of the transmitter is reduced by half, that is, $$R = \frac{R_3}{2} = \frac{1}{8}.$$

Subsequently, carrier modulation is performed on the symbol sequence $S'_k$. In this embodiment, the transmitter performs OFDM multicarrier modulation (i.e., IFFT processing) on $S'_k$, then performs D/A conversion, up-conversion and remaining baseband-to-RF processing, and eventually transmits the signal.

Further, the receiver will receive signals from multiple transmitters, and the received signals from multiple transmitters will be corrupted by noise. In this embodiment, the receiver employs multi-user iterative detection and decoding, where RF-to-baseband processing is first performed on the received mixed signals, as shown in FIG. 6.

Further, the third-stage grid mapping in the present invention is performed in various ways, for example, zero-padding and interleaving mode. In this mode, a grid mapping pattern $\beta_k$ corresponds to an interleaver used by the transmitter during the third-stage grid mapping. In the third-stage grid mapping in this embodiment, the transmitter performs zero-padding on the end of the symbol sequence $S_k$ (the zero-padded length is $L_0$), where $L_0 = L$. The zero-padded length can be adjusted, that is, $L' = L + L_0 = 2L$ and $$S_k = \begin{cases} S_k(l'), & l' = 0, \ldots, L-1 \\ 0, & l' = L, L+1, \ldots, 2L-1 \end{cases}.$$

By using two symbols as a unit, the zero-padded $S_k$ generates a sparse symbol sequence $S'_k = \{S'_k(l'), l=0, \ldots, L'-1\}$ through an interleaver $\beta_k$ (since two QPSK symbols are bound together for interleaving, the length of the interleaver is L), as shown in FIG. 7. In this embodiment of the present invention, the interleaver $\beta_k$ can be generated by randomly shuffling $\{0, 1, \ldots, L-1\}$, or can be generated based on a predetermined rule. In this embodiment, if $\beta_k = \{45, 103, \ldots, 23,229\}$, $S'_k(0) = S_k(90)$, $S'_k(1) = S_k(91)$, ..., $S'_k(502) = 0$, $S'_k(503) = 0$.

Further, during the multi-user iterative detection and decoding in this embodiment, a user signal soft information sequence obtained by a multi-user detector is de-interleaved according to the third-stage grid mapping pattern. When the multi-user signal detector outputs symbol extrinsic information, the corresponding grid de-mapping is shown in FIG. 8(a). That is, the sequence is de-interleaved according to a symbol-level interleaver $\beta_k$, and the de-interleaved soft information sequence is truncated in order to discard symbol extrinsic information with a length of $$L = \frac{L'}{2} = 252$$

in the latter part of the sequence. In this embodiment of the present invention, since latter 252 bits of symbol extrinsic information are zero-padded at the transmitter, only first 252 bits of symbol extrinsic information are valid data, and inverse multidimensional constellation mapping will be performed on the obtained symbol extrinsic information and the obtained symbol extrinsic information will be then input into the first-stage interleaver/scrambler for de-interleaving/de-scrambling.

Further, if the multi-user detector outputs bit extrinsic information, the grid de-mapping is performed in the way shown in FIG. 8(b). That is, bits mapped to one symbol are grouped at first, second-stage grid de-mapping is performed on the bit groups to obtain bit extrinsic information, and the de-interleaved bit groups are truncated. In this embodiment, if the transmitter uses QPSK×QPSK, bits are classified into four groups each having a length of 252. Each group of data is de-interleaved according to a bit-level interleaver $\beta_k$, and intrinsic information of latter 126 bits in each de-interleaved group are truncated and discarded because the latter 126 bits are located at zero-padded positions of the transmitter. Subsequently, the obtained bit intrinsic information sequence is de-interleaved/de-scrambled according to the interleaver/scrambler used in the first stage.

Further, during the implementation of zero-padding and interleaving, the used interleaver $\beta_k$ is generated by randomly shuffling, or $\beta_k$ can be generated based on given conditions. For example, non-zero symbols of each transmitter are uniformly distributed in the time-frequency resources to generate $\beta_k$.

In a second specific embodiment of the present invention, the method of distinguishing multiple accesses of transmitters by a multidimensional constellation in this embodiment of the present invention will be described in detail. In this embodiment, the schematic diagram of the transmission principle of transmitters is shown in FIG. 4. It is assumed that there are K=4 transmitters in the system, and each transmitter uses the same transmission method as that in Embodiment 1. The $k^{th}$ transmitter has an information bit sequence $d_k=\{d_k(m), m=0, \ldots, M-1\}$ to be transmitted, where M=126. Channel coding is performed on this bit sequence. The channel coding is performed by an LTE standard Turbo code of a code rate $R_1=1/2$ and a repetition spreading code of a length of 2 (an equivalent code rate of $R_2=1/2$), so that the code rate of the whole channel coding is $R_3=R_2R_1=1/4$; or, the channel coding is directly performed by a Turbo code of a code rate of 1/4 or other component codes. The information bit sequence $d_k$ will be channel coded to obtain a coded sequence $c_k=\{c_k(n), n=0, \ldots, N-1\}$, where N is the length of the channel-coded sequence, and $N=M/R_3=126*4=504$. Subsequently, the coded sequence $c_k$ is interleaved/scrambled by a first-stage interleaver/scrambler $\alpha$ (here, it is assumed that interleavers/scramblers for 4 users are the same) to obtain an interleaved/scrambled sequence $x_k=\{x_k(n), n=0, \ldots, N-1\}$, and bit-to-symbol mapping is performed on the interleaved/scrambled sequence by using a multidimensional constellation. The four transmitters use different multidimensional constellations. Specifically, the four transmitters adopt different phase rotation ways for a mother constellation QPSK×QPSK, wherein transmitter 1 uses QPSK×QPSK; transmitter 2 uses $$\frac{\pi}{4} - QPSK \times QPSK,$$

that is, the first QPSK constellation is rotated clockwise by $$\frac{\pi}{4}$$

and the second QPSK constellation remains unchanged; transmitter 3 use QPSK $$QPSK \times \frac{\pi}{4} - QPSK,$$

that is, the first QPSK constellation remains unchanged and the second QPSK constellation is rotated clockwise by $$\frac{\pi}{4};$$

transmitter 4 uses $$\frac{\pi}{4} - QPSK \times \frac{\pi}{4} - QPSK,$$

that is, two QPSK constellations are rotated clockwise by $$\frac{\pi}{4},$$

shown in FIG. 9.

The multidimensional constellation information used by the transmitter comprises the used mother constellation, and constellation operators can be tabulated. The system can inform the transmitter of the multidimensional constellation information through a physical broadcast channel, a physical downlink control channel and/or a physical downlink shared channel.

Further, bit-to-symbol modulation is performed on the interleaved/scrambled sequence $x_k$ by using a multidimensional constellation to generate a symbol sequence $S_k=\{S_k(l), l=0, \ldots, L-1\}$. L is the length of the symbol sequence and is related to the used modulation mode and the length of the interleaved/scrambled sequence. In this embodiment of the present invention, one constellation point corresponds to two QPSK symbols, and the modulation order is $M_s=4$. That is, four bits are mapped to one constellation point. However, since one constellation point corresponds to two complex-valued symbols, the length of the symbol sequence is $$L = q\frac{N}{M_s} = 252.$$

Then, the grid mapping will be performed on the symbol sequence $S_k$ by using a third-stage grid mapping pattern to generate a sparse symbol sequence $S'_k=\{S'_k(l'), l=0, \ldots, L'-1\}$, where L' is the length of the third-stage grid mapped sequence.

The third-stage grid mapping pattern information is also obtained by the transmitter through a physical broadcast channel, a physical downlink control channel and/or a physical downlink shared channel. In this embodiment, the grid mapping patterns corresponding to all transmitters are the same. The data from different transmitters is distinguished by different multidimensional constellations. As shown in FIG. 10, since K transmitters use the same zero-padding, interleaving and grid mapping, the K transmitters require only one piece of grid mapping pattern information; and, since the zero-padding and interleaving pattern corresponding to each transmitter is the same, non-zero symbols of each transmitter occupy same time-frequency resources.

Further, the third-stage grid mapping pattern allows symbols carrying user information to be sparsely mapped onto the allocated time-frequency resources, it is beneficial to resist against interference and fading, and advantageous to support more users in the same time-frequency resources. In this embodiment of the present invention, since the signals are sparsely mapped onto resources, the overall equivalent code rate R of the transmitter is further reduced relative to the coding rate $R_3$, wherein the degree of reduction of the overall equivalent code rate of the transmitter is related to the sparseness in the third-stage grid mapping pattern. In this embodiment of the present invention, since the length of the symbol sequence is doubled, the equivalent code rate of the transmitter is reduced by half, that is, $$R = \frac{R_3}{2} = \frac{1}{8}.$$

Subsequently, carrier modulation is performed on the symbol sequence $S'_k$. In other words, the transmitter performs OFDM multicarrier modulation (IFFT processing) on $S'_k$. Then, the transmitter performs D/A conversion, up-conversion and remaining baseband-to-RF processing, and eventually transmits the processed signals.

Further, signals from K transmitters are mixed together at the receiver through respective channels and corrupted by noise, wherein the receiver employs multi-user iterative detection and decoding. That is, RF-to-baseband processing is first performed on the received mixed signals, and the signals processed by FFT are then fed into a multi-user detector. During the first iteration, posterior probability information of each user signal is calculated in the multi-user detector according to the preset prior probability information of user signals and the channel information of each user estimated by a reference signal, and an extrinsic information sequence is then calculated in combination with the prior probability information; subsequently, grid de-mapping is performed according to the grid mapping pattern of each user, and the grid de-mapped soft information sequence is de-mapped according to a second-stage multidimensional constellation corresponding to the transmitter; and, the de-mapped bit soft information sequence is de-interleaved according to a first-stage interleaver/scrambler, and the de-interleaved soft information is input into a decoder. In the decoder, corresponding decoding is performed according to the component code used by the transmitter. That is, repetition spreading decoding is first performed, followed by Turbo decoding and final decision, to obtain user data. Further, for next iterative detection, the receiver updates the prior probability information of user signals, and performs channel coding, which is the same as that in the transmitter, on the decoded soft information, wherein the equivalent code rate of the signal coding is the component code the same as that in the transmitter or the combination of component codes, i.e., a Turbo code of a code rate $R_1=1/2$ and a repetition spreading code of a length 2. Subsequently, the previous soft information is subtracted from the decoded soft information to obtain extrinsic information, and the obtained extrinsic information is re-interleaved/re-scrambled by the first-stage interleaver/scrambler, remapped by using the second-stage multidimensional constellation and grid-remapped by using the third-stage grid mapping to eventually obtain an extrinsic information sequence. This extrinsic information sequence as a prior probability sequence is fed into the multi-user detector to serve as the input for the next iterative detection. Hereto, one iterative detection ends, and the above operations are repeated for next iterative detection and decoding.

Further, since there is no prior probability information during the first iteration, the prior probability input into the multi-user detector is an equal probability distribution; while during the subsequent iteration, the prior probability information updated by the previous iteration is used. The multi-user signal detector can be an ESE, an MPA, an SIC or other detectors.

Further, when the number of iterations reaches a preset maximum value, a process of hard decision is performed in the decoder to obtain the final information data result of a user, and the transmitter from which the data is transmitted is distinguished by the allocated corresponding second-stage multidimensional constellation. In other words, when the second-stage multidimensional constellations of transmitters are the same, different users (transmitters) are distinguished by different first-stage interleavers/scramblers or third-stage grid mapping patterns.

In a third specific embodiment of the present invention, a method of distinguishing multiple accesses of transmitters by a combination of first-stage interleaver/scrambler information and second-stage multidimensional constellation information will be described in detail. The configuration of transmitters and of a receiver is shown in FIG. 4. There are K=4 transmitters in the system, and each transmitter uses the same transmission mode as that in Embodiment 1, wherein the $k^{th}$ transmitter has an information bit sequence $d_k=\{d_k(m), m=0, \ldots, M-1\}$ to be transmitted having a length of M=126. That is, this transmitter has 126 information bits. Channel coding is performed on this bit sequence. The channel coding is performed by an LTE standard Turbo code of a code rate $R_1=1/2$ and a repetition spreading code of a length of 2 (an equivalent code rate of $R_2=1/2$), so that the code rate of the whole channel coding is $R_3=R_2R_1=1/4$; or, the channel coding is directly performed by a Turbo code of a code rate of 1/4 or other component codes. The information bit sequence $d_k$ will be channel coded to obtain a coded sequence $c_k=\{c_k(n), n=0, \ldots, N-1\}$, where N is the length of the channel-coded sequence, and N=M/$R_3$=126*4=504. Subsequently, the coded sequence $c_k$ is interleaved by a first-stage interleaver/scrambler $\alpha_k$ to obtain an interleaved sequence $x_k=\{x_k(n), n=0, \ldots, N-1\}$, wherein transmitters 1 and 2 use the same interleavers/scramblers $\alpha_1$, and transmitters 3 and 4 use the same interleavers/scramblers $\alpha_2$. Subsequently, bit-to-symbol mapping is performed on the interleaved sequence by using a multidimensional constellation, wherein transmitters 1 and 3 use the same multidimensional constellation QPSK×QPSK, and transmitters 2 and 4 use the same multidimensional constellation $$\frac{\pi}{4} - QPSK \times \frac{\pi}{4} - QPSK.$$

In other words, the transmitters 1 to 4 have different combinations of first-state interleaver/scrambler information and second-stage multidimensional constellation information. Thus, the receiver distinguishes data from different transmitters according to the combination of interleaver/scrambler information and second-stage multidimensional constellation information. Further, the interleaving/scrambling information and multidimensional constellation information used by transmitters are obtained through a physical broadcast channel, a physical downlink control channel and/or a physical downlink shared channel.

Further, bit-to-symbol modulation is performed on the interleaved/scrambled sequence $x_k$ by using a multidimensional constellation to generate a symbol sequence $S_k=\{S_k(l), l=0, \ldots, L-1\}$, where L is the length of the symbol sequence and is related to the used modulation mode and the length of the interleaved/scrambled sequence. In this embodiment of the present invention, one constellation point corresponds to two QPSK symbols, and the modulation order is $M_s=4$. That is, four bits are mapped to one constellation point. Thus, the length of the symbol sequence is $$L = 2\frac{N}{M_s} = 252.$$

Then, the symbol sequence $S_k$ is processed by using a third-stage grid mapping pattern to generate a sparse symbol sequence $S'_k=\{S'_k(l'), l=0, \ldots, L'-1\}$, where L' is the length of the third-stage grid mapped sequence.

Further, the third-stage grid mapping pattern information is also obtained by the transmitter through a physical broadcast channel, a physical downlink control channel and/or a physical downlink shared channel. In this embodiment of the present invention, the grid mapping patterns corresponding to all transmitters are the same, and the data from different transmitters is distinguished by a different combination of first-stage interleaving/scrambling information and second-stage multidimensional constellation information, as shown in FIG. 11. Since K transmitters use the same grid mapping, the K transmitters require only one piece of grid mapping pattern information. And, since each transmitter uses the same zero-padding and interleaving pattern, non-zero symbols of each transmitter occupy the same time-frequency resources.

Further, the third-stage grid mapping pattern allows symbols carrying user information to be sparsely mapped onto the allocated time-frequency resources, it is beneficial to resist against interference and fading, and advantageous to support more users in the same time-frequency resources. In addition, it is to be noted that, since the signals are sparsely mapped onto resources, the overall equivalent code rate R of the transmitter is further reduced relative to the coding rate $R_3$. The degree of reduction is related to the sparseness in the third-stage grid mapping. In this embodiment of the present invention, since the length of the symbol sequence is doubled, the equivalent code rate of the transmitter is reduced by half, that is, $$R = \frac{R_3}{2} = \frac{1}{8}.$$

Subsequently, carrier modulation is performed on the symbol sequence $S'_k$. Specifically, the transmitter performs OFDM multicarrier modulation (IFFT processing) on $S'_k$, then performs D/A conversion, up-conversion and remaining baseband-to-RF processing, and eventually transmits the signals.

Further, signals from K transmitters are mixed together at the receiver through respective channels and corrupted by noise. The receiver employs multi-user iterative detection and decoding. That is, RF-to-baseband processing is firstly performed on the received mixed signals, and the signals processed by FFT are then fed into a multi-user detector. During the first iteration, at first, channel information corresponding to each transmitter is estimated according to the preset prior probability information of user signals and a reference signal; then, posterior probability information of each transmitter signal is calculated in the multi-user detector, and an extrinsic information sequence is calculated in combination with the prior probability information; subsequently, grid de-mapping is performed according to the third-stage grid mapping pattern corresponding to each transmitter, and the third-stage grid de-mapped soft information sequence is de-mapped according to the second-stage multidimensional constellation corresponding to each transmitter; and, the de-mapped bit soft information sequence is de-interleaved/de-scrambled according to a first-stage interleaver/scrambler of the user. The de-interleaved/de-scrambled soft information is input into a decoder. In the decoder, corresponding decoding is performed according to the component code used by each transmitter. That is, repetition spreading decoding is firstly performed, followed by Turbo decoding and final decision, to obtain user data. For next iterative detection, the prior probability information of user signals needs to be updated. Therefore, channel coding the same as that in the transmitter needs to be performed on the decoded soft information again, that is, a component code or a combination of component codes the same as that in the transmitter is used. For example, the component code or the combination of component codes the same as that in the transmitter is a Turbo code of a code rate $R_1=1/2$ and a repetition spreading code of a length 2. Subsequently, the previous soft information is subtracted from the decoded soft information to obtain extrinsic information, and the obtained extrinsic information is re-interleaved by the first-stage interleaver/scrambler, remapped by using the second-stage multidimensional constellation and grid-remapped by using the third-stage grid mapping to eventually obtain an extrinsic information sequence. This extrinsic information sequence as a prior probability sequence is fed into the multi-user detector to serve as the input for the next iterative detection. Hereto, iterative detection completes once, and the above operations are repeated for next iterative detection and decoding.

Further, since there is no prior probability information during the first iteration, the prior probability input into the multi-user detector is an equal probability distribution; while during the subsequent iteration, the prior probability information updated by the previous iteration is used. The multi-user signal detector is an ESE, an MPA, an SIC or other detectors.

Further, when the number of iterations reaches a preset maximum value, a process of hard decision is performed in the decoder to obtain the final information data result of a user. In this embodiment of the present invention, the receiver distinguishes, according to the combination of correspondingly allocated first-stage interleavers/scramblers and second-stage multidimensional constellations, the transmitter from which the data is transmitted.

In a fourth specific embodiment of the present invention, a method of distinguishing multiple accesses of transmitters by using a combination of second-stage multidimensional constellation information and third-stage grid mapping pattern information will be described in detail in this embodiment.

In this embodiment of the present invention, the configuration of transmitters and of a receiver in this system is shown in FIG. 4. For example, there are K=4 transmitters in the system. Each transmitter uses the same transmission method as that in Embodiment 1. The $k^{th}$ transmitter has an information bit sequence $d_k=\{d_k(m), m=0, \ldots, M-1\}$ to be transmitted having a length of M=126, that is, this transmitter has 126 information bits. Channel coding is performed on this bit sequence, wherein the channel coding is performed by an LTE standard Turbo code of a code rate $R_1=1/2$ and a repetition spreading code of a length 2 (an equivalent code rate of $R_2=1/2$), or the channel coding is directly performed by a Turbo code of a code rate 1/4 or other component codes. The information bit sequence $d_k$ will be channel coded to obtain a coded sequence $c_k=\{c_k(n), n=0, \ldots, N-1\}$, where N is the length of the channel-coded sequence, and $N=M/R_3=126*4=504$. Subsequently, the coded sequence $c_k$ is interleaved/scrambled by a first-stage interleaver/scrambler a (all transmitters use the same interleaver/scrambler) to obtain an interleaved/scrambled sequence $x_k=\{x_k(n), n=0, \ldots, N-1\}$ (the interleaving/scrambling information used by the transmitter is obtained through a physical broadcast channel, a physical downlink control channel and/or a physical downlink shared channel), and bit-to-symbol mapping is performed on the interleaved/scrambled sequence by using a multidimensional constellation, wherein transmitters 1 and 2 use an same multidimensional constellation QPSK×QPSK, and transmitters 3 and 4 use the same multidimensional constellation $$\frac{\pi}{4} - QPSK \times \frac{\pi}{4} - QPSK.$$

The multidimensional constellation information used by the transmitters is obtained through a physical broadcast channel, a physical downlink control channel and/or a physical downlink shared channel.

In this embodiment of the present invention, bit-to-symbol modulation is performed on the interleaved/scrambled sequence $x_k$ by using a multidimensional constellation to generate a symbol sequence $S_k=\{S_k(l), l=0, \ldots, L-1\}$ (where L is the length of the symbol sequence, and L is related to the used modulation mode and the length of the interleaved/scrambled sequence). In this embodiment of the present invention, one constellation point corresponds to two QPSK symbols, and the modulation order is M, =4. That is, four bits are mapped to one constellation point. Thus, the length of the symbol sequence is $$L = 2\frac{N}{M_s} = 252.$$

Then, the symbol sequence $S_k$ is processed by using a third-stage grid mapping pattern to generate a sparse symbol sequence $S'_k=\{S'_k(l'), l=0, \ldots, L'-1\}$ (where L' is the length of the sequence which passed through the third-stage grid mapping).

Further, the third-stage grid mapping pattern can be implemented in various ways, as described in Embodiment 1. The third-stage grid mapping pattern information is also obtained by the transmitter through a physical broadcast channel, a physical downlink control channel and/or a physical downlink shared channel, and the principle for allocating grid mapping patterns is to ensure that different transmitters have different combinations of second-stage multidimensional constellation information and third-stage grid mapping pattern information. For example, in this embodiment of the present invention, the transmitters 1 and 3 use the same grid mapping pattern information and the transmitters 2 and 4 use the same mapping patterns, but the four transmitters have different combinations of second-stage multidimensional constellation information and third-stage grid mapping pattern information, as shown in FIG. 12.

Further, since the third-stage grid mapping is to allow symbols carrying user information to be sparsely mapped onto the allocated time-frequency resources, it is beneficial to resist against interference and fading, and advantageous to support more users in the same time-frequency resources. In addition, since sparse symbol mapping is performed, the overall equivalent code rate R of the transmitter is further reduced relative to the coding rate $R_3$, wherein the degree of reduction is related to the sparseness in the third-stage grid mapping pattern. In this embodiment of the present invention, since the length of the symbol sequence is doubled, the equivalent code rate of the transmitter is reduced by half, that is, $$R = \frac{R_3}{2} = \frac{1}{8}.$$

Subsequently, carrier modulation is performed on the sparse symbol sequence $S'_k$. In other words, OFDM multicarrier modulation (i.e., IFFT processing) is performed on $S'_k$. Then, the transmitter performs D/A conversion, up-conversion and remaining baseband-to-RF processing, and eventually transmits the signals.

Further, signals from K transmitters are mixed together at the receiver through respective channels and corrupted by noise. The receiver employs multi-user iterative detection and decoding. That is, RF-to-baseband processing is first performed on the received mixed signals, and the signals processed by FFT are then fed into a multi-user detector.

Further, during the first iteration, channel information corresponding to each user is estimated according to the preset prior probability information of user signals and by using a reference signal; then, posterior probability information of each user signal is calculated in the multi-user detector, and an extrinsic information sequence is calculated in combination with the prior probability information; subsequently, grid de-mapping is performed according to the third-stage grid mapping pattern corresponding to each transmitter, and the third-stage grid de-mapped soft information sequence is de-mapped according to the second-stage multidimensional constellation corresponding to each transmitter; and, the de-mapped bit soft information sequence is de-interleaved/de-scrambled according to the first-stage interleaver/scrambler corresponding to this transmitter, and the de-interleaved/de-scrambled soft information is input into a decoder. Specifically, in the decoder, corresponding decoding is performed according to the component code used by the transmitter (repetition spreading decoding is first performed, followed by Turbo decoding and final decision, to obtain user data).

Further, for next iterative detection, the prior probability information of user signals needs to be updated. Therefore, channel coding the same as that in the transmitter needs to be performed on the decoded soft information again, that is, a component code or a combination of component codes the same as that in the transmitter (i.e., a Turbo code of a code rate $R_1=1/2$ and a repetition spreading code of a length 2) is used. Subsequently, the previous soft information is subtracted from the decoded soft information to obtain extrinsic information, and the obtained extrinsic information is re-interleaved by the first-stage interleaver/scrambler, remapped by using the second-stage multidimensional constellation and grid-remapped by using the third-stage grid mapping to eventually obtain an extrinsic information sequence. This extrinsic information sequence as a prior probability sequence is fed into the multi-user detector to serve as the input for the next iterative detection. Hereto, the iterative detection completes once, and the above operations are repeated for next iterative detection and decoding. Specifically, since there is no prior probability information during the first iteration, the prior probability input into the multi-user detector is an equal probability distribution; while during the subsequent iteration, the prior probability information updated by the previous iteration is used. The multi-user signal detector can be an ESE, an MPA, an SIC or other detectors.

Further, when the number of iterations reaches a preset maximum value, a process of hard decision is performed in the decoder to obtain the final information data result of a user.

In the fifth embodiment of the present invention, a method of distinguishing multiple accesses of transmitters by using a combination of first-stage interleaver/scrambler information, second-stage multidimensional constellation information and third-state grid mapping pattern information will be described. The configuration of transmitters and of a receiver is shown in FIG. 4. There are K transmitters in the system, each transmitter uses the same transmission method as that in Embodiment 1, and the $k^{th}$ transmitter has an information bit sequence $d_k=\{d_k(m), m=0, \ldots, M-1\}$ to be transmitted having a length of M. Specifically, channel coding is first performed on this information bit sequence (wherein the channel coding is performed by an LTE standard Turbo code of a code rate $R_1=1/2$ and a repetition spreading code of a length 2 (an equivalent code rate of $R_2=1/2$), so that the code rate of the whole channel coding is $R_3=R_2R_1=1/4$; or, the channel coding is directly performed by a Turbo code of a code rate 1/4 or other component codes). The information bit sequence $d_k$ will be channel coded to obtain a coded sequence $c_k=\{c_k(n), n=0, \ldots, N-1\}$ (where N is the length of the channel-coded sequence, and $N=M/R_3$). Subsequently, the coded sequence $c_k$ is interleaved/scrambled by a first-stage interleaver/scrambler ($x_k$ to obtain an interleaved/scrambled sequence $x_k=\{x_k(n), n=0, \ldots, N-1\}$, and bit-to-symbol mapping is performed on the interleaved/scrambled sequence by using a multidimensional constellation $i_k$ to generate a symbol sequence $S_k=\{S_k(l), l=0, \ldots, L-1\}$ (where L is the length of the symbol sequence and is related to the used modulation mode and the length of the interleaved/scrambled sequence). This symbol sequence $S_k$ is processed by using a third-stage grid mapping pattern $\beta_k$ to generate a sparse symbol sequence $S'_k=\{S'_k(l'), l=0, \ldots, L'-1\}$ (where L' is the length of the sequence which passed through the third-stage grid mapping). The interleaver/scrambler information, multidimensional constellation information and grid mapping pattern information used by transmitters are obtained through a physical broadcast channel, a physical downlink control channel and/or a physical downlink shared channel.

Further, when the receiver allocates a first-stage interleaver/scrambler $\alpha_k$, a second-stage multidimensional constellation $\Omega_k$ and a third-stage grid mapping pattern $\beta_k$ for each transmitter, the three-stage combinations for different transmitters are ensured to be different, and it is thus ensured that the receiver can distinguish different transmitters by using the three-stage combinations.

Further, signals from K transmitters are combined together at the receiver through respective channels and corrupted by noise, and the receiver employs multi-user iterative detection and decoding. Specifically, the receiver performs RF-to-baseband processing on the received mixed signals, and the FFT-processed signals are fed into a multi-user detector. Specifically, in the multi-user detector, during the first iteration, channel information of each user is estimated according to the preset prior probability information of user signals and by using a reference signal; then, posterior probability information of each user signal is calculated in the multi-user detector, and an extrinsic information sequence is calculated in combination with the prior probability information; subsequently, grid de-mapping is performed according to the third-stage grid mapping pattern corresponding to each transmitter, and the soft information sequence which passed through the third-stage grid de-mapping is de-mapped according to the second-stage multidimensional constellation corresponding to each transmitter; and, the de-mapped bit soft information sequence is de-interleaved/de-scrambled according to the first-stage interleaver/scrambler corresponding to each transmitter, and the de-interleaved/de-scrambled soft information is input into a decoder. Specifically, in the decoder, corresponding decoding is performed according to the component code used by the transmitter (repetition spreading decoding is first performed, followed by Turbo decoding and final decision, to obtain user data). For next iterative detection, the prior probability information of user signals needs to be updated. Therefore, channel coding the same as that in the transmitter is performed on the decoded soft information again, wherein the channel coding is performed by the component code or a combination of component codes (a Turbo code of a code rate $R_1=1/2$ and a repetition spreading code of a length 2) the same as that in the transmitter. Subsequently, the previous soft information is subtracted from the decoded soft information to obtain extrinsic information, and the obtained extrinsic information is re-interleaved/re-scrambled by the first-stage interleaver/scrambler, remapped by using the second-stage multidimensional constellation and grid-remapped by using the third-stage grid mapping to eventually obtain an extrinsic information sequence. This extrinsic information sequence as a prior probability sequence is fed into the multi-user detector to serve as the input for the next iterative detection. Hereto, the iterative detection completes once, and the above operations are repeated for next iterative detection and decoding. Since there is no prior probability information during the first iteration, the prior probability input into the multi-user detector is an equal probability distribution; while during the subsequent iteration, the prior probability information updated by the previous iteration is used. The multi-user signal detector can be an ESE, an MPA, an SIC or other detectors.

Further, when the number of iterations reaches a preset maximum value, a process of hard decision is performed in the decoder to obtain the final information data result of a user.

In the sixth embodiment of the present invention, a transmission method based on cascaded interleaving/scrambling, multidimensional constellation and grid mapping has been described in the first specific embodiment, wherein different transmitters are symmetrical. In other words, different transmitters are configured with data sequences of the same length (same M) and same channel coding (i.e., same component code or a combination of component codes and same coding rate $R_3$); with first-stage interleaves/scramblers of an same length, the different transmitters perform bit-to-symbol mapping by using multidimensional constellations having the same modulation order, and send to third-stage grid mapping patterns, where the number of zero values or the number of idle REs is the same. Therefore, the overall equivalent code rate R of different transmitters is the same, so that symbol sequences from different transmitters can be mapped to the same time-frequency resources. In this embodiment of the present invention, by adjusting the coding rate $R_{k3}$ of each transmitter, the modulation order of the second-stage multidimensional constellation mapping and the number $N_{k0}$ of zero values (or the number of idle REs) in the third-stage grid mapping pattern, the overall equivalent code rate R of different transmitters is allowed to be different, but it still can ensure that symbol sequences from different transmitters can be mapped to the same time-frequency resources, i.e., $N_{RE}$ same REs.

Specifically, the $k^{th}$ transmitter has an information bit sequence $d_k=\{d_k(m), m=0, \ldots, M_k-1\}$ having a length of $M_k$. Channel coding is performed on this information bit sequence to obtain a coded sequence $c_k=\{c_k(n), n=0, \ldots, N_k-1\}$ (where $N_k$ is the length of the sequence channel-coded by the $k^{th}$ transmitter, and $N_k=M_k/R_{k3}$). Subsequently, the coded sequence $c_k$ is interleaved/scrambled by a first-stage interleaver/scrambler $\alpha_k$ to obtain an interleaved/scrambled sequence $x_k=\{x_k(n), n=0, \ldots, N_k-1\}$. The first-stage interleaver/scrambler $\alpha_k$ is a chip(bit)-level interleaver/scrambler. The length of the interleaved/scrambled sequence is kept consistent with the length of the sequence fed into the interleaver/scrambler. The generation and operation of the first-stage interleaver/scrambler $\alpha_k$ have been described in detail in the forgoing embodiments and will not be repeated here. If the channel coding is performed by a component code (a Turbo code, an LDPC code, a Polar code or more) of a code rate $R_{1k}$, the code rate of the whole channel coding is $R_{k3}=R_{1k}$; however, if the channel coding is performed by a component code 1 of a code rate $R_{1k}$, a component code 2 of a code rate $R_2k \ldots$ a component code F of a code rate $R_{Fk}$, the code rate of the whole channel coding is $R_{k3}=R_{1k}*R_{2k}* \ldots *R_{Fk}$.

Further, the transmitter performs bit-to-symbol modulation on the interleaved/scrambled sequence $x_k$ by using a multidimensional constellation to generate a symbol sequence $S_k=\{S_k(l), l=0, \ldots, L_k-1\}$ (where $L_k$ is the length of the symbol sequence and related to the used modulation mode and the length of the interleaved/scrambled sequence), and the symbol sequence $S_k$ is then processed by using a third-stage grid mapping pattern to generate a sparse symbol sequence $S'_k=\{S'_k(l'), l=0, \ldots, L'_k-1\}$ (where L' is the length of the sequence which passed through the third-stage grid mapping), wherein the modulation order of the modulation mode used by the $k^{th}$ transmitter is $M_{ks}$, that is, $M_{ks}$ bits are mapped to one constellation point. Since one constellation point corresponds to $q_k$ complex-valued symbols, the length of the symbol sequence is $$L_k = q_k \frac{N_k}{M_{ks}}.$$

The aim is to allow symbols carrying user information to be sparsely mapped onto the allocated time-frequency resources, so that it is beneficial to resist against interference and fading, and advantageous to support more users in the same time-frequency resources. In addition, it is to be noted that, since the signals are sparsely mapped onto resources, the overall equivalent code rate $R_k$ of the transmitter is further reduced relative to the coding rate $R_{k3}$. The degree of reduction is positively proportional to the sparseness in the third-stage grid mapping pattern. In turn, the sparseness is related to the number of zero values (or idle REs) added into the third-stage grid mapping pattern by the transmitter.

Further, the system allocates $N_{RE}=504$ same REs for K=4 transmitters. By adjusting the coding rate, the second-stage multidimensional constellation and the number of zero values in the third-stage grid mapping pattern, the overall equivalent code rate $R_k$ of the transmitters is realized. As shown in Table 1, for the transmitter 1, the number of zero values is maximal, that is, $N_{k0}=441$, but the reduction of the overall equivalent code rate $R_k$ relative to the coding rate $R_{k3}$ is also maximal, that is, $$\frac{R_{k3}}{R_k} = \frac{1}{4};$$

however, for transmitter 4, since no zero needs to be added, the overall equivalent code rate $R_k$ remains unchanged relative to the coding rate $R_{k3}$.

TABLE 1

Configuration examples of the coding rate and the number of zero values

| Information length $M_k$ | Coding rate $R_{k3}$ | Modulation mode $(M_{ks}, q_k)$ | The number of zero values $N_{k0}$ | Overall equivalent code rate $R_k$ |
|---|---|---|---|---|
| 63 | ½ | QPSK (2, 1) | 441 | 1/16 |
| 126 | ⅓ | QPSK (2, 1) | 315 | ⅛ |
| 126 | ¼ | 16 QAM (4, 1) | 378 | 1/16 |
| 252 | ¼ | QPSK × QPSK (4, 2) | 0 | ¼ |

Further, if the length $M_k$ of information bits of a transmitter k, the coding rate $R_{k3}$ and the time-frequency resources allocated by the system are determined, the number $N_{k0}$ of zero values or idle REs required by the third-stage grid mapping pattern is determined according to the used multidimensional constellation information (the modulation order M, and the number $q_k$ of symbols corresponding to each constellation point), that is, $N_{k0}=N_{RE}-q_k*M_k/(R_{k3}*M_{ks})$; and in turn, the overall equivalent code rate of the transmitter k is $R_k=q_k*M_k/(N_{RE}*M_{ks})$. In addition, if the power of each transmitter is ensured to be the same, the power $P_s$ of a single symbol is modulated by adjusting the size of $N_{k0}$, as shown in Table 2. In addition, the total power of the transmitters is normalized as 1, in the case of given resources and data to be transmitted, it can be seen from Table 2 that the number of zero values of each transmitter is positively proportional to the symbol power. In other words, if there are more zero values, it is indicated that there are less symbols in the symbol sequence. However, since the total power is constant, the power allocated for each symbol becomes higher. Therefore, the symbol power of each transmitter is adjusted by adjusting the number of zero values (or by adjusting the modulation and coding mode of each transmitter).

TABLE 2

Relationship between the number $N_{k0}$ of zero values and the symbol power $P_s$

| The number of zero values $N_{k0}$ | Symbol power $P_s$ |
|---|---|
| 441 | 1/63 ≈ 0.016 |
| 315 | 1/189 ≈ 0.005 |
| 378 | 1/126 ≈ 0.008 |
| 0 | 1/504 ≈ 0.002 |

Further, carrier modulation (e.g., OFDM multicarrier modulation, i.e., IFFT processing) is performed on the sparse symbol sequence $S'_k$; then, resource mapping, D/A conversion, up-conversion and remaining baseband-to-RF processing are performed; and finally, the signals are transmitted.

Further, the signals received by the receiver from multiple transmitters are mixed together and corrupted by noise. In this embodiment of the present invention, the receiver employs multi-user iterative detection. That is, RF-to-baseband processing is firstly performed on the received mixed signals, and the signals processed by FFT are then fed into a multi-user detector. Specifically, during the first iteration, posterior probability information of each transmitter signal is calculated in the multi-user detector according to the preset prior probability information of user signals and the channel information of each transmitter estimated by a reference signal, and an extrinsic information sequence is then calculated in combination with the prior probability information; subsequently, the extrinsic information sequence is demodulated according to the respective second-stage multidimensional constellation information of each user and then grid de-mapped according to the third-stage grid mapping pattern information; and, the soft information sequence which passed through the grid de-mapping is de-interleaved/de-scrambled according to the first-stage interleaver/scrambler corresponding to each transmitter, and the de-interleaved/de-scrambled soft information is input into a decoder. In the decoder, corresponding decoding is performed according to the component code used by each transmitter. For next iterative detection, the prior probability information of user signals needs to be updated. Therefore, channel coding the same as that in the transmitter needs to be performed on the decoded soft information again, that is, a component code or a combination of component codes the same as that in the transmitter is used. Subsequently, the previous soft information is subtracted from the decoded soft information to obtain extrinsic information, and the obtained extrinsic information is re-interleaved/re-scrambled by the first-stage interleaver/scrambler, re-modulated by using the second-stage multidimensional constellation and grid-remapped by using the third-stage grid mapping to eventually obtain an extrinsic information sequence. This extrinsic information sequence as a prior probability sequence is fed into the multi-user detector to serve as the input for the next iterative detection. Hereto, the iterative detection completes once, and the above operations are repeated for next iterative detection and decoding. When the number of iterations reaches a preset maximum value, a process of hard decision is performed in the decoder to obtain the final information data result of a user. Since there is no prior probability information during the first iteration, the prior probability input into the multi-user detector is an equal probability distribution; while during the subsequent iteration, the prior probability information updated by the previous iteration is used. The multi-user signal detector can be an ESE, an MPA, an SIC or other detectors.

In the seventh embodiment of the present invention, a solution of combining the multiple access based on cascaded interleaving/scrambling, multidimensional constellation modulation and grid mapping with carrier modulation will be described in detail. The system configuration is shown in Embodiment 2, where K transmitters employ cascaded interleaving/scrambling, multidimensional constellation modulation and grid mapping; and, the receiver detects data transmitted by the K transmitters by using the multi-user iterative detection and decoding structure shown in FIG. 4. Since the carrier module is flexible in resource allocation and capable to resist against multipath fading, the combination with the carrier modulation modes can fully utilize the advantages of the multiple access method based on the cascaded interleaving/scrambling, multidimensional constellation modulation and grid mapping. In this embodiment of the present invention, examples of combinations with important carrier modulation modes will be described, specifically:

1. DFT-spread-Orthogonal frequency division multiplexing (DFT-s-OFDM): the DFT-s-OFDM is also called Single-Carrier OFDMA (SC-FDMA), which is an uplink carrier modulation mode used in LTF/LTE-A, wherein FIG. 13 shows a block diagram of a transmitter complying with cascaded interleaving/scrambling, multidimensional constellation modulation and grid mapping, in combination with DFT-s-OFDM.

Specifically, as shown in FIG. 13, DFT-s-OFDM modulation will be performed on a data stream to be transmitted on which channel coding, interleaving/scrambling, multidimensional constellation modulation and grid mapping are performed. The right half part of FIG. 13 shows a block diagram of the DFT-s-OFDM. Specifically, a serial data stream is converted into a parallel data stream by serial-to-parallel conversion, and DFT will be performed on the parallel data stream to obtain DFT-spread data; and carrier mapping and IDFT will be performed on the data and then parallel-to-serial conversion will be performed on the data and the data is prefixed with a cyclic prefix (CP) to obtain the data to be transmitted. It is to be noted that, the number of data before carrier mapping and the number of data after carrier mapping are different, and the number of data after carrier mapping is not less than the number of data before carrier mapping.

Further, the carrier mapping also determines the frequency resources used by a transmitter. DFT-s-OFDM, since it belongs to an orthogonal resource allocation method, can more flexibly support more transmitters when combined with the non-orthogonal multiple access method. Multiple transmitters allocated with the same time-frequency resources can be distinguished by using first-stage interleavers/scramblers, second-stage multidimensional constellations and third-stage grid mapping patterns; and, the transmitters allocated with orthogonal time-frequency resources can use the same first-stage interleavers/scramblers, second-stage multidimensional constellations and third-stage grid mapping patterns. The time-frequency resources, first-stage interleavers/scramblers, second-stage multidimensional constellations and third-stage grid mapping patterns allocated to each transmitter are transmitted in a physical broadcast channel, a physical downlink control channel or a physical downlink shared channel.

Further, FIG. 14 shows the structure of a receiver complying with cascaded interleaving/scrambling, multidimensional constellation and grid mapping in combination with DFT-s-OFDM. The demodulation process of the DFT-s-OFDM is an inverse process of the modulation process, as shown in FIG. 14. Specifically, the demodulated data will be multi-user iterative detected and decoded similar to FIG. 4, to obtain the data of each transmitter.

It is to be noted that, the receiver structure shown in FIG. 14 is applicable to a structure in which multiple transmitters are served in a set of time-frequency resources in a non-orthogonal manner. When transmitters in different time-frequency resources are taken into consideration, different time-frequency resources need to be separately processed by the structure shown in FIG. 14.

2. Orthogonal Frequency Division Multiplexing (OFDM)

The OFDM is a downlink carrier modulation mode used in LTE/LTE-A. FIG. 15 shows the structure of a transmitter complying with three cascaded processes in combination with OFDM.

Further, in FIG. 15, OFDM modulation is performed on a data stream on which the interleaving/scrambling, the multidimensional constellation modulation and the grid mapping are performed, to obtain the data to be transmitted. The OFDM modulation comprises serial-to-parallel conversion, carrier mapping (that is, the data to be modulated is mapped to different subcarriers of different OFDM symbols), IDFT, and parallel-to-serial conversion and CP addition. Like the DFT-s-OFDM, the OFDM is an orthogonal multicarrier modulation mode. In combination with the multiple access method of cascaded interleaving/scrambling, multidimensional constellation modulation and grid mapping, the OFDM can provide the system with more flexible resource allocation and can support more users. Multiple transmitters allocated with the same time-frequency resources can be distinguished by using first-stage interleavers/scramblers, second-stage multidimensional constellations and third-stage grid mapping patterns; and, the transmitters allocated with orthogonal time-frequency resources can use the same first-stage interleavers/scramblers, second-stage multidimensional constellations and third-stage grid mapping patterns. The time-frequency resources, first-stage interleavers/scramblers, second-stage multidimensional constellations and third-stage grid mapping patterns allocated to each transmitter are transmitted in a physical broadcast channel, a physical downlink control channel or a physical downlink shared channel. The transmitters select the used interleavers/scramblers, multidimensional constellations, grid mapping patterns and time-frequency resources according to the information.

Further, FIG. 16 shows the structure of a receiver complying with cascaded interleaving/scrambling, multidimensional constellation and grid mapping in combination with OFDM. The demodulation of the OFDM is an inverse process of the modulation. Specifically, a CP is removed from the received signal, and the received signal will pass through parallel-to-serial conversion, DFT and resource de-mapping and then will pass through serial-to-parallel conversion and iterative detection and decoding to obtain the data stream from each transmitter.

3. Filtered-OFDM (F-OFDM)

As a novel waveform modulation technology based on sub-band filtering, the F-OFDM can meet the requirements of 5G on out-of-band emission, resource allocation flexibility, and becomes one candidate air interface technology of 5G. FIG. 17 shows a block diagram of a transmitter complying with cascaded interleaving/scrambling, multidimensional constellation and grid mapping in combination with F-OFDM.

Specifically, as shown in FIG. 17, the channel coding, interleaving/scrambling, multidimensional constellation modulation and grid mapping will be performed on a data stream to be processed, and then F-OFDM modulation will be performed. The modulation method of the F-OFDM is shown in the right half part of FIG. 17. That is, the input data is converted into parallel data by serial-to-parallel conversion, and carrier mapping, IDFT and parallel-to-serial conversion will be performed on the parallel data successively and the data is prefixed with a CP to obtain a time-domain signal. The time-domain signal is filtered by time-domain sub-band filtering according to a sub-band frequency band to be transmitted, to obtain a time-domain signal to be transmitted. Compared with the OFDM technology, the F-OFDM supports sub-band filtering and can more flexibly support transmitters configured by various carrier modulations. Meanwhile, F-OFDM remains the advantage of supporting flexible resource allocation by resource mapping. The receiver informs a transmitter of the sub-bands, conditions, an interleaver/scrambler, a multidimensional constellation and a grid mapping pattern allocated to this transmitter through a physical broadcast channel, a physical downlink control channel or a physical downlink shared channel; and, this transmitter adjusts the used interleaver/scrambler, multidimensional constellation and grid mapping pattern, the resource allocation mode, the used multicarrier modulation parameter settings and the time-domain filter parameter settings according to the information, and then transmits data.

Further, the receiver distinguishes data from different transmitters by using the processed sub-bands, resource allocation mode, interleavers/scramblers, multidimensional constellations and grid mapping patterns. FIG. 18 shows a block diagram of a receiver complying with cascaded interleaving/scrambling, multidimensional constellation and grid mapping in combination with F-OFDM.

Further, in the example shown in FIG. 18, the whole frequency band is divided into L sub-bands. In each sub-band, the access service of data from multiple transmitters is provided by orthogonal resource allocation and non-orthogonal interleave-division multiple access. That is, the receiver acquires information about data in each sub-band by sub-band filtering first, and then acquires data sent by the transmitters and allocated to the time-frequency resources by OFDM demodulation. The above two methods of distinguishing transmitters are both orthogonal and ideally free of interference. What is received in the same sub-bands and the same time-frequency resources is data sent by multiple transmitters, and the data is to be detected by a receiver with a structure of an iterative detection and decoding as shown in FIG. 4.

It is to be noted that, in addition to the examples illustrated above, the multiple access technology of cascaded interleaving/scrambling, multidimensional constellation modulation and grid mapping provided in this embodiment of the present invention can also be combined with other carrier modulation technologies, for example, Universal-filtered multi-carrier (UFMC), N-continuous OFDM (NC-OFDM), Filter-bank Multi-carrier (FBMC) or more.

In the eighth embodiment of the present invention, a solution in which the data rate of an individual user is improved by superposing multiple transmission streams will be described in detail. The system configuration is shown in Embodiment 1, where K transmitters use a transmitter structure complying with cascaded interleaving/scrambling, multidimensional constellation modulation and grid mapping; and, the receiver detects the data from K users by using the multi-user iterative detection receiver structure shown in FIG. 4.

Further, to improve the data transmission rate of an individual user, multiple data rates are transmitted simultaneously at the same frequency by transmitters. The block diagram of the transmitters is shown in FIG. 19.

Further, in FIG. 17, data streams 1 to M are data streams from an individual user. The data streams can be generated by producing and distributing one data source, or generated respectively by M independent data streams, or generated in such a method that some data streams are generated by producing and distributing one data source while the others are generated by independent data sources. The channel coding, interleaving/scrambling, multidimensional constellation modulation and grid mapping will be performed on data in each data stream, and phase and power adjustment and then multicarrier modulation will be performed on the resulting symbol stream, and the signal streams on which the multicarrier modulation is performed are superposed and then baseband-to-RF process will be performed for transmission. The order of carrier modulation and superposition can be interchanged, that is, the data streams are superposed first and then will pass through carrier modulation to be transmitted.

Further, the detection and decoding structure of the receiver is similar to that in the example shown in FIG. 4. The multi-user detector performs symbol detection according to the phase and power adjustment performed on the modulated symbols of each data stream by each transmitter, and then performs the subsequent iterative detection and decoding operations. The iterative detection decoder outputs all data stream information of each user. The receiver identifies and distinguishes the user data according to the first-stage interleavers/scramblers and/or the second-stage multidimensional constellations and/or the third-stage grid mapping patterns.

Further, the first-stage interleavers/scramblers, second-stage multidimensional constellations and third-stage grid mapping patterns are used as the basis for distinguishing different transmitters and different data streams. Specific allocation methods are described below.

1. Different data streams from the same transmitter are allocated with the same first-stage interleaver/scrambler patterns and different second-stage multidimensional constellations, different transmitters are allocated with different first-stage interleaver/scrambler patterns, and different data streams from different transmitters use the same third-stage grid mapping patterns. Thus, the receiver distinguishes data from different transmitters according to the first-stage interleaver/scrambler patterns, and distinguishes different data streams from the same transmitter according to the second-stage multidimensional constellations.

2. Different data streams from the same transmitter are allocated with the same second-stage multidimensional constellations and different first-stage interleaver/scrambler patterns, different transmitters are allocated with different second-stage multidimensional constellations, and different data streams from different transmitters use the same third-stage grid mapping patterns. Thus, the receiver distinguishes data from different transmitters according to the second-stage multidimensional constellations, and distinguishes different data streams from the same transmitter according to the first-stage interleavers/scramblers.

3. Different data streams from the same transmitter are allocated with the same second-stage multidimensional constellations and different third-stage grid mapping patterns, different transmitters are allocated with different second-stage multidimensional constellations, and different data streams from different transmitters use the same first-stage interleaving/scrambling patterns. Thus, the receiver distinguishes data from different transmitters according to the second-stage multidimensional constellations, and distinguishes different data streams from the same transmitter according to the third-stage grid mapping patterns.

4. Different data streams from the same transmitter are allocated with the same third-stage grid mapping patterns and different second-stage multidimensional constellations, different transmitters are allocated with different third-stage grid mapping patterns, and different data streams from different transmitters use the same first-stage interleaving/scrambling patterns. Thus, the receiver distinguishes data from different transmitters according to the third-stage grid mapping patterns, and distinguishes different data streams from the same transmitter according to the second-stage multidimensional constellations.

5. Different data streams from the same transmitter are allocated with the same first-stage interleaving/scrambling patterns and second-stage multidimensional constellations and different third-stage grid mapping patterns, and different transmitters are allocated with different first-stage interleaving/scrambling patterns and second-stage multidimensional constellations. Thus, the receiver distinguishes data from different transmitters according to the first-stage interleaving/scrambling patterns and the second-stage multidimensional constellations, and distinguishes different data streams from the same transmitter according to the third-stage grid mapping patterns.

6. Different data streams from the same transmitter are allocated with the same third-stage grid mapping patterns and different first-stage interleaving/scrambling patterns and second-stage multidimensional constellations, and different transmitters are allocated with different third-stage grid mapping patterns. Thus, the receiver distinguishes data from different transmitters according to the third-stage grid mapping patterns, and distinguishes different data streams from the same transmitter according to the first-stage interleaving/scrambling patterns and the second-stage multidimensional constellations.

7. Different data streams from the same transmitter are allocated with the same first-stage interleaver/scrambler patterns and third-stage grid mapping patterns and different second-stage multidimensional constellations, and different transmitters are allocated with different interleaver/scrambler pattern information and third-stage grid mapping pattern information. Thus, the receiver distinguishes data from different transmitters according to the first-stage interleaver/scrambler pattern information and the third-stage grid mapping pattern information, and distinguishes different data streams from the same transmitter according to the second-stage multidimensional constellation information.

8. Different data streams from the same transmitter are allocated with the same second-stage multidimensional constellations and different first-stage interleaver/scrambler patterns and third-stage grid mapping patterns, and different transmitters are allocated with different second-stage multidimensional constellations. Thus, the receiver distinguishes data from different transmitters according to the second-stage multidimensional constellations, and distinguishes different data streams from the same transmitter according to the first-stage interleavers/scramblers and the third-stage grid mapping patterns.

9. Different data streams from the same transmitter are allocated with the same second-stage multidimensional constellations and third-stage grid mapping patterns and different first-stage interleaver/scrambler pattern information, and different transmitters are allocated with different second-stage multidimensional constellation information and third-stage grid mapping pattern information. Thus, the receiver distinguishes data from different transmitters according to the second-stage multidimensional constellation information and the third-stage grid mapping pattern information, and distinguishes different data streams from the same transmitter according to the first-stage interleaver/scrambler pattern information.

10. Different data streams from the same transmitter are allocated with the same first-stage interleaver/scrambler information and different second-stage multidimensional constellation information and third-stage grid mapping pattern information, and different transmitters are allocated with different first-stage interleaver/scrambler information. Thus, the receiver distinguishes data from different transmitters according to the first-stage interleaver/scrambler information, and distinguishes different data streams from the same transmitter according to the second-stage multidimensional constellation information and the third-stage grid mapping pattern information.

11. Different data streams from different transmitters are allocated with different combinations of first-stage interleaver/scrambler patterns, second-stage multidimensional constellations and third-stage grid mapping patterns. The receiver distinguishes different data streams from different transmitters according to the combination of first-stage interleaver/scrambler patterns, second-stage multidimensional constellations and third-stage grid mapping patterns.

The criterion for the phase and power adjustment is to ensure that symbols corresponding to different data streams from the same transmitter will not be overlapped or offset during superposition. For the constellation point modulation mode, a preferred criterion is as follows: under the conditions meeting the power limit, a criterion for Phase and power adjustment of low-order modulated data streams is designed according to a high-order modulation constellation. For example, the BPSK modulation and the transmitters for transmitting eight streams are used, and the phase and power adjustment factors for each path are shown in Table 3.

TABLE 3

Examples of phase and power adjustment

| Stream | 1 | 2 | 3 | 4 | 5 | 6 | 7 | 8 |
|---|---|---|---|---|---|---|---|---|
| Phase (°) | 45 | −45 | 45 | −45 | 18.43 | −18.43 | 71.57 | −71.57 |
| Power | 0.2 | 0.2 | 1.8 | 1.8 | 1 | 1 | 1 | 1 |

Further, if the phase adjustment factor of the $k^{th}$ data stream is $\theta_k$, the power adjustment factor is $a_k$ and the constellation point transmission symbol is $x_k$ (where $\theta_k$ and $a_k$ are determined in Table 3), the actual transmission symbol of the $k^{th}$ data stream is $\sqrt{a_k} \exp(j\theta_k) x_k$. After the phase and power adjustment is performed according to Table 3, the superposed transmitter transmission is similar to a constellation of 16QAM modulation, and the transmission symbols will not be overlapped nor offset during the superposition of the streams.

Further, to serve multiple transmitters in the same time-frequency resources, the receiver will transmit the first-stage interleaver-scrambler information, second-stage multidimensional constellation information and third-stage grid mapping pattern information used for distinguishing transmitters, corresponding phase/power adjustment factors and the maximum number of supported streams to a physical broadcast channel, a physical downlink control channel or a physical downlink shared channel in a lookup table manner; and, each transmitter determines, according to the number of data streams to be transmitted and the maximum number of supported streams, the number of streams to be superposed, and the first-stage interleaver/scrambler information, second-stage multidimensional constellation information, third-stage grid mapping pattern information and corresponding phase/power adjustment factors, which are allocated to each stream.

Further, the number K of actually transmitted streams is less than the maximum number Km. of supported streams of the receiver. The transmitter can perform transmission in the following ways.

1. Only K data streams are transmitted, and the number of the transmitted streams is informed to the receiver through a physical downlink control channel or a physical uplink shared channel. That is, the transmitter transmits an indication of the number of streams, and informs the receiver of the number of streams to be received in a lookup table manner.

2. $K_{max}$ data streams are transmitted, wherein K data streams transmit information while $K_{max}$-K other data streams transmit all-zero data. Since an all-zero sequence is an allowable codeword of the channel coding, it is determined that this stream is not used for transmitting data if the receiver detects an all-zero sequence or a nearly-all-zero sequence. After the iterative detection and decoding process is completed, the number of zero values in the decoded sequence is counted. If the number of zero values exceeds a preset threshold, it is determined that this stream is used for transmitting a valid sequence; or otherwise, it is determined that this stream is not used for transmitting a valid sequence.

Further, by superposing multiple streams, more users can be supported on the same time-frequency resources, and the data transmission rate of an individual user is improved and a higher reliability is maintained.

In the ninth embodiment of the present invention, a solution combining the multiple access method of cascaded interleaving/scrambling, multidimensional constellation modulation and grid mapping with a multi-antenna technology will be described in detail. The system configuration is as described in the first specific embodiment. K transmitters employ the multiple access method of cascaded interleaving/scrambling, multidimensional constellation and grid mapping, and are equipped with NT transmitting antennas so that the transmitters transmit data by multiple antennas. The receiver performs detection and estimation on the transmitted bit streams in the iterative detection and coding method shown in FIG. 4, wherein the receiver is equipped with NR receiving antennas.

Further, the transmitters perform transmission based on a multi-antenna technology in the methods shown in FIGS. 20 and 21. As shown in FIG. 20, a transmitter transmits only one data stream, and channel coding, first-stage interleaving/scrambling, second-stage multidimensional constellation modulation and third-stage grid mapping will be performed on this data stream; then, the one data stream is converted into multiple data streams by serial-to-parallel conversion, or the one data stream is converted into multiple data streams by layer mapping similar to that in LTE; and, these data streams are preprocessed to obtain multi-antenna data streams to be transmitted. The preprocessing comprises a space-time pre-coding operation (for example, multiplication with a precoding matrix or space-time coding or more).

Further, in order to estimate the channel state information, a transmitter inserts orthogonal reference signals into each link after the serial-to-parallel conversion (or layer mapping), and orthogonal reference signals are also used among different transmitters. The receiver estimates, according to the reference signals, the preprocessed equivalent channel state information. The receiver still uses the superposition, detection and decoding structure shown in FIG. 4. The specific structure is shown in FIG. 21. The received signals are processed by a multi-antenna and multi-user detector to obtain estimated signals of each transmitting link; then, parallel-to-serial conversion (or layer de-mapping) will be performed on these signals to obtain a data stream from one transmitter; and, grid de-mapping, multidimensional constellation de-mapping, de-interleaving/de-scrambling and channel decoding will be performed on this data stream to obtain estimated data transmitted by this transmitter. The interleaving/scrambling, multidimensional constellation modulation, grid mapping and serial-to-parallel conversion (or layer mapping) will be performed on this estimated data as prior information and the data is then input into the multi-antenna and multi-user detector to serve as the prior information for next iteration.

Further, to distinguish data from different transmitters, different transmitters use different first-stage interleaver/scrambler information and/or second-stage multidimensional constellation information and/or third-stage grid mapping pattern information. The specific method of allocating interleaver/scrambler information can refer to the foregoing embodiments and will not be repeated here.

Further, as shown in FIG. 22, a transmitter transmits M data streams, and channel coding, first-stage interleaving/scrambling, second-stage multidimensional constellation modulation and third-stage grid mapping will be performed on each data stream. In FIG. 23, the function of generating data by cascaded interleaving/scrambling, multidimensional constellation modulation and grid mapping is to process data streams in a method as shown in FIG. 3. The processed data streams will pass through layer mapping and preprocessing, and are then transmitted by multiple antennas. One possible layer mapping and processing method is that both the layer mapping equivalent matrix and the preprocessing equivalent matrix are identity matrixes, that is, the processed data streams correspond to the transmitting antenna links one by one. In this method, orthogonal reference signals are inserted into each data link to estimate the channel of each data link. When in processing, the receiver regards each link as a different transmitter employing a single antenna. Data bit streams are detected by an iterative detection and decoding structure as shown in FIG. 4, and data streams from different transmitters are distinguished by the first-stage interleavers/scramblers, the second-stage multidimensional constellation information and the third-stage grid mapping pattern information.

Further, the allocation of the first-stage interleaver/scrambler information, the second-stage multidimensional constellation information and the third-stage grid mapping pattern information is informed in a form of a lookup table to each transmitter by a broadcast channel, a physical downlink control channel or a physical downlink shared channel. In order to distinguish data streams from different transmitters, the method for distinguishing different data streams from different transmitters by using the first-stage interleaver/scrambler information, the second-stage multidimensional constellation information and the third-stage grid mapping pattern information can employ the methods described in the eighth embodiment of the present invention and will not be repeated here.

Further, as shown in FIG. 23, a transmitter transmits multiple data streams, and different data streams from the same transmitter will pass through phase and power adjustment, will be superposed, and then will pass through serial-to-parallel conversion (or layer mapping) and preprocessing, and will be finally transmitted by multiple transmitting antennas. In order to distinguish different data streams from different transmitters, it is needed to allocate first-stage interleaver/scrambler information, second-stage multidimensional constellation information and third-stage grid mapping pattern information for each data stream. The specific allocation method refers to the solution in Embodiment 8, and will be informed to each transmitter by a physical broadcast channel, a physical downlink control channel and a physical downlink shared channel.

Further, the purpose of the phase/power adjustment is to ensure that data streams from the same transmitter will not be overlapped or offset during the superposition, and the specific adjustment method refers to Embodiment 8. In order to estimate the equivalent channel state information of each link, reference signals are needed. The reference signals are inserted after serial-to-parallel conversion (or layer mapping), and sent to the receiver after preprocessing is performed, for estimating the preprocessed equivalent channel. After the phase/power adjustment, the receiver can detect a received signal in a method as shown in FIG. 21, and distinguish different data streams from different transmitters according to the first-stage interleaver/scrambler information, the second-stage multidimensional constellation information and the third-stage grid mapping pattern information.

The combination of at least two of the above three methods is used. For example, parts of links will pass through direct mapping, while some links will pass through serial-to-parallel conversion, then layer mapping, etc.

It is to be noted that, among the above methods, the second method is more suitable for improving the data transmission rate, that is, the data transmission rate is improved in a method of transmitting data streams in different links; the first method is more suitable for improving the transmission reliability, that is, the spatial diversity is obtained by space-time block coding, space-frequency block coding and other space-time coding methods thus to improve the transmission reliability; by the third method, both the improvement of reliability and the improvement of data rate can be obtained, that is, the spatial diversity is obtained by space-time block coding, space-frequency block coding and other space-time coding methods and meanwhile the improvement of data rate is obtained by the superposition of multiple data streams; and the fourth method can be regarded as a compromise of reliability and data rate.

Further, when a transmitter can obtain the channel state information about a transmission channel by channel estimation or feedback or other methods, interference between different links of the same transmitter can be eliminated by precoding (for example, zero-forcing precoding) and other methods. This will greatly simplify the operations of the receiver. Meanwhile, the above various methods can all be used for improving the data transmission rate.

In the tenth embodiment of the present invention, the signaling design of accessing to the system by a transmitter using the multiple access method of cascaded interleaving/scrambling, multidimensional constellation modulation and grid mapping will be specifically described.

Further, a system resource pool is configured according to the multiple access method, wherein the system resource pool comprises: interleaver/scrambler information, multidimensional constellation information, grid mapping patter information and any combination of the three. When a transmitter performs system access, corresponding access resource can be allocated by a base station for this transmitter; or, a resource is randomly selected from the resource pool by this transmitter for accessing; or, the whole resource pool can be divided into two parts, wherein one part allows the transmitter to randomly select while the other part is allocated by the base station. By using different access methods, the signaling flows of the system are also different, specifically:

1. When the resources used by all transmitters for accessing are allocated by a base station, the signaling flow is shown in FIG. 24. A transmitter transmits an access request through an uplink channel; then, the base station reads the network load condition, then allocates corresponding interleaver/scrambler information, multidimensional constellation information and grid mapping pattern information for the transmitter sending the request, and informs each transmitter of the allocated resources through a downlink channel; the transmitter performs wireless access according to the interleaver/scrambler information, multidimensional constellation information and grid mapping pattern information allocated by the base station; and, the base station receives mixed signals from multiple transmitters, and performs joint detection and decoding according to the allocated interleaver/scrambler information, multidimensional constellation information and grid mapping pattern information to obtain data from all transmitters.

2. When all transmitters access the system in a random selection manner, the signaling flow of the system is shown in FIG. 25. When accessing, a transmitter randomly selects, from a system resource (wherein the resource pool can be informed to this transmitter by the system through a broadcast channel), a combination of interleaver/scrambler information, multidimensional constellation information and grid mapping pattern information, and then transmits an access request to the base station by using this combination; the base station performs detection according to the interleaver/scrambler information, multidimensional constellation information and grid mapping pattern information in the system resource pool; if a transmission request is detected, the base station transmits feedback information (e.g., feeds back a resource ID and a user ID) to the corresponding transmitter through a downlink channel; if the transmitter has detected the feedback from the base station within a specified detection time window, the transmitter performs data transmission by using the randomly selected interleaver/scrambler information, multidimensional constellation information and grid mapping pattern information; and, if the transmitter has not detected the feedback from the base station within the specified time window, the transmitter randomly reselects an interleaver/scrambler, a multidimensional constellation and a grid mapping pattern or lowers the MCS, and then transmits an access request again.

Further, when there are many access resources for the system, the resource pool can also be divided into two parts, wherein one part allows the transmitter to randomly select while the other part is allocated by the base station. In this case, the signaling flow of the system is shown in FIG. 26. Transmitter 1 acquires access resources allocated by the base station, and transmits an access request through an uplink channel; while transmitter 2 acquires access resources by random selection.

Specifically, a combination of interleaver/scrambler information, multidimensional constellation information and grid mapping pattern information is randomly selected from a resource pool 1, and an access request is sent to the system by using this combination. Then, the base station reads the network load condition, and detects user signals according to the interleaver/scrambler information, multidimensional constellation information and grid mapping pattern information in the resource pool 1. If a transmission request is detected, the base station transmits feedback information to a corresponding transmitter (transmitter 2), and then detects resource request information of this transmitter. If there is resource request information, the base station allocates a certain source in a resource pool 2 to a corresponding transmitter (transmitter 1). If the transmitter requesting access resources has obtained the corresponding resources, the transmitter performs access to the system by using the resources; or otherwise, the transmitter transmits an access request again or randomly selects access resources from the resource pool 2. If the transmitter randomly selecting access resources has obtained the feedback, the transmitter performs access to the system by using the selected resources; or otherwise, the transmitter randomly selects access resources from the resource pool 2 or transmits a resource request to the system. The base station receives mixed signals from multiple users, and performs joint detection and decoding according to the allocated interleaver/scrambler information, multidimensional constellation information and grid mapping pattern information to obtain data from all users.

The present invention provides a transmitter, as shown in FIG. 27, comprising: a channel coding module 2701, an interleaving/scrambling module 2702, a modulation module 2703, a grid mapping module 2704 and a transmitting module 2705, wherein:

The channel coding module 2701 is configured to perform channel coding on a bit sequence to determine a coded sequence.

The interleaving and/or scrambling module 2702 is configured to interleave and/or scramble the coded sequence coded by the channel coding module 2701.

The modulation module 2703 is configured to perform multidimensional constellation modulation on the interleaved and/or scrambled sequence processed by the interleaving and/or scrambling module 2702.

The grid mapping module 2704 is configured to perform grid mapping on the symbol sequence modulated by the modulation module 2703 to determine a mapped sequence.

The transmitting module 2705 is configured to transmit the sequence mapped by the grid mapping module 2704.

This embodiment of the present invention provides a transmitter. In this embodiment of the present invention, a transmitter performs channel coding on a bit sequence to determine a coded sequence, then performs interleaving and/or scrambling, multidimensional constellation modulation and grid mapping on the coded sequence to determine a mapped sequence, and transmits the mapped sequence; subsequently, a receiver receives mixed signals from each transmitter and then decodes the mixed information according to interleaver information and/or scrambler information, multidimensional constellation information and grid mapping pattern information corresponding to each transmitter to obtain data corresponding to each transmitter. In other words, the transmitter can process corresponding bit sequences of different user equipments by using different interleaver information and/or scrambler information, different multidimensional constellation information and different grid mapping pattern information and then transmit the processed bit sequences to the receiver, so that the receiver can distinguish the mixed signals transmitted by the transmitters by using different interleaver information and/or scrambler information, different multidimensional constellation information and different grid mapping pattern information, so as to distinguish different users. Accordingly, the requirements for the simultaneous wireless access of more user equipments can be met.

The transmitter provided in this embodiment of the present invention can implement the method embodiments described above, and the specific function implementations refer to the descriptions in the method embodiments and will not be repeated here.

The present invention provides a receiver, as shown in FIG. 28, comprising a receiving module 2801 and a decoding module 2802, wherein:

The receiving module 2801 is configured to receive mixed signals from multiple transmitters, the mixed signals being signals obtained by performing, by each of the multiple transmitters, interleaving and/or scrambling, multidimensional constellation modulation and grid mapping on data.

The decoding module 2802 is configured to decode the mixed information received by the receiving module 2801 according to interleaver information and/or scrambler information, multidimensional constellation information and grid mapping pattern information corresponding to each transmitter to obtain data corresponding to the each transmitter.

This embodiment of the present invention provides a receiver. In this embodiment of the present invention, a transmitter performs channel coding on a bit sequence to determine a coded sequence, then performs interleaving and/or scrambling, multidimensional constellation modulation and grid mapping on the coded sequence to determine a mapped sequence, and transmits the mapped sequence; subsequently, a receiver receives mixed signals from each transmitter and then decodes the mixed information according to interleaver information and/or scrambler information, multidimensional constellation information and grid mapping pattern information corresponding to each transmitter to obtain data corresponding to each transmitter. In other words, the transmitter can process corresponding bit sequences of different user equipments by using different interleaver information and/or scrambler information, different multidimensional constellation information and different grid mapping pattern information and then transmit the processed bit sequences to the receiver, so that the receiver can distinguish the mixed signals transmitted by the transmitters by using different interleaver information and/or scrambler information, different multidimensional constellation information and different grid mapping pattern information, so as to distinguish different users. Accordingly, the requirements for the simultaneous wireless access of more user equipments can be met.

The receiver provided in this embodiment of the present invention can implement the method embodiments described above, and the specific function implementations refer to the descriptions in the method embodiments and will not be repeated here.

FIG. 29 is a schematic flowchart of a transmitting method for multiple access according to an embodiment of the present invention.

Step 301: A transmitter performs channel coding on an information bit sequence to determine a coded sequence; and, step 302: the transmitter performs bit level processing and symbol level processing on the coded sequence to obtain a processed sequence, and transmits the processed sequence.

In the step 302, the step of performing, by the transmitter, bit level processing and symbol level processing on the coded sequence comprises: performing, by the transmitter, bit level processing on the coded sequence by a bit level processor; performing bit-to-symbol modulation on the sequence which passed through the bit level processing, to obtain a symbol sequence; and, performing symbol level processing on the symbol sequence by a symbol level processor to obtain a processed symbol sequence.

Further, the mode for performing, by the transmitter, bit level processing on the coded sequence by a bit level processor comprises any one of the following:
 a. interleaving, by the transmitter, the coded sequence by a bit level interleaver;
 b. scrambling, by the transmitter, the coded sequence by a bit level scrambler; and
 c. spreading, by the transmitter, the coded sequence by a bit level spreader.

Further, the transmitter acquires bit level interleaver information, bit level scrambler information and/or bit level spreader information via any one of the following: a physical broadcast channel, a physical downlink control channel and a physical downlink shared channel.

Further, the mode for performing, by the transmitter, symbol level processing on the symbol sequence comprises any one of the following:
 d. performing, by the transmitter, symbol level spreading on the symbol sequence;
 e. performing, by the transmitter, symbol level spreading and symbol level interleaving on the symbol sequence;
 f. performing, by the transmitter, symbol level scrambling on the symbol sequence; and
 g. performing, by the transmitter, symbol level spreading and symbol level scrambling on the symbol sequence.

Further, the mode for performing, by the transmitter, symbol level spreading on the symbol sequence can specifically comprise: performing, by the transmitter, symbol level spreading on the symbol sequence by a complex spreading code.

Further, the mode for performing, by the transmitter, symbol level interleaving on the symbol sequence can specifically comprise: performing, by the transmitter, symbol level interleaving on the symbol sequence by a symbol level interleaver.

Further, the mode for performing, by the transmitter, symbol level scrambling on the symbol sequence can specifically comprise: performing, by the transmitter, symbol level scrambling on the symbol sequence by a symbol level scrambling sequence.

The transmitter acquires the complex spreading code, the symbol level interleaver and/or the symbol level scrambling sequence via any one of the following: a physical broadcast channel, a physical downlink control channel and a physical downlink shared channel.

Further, the mode for the symbol level interleaving comprises any one of the following: direct interleaving; zero-padding and interleaving; direct zero-inserting and interleaving; and interleaving and zero-inserting.

Specifically, the direct interleaving is to perform symbol level interleaving on the symbol sequence by a symbol level interleaver; the zero-padding and interleaving is to perform zero-padding on the symbol sequence and perform symbol level interleaving on the zero-padded symbol sequence by a symbol level interleaver; the direct zero-inserting and interleaving is to perform zero-inserting on the symbol sequence according to zero-inserting pattern information; and, the interleaving and zero-inserting is to perform symbol level interleaving on the symbol sequence according to a symbol level interleaver and perform zero-inserting on the processed symbol sequence according to zero-inserting pattern information.

Further, if the transmitter is configured with a multiple of antennas and the data to be transmitted currently is single-stream data, the transmitter converts the data which passed through the symbol level processing into multi-stream data or multi-layer data and then transmits the multi-stream data or multi-layer data through the antennas.

Further, if the data to be transmitted by the transmitter is multi-stream data and the transmitter is configured with multiple antennas, the transmitter processes the data by at least one of the following modes:

h. performing, by the transmitter, channel coding, bit level processing, modulation and symbol level processing, layer mapping and preprocessing on the multi-stream data to obtain a processed multi-stream data, and transmitting the processed multi-stream data through the antennas; and i. performing, by the transmitter, channel coding, bit level processing, modulation and symbol level processing, phase and/or power adjustment, superposition, serial-to-parallel conversion and preprocessing on the multi-stream data to obtain a processed multi-stream data, and transmitting the processed multi-stream data through the antennas.

This embodiment of the present invention provides a multiple access method. Compared with the existing orthogonal multiple access modes, in this embodiment of the present invention, since a receiver decodes the received data by different symbol level processors and/or bit level processors, the data transmitted by different transmitters can be distinguished, and there will be no limitations from orthogonal time-frequency resources; furthermore, since transmitters process data by bit level processors and symbol level processors, it is advantageous for multiple transmitters to transmit data in same time-frequency resources. Thus, the receiver can simultaneously receive uplink data transmitted by multiple transmitters, and it is advantageous to share the same time-frequency resources to multiple transmitters. Accordingly, the number of servable transmitters is increased, and the number of users served by the receiver can be further increased.

FIG. 30 is a schematic flowchart of a multiple access method according to another embodiment of the present invention.

The method comprises steps 401 and 402. In the step 401, a receiver receives signals from multiple transmitters. The signals are obtained by performing bit level processing and symbol level processing on data from each of multiple transmitters. In the step 402, the receiver decodes the signals according to a bit level processor and a symbol level processor corresponding to each transmitter to obtain data corresponding to each transmitter.

Further, the signals received by the receiver are obtained by performing bit level processing, symbol level processing, and phase and/or power adjustment on multiple data streams from a same transmitter.

The step 402 specifically comprises: performing, by the receiver and by a symbol level processor corresponding to each transmitter, symbol level decoding on the signals; and, performing, by the receiver and by a bit level processor corresponding to each transmitter, bit level decoding on the data which passed through the symbol level decoding.

Further, in the step 402, the mode for decoding, by the receiver, the signals according to a bit level processor and a symbol level processor corresponding to each transmitter comprises any one of the following situations (A, B and C).

A. The receiver performs symbol level decoding and bit level decoding on the signals according to a same symbol level processor and a different bit level processor corresponding to each transmitter.

In this embodiment of the present invention, if the signals are signals which are received from each transmitter by the receiver and obtained by performing bit level processing according to different bit level processors and then symbol level processing by a symbol level processor on the data to be transmitted, the receiver performs, according to different bit level processors, bit level decoding on the data which passed through the decoding by the symbol level processor.

B. The receiver performs symbol level decoding and bit level decoding on the signals according to a different symbol level processor and a same bit level processors corresponding to each transmitter.

In this embodiment of the present invention, if the signals are signals which are received from each transmitter by the receiver and obtained by performing, according to different symbol level processors, symbol level processing on the data processed by a bit level processor, the receiver performs, according to different symbol level processors, symbol level decoding on the signals.

C. The receiver performs symbol level decoding and bit level decoding on the signals according to different combinations of symbol level processors and bit level processors corresponding to the transmitters.

In this embodiment of the present invention, if the signals are signals which are received from each transmitter by the receiver and obtained by performing, according to a different combination of bit level processors and symbol level processors, bit level processing and symbol level processing on the data to be transmitted, the receiver performs, according to a different combination of bit level processors and symbol level processors, symbol level decoding and bit level decoding on the signals.

Further, multiple pieces of data, which are obtained by performing, by the receiver and according to a different combination of bit level processors and symbol level processors corresponding to each transmitter, symbol level decoding and bit level decoding on the signals, are different from each other.

The different combination of bit level processors and symbol level processors comprises any one of the following combinations (D, E and F):

D. same bit level processors and different symbol level processors;

E. different bit level processors and same symbol level processors; and

F. different bit level processors and different symbol level processors.

Further, the mode for performing, by the receiver, bit level decoding by a bit level processor comprises any one of the following situations (G, H and I):

G. the receiver performs de-interleaving by a bit level interleaver;

H. the receiver performs de-scrambling by a bit level scrambler; and

I. the receiver performs de-spreading by a bit level spreader.

Further, the mode for performing, by the receiver, symbol level decoding by a symbol level processor comprises any one of the following situations (J, K, L and M):

J. the receiver performs symbol level de-spreading by a complex spreading code;

K. the receiver performs symbol level de-spreading and symbol level de-interleaving by a complex spreading code and a symbol level interleaver, respectively;

L. the receiver performs symbol level de-scrambling by a symbol level scrambling sequence; and M. the receiver performs symbol level de-spreading and symbol level de-scrambling by a complex spreading code and a symbol level scrambling sequence, respectively.

Further, the signals are signals which are received from each transmitter by the receiver and obtained by performing carrier modulation on the data which passed through the symbol level processing and then performing baseband-to-RF conversion on the modulated data.

The carrier modulation comprises any one of the following: a single-carrier modulation and a multi-carrier modulation.

The single-carrier modulation at least comprises: DFT-spread-OFDM modulation.

The multi-carrier modulation comprises at least one of the following: OFDM modulation, filter-based OFDM modulation, UFMC, NC-OFDM and BMC.

Further, the receiver receives signals from a same transmitter, wherein the signals are obtained by performing bit level processing and symbol level processing on multiple data streams from a same transmitter; and, the receiver decodes, according to a bit level processor and a symbol level processor corresponding to each data stream, the signals to obtain multiple data streams from a same transmitter.

Further, if the signals received by the receiver are obtained by performing bit level processing by different bit level processors and then performing symbol level processing by a symbol level processor on multiple data streams from a same transmitter, the receiver performs, according to different bit level processors, bit level decoding on the data which passed through the symbol level decoding.

Further, if the signals received by the receiver are obtained by performing, by different symbol level processors, symbol level processing on the data which passed through the bit level processing among multiple data streams from a same transmitter, the receiver performs, according to different symbol level processors, symbol level decoding on the received signals.

Further, if the signals received by the receiver are obtained by performing, by a different combination of bit level processors and symbol level processors, bit level processing and symbol level processing on multiple data streams from a same transmitter, the receiver performs, according to a different combination of bit level processors and symbol level processors, symbol level decoding and bit level decoding on the received signals.

Further, if the receiver performs, according to different bit level processors, bit level decoding on the data from multiple transmitters which passed through the symbol level decoding, the receiver performs, according to different symbol level processors, symbol level decoding on signals of multiple data streams from a same transmitter.

Further, if the receiver performs, according to different symbol level processors, symbol level decoding on the signals from multiple transmitters, the receiver performs, according to different bit level processors, bit level decoding on the data which passed through the symbol level decoding among multiple data streams from a same transmitter.

Further, the receiver performs, according to a different combination of bit level processors and symbol level processors, symbol level decoding and bit level decoding on signals of multiple data streams from different transmitters.

This embodiment of the present invention provides another multiple access method. Compared with the existing orthogonal multiple access modes, in this embodiment of the present invention, since a receiver decodes the received data by different symbol level processors and/or bit level processors, the data transmitted by different transmitters can be distinguished, and there will be no limitations from orthogonal time-frequency resources; furthermore, since transmitters process data by bit level processors and symbol level processors, it is advantageous for multiple transmitters to transmit data in same time-frequency resources. Thus, the receiver can simultaneously receive uplink data transmitted by multiple transmitters, and it is advantageous to share the same time-frequency resources to multiple transmitters. Accordingly, the number of servable transmitters is increased, and the number of users served by the receiver can be further increased.

FIG. 31 is a principle diagram of a transmitter based on bit level processing and symbol level processing. As shown in FIG. 31, this embodiment of the present invention provides a transmitter based on bit level processing and symbol level processing. First, channel coding is performed on an information bit sequence $d_k=\{d_k(m), m=0, \ldots, M-1\}$ (where M is the length of the information bit sequence). The channel coding consists of one component code (e.g., a Turbo code or an LDPC (Low Density Parity Check) code) with a code rate of $R_1$ or consists of a combination of multiple component codes. For example, one turbo code with a code rate of $R_1$ and one repetition spreading code with a code rate of $R_2$ are combined to generate a lower coding rate $R_3=R_2R_1$. Alternatively, the channel coding directly consists of one Turbo code with a code rate of $R_3$. Channel coding is performed on the information bit information $d_k$ to obtain a coded sequence $c_k=\{c_k(n), n=0, \ldots, N-1\}$ (where N is the length of the channel-coded sequence). Subsequently, the coded sequence $c_k$ is processed by a bit level processor $\alpha_k$ to obtain a processed sequence $x_k=\{x_k(n), n=0, \ldots, N_b-1\}$.

The bit level processing can comprise any one of the following modes.

1. Bit level interleaving: the bit level processor is a bit level interleaver (also referred to as a bit level interleaving sequence or a bit level interleaving pattern). In this embodiment of the present invention, the length of the interleaved sequence is kept consistent with the length of the sequence to be interleaved. Thus, the correlation of adjacent chips is reduced by interleaving, and it is advantageous for the chip-by-chip detection at the receiver.

In this embodiment of the present invention, bit level interleaver $\alpha_k$ can be generated by randomly shuffling $\{0, 1, \ldots, N\}$. In this embodiment of the present invention, numerical values from 0 to N denote an order of positions in which bits occupy.

2. Bit level scrambling: the bit level processor is a bit level scrambler (also referred to as a bit level scrambling sequence or a bit level scrambling pattern). In this embodiment of the present invention, the length of the scrambled sequence is kept consistent with the length of the sequence before scrambling. Thus, the correlation of adjacent chips is reduced by scrambling, and it is advantageous for the chip-by-chip detection on the receiver.

3. Bit level spreading: the bit level processor is a bit level spreader (also referred to as a bit level interleaving sequence or a bit level interleaving pattern). Specifically, the spreading can be performed repeatedly on the coded bits, or the spreading operation can be performed according to a given spreading sequence.

In this embodiment of the present invention, the bit level spreading can further reduce the code rate of the data and improve the reliability of the data transmission.

In this embodiment of the present invention, bit-to-symbol modulation is performed on the sequence which passed through the bit level processing, to generate a symbol sequence $S_k=\{S_k(l), l=0, \ldots, L-1\}$ (where L is the length of the symbol sequence and is related to the used modulation mode and the length of the sequence which passed through the bit level processing). The modulation mode can be constellation modulations such as Quadrature Amplitude Modulation (QAM) and Phase Shift Keying (PSK), or waveform modulations such as Frequency Shift Keying (FSK), or more. Subsequently, the symbol sequence $S_k$ will pass through symbol level processing to obtain a processed symbol sequence, wherein the symbol level processing can comprise any one of the following processing modes.

1. Symbol level spreading: a complex spreading code/sequence is used. In this embodiment of the present invention, after the symbol sequence $S_k$ is spread by a complex spreading code, a lower equivalent coding rate of the system can be obtained, and the reliability of the data transmission can be thus improved. Further, by using a low-correlation/orthogonal complex spreading code, the correlation of data from different users can be reduced, and it is beneficial for the detection and decoding at the receiving terminal.

In this embodiment of the present invention, the complex spreading code can also have sparsity, that is, there can be symbol 0 in the complex spreading sequence.

2. Symbol level spreading and symbol level interleaving: by performing symbol level interleaving on the symbol sequence generated by the symbol level spreading operation, the inter-symbol correlation is further reduced. Accordingly, it can be beneficial to relieve the inter-cell interference, perform detection and decoding at the receiving terminal, and distinguish users.

It is to be noted that, the order of the symbol level spreading and interleaving operations can be interchanged, that is, symbol level interleaving is first performed on the symbol sequence $S_k$ and symbol level spreading is then performed on the interleaved symbol sequence.

3. Symbol level scrambling: specifically, symbol level scrambling is performed on the symbol sequence $S_k$. In this embodiment of the present invention, the inter-symbol correlation can be reduced by the symbol level scrambling, so that it is beneficial for the detection and decoding at the receiving terminal and it can be beneficial to relieve the inter-cell interference.

4. Symbol level spreading and symbol level scrambling: specifically, symbol level scrambling is performed on the symbol sequence generated by the symbol level spreading operation. In this embodiment of the present invention, the inter-symbol correlation can be further reduced by the symbol level spreading and the symbol level scrambling. Accordingly, it can be beneficial to relieve the inter-cell interference, perform detection and decoding at the receiving terminal, and distinguish users.

It is to be noted that, the order of the symbol level spreading and scrambling operations can be interchanged, that is, symbol level scrambling is first performed on the symbol sequence $S_k$ and symbol level spreading is then performed on the scrambled symbol sequence.

In this embodiment of the present invention, the processor (e.g., a symbol level complex spreading code, a symbol level interleaving sequence, a symbol level scramble or more) used in the symbol level processing is represented by $\beta_k$. In this embodiment of the present invention, after the symbol level processing, symbols carrying user information are sparsely mapped onto the allocated time-frequency resources, so that it is beneficial to resist against interference and fading, and it is advantageous to support more users in the same time-frequency resources. Subsequently, baseband-to-RF processing or more operations are performed on the generated data sequence, and the processed data sequence is eventually transmitted.

In this embodiment of the present invention, based on the transmitter shown in FIG. 31, this embodiment of the present invention provides a novel multiple access mode based on bit level processing and symbol level processing. As shown in FIG. 32, K transmitters acquire respective bit level processor information and symbol level processor information from a physical broadcast channel, a physical downlink control channel or a physical downlink shared channel.

The bit level processor information and the symbol level processor information are used for indicating the processer used by the bit level processing and the processor used by the symbol level processing, respectively, and can be indicated by a table. In this embodiment of the present invention, the bit level processor and/or the symbol level processor are unique identifiers for distinguishing different users by the receiver.

In this embodiment of the present invention, K transmitters transmit signals in the same way as the transmitter, and the signals are combined together at the receiver through respective channels $h_k$ and interfered by noise. The receiver employs multi-user iterative detection.

Specifically, the receiver performs RF-to-baseband processing on the received signals, and the obtained signals as baseband received signals are fed to a multi-user detector. The multi-user detector calculates, according to the baseband received signals and prior probability information of each bit generated by previous iteration, posterior probability information of each bit or each symbol; then, extrinsic information is calculated in combination with the prior probability information input into the detector; and, inverse processing is performed on the extrinsic information output from the detector according to the symbol level processor $\beta_k$ of each user. For example, if the symbol level processing is symbol level scrambling, the inverse processing is symbol level de-scrambling. Next, the resumed soft information sequence is fed into the bit level processor $\alpha_k$ corresponding to this user for inverse processing. For example, if the bit level processing is bit level interleaving, the inverse processing is bit level de-interleaving. Subsequently, the inversely-processed soft information is input into a decoder. In the decoder, corresponding decoding is performed according to the component code used by the transmitter, and a decision process is performed to obtain user data.

Further, for next iterative detection, the decoded soft information will pass through the same channel coding as in the transmitter again, and will be then subtracted by its own previous soft information to obtain extrinsic information. The obtained extrinsic information is reprocessed by the bit level processor $\alpha_k$ and then reprocessed by the symbol level processing. The eventually obtained extrinsic information sequence as prior probability is input into the multi-user detector. Hereto, one iterative detection ends, and the above operations are repeated for next iterative detection and decoding. During the above process, information transferred in the iterative detection and decoding is all probability information, i.e., probability that the bit is 0 or 1 or probability that a symbol has a value. Such information is called soft information. The soft information can be represented by a log-likelihood rate or a log probability in order to simplify the implementation operations. During the first iteration, since there is no prior probability information, the prior probability input into the multi-user detector is an equal probability distribution; and, during the subsequent iteration, the prior probability information updated by the previous iteration is used. When the number of iterations reaches a preset maximum value, a process of hard decision is performed in the decoder to obtain the final information data result of a user. The multi-user signal detector can be an Elementary Signal Estimator (ESE), or a detector based on a Message Passing Algorithm (MPA), a detector based on Successive Interference Cancellation (SIC) or more.

In a first specific embodiment of the present invention, a multiple access mode based on bit level processing and symbol level complex spreading will be specifically described in this embodiment. As shown in FIG. 33, this embodiment of the present invention will describe a schematic block diagram of a transmitter based on bit level processing and symbol level complex spreading. First, channel coding is performed on an information bit sequence $d_k=\{d_k(m), m=0, \ldots, M-1\}$ (where M is the length of the information bit sequence). The channel coding consists of one component code (e.g., a Turbo code or an LDPC code) with a code rate of $R_1$ or consists of a combination of multiple component codes. For example, one Turbo code with a code rate of $R_1$ and one repetition spreading code with a code rate of $R_2$ are combined to generate a lower coding rate $R_3=R_2R_1$. Alternatively, the channel coding can directly consists of one Turbo code with a code rate of $R_3$. Then, the information bit sequence $d_k$ will pass through channel coding to obtain a coded sequence $c_k=\{c_k(n), n=0, \ldots, N-1\}$ (where N is the length of the channel-coded sequence). Subsequently, the coded sequence $c_k$ is processed by a bit level processor $\alpha_k$ to obtain a processed sequence $x_k=\{x_k(n), n=0, \ldots, N_b-1\}$.

The bit level processing can comprise any one of the following.

1. Bit level interleaving: the bit level processed used by the bit level interleaving is a bit level interleaver (also referred to as a bit level interleaving sequence or a bit level interleaving pattern). In this embodiment of the present invention, through the bit level interleaving, the length of the interleaved sequence is kept consistent with the length of the sequence to be interleaved, that is, $N_b=N$.

In this embodiment of the present invention, the correlation of adjacent chips is reduced by interleaving, and it is beneficial for the chip-by-chip detection at the receiver.

In this embodiment of the present invention, the bit level interleaver $\alpha_k$ can be generated by randomly shuffling $\{0, 1, \ldots, N-1\}$. In this embodiment of the present invention, numerical values from 0 to N denote the order of positions in which bits occupy. For example, if it is assumed that N=504 and the bit level interleaving sequence is $\alpha_k=\{4, 503, \ldots, 52\}$, it can be obtained that $x_k(0)=c_k(4), x_k(1)=c_k(503), \ldots, x_k(503)=c_k(52)$, as shown FIG. 34.

2. Bit level scrambling: the bit level processor used by the bit level scrambling is a bit level scrambler (also referred to as a bit level scrambling sequence or a bit level scrambling pattern, wherein the length of the scrambled sequence is kept consistent with the length of the sequence before scrambling, that is, $N_b=N$.

In this embodiment of the present invention, the correlation of adjacent chips is reduced by scrambling, and it is beneficial for the chip-by-chip detection at the receiver. For example, if it is assumed that N=504 and the bit level scrambling sequence is $\alpha_k=\{0, 1, 1, 0, \ldots, 1\}$, the scrambled sequence is $x_k(0)=c_k(0)\oplus\alpha_k(0), x_k(1)=c_k(1)\oplus\alpha_k(1), \ldots, x_k(503)=c_k(503)\oplus\alpha_k(503)$, where $x\oplus y$ denotes the modulo N addition operation of x and y, for example, modulo 2 addition operation.

3. Bit level spreading: the bit level processor is a bit level spreader (also referred to as a bit level interleaving sequence or a bit level interleaving pattern), and the length of the spread sequence is generally different from the length of the sequence before spreading. If it is assumed that the length of the bit level spreading sequence is $\alpha_k$ (where $N_\alpha$, $N_\alpha \geq 1$), $N_b=N*N_\alpha$. The bit level spreading can be performed repeatedly on the coded bits, or the spreading operation can be performed according to a given spreading sequence.

In this embodiment of the present invention, the bit level spreading can further reduce the code rate of the data and improve the reliability of the data transmission.

Further, the transmitter performs bit-to-symbol modulation on the sequence which passed through the bit level processing, to generate a symbol sequence $S_k=\{S_k(l), l=0, \ldots, L-1\}$ (where L is the length of the symbol sequence and is related to the used modulation mode and the length of the sequence which passes through the bit level processing), wherein the modulation mode can be constellation modulations such as QAM and PSK, or waveform modulations such as FSK, or more. Subsequently, the symbol sequence $S_k$ will pass through symbol level complex spreading to obtain a spread symbol sequence, wherein the symbol level spreading uses a complex spreading code. In this embodiment of the present invention, after the symbol sequence $S_k$ is spread by a complex spreading code, a lower equivalent coding rate of the system can be obtained, and the reliability of the data transmission can be thus improved. Further, if a low-correlation/orthogonal complex spreading code is used, the correlation of data from different users can be reduced, and it is helpful for the detection and decoding at the receiving terminal.

Further, the symbol level complex spreading sequence used in the symbol level complex spreading is represented by $\beta_k$, wherein the length of the symbol level complex spreading sequence is $N_{cs}$. In this embodiment of the present invention, if $N_{cs}=4$, $\beta_k=\{\alpha_{kr1}+\alpha_{ki1}*j, \alpha_{kr2}+\alpha_{ki2}*j, \alpha_{kr3}+\alpha_{ki3}*j, \alpha_{kr4}+\alpha_{ki4}*j\}$, where j denotes $\sqrt{-1}$, $\alpha_{kr1}, \alpha_{kr2}, \alpha_{kr3}$ and $\alpha_{kr4}$ denote real parts, and $\alpha_{ki1}, \alpha_{ki2}, \alpha_{ki3}$ and $\alpha_{ki4}$ denote imaginary parts. Each symbol in the symbol sequence $S_k$ will be multiplied by $\beta_k$ to obtain a complex-spread symbol sequence, i.e., a complex-spread symbol sequence $P_k=\{P_k(b), b=0, \ldots, B-1\}$ (wherein B is the length of the complex-spread symbol sequence, and is related to the length L of the sequence before complex spreading and the length of the complex spreading sequence, for example, $B=L*N_{cs}$), as shown in FIG. 35.

Further, the complex spreading code can also have sparsity, that is, there can be symbol 0 in the complex spreading sequence. Specifically, if the symbol level complex spreading sequence is represented by $\beta_k$ and the length of the symbol level complex spreading sequence is $N_{cs}=4$, $\beta_k=\{\alpha_{kr1}+\alpha_{ki1}*j, 0, \alpha_{kr3}+\alpha_{ki3}*j, 0\}$. The processing mode using a complex spreading code with sparsity is the same as a common complex spreading code. That is, each symbol in the symbol sequence $S_k$ will be multiplied by $\beta_k$ to obtain a complex-spread symbol sequence, and the complex-spread symbol sequence is $P_k=\{P_k(b), b=0, \ldots, B-1\}$ (wherein B is the length of the complex-spread symbol sequence, and is related to the length L of the sequence before complex spreading and the length of the complex spreading sequence, for example, $B=L*N_{cs}$), wherein a difference between this complex spreading code and the common complex spreading code lies in that there will be symbols 0 in $P_k$, as shown in FIG. 36.

Further, after the symbol level spreading, symbols carrying user information are mapped onto the allocated time-frequency resources. Still further, the symbols carrying user information can be sparsely mapped onto the allocated time-frequency resources, so that it is beneficial to resist against interference and fading, and it is advantageous to support more users in the same time-frequency resources. Subsequently, baseband-to-RF processing or more operations are performed on the generated data sequence, and the processed data sequence is eventually transmitted.

In this embodiment of the present invention, based on the transmitter shown in FIG. 33, this embodiment of the present invention provides a novel multiple access mode based on bit level processing and symbol level processing. As shown in FIG. 37, K transmitters acquire respective bit level processor information and symbol level complex spreading sequence information from a physical broadcast channel, a physical downlink control channel or a physical downlink shared channel, wherein the bit level processor information and the symbol level complex spreading sequence information are used for indicating the processor used by the bit level processing and the complex spreading sequence used by the symbol level processing, respectively. The processor used by the bit level processing and the complex spreading sequence used by the symbol level processing can be obtained in a lookup table manner or more. The bit level processor and/or the symbol level complex spreading sequence are unique identifiers for distinguishing different users by the receiver. The mode for distinguishing users can comprise any one of the following:

1. if users are distinguished by only bit level processors, at least the bit level processors of the users sharing the same time-frequency resources are different, but the symbol level complex spreading codes are not required;

2. if users are distinguished by only symbol level complex spreading codes, at least the symbol level complex spreading codes of the users sharing the same time-frequency resources are different, but the bit level processors are not required; and 3. if users are distinguished by combinations of bit level processors and symbol level spreading codes, at least the combinations of bit level processors and symbol level complex spreading codes of the users sharing the same time-frequency resources are different.

Different combinations of bit level processors and symbol level complex spreading codes mean that symbol sequences obtained from the same data (sequence) by different combinations of bit level processors and symbol level complex spreading codes are different.

In this embodiment of the present invention, K transmitters transmit signals in the same way as the transmitter, and the signals are combined together at the receiver through respective channels $h_k$ and interfered by noise. The receiver employs multi-user iterative detection. Specifically, RF-to-baseband processing is performed on the received signals first, and then the obtained signals as baseband received signals are fed into a multi-user detector. The multi-user detector calculates, according to the baseband received signals and the prior probability information of each bit generated by the previous iteration, posterior probability information of each bit or each symbol, and then calculates extrinsic information in combination with the prior probability input into the detector. Then, the receiver performs, according to the symbol level spreading code $\beta_k$ of each user, complex de-spreading on the extrinsic information output from the detector. Specifically, the resumed soft information sequence is fed into the bit level processor $\alpha_k$ corresponding to this user for inverse processing. For example, if the bit level processing is bit level interleaving, the inverse processing is bit level de-interleaving. Subsequently, the inversely-processed soft information is input into a decoder. Specifically, in the decoder, corresponding decoding is performed according to the component code used by the transmitter, and final decision is performed to obtain user data.

In this embodiment of the present invention, for next iterative detection, the decoded soft information will pass through the same channel coding as in the transmitter again, and will be then subtracted by its own previous soft information to obtain extrinsic information. The obtained extrinsic information is reprocessed by the bit level processor $\alpha_k$ and then complex-spread by the symbol level complex spreading. The eventually obtained extrinsic information sequence as prior probability is input into the multi-user detector. Hereto, one iterative detection ends, and the above operations are repeated for next iterative detection and decoding. In this embodiment of the present invention, during the above process, information transferred in the iterative detection and decoding is all probability information, i.e., probability that the bit is 0 or 1 or probability that a symbol has a value. Such information is called soft information. The soft information can be represented by a log-likelihood rate or a log probability in order to simplify the implementation operations. During the first iteration, since there is no prior probability information, the prior probability input into the multi-user detector is an equal probability distribution; and, during the subsequent iteration, the prior probability information updated by the previous iteration is used. When the number of iterations reaches a preset maximum value, a process of hard decision is performed in the decoder to obtain the final information data result of a user. The multi-user signal detector can be an ESE, a detector based on an MPA, a detector based on an SIC or more.

In a second specific embodiment of the present invention, a multiple access mode based on bit level processing and symbol level processing will be described in this embodiment, wherein the symbol level processing mode is symbol level complex spreading and symbol level interleaving.

This embodiment will describe a schematic block diagram of a transmitter based on bit level processing and symbol level complex spreading and interleaving, as shown in FIG. 38. First, the transmitter performs channel coding on an information bit sequence $d_k=\{d_k(m), m=0, \ldots, M-1\}$ (where M is the length of the information bit sequence). The channel coding can consist of one component code (a Turbo code, an LDPC code or more) with a code rate of $R_1$ or consist of the combination of multiple component codes. For example, one Turbo code with a code rate of $R_1$ and one repetition spreading code with a code rate of $R_2$ are combined to generate a lower coding rate $R_3=R_2R_1$. Alternatively, the channel coding can directly consist of one Turbo code with a code rate of $R_3$. Specifically, channel coding is performed on the information bit information $d_k$ to obtain a coded sequence $c_k=\{c_k(n), n=0, \ldots, N-1\}$ (where N is the length of the channel-coded sequence), and the coded sequence $c_k$ is processed by a bit level processor $\alpha_k$ to obtain a processed sequence $x_k=\{x_k(n), n=0, \ldots, N_b-1\}$.

The bit level processing can comprise any one of the following.

1. Bit level interleaving: if the bit level processing is bit level interleaving, the bit level processor is a bit level interleaver (also referred to as a bit level interleaving sequence or a bit level interleaving pattern), wherein the length of the interleaved sequence is kept consistent with the length of the sequence to be interleaved, that is, $N_b=N$. In this embodiment of the present invention, the correlation of adjacent chips is reduced by interleaving, and it is beneficial for the chip-by-chip detection at the receiver. The bit level interleaver $\alpha_k$ can be generated by randomly shuffling $\{0, 1, \ldots, N-1\}$. In this embodiment of the present invention, numerical values from 0 to N denote the order of positions in which bits occupy. For example, if N=504 and the bit level interleaving sequence is $\alpha_k=\{4,503, \ldots, 52\}$, the interleaved sequence can be $x_k(0)=c_k(4)$, $x_k(1)=c_k(503)$ . . . . , $x_k(503)=c_k(52)$, as shown FIG. 34.

2. Bit level scrambling: if the bit level processing is bit level scrambling, the bit level processor is a bit level scrambler (also referred to as a bit level scrambling sequence or a bit level scrambling pattern), wherein the length of the scrambled sequence is kept consistent with the length of the sequence before scrambling, that is, $N_b=N$. In this embodiment of the present invention, the correlation of adjacent chips is reduced by scrambling, and it is beneficial for the chip-by-chip detection at the receiver. For example, if N=504 and the bit level scrambling sequence is $\alpha_k=\{0, 1, 1, 0, \ldots, 1\}$, the scrambled sequence can be $x_k(0)=c_k(0) \oplus \alpha_k(0)$, $x_k(1)=c_k(1) \oplus \alpha_k(1)$, ..., $x_k(503)=c_k(503) \oplus \alpha_k(503)$, where $x \oplus y$ denotes the modulo N addition operation of x and y, for example, modulo 2 addition operation.

3. Bit level spreading: if the bit level processing is bit level spreading, the bit level processor is bit level spreader (also referred to as a bit level interleaving sequence or a bit level interleaving pattern), wherein the length of the spread sequence is generally different from the length of the sequence before spreading; and if it is assumed that the length of the bit level spreading sequence $\alpha_k$ is $N_\alpha$ (where $N_\alpha \geq 1$), $N_b=N*N_\alpha$. In this embodiment of the present invention, the bit level spreading can be performed repetitively on the coded bits, or the spreading operation can be performed according to a given spreading sequence. Thus, the code rate of the data can be further reduced, and the reliability of the data transmission is improved.

In this embodiment of the present invention, the transmitter performs bit-to-symbol modulation on the sequence which passed through the bit level processing to generate a symbol sequence $S_k=\{S_k(l), l=0, \ldots, L-1\}$ (where L is the length of the symbol sequence and is related to the used modulation mode and the length of the sequence which passed through the bit level processing). Subsequently, the symbol sequence $S_k$ will pass through symbol level complex spreading to obtain a spread symbol sequence.

The modulation mode can be constellation modulations such as QAM or PSK (including multi-dimensional constellation modulation), or waveform modulations such as FSK, or more.

The symbol level spreading uses a complex spreading code. In this embodiment of the present invention, after the symbol sequence $S_k$ is spread by a complex spreading code, a lower equivalent coding rate of the system can be obtained, and the reliability of the data transmission can be thus improved. Further, if the symbol level spreading uses a low-correlation/orthogonal complex spreading code, the correlation of data from different users can be reduced, and it is beneficial for the detection and decoding at the receiving terminal.

The symbol level complex spreading sequence used in the symbol level complex spreading is represented by $\beta_{k-cs}$, and the length of the symbol level complex spreading sequence is $N_{cs}$. If $N_{cs}=4$, $\beta_{k-cs}=\{\alpha_{kr1}+\alpha_{ki1}*j, \alpha_{kr2}+\alpha_{ki2}*j, \alpha_{kr3}+\alpha_{ki3}*j, \alpha_{kr4}+\alpha_{ki4}*j\}$, where j denotes $\sqrt{-1}$, $\alpha_{kr1}$, $\alpha_{kr2}$, $\alpha_{kr3}$ and $\alpha_{kr4}$ denote real parts, and $\alpha_{ki1}$, $\alpha_{ki2}$, $\alpha_{ki3}$ and $\alpha_{ki4}$ denote imaginary parts. Each symbol in the symbol sequence $S_k$ will be multiplied by $\beta_k$ to obtain a complex-spread symbol sequence, i.e., a complex-spread symbol sequence $P_k=\{P_k(b), b=0, \ldots, B-1\}$ (wherein B is the length of the complex-spread symbol sequence, and is related to the length L of the sequence before complex spreading and the length of the complex spreading sequence, for example, $B=L*N_{cs}$).

Further, the complex spreading code can also have sparsity, that is, there can be symbol 0 in the complex spreading sequence. Similarly, if the symbol level complex spreading sequence is represented by $\beta_k$ and the length of the symbol level complex spreading sequence is $N_{cs}=4$, $\beta_{k-cs}=\{\alpha_{kr1}+\alpha_{ki1}*j, 0, \alpha_{kr3}+\alpha_{ki3}*j, 0\}$. The processing mode using a complex spreading code with sparsity is the same as a common complex spreading code. That is, each symbol in the symbol sequence $S_k$ will be multiplied by $\beta_k$ to obtain a complex-spread symbol sequence, and the complex-spread symbol sequence is $P_k=\{P_k(b), b=0, \ldots, B-1\}$ (wherein B is the length of the complex-spread symbol sequence, and is related to the length L of the sequence before complex spreading and the length of the complex spreading sequence, for example, $B=L*N_{cs}$), wherein a difference between the two processing modes lies in that there will be symbols of value 0 in $P_k$.

In this embodiment of the present invention, the transmitter performs symbol level interleaving on the complex-spread symbol sequence $P_k$ to obtain an interleaved symbol sequence $Q_k=\{Q_k(t), t=0, \ldots, T-1\}$. The operation of the symbol level interleaving can be the following possible situations.

1. Direct interleaving: The length of the interleaved symbol sequence is kept consistent with the sequence before interleaving, that is T=B. The symbol level interleaver $\beta_{k-it}$ can be generated by randomly shuffling $\{0, 1, \ldots, T-1\}$. In this embodiment of the present invention, numerical values from 0 to T−1 denote the order of positions in which symbols occupy. As shown in FIG. 39, after a symbol level complex spreading operation is performed on a symbol sequence with a length of 8 by a complex spreading sequence with a length of 4, the length of the spread symbol sequence turns to 32 and is then processed by an interleaver with a length of 32, for example, $\beta_{k-it}=\{15, 31, 9 \ldots 3\}$. The interleaved sequence is rearranged according to the order of the interleaver.

In this embodiment of the present invention, the inter-symbol correlation is reduced by interleaving, and it is beneficial for the chip-by-chip detection at the receiver.

2. Zero-padding and interleaving: A part of the complex-spread sequence is padded with zero symbols (it is assumed that there are $N_0$ padded zero symbols). The padded zero symbols can allow the symbol sequence to have sparsity, so that it is beneficial for the detection and decoding at the receiving terminal. The length of the interleaved symbol sequence is kept consistent with the length of the zero-padded sequence, that is, the length of the interleaved symbol sequence is the sum of the length of the sequence before zero-padding and the number of the padded zero symbols, that is $T=B+N_0$. The symbol level interleaver $\beta_{k-it}$ can be generated by randomly shuffling $\{0, 1, \ldots, T-1\}$. In this embodiment of the present invention, numerical values from 0 to T−1 denote the order of positions in which symbols occupy. As shown in FIG. 40, after a symbol level complex spreading operation is performed on a symbol sequence with a length of 8 by a complex spreading sequence with a length of 2, the length of the spread symbol sequence turns to 16, and is padded with 16 zero symbols to obtain a symbol sequence with a length of 32 and then processed by an interleaver with a length of 32, for example, $\beta_{k-it}=\{15, 31, 9 \ldots 3\}$. The interleaved sequence is rearranged according to the order of the interleaver.

In this embodiment of the present invention, the inter-symbol correlation is reduced by interleaving, and it is beneficial for the chip-by-chip detection at the receiver.

3. Direct zero-inserting: According to a zero-inserting pattern, $N_0$ zero symbols are inserted into the complex-spread sequence. The inserted zero symbols can allow the symbol sequence to have sparsity, so that it is beneficial for the detection and decoding at the receiving terminal. The length of the zero-inserted symbol sequence is the sum of the length of the symbol sequence before the zero-inserting and the number of the inserted zero symbols, that is, $T=B+N_0$. The zero-inserting pattern $\beta_k$ defines the number of zero elements and the positions of the zero elements. For example, $\beta_k=\{3, 5, 8, 10\}$ indicates that there are four zero symbols to be inserted and the position indexes of the four zero symbols in the final symbol sequence are 3, 5, 8 and 10. As shown in FIG. 41, after a symbol level complex spreading operation is performed on a symbol sequence with a length of 8 by a complex spreading sequence with a length of 2, the length of the spread symbol sequence turns to 16, and four zero symbols are then inserted into the symbol sequence according to the zero-inserting pattern $\beta_k=\{3, 5, 8, 10\}$ to obtain a symbol sequence with a length of 20.

4. Interleaving and zero-inserting: A symbol level interleaving operation is performed on the complex-spread sequence according to an interleaving pattern $\beta_{k\text{-}it}$. The length of the interleaved symbol sequence is kept consistent with the length of the zero-padded sequence. The inter-symbol correlation is reduced by interleaving, so that it is beneficial for the chip-by-chip detection at the receiver. The symbol level interleaver $\beta_{k\text{-}it}$ can be generated by randomly shuffling $\{0, 1, \ldots, B-1\}$. In this embodiment of the present invention, numerical values from 0 to B−1 denote the order of positions in which symbols occupy. Subsequently, zero-inserting is performed on the interleaved symbol sequence according to a zero-inserting pattern $\beta_{k0}$. The inserted zero symbols can allow the symbol sequence to have sparsity, so that it is beneficial for the detection and decoding at the receiving terminal. The length of the zero-inserted symbol sequence is the sum of the length of the symbol sequence before the zero-inserting and the number of the inserted zero symbols, that is, $T=B+N_0$. The zero-inserting pattern $\beta_k$ defines the number of zero elements and the positions of the zero elements. For example, $\beta_{k0}=\{3, 5, 8, 10\}$ indicates that there are four zero symbols to be inserted and the position indexes of the four zero symbols in the final symbol sequence are 3, 5, 8 and 10. It is to be noted that the position indexes at this moment are not original position indexes.

It is to be noted that, the order of the interleaving and zero-inserting operations can be interchanged, that is, interleaving is first performed, followed by zero inserting; or, zero-inserting is first performed, followed by interleaving. As shown in FIG. 42, after a symbol level complex spreading operation is performed on a symbol sequence with a length of 8 by a complex spreading sequence with a length of 2, the length of the symbol sequence turns to 16; then, the symbols are rearranged according to an interleaving pattern $\beta_{k\text{-}it}=\{14, 3, 9, 0 \ldots 2, 1\}$, and the interleaved symbol sequence is inserted with four zero symbols according to a zero-inserting pattern $\beta_k=\{3, 5, 8, 10\}$ to obtain a symbol sequence with a length of 20. After the zero-inserting, it is ensured that the generated symbol symbols have zero symbols in position indexes 3, 5, 8 and 10.

It is to be noted that, the order of the symbol level complex spreading operation and the symbol level interleaving operation can be interchanged, that is, the complex spreading operation is first performed and the symbol level interleaving operation is then performed; or, the symbol level interleaving operation is first performed and the symbol level complex spreading operation is then performed. This will not be limited in this embodiment of the present invention.

In this embodiment of the present invention, the symbol level processor $\beta_k$ is a combination of a symbol level spreading sequence and a symbol level interleaving module, wherein the symbol level interleaving module can be an independent symbol level interleaver, or a symbol level interleaver and/or a zero-inserting pattern or more. For description convenience, both are represented by the symbol level processor $\beta_k$.

In this embodiment, after the symbol level processing, symbols carrying user information are mapped onto the allocated time-frequency resources. Specifically, the symbols carrying user information can be sparsely mapped onto the allocated time-frequency resources, so that it is beneficial to resist against interference and fading, and it is advantageous to support more users in the same time-frequency resources. Subsequently, baseband-to-RF processing or more operations are performed on the generated data sequence, and the processed data sequence is eventually transmitted.

Further, based on the transmitter shown in FIG. 38, the present invention provides a novel multiple access mode based on bit level processing and symbol level processing. As shown in FIG. 43, K transmitters acquire respective bit level processors and symbol level processors (complex spreading sequences and interleaving information) from a physical broadcast channel, a physical downlink control channel or a physical downlink shared channel. The bit level processor information and the symbol level complex processor (spreading sequence and interleaving) information are used for indicating the processor used by the bit level processing and the processor (a complex spreading sequence and the possibly used interleaving sequence and/or zero-inserting pattern) used by the symbol level processing, respectively. The processor used by the bit level processing and the processor used by the symbol level processing can be acquired in a lookup table manner or more.

In this embodiment of the present invention, the bit level processor and/or the symbol level processor (the complex spreading sequence and/or the interleaving sequence and/or the zero-inserting pattern) are unique identifiers for distinguishing different users by the receiver. The mode for distinguishing transmitters (users) can comprise any one of the following:

1. if users are distinguished by only bit level processors, at least the bit level processors of the users sharing the same time-frequency resources are different, but the symbol level processors are not required;

2. if users are distinguished by only symbol level processors, at least the symbol level processors of the users sharing the same time-frequency resources are different, but the bit level processors are not required; and 3. if users are distinguished by combinations of bit level processors and symbol level processors, at least the combinations of bit level processors and symbol level processors of the users sharing the same time-frequency resources are at least different.

Different combinations of bit level processors and symbol level processors mean that symbol sequences obtained from the same data (sequence) by different combinations of bit level processors and symbol level processors are different.

In this embodiment of the present invention, K transmitters transmit signals in the same way as the transmitter, and the signals are combined together at the receiver through respective channels $h_k$ and interfered by noise. The receiver employs multi-user iterative detection. RF-to-baseband processing is first performed on the received signals, and the obtained signals as baseband received signals are then fed into a multi-user detector. The multi-user detector calculates, according to the baseband received signals and the prior probability information of each bit generated by the previous iteration, posterior probability information of each bit or each symbol, and then calculates extrinsic information in combination with the prior probability input into the detector. Then, inverse processing (e.g., de-interleaving and complex de-spreading) is performed on the extrinsic information output from the detector according to the symbol level processor $\beta_k$ of each user. The resumed soft information sequence is fed into the bit level processor $\alpha_k$ corresponding to this user for inverse processing. For example, if the bit level processing is bit level interleaving, the inverse processing is bit level de-interleaving. Subsequently, the inversely-processed soft information is input into a decoder. In the decoder, corresponding decoding is performed according to the component code used by the transmitter, and final decision is performed to obtain user data.

In this embodiment of the present invention, for next iterative detection, the decoded soft information will pass through the same channel coding as in the transmitter again, and is then subtracted by its own previous soft information to obtain extrinsic information. The obtained extrinsic information is reprocessed by the bit level processor $\alpha_k$ and then reprocessed (e.g., complex re-spread or re-interleaved) by the symbol level processor. The eventually obtained extrinsic information sequence as prior probability is input into the multi-user detector. Hereto, one iterative detection ends, and the above operations are repeated for next iterative detection and decoding. During the above process, information transferred in the iterative detection and decoding is all probability information, i.e., probability that the bit is 0 or 1 or probability that a symbol has a value. Such information is called soft information. The soft information can be represented by a log-likelihood rate or a log probability in order to simplify the implementation operations. During the first iteration, since there is no prior probability information, the prior probability input into the multi-user detector is an equal probability distribution; and, during the subsequent iteration, the prior probability information updated by the previous iteration is used. When the number of iterations reaches a preset maximum value, a process of hard decision is performed in the decoder to obtain the final information data result of a user. The multi-user signal detector can be an ESE, a detector based on an MPA, a detector based on an SIC or other detectors.

In a third specific embodiment of the present invention, a multiple access mode based on bit level processing and symbol level scrambling will be described. As shown in FIG. 34, this embodiment of the present invention will describe a schematic block diagram of a transmitter based on bit level processing and symbol level scrambling. First, channel coding is performed on an information bit sequence $d_k=\{d_k(m), m=0, \ldots, M-1\}$ (where M is the length of the information bit sequence). The channel coding can consist of one component code (e.g., a Turbo code, an LDPC code or more) with a code rate of $R_1$ or consist of the combination of multiple component codes. For example, one Turbo code with a code rate of $R_1$ and one repetition spreading code with a code rate of $R_2$ are combined to generate a lower coding rate $R_3=R_2R_1$. Alternatively, the channel coding can directly consist of one Turbo code with a code rate of $R_3$. Specifically, channel coding is performed on the information bit information $d_k$ to obtain a coded sequence $c_k=\{c_k(n),$ n=0, ..., N-1} (where N is the length of the channel-coded sequence), and the coded sequence $c_k$ is processed by a bit level processor $\alpha_k$ to obtain a processed sequence $x_k=\{x_k(n), n=0, \ldots, N_b-1\}$.

The bit level processing can comprise any one of the following.

1. Bit level interleaving: if the bit level processing is bit level interleaving, the bit level processor is a bit level interleaver (also referred to as a bit level interleaving sequence or a bit level interleaving pattern), wherein the length of the interleaved sequence is kept consistent with the length of the sequence to be interleaved, that is, $N_b=N$. The correlation of adjacent chips is reduced by interleaving, so that it is beneficial for the chip-by-chip detection at the receiver.

The bit level interleaver $\alpha_k$ can be generated by randomly shuffling $\{0, 1, \ldots, N-1\}$. In this embodiment of the present invention, numerical values from 0 to N denote the order of positions in which bits occupy. For example, if N=504 and the bit level interleaving sequence is $\alpha_k=\{4, 503, \ldots, 52\}$, it can be obtained that $x_k(0)=c_k(4)$, $x_k(1)=c_k(503)$, ..., $x_k(503)=c_k(52)$, as shown FIG. 34.

2. Bit level scrambling: if the bit level processing is bit level scrambling, the bit level processor is a bit level scrambler (also referred to as a bit level scrambling sequence or a bit level scrambling pattern), wherein the length of the scrambled sequence is kept consistent with the length of the sequence before scrambling, that is, $N_b=N$. The correlation of adjacent chips is reduced by scrambling, so that it is beneficial for the chip-by-chip detection at the receiver. For example, if N=504 and the bit level scrambling sequence is $\alpha_k=\{0, 1, 1, 0, \ldots, 1\}$, it can be obtained that $x_k(0)=c_k(0)\oplus\alpha_k(0)$, $x_k(1)=c_k(1)\oplus\alpha_k(1)$, ..., $x_k(503)=c_k(503)\oplus\alpha_k(503)$, where $x\oplus y$ denotes the modulo N addition operation of x and y, for example, modulo 2 addition operation.

3. Bit level spreading: if the bit level processing is bit level spreading, the bit level processor is bit level spreader (also referred to as a bit level interleaving sequence or a bit level interleaving pattern), wherein the length of the spread sequence generally is different from the length of the sequence before spreading; and it is assumed that the length of the bit level spreading sequence $\alpha_k$ is $N_\alpha$ (where $N_\alpha \geq 1$), $N_b=N*N_\alpha$. Subsequently, bit-to-symbol modulation is performed on the sequence which passed through the bit level processing, to generate a symbol sequence $S_k=\{S_k(l), l=0, \ldots, L-1\}$ (where L is the length of the symbol sequence and is related to the used modulation mode and the length of the sequence which passed through the bit level processing).

The spreading can be repetition of the coded bits, or the spreading operation according to a given spreading sequence. In this embodiment of the present invention, the spreading can further reduce the code rate of the data and improve the reliability of the data transmission.

The modulation mode can be constellation modulations such as QAM or PSK, or waveform modulations such as FSK, or more. The symbol sequence $S_k$ will pass through symbol level scrambling to obtain a scrambled symbol sequence. The symbol level scrambling uses a scrambling sequence/code. After the symbol sequence $S_k$ is scrambled by a scrambling sequence, the inter-symbol correlation can be reduced, and it is thus beneficial for the detection and decoding at the receiving terminal. In this embodiment of the present invention, the symbol level scrambling sequence used in the symbol level scrambling is represented by $\beta_k$, wherein the length of the symbol level scrambling sequence is $N_{scr}$, generally, $N_{scr}=L$. That is, the scrambling operation will not change the length of the symbol sequence, that is, $\beta_k = \{\beta_k(n_{scr}), n_{scr}=0, \ldots, N_{scr}-1\}$. Elements $\beta_k(n_{scr})$ in the scrambling sequence can be:

1. real numbers; and
2. complex numbers (constant modulus, i.e., modulus for original data symbols will not be changed after the scrambling operation).

In this embodiment of the present invention, each symbol in the symbol sequence $S_k$ is multiplied by $\beta_k$ to obtain a scrambled symbol sequence $P_k = \{P_k(b), b=0, \ldots, B-1\}$ (where B is the length of the symbol sequence which passed through the symbol level scrambling, for example, B=L), that is, $P_k = S_k \cdot \beta_k = \{P_k(0) = S_k(0) \cdot \beta_k(0), P_k(1) = S_k(1) \cdot \beta_k(1), \ldots\}$. If it is assumed that the length of the symbol sequence is 8, the length of the scrambling sequence is 8. The symbol level scrambling process is multiplying the symbols of the symbol sequence by the elements of the scrambling sequence at corresponding positions, as shown in FIG. 45.

In this embodiment of the present invention, after the symbol level scrambling, symbols carrying user information can be mapped onto the allocated time-frequency resources. Further, the symbols carrying user information can be sparsely mapped onto the allocated time-frequency resources, so that it is beneficial to resist against interference and fading, and it is advantageous to support more users in the same time-frequency resources. Subsequently, baseband-to-RF processing or more operations are performed on the generated data sequence, and the processed data sequence is eventually transmitted.

In this embodiment of the present invention, based on the transmitter shown in FIG. 44, this embodiment of the present invention provides a novel multiple access mode based on bit level processing and symbol level scrambling. As shown in FIG. 46, K transmitters acquire respective bit level processor information and symbol level scrambling sequence information from a physical broadcast channel, a physical downlink control channel or a physical downlink shared channel, wherein the bit level processor information and the symbol level scrambling sequence information are used for indicating the processor used by the bit level processing and the scrambling sequence used by the symbol level processing, respectively, and can be obtained in a lookup table manner or more. In this embodiment of the present invention, the bit level processor and/or the symbol level scrambling sequence are unique identifiers for distinguishing different users by the receiver. The mode for distinguishing users can comprise any one of the following:

1. if users are distinguished by only bit level processors, at least the bit level processors of the users sharing the same time-frequency resources are different, but the symbol level scrambling codes are not required;
2. if users are distinguished by only symbol level scrambling codes, at least the symbol level scrambling codes of the users sharing the same time-frequency resources are different, but the bit level processors are not required; and
3. if users are distinguished by combinations of bit level processors and symbol level scrambling codes, at least the combinations of bit level processors and symbol level scrambling codes of the users sharing the same time-frequency resources are different.

Different combinations of bit level processors and symbol level scrambling codes mean that symbol sequences obtained from the same data (sequence) by different combinations of bit level processors and symbol level scrambling codes are different.

In this embodiment of the present invention, K transmitters transmit signals in the same way as the transmitter, and the signals are combined together at the receiver through respective channels $h_k$ and interfered by noise. The receiver employs multi-user iterative detection. Specifically, RF-to-baseband processing is first performed on the received signals, and the obtained signals as baseband received signals are then fed into a multi-user detector. The multi-user detector calculates, according to the baseband received signals and the prior probability information of each bit generated by the previous iteration, posterior probability information of each bit or each symbol, and then calculates extrinsic information in combination with the prior probability input into the detector. Then, the extrinsic information out from the detector is de-scrambled according to the symbol level scrambling code $\beta_k$ corresponding to each user. The resumed soft information sequence is fed into the bit level processor $\alpha_k$ corresponding to this user for inverse processing. For example, if the bit level processing is bit level interleaving, the inverse processing is bit level de-interleaving. The inversely-processed soft information is input into a decoder. In the decoder, corresponding decoding is performed according to the component code used by the transmitter, and final decision is performed to obtain user data.

In this embodiment of the present invention, for next iterative detection, the decoded soft information will pass through the same channel coding as in the transmitter again, and is then subtracted by its own previous soft information to obtain extrinsic information. The obtained extrinsic information is reprocessed by the bit level processor $\alpha_k$ and then re-scrambled by the symbol level scrambling. The eventually obtained extrinsic information sequence as prior probability is input into the multi-user detector. Hereto, one iterative detection ends, and the above operations are repeated for next iterative detection and decoding. During the above process, information transferred in the iterative detection and decoding is all probability information, i.e., probability that the bit is 0 or 1 or probability that a symbol has a value. Such information is called soft information. The soft information can be represented by a log-likelihood rate or a log probability in order to simplify the implementation operations. During the first iteration, since there is no prior probability information, the prior probability input into the multi-user detector is an equal probability distribution; and, during the subsequent iteration, the prior probability information updated by the previous iteration is used. When the number of iterations reaches a preset maximum value, a process of hard decision is performed in the decoder to obtain the final information data result of a user. The multi-user signal detector can be an ESE, a detector based on an MPA, a detector based on an SIC or other detectors.

In a fourth specific embodiment of the present invention, a multiple access mode based on bit level processing and symbol level processing will be described in this embodiment, wherein the symbol level processing is symbol level complex spreading and symbol level scrambling.

As shown in FIG. 47, this embodiment of the present invention will describe a schematic block diagram of a transmitter based on bit level processing and symbol level complex spreading and scrambling. First, channel coding is performed on an information bit sequence $d_k = \{d_k(m), m=0, \ldots, M-1\}$ (where M is the length of the information bit sequence). The channel coding can consist of one component code (e.g., a Turbo code, an LDPC code or more) with a code rate of $R_1$ or consist of the combination of multiple component codes. For example, one Turbo code with a code rate of $R_1$ and one repetition spreading code with a code rate of $R_2$ are combined to generate a lower coding rate $R_3=R_2R_1$. Alternatively, the channel coding can directly consist of one Turbo code with a code rate of $R_3$. Specifically, channel coding is performed on the information bit information $d_k$ to obtain a coded sequence $c_k=\{c_k(n), n=0, \ldots, N-1\}$ (where N is the length of the channel-coded sequence), and the coded sequence $c_k$ is processed by a bit level processor $\alpha_k$ to obtain a processed sequence $x_k=\{x_k(n), n=0, \ldots, N_b-1\}$.

The bit level processing can comprise any one of the following modes.

1. Bit level interleaving: if the bit level processing is bit level interleaving, the bit level processor is a bit level interleaver (also referred to as a bit level interleaving sequence or a bit level interleaving pattern), wherein the length of the interleaved sequence is kept consistent with the length of the sequence to be interleaved, that is, $N_b=N$. In this embodiment of the present invention, the correlation of adjacent chips is reduced by interleaving, and it is beneficial for the chip-by-chip detection at the receiver. The bit level interleaver $\alpha_k$ can be generated by randomly shuffling $\{0, 1, \ldots, N-1\}$. In this embodiment of the present invention, numerical values from 0 to N denote the order of positions in which bits occupy. For example, if N=504 and the bit level interleaving sequence is $\alpha_k=\{4,503, \ldots, 52\}$, the interleaved sequence can be $x_k(0)=c_k(4)$, $x_k(1)=c_k(503)\ldots$, $x_k(503)=c_k(52)$, as shown FIG. 34.

2. Bit level scrambling: if the bit level processing is bit level scrambling, the bit level processor is a bit level scrambler (also referred to as a bit level scrambling sequence or a bit level scrambling pattern), wherein the length of the scrambled sequence is kept consistent with the length of the sequence before scrambling, that is, $N_b=N$. In this embodiment of the present invention, the correlation of adjacent chips is reduced by scrambling, and it is beneficial for the chip-by-chip detection at the receiver. For example, if N=504 and the bit level scrambling sequence is $\alpha_k=\{0, 1, 1, 0, \ldots, 1\}$, the scrambled sequence can be $x_k(0)=c_k(0)\oplus\alpha_k(0)$, $x_k(1)=c_k(1)\oplus\alpha_k(1),\ldots, x_k(503)=c_k(503)\oplus\alpha_k(503)$, where $x\oplus y$ denotes the modulo N addition operation of x and y, for example, modulo 2 addition operation.

3. Bit level spreading: if the bit level processing is bit level spreading, the bit level processor is bit level spreader (also referred to as a bit level interleaving sequence or a bit level interleaving pattern), wherein the length of the spread sequence generally different from the length of the sequence before spreading; and if it is assumed that the length of the bit level spreading sequence $\alpha_k$ is $N_\alpha$ (where $N_\alpha\geq 1$), $N_b=N*N_\alpha$. In this embodiment of the present invention, the bit level spreading can be performed repeatedly on the coded bits, or the spreading operation can be performed according to a given spreading sequence. Thus, the code rate of the data can be further reduced, and the reliability of the data transmission is improved.

Further, in this embodiment of the present invention, the transmitter performs bit-to-symbol modulation on the sequence which passed through the bit level processing to generate a symbol sequence $S_k=\{S_k(l), l=0, \ldots, L-1\}$ (where L is the length of the symbol sequence and is related to the used modulation mode and the length of the sequence which passed through the bit level processing). Subsequently, the symbol sequence $S_k$ will pass through symbol level complex spreading to obtain a spread symbol sequence.

The modulation mode can be constellation modulations such as QAM or PSK (including multi-dimensional constellation modulation), or waveform modulations such as FSK, or more.

The symbol level spreading uses a complex spreading code. In this embodiment of the present invention, after the symbol sequence $S_k$ is spread by a complex spreading code, a lower equivalent coding rate of the system can be obtained, and the reliability of the data transmission can be thus improved. Further, if the symbol level spreading uses a low-correlation/orthogonal complex spreading code, the correlation of data from different users can be reduced, and it is beneficial for the detection and decoding at the receiving terminal.

The symbol level complex spreading sequence used in the symbol level complex spreading is represented by $\beta_{k-cs}$, and the length of the symbol level complex spreading sequence is $N_{cs}$. If $N_{cs}=4$, $\beta_{k-cs}=\{\alpha_{kr1}+\alpha_{ki1}*j, \alpha_{kr2}+\alpha_{ki2}*j, \alpha_{kr3}+\alpha_{ki3}*j, \alpha_{kr4}+\alpha_{ki4}*j\}$, where j denotes $\sqrt{-1}$, $\alpha_{kr1}$, $\alpha_{kr2}$, $\alpha_{kr3}$ and $\alpha_{kr4}$ denote real parts, and $\alpha_{ki1}$, $\alpha_{ki2}$, $\alpha_{ki3}$ and $\alpha_{ki4}$ denote imaginary parts. Each symbol in the symbol sequence $S_k$ will be multiplied by $\beta_k$ to obtain a complex-spread symbol sequence, i.e., a complex-spread symbol sequence $P_k=\{P_k(b), b=0, \ldots, B-1\}$ (where B is the length of the complex-spread symbol sequence, and is related to the length L of the sequence before complex spreading and the length of the complex spreading sequence, for example, $B=L*N_{cs}$).

Further, the complex spreading code can also have sparsity, that is, there can be symbol 0 in the complex spreading sequence. If the symbol level complex spreading sequence is represented by $\beta_k$ and the length of the symbol level complex spreading sequence is $N_{cs}=4$, $\beta_{k-cs}=\{\alpha_{kr1}+\alpha_{ki1}*j, 0, \alpha_{kr3}+\alpha_{ki3}*j, 0\}$. The processing mode using a complex spreading code with sparsity is the same as a common complex spreading code. That is, each symbol in the symbol sequence $S_k$ will be multiplied by $\beta_k$ to obtain a complex-spread symbol sequence, and the complex-spread symbol sequence is $P_k=\{P_k(b), b=0, \ldots, B-1\}$ (where B is the length of the complex-spread symbol sequence, and is related to the length L of the sequence before complex spreading and the length of the complex spreading sequence, for example, $B=L*N_{cs}$), wherein a difference between the both lies in that there will be zero symbols in $P_k$.

In this embodiment, the complex-spread symbol sequence $P_k$ will passes through symbol level scrambling to obtain a scrambled symbol sequence $Q_k=\{Q_k(t), t=0, \ldots, T-1\}$. The symbol level scrambling uses a scrambling sequence/code. After the symbol sequence $P_k$ is processed by a scrambling sequence, the inter-symbol correlation can be reduced, and it is thus beneficial for the detection and decoding at the receiving terminal. The symbol level scrambling sequence used in the symbol level scrambling is represented by $\beta_{k-sc}$, wherein the length of the symbol level scrambling sequence is $N_{scr}$, generally, $N_{scr}=B$. That is, the scrambling operation will not change the length of the symbol sequence, that is, $T=B$, $\beta_k=\{\beta_k(n_{scr}), n_{scr}=0, \ldots, N_{scr}-1\}$. Elements $\beta_k(n_{scr})$ in the scrambling sequence can be any one of the following:

1. real numbers; and 2. complex numbers (constant modulus, i.e., modulus for original data symbols will not be changed after the scrambling operation).

In this embodiment of the present invention, each symbol in the symbol sequence $P_k$ will be multiplied by $\beta_k$ to obtain a scrambled symbol sequence $Q_k=\{Q_k(t), t=0, \ldots, T-1\}$ (where T is the length of the symbol sequence which passed through the symbol level scrambling, for example, T=B). If the length of the symbol sequence is 4 and the length of the complex spreading sequence is 2, the length of the symbol sequence which passed through the complex spreading is 8, and the length of the scrambling sequence is 8. The symbol level scrambling process is multiplying the symbols in the symbol sequence by the elements in the scrambling sequence at corresponding positions, as shown in FIG. 48.

It is to be noted that, the order of the symbol level complex spreading operation and the symbol level scrambling operation can be interchanged, that is, the complex spreading operation is first performed and the symbol level scrambling operation is then performed; or, the symbol level scrambling operation is first performed and the symbol level complex spreading operation is then performed. This will not be limited in this embodiment of the present invention. In this embodiment of the present invention, the symbol level processor $\beta_k$ is a combination of a symbol level spreading sequence and a symbol level scrambling sequence.

In this embodiment of the present invention, after the symbol level processing, symbols carrying user information can be mapped onto the allocated time-frequency resources. Further, the symbols carrying user information can be sparsely mapped onto the allocated time-frequency resources, so that it is beneficial to resist against interference and fading, and it is advantageous to support more users in the same time-frequency resources. Subsequently, baseband-to-RF processing or more operations are performed on the data sequence generated by the symbol level processing, and the processed data sequence is eventually transmitted.

In this embodiment of the present invention, based on the transmitter shown in FIG. 47, this embodiment of the present invention provides a novel multiple access mode based on bit level processing and symbol level processing. As shown in FIG. 49, K transmitters acquire respective bit level processors and symbol level processors (complex spreading sequences and scrambling information) from a physical broadcast channel, a physical downlink control channel or a physical downlink shared channel. The bit level processor information and the symbol level complex processor (spreading sequence and scrambling) information are used for indicating the processor used by the bit level processing and the processor (complex spreading sequence and scrambling sequence) used by the symbol level processing, and can be indicated by a table or more. The bit level processor and/or the symbol level processor (the complex spreading sequence and/or the scrambling sequence) are unique identifiers for distinguishing different users by the receiver. The specific mode for distinguishing users can comprise any one of the following:

1. if users are distinguished by only bit level processors, at least the bit level processors of the users sharing the same time-frequency resources are different, but the symbol level processors are not required;

2. if users are distinguished by symbol level processors, at least the symbol level processors of the users sharing the same time-frequency resources are different, but the bit level processors are not required; and 3. if users are distinguished by combinations of bit level processors and symbol level processors, at least the combinations of bit level processors and symbol level processors of the users sharing the same time-frequency resources are different.

Different combinations of bit level processors and symbol level processors mean that symbol sequences obtained from the same data (sequence) by different combinations of bit level processors and symbol level processors are different.

In this embodiment of the present invention, K transmitters transmit signals in the same way as the transmitter, and the signals are combined together at the receiver through respective channels $h_k$ and interfered by noise. The receiver employs multi-user iterative detection. Specifically, RF-to-baseband processing is first performed on the received signals, and the obtained signals as baseband received signals are then fed into a multi-user detector. The multi-user detector calculates, according to the baseband received signals and the prior probability information of each bit generated by the previous iteration, posterior probability information of each bit or each symbol, and then calculates extrinsic information in combination with the prior probability input into the detector. Then, inverse processing (e.g., de-interleaving and complex de-spreading) is performed on the extrinsic information output from the detector according to the symbol level processor $\beta_k$ of each user. The resumed soft information sequence is fed into the bit level processor $\alpha_k$ corresponding to this user for inverse processing. For example, if the bit level processing is bit level interleaving, the inverse processing is bit level de-interleaving. Subsequently, the inversely-processed soft information is input into a decoder. In the decoder, corresponding decoding is performed according to the component code used by the transmitter, and final decision is performed to obtain user data.

In this embodiment of the present invention, for next iterative detection, the decoded soft information will pass through the same channel coding as in the transmitter again, and is then subtracted by its own previous soft information to obtain extrinsic information. The obtained extrinsic information is reprocessed by the bit level processor $\alpha_k$ and then reprocessed (e.g., complex re-spread or re-interleaved) by the symbol level processor. The eventually obtained extrinsic information sequence as prior probability is input into the multi-user detector. Hereto, one iterative detection ends, and the above operations are repeated for next iterative detection and decoding. During the above process, information transferred in the iterative detection and decoding is all probability information, i.e., probability that the bit is 0 or 1 or probability that a symbol has a value. Such information is called soft information. The soft information can be represented by a log-likelihood rate or a log probability in order to simplify the implementation operations. During the first iteration, since there is no prior probability information, the prior probability input into the multi-user detector is an equal probability distribution; and, during the subsequent iteration, the prior probability information updated by the previous iteration is used. When the number of iterations reaches a preset maximum value, a process of hard decision is performed in the decoder to obtain the final information data result of a user. The multi-user signal detector can be an ESE, a detector based on an MPA, a detector based on an SIC or other detectors.

In a fifth specific embodiment of the present invention, a solution of combining the multiple access mode based on bit level processing and symbol level processing with carrier modulation will be described in this specific embodiment. For description convenience, the bit level processing is bit level interleaving, and the symbol level processing is symbol level complex spreading. The mode for combining different processing modes is similar and will not be repeated here.

In this embodiment of the present invention, K transmitters employ the multiple access mode based on bit level processing and symbol level processing; and, the receiver detects data transmitted by the K transmitters by using a multi-user iterative detection and decoding structure. Since the carrier modulation is flexible in resource allocation and easy to resist against multipath fading, the combination with the carrier modulation can give full play to the advantages of the multiple access mode based on bit level processing and symbol level processing. In this embodiment, examples of combinations with important carrier modulation modes will be described. Specifically:

1. DFT-spread-Orthogonal frequency division multiplexing (DFT-s-OFDM): the DFT-s-OFDM is also called Single-Carrier Frequency-Division Multiple Access (SC-FDMA), which is an uplink carrier modulation mode used in LTE/LTE-A. FIG. 50 shows a block diagram of a transmitter complying with the multiple access mode based on bit level processing and symbol level processing, in combination with DFT-s-OFDM. As shown in FIG. 50, a data stream to be transmitted will pass through channel coding, bit level interleaving, modulation and symbol level complex spreading, and then will pass through DFT-s-OFDM modulation. The right half part of FIG. 50 shows a block diagram of the DFT-s-OFDM. Specifically, a serial data stream is converted into a parallel data stream by serial-to-parallel conversion, and the parallel data stream will pass through DFT to obtain DFT-spread data; and the data will pass through carrier mapping and IDFT and then parallel-to-serial conversion and is prefixed with a cyclic prefix (CP) to obtain the data to be transmitted.

It is to be noted that, the number of data before carrier mapping and the number of data after carrier mapping are different, and the number of data after carrier mapping is no less than the number of data before carrier mapping.

In addition, the carrier mapping also determines the frequency resources used by a transmitter. The DFT-s-OFDM, since it belongs to an orthogonal resource allocation mode, can more flexibly support more transmitters when combined with a non-orthogonal multiple access mode. Further, multiple transmitters allocated with same time-frequency resources can be distinguished by bit level interleavers and symbol level complex spreading sequences; and, the transmitters allocated with orthogonal time-frequency resources can use same bit level interleavers and symbol level complex spreading sequences. In this embodiment of the present invention, the time-frequency resources, bit level interleavers and symbol level complex spreading sequences allocated to each transmitter are transmitted in a physical broadcast channel, a physical downlink control channel or a physical downlink shared channel; and, the transmitters select the used bit level interleavers, symbol level complex spreading sequences and time-frequency resources according to the information.

Further, FIG. 51 shows the structure of a receiver complying with the multiple access mode based on bit level interleaving and symbol level complex spreading in combination with DFT-s-OFDM. The demodulation process of the DFT-s-OFDM is an inverse process of the modulation process, as shown in FIG. 51. The demodulated data will pass through multi-user iterative detection and decoding to obtain the data from each transmitter. It is to be noted that, the receiver structure shown in FIG. 51 is applicable to a structure in which multiple transmitters are served in a set of time-frequency resources in a non-orthogonal manner. Therefore, when transmitters in different time-frequency resources are taken into consideration, different time-frequency resources need to be separately processed by the structure shown in FIG. 51.

2. Orthogonal Frequency Division Multiplexing (OFDM): the OFDM is a downlink carrier modulation mode used in LTE/LTE-A and is also selected as a main uplink carrier modulation mode in 5G. FIG. 52 shows the structure of a transmitter based on pattern mapping in combination with OFDM.

In FIG. 52, OFDM modulation is performed on a data stream which passed through the bit level interleaving and the symbol level complex spreading, to obtain the data to be transmitted. The OFDM modulation comprises serial-to-parallel conversion, resource mapping (that is, the data to be modulated is mapped onto different subcarriers of different OFDM symbols), IDFT, and parallel-to-serial conversion and CP addition. Like the DFT-s-OFDM, the OFDM is an orthogonal multi-carrier modulation mode. In combination with the multiple access mode based on bit level interleaving and symbol level complex spreading, the OFDM can provide the system with more flexible resource allocation and can support more users. Multiple transmitters allocated with same time-frequency resources can be distinguished by bit level interleavers and symbol level complex spreading sequences; and, the transmitters allocated with orthogonal time-frequency resources can use same bit level interleavers and symbol level complex spreading sequences. Further, the time-frequency resources, bit level interleavers and symbol level complex spreading sequences allocated to each transmitter are transmitted in a physical broadcast channel, a physical downlink control channel or a physical downlink shared channel. The transmitters select the used bit level interleavers, symbol level complex spreading sequences and time-frequency resources according to the information.

In this embodiment of the present invention, FIG. 53 shows the structure of a receiver complying with the two-stage interleaving multiple access based on pattern mapping, in combination with OFDM.

The demodulation of the OFDM is an inverse process of the modulation of the OFDM. Specifically, a CP is removed from the received signal, and the received signal will pass through parallel-to-serial conversion, DFT and resource de-mapping and then will pass through serial-to-parallel conversion and iterative detection and decoding to obtain the data stream from each transmitter.

3. Filtered-OFDM (F-OFDM)

As a novel waveform modulation technology based on sub-band filtering, the F-OFDM can meet the requirements on out-of-band emission, resource allocation flexibility and more in future scenarios, and becomes one of candidates of the novel air interface technology. FIG. 54 shows a block diagram of a transmitter complying with the multiple access technology based on a bit level interleaver and a symbol level complex spreading sequence, in combination with F-OFDM.

As shown in FIG. 54, a data stream to be processed will pass through channel coding, bit level interleaving, modulation and symbol level complex spreading, and then will pass through F-OFDM modulation. The F-OFDM modulation is shown in the right half part of FIG. 54. That is, the input data is first converted into parallel data by serial-to-parallel conversion, and the parallel data will successively pass through resource mapping, IDFT and parallel-to-serial conversion and is prefixed with a CP to obtain a time-domain signal. The time-domain signal is filtered by time-domain sub-band filtering according to a sub-band frequency band to be transmitted, to obtain a time-domain signal to be transmitted. In this embodiment of the present invention, compared with the OFDM technology, the F-OFDM supports sub-band filtering and can more flexibly support transmitters configured by various carrier modulations. Meanwhile, F-OFDM remains the advantage of supporting flexible resource allocation by resource mapping.

The receiver informs a transmitter of the sub-bands, resource allocation conditions, a bit level interleaver and a symbol level complex spreading sequence allocated to this transmitter through a physical broadcast channel, a physical downlink control channel or a physical downlink shared channel in a lookup table manner. This transmitter adjusts the used bit level interleaver, the symbol level complex spreading sequence, the resource allocation modes, the used multi-carrier modulation parameter settings and the time-domain filter parameter settings according to the information, and then transmits data.

In this embodiment of the present invention, the receiver distinguishes data from different transmitters by the processed sub-bands, resource allocation modes, bit level interleavers and symbol level complex spreading sequences. FIG. 55 shows a block diagram of a receiver complying with the multiple access technology based on bit level interleaving and symbol level complex spreading, in combination with F-OFDM.

In the example shown in FIG. 55, the whole frequency band is divided into L sub-bands. In each sub-band, the access service of data from multiple transmitters is provided by orthogonal resource allocation and non-orthogonal interleaving multiple access. That is, the receiver acquires information about data in each sub-band by sub-band filtering first, and then acquires data transmitted by the transmitters and allocated to the time-frequency resources by OFDM demodulation. The above two modes for distinguishing users are both orthogonal and ideally free of interference. What is received in same sub-bands and same time-frequency resources is data transmitted by multiple transmitters, and the data is to be detected by a receiver with a structure of iterative detection and decoding similar to the foregoing embodiment.

It is to be noted that, in addition to the examples illustrated above, the multiple access technology based on bit level interleaving and symbol level complex spreading provided by the present invention can also be combined with other carrier modulation technologies, for example, UFMC, NC-OFDM, BMC or more.

In a sixth specific embodiment of the present invention, a solution in which the data rate of an individual user is improved by superposing multiple transmission streams will be described in this embodiment of the present invention. The system configuration is as shown in the first specific embodiment, where K transmitters employs a transmitter structure complying with the multiple access technology based on bit level interleaving and symbol level complex spreading; and, the receiver detects the data from K users by using a multi-user joint iterative detection receiver.

In this embodiment of the present invention, in order to improve the data transmission rate of an individual user, transmitters transmit multiple data rates simultaneously at a same frequency by superposing multiple streams. The block diagram of the transmitters is shown in FIG. 56.

Specifically, in FIG. 56, data streams 1 to M are data streams from an individual user. The data streams can be generated by producing and dividing one data source, or generated respectively by M independent data streams, or generated in such a method that some data streams are generated by producing and dividing one data source while the others are generated by independent data sources. Data in each data stream will pass through channel coding, bit level interleaving, modulation and symbol level complex spreading, and the resulting symbol stream will pass through phase and/or power adjustment and then multi-carrier modulation. The signal streams which passed through the multi-carrier modulation are superposed and then will pass through baseband-to-RF conversion to be transmitted. The order of multi-carrier modulation and superposition can be interchanged, that is, the data streams are superposed first and then will pass through multi-carrier modulation to be transmitted.

Further, the detection and decoding structure of the receiver is similar to that in the example shown in FIG. 32. Specifically, the multi-user detector completes symbol detection according to the phase and/or power adjustment performed on the modulated symbols of each data stream by each user, and then performs the subsequence iterative detection and decoding operations. The iterative detection decoder outputs all data stream information of each user. The receiver identifies and distinguishes the user data according to the bit level interleaver and/or the symbol level complex spreading sequence.

The bit level interleaver and the symbol level complex spreading sequence are the basis for distinguishing different users and different data streams. Specific allocation modes will be described below.

1. Different data streams from a same transmitter are allocated with same bit level interleavers and different symbol level complex spreading sequences, and different transmitters are allocated with different bit level interleavers. The receiver distinguishes data from different transmitters according to the bit level interleavers, and distinguishes different data streams from a same transmitter according to the symbol level complex spreading sequences.

2. Different data streams from a same transmitter are allocated with same symbol level complex spreading sequences and different bit level interleavers, and different transmitters are allocated with different symbol level complex spreading sequences. The receiver distinguishes data from different transmitters according to the secondary-level mode mapping patterns, and distinguishes different data streams from a same transmitter according to the bit level interleavers.

3. Different data streams from different transmitters are allocated with different bit level interleavers and symbol level complex spreading sequences. The receiver distinguishes data streams according to the bit level interleavers and symbol level complex spreading sequences, and thus obtains data from each transmitter.

The criterion for the phase and/or power adjustment is to ensure that symbols corresponding to different data streams from a same transmitter will not be overlapped or offset during superposition. For the constellation point modulation mode, a preferred criterion is as follows: under the conditions meeting the power limit, a criterion for phase and power modulation of low-order modulated data streams is designed according to a high-order modulation constellation. By taking BPSK modulation and transmitters for transmitting eight streams as example, the phase and/or power adjustment factors for each path are shown in Table 4.

TABLE 4

Examples of phase and/or power adjustment

| Stream | 1 | 2 | 3 | 4 | 5 | 6 | 7 | 8 |
|---|---|---|---|---|---|---|---|---|
| Phase (°) | 45 | −45 | 45 | −45 | 18.43 | −18.43 | 71.57 | −71.57 |
| Power | 0.2 | 0.2 | 1.8 | 1.8 | 1 | 1 | 1 | 1 |

If the phase adjustment factor of the $k^{th}$ data stream is $\theta_k$, the power adjustment factor is $\alpha_k$ and the constellation point transmission symbol is $x_k$, the actual transmission symbol of the $k^{th}$ data stream is $\sqrt{\alpha_k} \exp(j\theta_k)x_k$. After the phase and/or power adjustment is performed according to Table 4, what transmitted by the transmitter, after the superposition, is similar to a constellation of 16QAM modulation, and the transmission symbols will not be overlapped nor offset during the superposition of the streams. $\theta_k$ and $\alpha_k$ are determined in Table 4.

In this embodiment of the present invention, in order to serve multiple transmitters (users) in same time-frequency resources, the receiver will transmit the bit level interleavers and symbol level complex spreading sequences used for distinguishing transmitters (users), corresponding phase and/or power adjustment factors and the maximum number of supported streams in a physical broadcast channel, a physical downlink control channel or a physical downlink shared channel in a lookup table manner. Each transmitter determines, according to the number of data streams to be transmitted and the maximum number of supported streams, the number of streams to be superposed, as well as the bit level interleaver, symbol level complex spreading sequence and corresponding phase and/or power adjustment factors, which are allocated to each stream.

If the number K of actually transmitted streams is less than the maximum number $K_{max}$ of supported streams of the receiver, the transmitter can perform transmission in the following ways.

1. Only K data streams are transmitted, and the number of the transmitted streams is informed to the receiver in a physical uplink control channel or a physical uplink shared channel. That is, the transmitter transmits an indication of the number of streams, and informs the receiver of the number of streams to be received in a lookup table manner.

2. $K_{max}$ data streams are transmitted, wherein K data streams transmit information while $K_{max}$−K other data streams transmit all-zero data. Since an all-zero sequence is an allowable codeword for the channel coding, it is considered that this stream is not used for transmitting data if the receiver detects an all-zero sequence or a nearly-all-zero sequence. After the iterative detection and decoding process is completed, the number of zero values in the decoded sequence is counted. If the number of zero values exceeds a preset threshold, it is considered that this stream is used for transmitting a valid sequence; or otherwise, it is considered that this stream is not used for transmitting a valid sequence.

In this embodiment of the present invention, by superposing multiple streams, the solution provided in this embodiment of the present invention can support more users in same time-frequency resources, so that the data transmission rate of an individual user is improved and a higher reliability is maintained.

In a seventh specific embodiment of the present invention, a solution combining the multiple access mode based on bit level interleaving and symbol level complex spreading with a multi-antenna technology will be described in this embodiment. The system configuration is as described in the first specific embodiment. K transmitters employ the multiple access mode based on bit level interleaving and symbol level complex spreading sequences, and are equipped with NT transmitting antennas so that the transmitters transmit data by multiple antennas. The receiver performs detection and estimation on the transmitted bit streams by the iterative detection and coding mode shown in FIG. 32. The receiver is equipped with $N_R$ receiving antennas.

The transmitters perform transmission based on a multi-antenna technology by the mode shown in FIG. 57.

1. As shown in FIG. 57, a transmitter transmits only one data stream. This data stream will pass through channel coding, bit level interleaving, modulation and symbol level complex spreading, and the one data stream is converted into multiple data streams by serial-to-parallel conversion. The one data stream can also be converted into multiple data streams by layer mapping similar to that in LTE. Then, these data streams are preprocessed to obtain multi-antenna data streams to be transmitted. The preprocessing comprises a space-time pre-coding operation (for example, multiplication with a pre-coding matrix or space-time coding or more). In order to estimate the channel state information, a transmitter inserts orthogonal reference signals into each link after the serial-to-parallel conversion (or layer mapping), and orthogonal reference signals are also used among different transmitters. The receiver estimates, according to the reference signals, the preprocessed equivalent channel state information. The receiver still employs the superposition, detection and decoding structure shown in FIG. 32. The specific structure is shown in FIG. 58. The received signals are processed by a multi-antenna and multi-user detector to obtain an estimated signal of each transmitting link. These signals will pass through parallel-to-serial conversion (or layer de-mapping) to obtain a data stream from one transmitter. This data stream will pass through symbol level complex de-spreading, bit level de-interleaving and channel decoding to obtain a data estimation of this transmitter. This data estimation as prior information will pass through bit level interleaving, symbol level complex spreading and serial-to-parallel conversion (or layer mapping) and is then input into the multi-antenna and multi-user detector to serve as the prior information for next iteration.

In order to distinguish data from different transmitters, different transmitters employ different bit level interleavers and/or symbol level complex spreading sequences. The specific mode for allocating bit level interleavers and/or symbol level complex spreading sequences can refer to the foregoing embodiments and will not be repeated here.

2. As shown in FIG. 59, M data streams are transmitted, and each data stream will pass through channel coding, bit level interleaving, modulation and symbol level complex spreading. In FIG. 59, the function of generating data based on bit level interleaving and symbol level complex spreading by a module is to process data streams by a mode as shown in FIG. 31. The processed data streams will pass through layer mapping and preprocessing, and are then transmitted by multiple antennas. One possible layer mapping and preprocessing mode is that both the layer mapping equivalent matrix and the preprocessing equivalent matrix are identity matrixes, that is, the processed data streams correspond to the transmitting antenna links one by one. In this mode, orthogonal reference signals are inserted into each data link for channel estimation of each data link. When in processing, the receiver regards each link as a different transmitter employing a single antenna. Data bit streams are detected by an iterative detection and decoding structure as shown in FIG. 32, and data streams from different users are distinguished by the bit level interleavers and/or symbol level complex spreading sequences.

In this embodiment of the present invention, the allocation of the bit level interleavers and the symbol level complex spreading sequences is informed in a lookup table manner to each transmitter by a broadcast channel, a physical downlink control channel or a physical downlink shared channel. In order to distinguish data streams from different users, the mode for allocating bit level interleavers and symbol level complex spreading sequences to different transmitters is as follows:
  a. different data streams from a same transmitter employ same bit level interleavers and different symbol level complex spreading sequences, and different transmitters employ different bit level interleavers; and, the receiver distinguishes data from different transmitters by bit level interleavers, and distinguishes different data streams from a same transmitter by symbol level complex spreading sequences; and
  b. different data streams from a same transmitter employ same symbol level complex spreading sequences and different bit level interleavers, and different transmitters employ different symbol level complex spreading sequences; and, the receiver distinguishes data from different transmitters by symbol level complex spreading sequences, and distinguishes different data streams from a same transmitter by bit level interleavers.

In this embodiment of the present invention, different data streams from different transmitters employ different bit level interleavers and different symbol level complex spreading sequences; and, the receiver distinguishes different data streams from each user by combinations of bit level interleavers and symbol level complex spreading sequences.

3. As shown in FIG. 60, multiple data streams are transmitted, and different data streams from a same transmitter will pass through phase and/or power adjustment, will be superposed, then will pass through serial-to-parallel conversion (or layer mapping) and preprocessing, and will be finally transmitted by multiple transmitting antennas.

In order to distinguish different data streams from different transmitters, it is needed to allocate bit level interleavers and symbol level complex spreading sequences for each data stream. The allocation mode refers to the solution described in the seventh specific embodiment, and will be informed to each transmitter by a physical broadcast channel, a physical downlink control channel and a physical downlink shared channel.

The purpose of the phase and/or power adjustment is to ensure that data streams from a same transmitter will not be overlapped or offset during superposition, and the specific adjustment mode refers to the sixth specific embodiment of the present invention. In order to estimate the equivalent channel state information of each link, it is needed to insert reference signals. The reference signals are inserted after serial-to-parallel conversion (or layer mapping), and preprocessed and then transmitted to the receiver, for estimating the preprocessed equivalent channel. After the phase and/or power adjustment, the receiver can detect a received signal by a mode as shown in FIG. 58, and distinguish different data streams from different transmitters according to the bit level interleavers and symbol level complex spreading sequences.

4. The combination of at least two of the above three modes is used. For example, parts of links will pass through direct mapping, while some links will pass through serial-to-parallel conversion, then layer mapping or more.

It is to be noted that, among the above modes, the second mode is more suitable for improving the data transmission rate, that is, the data transmission rate is improved in a mode for transmitting different data streams in different links; the first mode is more suitable for improving the transmission reliability, that is, the spatial diversity is obtained by space-time block coding, space-frequency block coding and other space-time coding methods thus to improve the transmission reliability; by the third mode, both the improvement of reliability and the improvement of data rate of transmission can be obtained, that is, the spatial diversity is obtained by space-time block coding, space-frequency block coding and other space-time coding methods and meanwhile the improvement of the data rate of transmission is obtained by the superposition of multiple data streams; and the fourth mode can be regarded as a compromise of reliability and the data rate of transmission.

In this embodiment of the present invention, when a transmitter can obtain the channel state information about a transmission channel by channel estimation or feedback or other modes, interference between different links of a same transmitter can be eliminated by pre-coding (for example, zero-forcing pre-coding) and other modes. This will greatly simplify the operations of the receiver. Meanwhile, the above various modes can all be used for improving the data transmission rate.

The present invention provides a transmitter, as shown in FIG. 61, comprising a channel coding module 3301, a processing module 3302 and a transmitting module 3303.

The channel coding module 3301 is configured to perform channel coding on an information bit sequence to determine a coded sequence.

The processing module 3302 is configured to perform bit level processing and symbol level processing on the coded sequence coded by the channel coding module 3301 to obtain a processed sequence.

The transmitting module 3303 is configured to transmit the processed sequence.

This embodiment of the present invention provides a transmitter. Compared with the existing transmitters, in this embodiment of the present invention, since a receiver decodes the received data by different symbol level processors and/or bit level processors, the data transmitted by different transmitters can be distinguished, and there will be no limitations from orthogonal time-frequency resources; furthermore, since transmitters process data by bit level processors and symbol level processors, it is advantageous for multiple transmitters to transmit data in same time-frequency resources. Thus, the receiver can simultaneously receive uplink data transmitted by multiple transmitters, and it is advantageous to share the same time-frequency resources to multiple transmitters. Accordingly, the number of servable transmitters is increased, and the number of users served by the receiver can be further increased.

The transmitter provided in this embodiment of the present invention can implement the method embodiments described above, and the specific function implementations refer to the descriptions in the method embodiments and will not be repeated here.

The present invention provides a receiver, as shown in FIG. 62, comprising a receiving module 3401 and a decoding module 3402, wherein:

The receiving module 3401 is configured to receive signals from multiple transmitters.

The signals are obtained by performing bit level processing and symbol level processing on data from each of multiple transmitters.

The decoding module 3402 is configured to decode the signals received by the receiving module 3401 according to a bit level processor and a symbol level processor corresponding to each transmitter to obtain data corresponding to the each transmitter.

This embodiment of the present invention provides a receiver. Compared with the existing receivers, in this embodiment of the present invention, since the receiver decodes the received data by different symbol level processors and/or bit level processors, the data transmitted by different transmitters can be distinguished, and there will be no limitations from orthogonal time-frequency resources; furthermore, since transmitters process data by bit level processors and symbol level processors, it is advantageous for multiple transmitters to transmit data in same time-frequency resources. Thus, the receiver can simultaneously receive uplink data transmitted by multiple transmitters, and it is advantageous to share the same time-frequency resources to multiple transmitters. Accordingly, the number of servable transmitters is increased, and the number of users served by the receiver can be further increased.

The receiver provided in this embodiment of the present invention can implement the method embodiments described above, and the specific function implementations refer to the descriptions in the method embodiments and will not be repeated here.

At present, an orthogonal reference signal design is employed in the LTE, that is, reference signals allocated to different terminals use orthogonal time-frequency resources or orthogonal reference signal sequences. For example, in the LTE-A, reference signals for downlink transmission use orthogonal time-frequency resources and shorter orthogonal cover codes; and, reference signals for uplink transmission use orthogonal sequences for distinguishing different reference signals. The orthogonal reference signals can provide higher accuracy of channel estimation; however, due to the limitation by the number of orthogonal resources, the orthogonal reference signals cannot provide a sufficient number of reference signals.

For non-orthogonal reference signals, sequences having low orthogonality (low sequence correlation) are used as reference signals, for example, PN sequences or more; or, the pilot frequency is used as a data layer, and the channel estimation and the data detection and decoding are performed by iterative channel estimation and decoding detection on the base station side. Since the number of non-orthogonal reference signals is not limited by the orthogonal resources, the number of reference signals that can be provided can be increased greatly. However, due to the limitation by the non-orthogonal characteristic, the use of non-orthogonal reference signals will influence the accuracy of channel estimation and thus influence the performance of data detection.

Hence, exiting reference signals in the LTE cannot provide the sufficient capacity of reference signals, so that the reference signals become a bottle for researches on the non-orthogonal multiple access technology.

In view of this problem, the embodiments of the present invention provide a design method for reference signals, in which reference signals for the non-orthogonal multiple access technology are designed with reference to the design characteristics of orthogonal and non-orthogonal reference signals; meanwhile, related signalings are designed to notify the corresponding reference signal allocation.

Specifically, an embodiment of the present invention provides a reference signal configuration method, as shown in FIG. 63, includes: step 110: configuring reference signals; and, step 120: transmitting configuration information of the reference signals, wherein the reference signals includes a first reference signal and a second reference signal, and there is a correspondence between the first reference signal and the second reference signal.

In the reference signal configuration method provided by this embodiment of the present invention, reference signals are configured, wherein the reference signals include a first reference signal and a second reference signal, and there is a correspondence between the first reference signal and the second reference signal. Thus, reference signals are configured by configuring a first reference signal and a second reference signal, so that the number of available reference signals is increased greatly, that is, the capacity of reference signals is improved, and a prerequisite is provided for the subsequent data transmission based on reference signals. Moreover, configuration information of the reference signals is transmitted, that is, the configuration information of the reference signals is notified to a UE, so that the UE can perform data transmission with a base station on the basis of the configuration information, and a reliable guarantee is provided for the UE to perform data transmission.

In addition, by the method provided by this embodiment of the present invention, the accuracy of channel estimation, the overhead of reference signals and the capacity of reference signals all can be taken into consideration, and the channel estimation as accurate as possible will be provided in the premise of providing an acceptable number of reference signals. In addition, the reference signal configuration method provided by this embodiment of the present invention is also applicable to a case where the number of borne terminals changes, and the method provides some flexible.

Preferably, the first reference signal is an orthogonal signal or a non-orthogonal signal; and/or, the second reference signal is an orthogonal signal.

Preferably, the second reference signal is discrete or sequential.

Preferably, the discrete second reference signal is distinguished in at least one of the following ways: frequency division, time division and code division; and, the sequential second reference signal is distinguished in at least one of the following ways: frequency division, time division, code division, cyclic shift, and comb-like structure.

Preferably, the correspondence includes: a correspondence between at least one of the following characteristic-related parameters of the second reference signal and the first reference signal: time-frequency resources, cyclic shift, comb-like structure and orthogonal cover code codeword.

Preferably, the step of configuring reference signals includes: configuring a reference signal resource pool; and, the step of transmitting configuration information of the reference signals includes: transmitting configuration information of the reference signal resource pool.

Preferably, the configuration information of the reference signals includes: characteristic-related parameters of the first reference signal, characteristic-related parameters of the second reference signal, and information about the correspondence between the first reference signal and the second reference signal.

Preferably, the characteristic-related parameters of the first reference signal includes at least one of the following: sequence cyclic shift, comb-like structure and orthogonal cover code codeword; and/or, when the second reference signal is a discrete reference signal, the characteristic-related parameters of the second reference signal includes at least one of the following: time-frequency resources, time-frequency resource allocation information and orthogonal cover code codeword; and, when the second reference signal is a sequential reference signal, the characteristic-related parameters of the second reference signal include at least one of the following: time-frequency resources, sequence cyclic shift, comb-like structure and orthogonal cover code codeword.

Preferably, the step of transmitting configuration information of the reference signals includes: notifying configuration information of the reference signals in any one of the following ways: an index, a combination of indexes, an index table and an index, and an index table and a combination of indexes.

Preferably, the configuration information of the reference signals is different due to the different number of bearable UEs or the different number of currently used ports.

Preferably, the reference signal configuration method further includes: notifying the number of bearable UEs or the number of currently used ports.

Preferably, the reference signal configuration method further includes: configuring a correspondence between the reference signals and multiple access resources, wherein the correspondence between the reference signals and multiple access resources includes a correspondence among the first reference signal, the second reference signal and the multiple access resources.

Preferably, the correspondence between the reference signals and multiple access resources includes the following situation: the first reference signal corresponds to a first multiple access resource information, and the second reference signal corresponds to a second multiple access resource information.

Preferably, the first multiple access resource information includes a bit-level interleaver, and the second multiple access resource information includes a grid mapping pattern; or, the first multiple access resource information includes a grid mapping pattern, and the second multiple access resource information includes a bit-level interleaver.

Preferably, the step of configuring a correspondence between the reference signals and multiple access resources includes: calculating indexes of the reference signals according to an index of the first reference signal and an index of the second reference signal; and configuring a correspondence between the indexes of the reference signals and multiple access resources.

Preferably, the reference signal configuration method further includes: configuring a multiple access resource pool, and transmitting configuration information of the multiple access resource pool, the multiple access resource pool includes any one of the following situations: a set of non-orthogonal multiple access time-frequency resources, and a correspondence between the reference signals and the set of non-orthogonal multiple access time-frequency resources; a set of orthogonal multiple access time-frequency resources, and a correspondence between the reference signals and the set of orthogonal multiple access time-frequency resources; and, a set of non-orthogonal multiple access time-frequency resources, a set of orthogonal multiple access time-frequency resources, a correspondence between the reference signals and the set of non-orthogonal multiple access time-frequency resources, and a correspondence between the reference signals and the set of orthogonal multiple access time-frequency resources.

Preferably, the step of configuring a reference signal resource pool includes any one of the following situations: configuring different first reference signals; configuring a same first reference signal and different second reference signals; configuring different first reference signals and a same second reference signal; and, configuring different first reference signals and different second reference signals.

Preferably, when the first reference signal occupies multiple symbols, a method for generating the first reference signals includes any one of the following situations: configuring different sequences for the symbols, respectively, and generating multiple first reference signals through different combinations of sequences of the symbols; configuring one sequence for the multiple symbols, and generating one first reference signal through the sequence; and, configuring one sequence for the multiple symbols, and generating multiple first reference signals through code division.

It is to be noted that, the first reference signal can specifically be a primary reference signal, and the second reference signal can specifically be a secondary reference signal; the step of configuring reference signals includes: configuring a reference signal resource pools; and, the step of transmitting configuration information of the reference signals includes: transmitting configuration information of the reference signal resource pool.

In view of the design of reference signals in 5G, an embodiment of the present invention provides a design method for reference signals. The design method includes the following flow.

A base station configures a primary reference signal and a secondary reference signal, respectively. That is, the base station configures a reference signal resource pool.

The base station transmits configuration information of the primary reference signal and the secondary reference signal to a terminal through a higher-layer signaling or a downlink control signaling. That is, the base station transmits configuration information of the reference signal resource pool.

The base station detects reference signals according to the configuration of the reference signals and the allocation of time-frequency resources, so as to perform channel estimation.

Wherein, this flow is shown in FIG. 64.

The embodiments of the present invention will be comprehensively described below in detail by the following preferred implementations.

Embodiment 1

In Embodiment 1, the configuring reference signals includes: configuring a reference signal resource pool, wherein the reference signals include a first reference signal and a second reference signal, and there is a correspondence between the first reference signal and the second reference signal; the first reference signal is an orthogonal signal or a non-orthogonal signal, and/or the second reference signal is an orthogonal signal; the second reference signal can be a discrete reference signal or a sequential reference signal; wherein the discrete second reference signal can be distinguished by at least one of frequency division, time division and code division, and the sequential second reference signal can be distinguished by at least one of frequency division, time division, code division, cyclic shift and comb-like structure; and, the correspondence between the first reference signal and the second reference signal includes: a correspondence between at least one of following characteristic-related parameters of the second reference signal and the first reference signal: time-frequency resources, cyclic shift, comb-like structure, and orthogonal cover code codeword.

In Embodiment 1, a design method for reference signals will be described with reference to a specific system. In Embodiment 1, it is assumed that the system employs a non-orthogonal multiple access technology, that is, different terminals use non-orthogonal or incompletely-orthogonal time-frequency resources or other multiple access resources to perform uplink data transmission or downlink data reception. Meanwhile, it is assumed that it is necessary to transmit uplink data by a terminal, and a base station serves multiple terminals on the same time-frequency resources.

In the method provided in Embodiment 1, the reference signals are mapped in two parts. The first part of reference signals is sequential reference signals, that is, different terminals are distinguished by different sequences. The other part of reference signals is secondary reference signals which occupy time-frequency resources discretely or successively. That is, the secondary reference signals can be discrete secondary reference signals which occupy time-frequency resources which are discrete in the frequency domain or discrete in the time domain, or can be sequential secondary reference signals which occupy time-frequency resources which are successive in the frequency domain. Wherein, in Embodiment 1, the detailed description will be given by taking discrete secondary reference signals as example. FIG. 65 shows a schematic diagram of the two parts of reference signals.

Wherein, the first part of reference signals is called primary reference signals which can be located in the front, middle or tail of a time unit (e.g., a subframe, a slot, a mini slot or more). By taking the primary reference signals being located in the front of the time unit as example, the primary reference signals occupy k symbols, where k is not less than 1. Each symbol occupies all the bandwidth allocated to a terminal using the non-orthogonal multiple access technology. If k is greater than 1, that is, multiple symbols are allocated for the primary reference signals, the allocation method can include the following three situations.

a. Each symbol is an independent sequence, and multiple reference signals are provided by different combinations of sequences of the symbols. It is to be noted that, a transmission mode in which only one of multiple available symbols is occupied and other symbols are null is a particular case of this method.

b. One of multiple sequences is mapped to multiple symbols, that is, time-frequency resources for the multiple symbols are used for bearing one sequence, and one primary reference signal is generated through this sequence.

c. The orthogonality between sequences is provided by code division, that is, a same sequence is transmitted by multiple symbols, and different primary reference signals are provided through different orthogonal cover code codewords.

Wherein, FIG. 66 shows the brief description of the above three allocation methods.

It is to be noted that, in the method c in FIG. 66, for a certain reference signal, when this reference signal uses only one symbol, other symbols are null; however, other reference signals may occupy symbols identical to or different from the symbol occupied by the certain reference signal.

In addition, the primary reference signals use orthogonal or quasi-orthogonal sequences. For example, Zadoff-Chu (ZC) sequences and different cyclic shifts are used, and multiple orthogonal sequences are provided by utilizing the orthogonal characteristics between the ZC sequences and the cyclic shifts; or, Pseudo-Noise (PN) sequences are employed, and multiple quasi-orthogonal sequences are provided by using different cyclic shifts.

It is to be noted that, identical or different primary reference signals can be allocated to different terminals on the basis of the configured reference signal resource pool; and, for terminals allocated with identical primary reference signals, channels need to be further distinguished by using the secondary reference signals. The secondary reference signals can be discrete reference signals in order to reduce the overhead of the reference signals. Different reference signals can be distinguished by frequency division and/or time division and/or code division. Specifically, different secondary reference signals can be provided in the following ways.

a. Different secondary reference signals are distinguished by frequency division and/or time division. For example, different secondary reference signals occupy non-overlapped time-frequency resources.

b. Different secondary reference signals are distinguished by time division and/or frequency division and/or code division. That is, different secondary reference signals can use identical time-frequency resources and different orthogonal cover code codewords which are orthogonal with each other.

The two methods for providing different secondary reference signals are shown in FIG. 67. The example shown in FIG. 67 is an example of providing two secondary reference signals. Wherein, in the method a, each secondary reference signal uses one of the two time-frequency resources; while in the method b, each secondary reference signal occupies both the two time-frequency resources and uses orthogonal cover code codewords which are orthogonal with each other, wherein one orthogonal cover code codeword is +1, +1, and the other cover code codeword is +1, −1.

Each primary reference signal corresponds to a group of secondary reference signals, and the correspondence can be time-frequency resources or a combination of time-frequency resources and orthogonal cover codes. For example, one possible correspondence is as follows: one primary reference signal corresponds to a combination of time-frequency resources, and the secondary reference signals on the time-frequency resources are used for distinguishing different channels; and, different primary reference signals correspond to non-overlapped time-frequency resources, and the locations of secondary reference signals corresponding to other primary reference signals are null, that is, the other primary reference signals are not used for data transmission. FIG. 68 shows a schematic structure diagram of this way.

Another possible correspondence is as follows: one primary reference signal corresponds to a combination of time-frequency resources and orthogonal cover code codewords. In this case, multiple primary reference signals may be mapped to a same combination of time-frequency resources. Different secondary reference signals corresponding to the primary reference signals need to be distinguished by orthogonal cover code codewords or a set of orthogonal cover code codewords. That is, the primary reference signals correspond to secondary reference signals indicated by different orthogonal cover code codewords or different sets of orthogonal cover code codewords. For example, primary reference signals 1 and 2 correspond to the same secondary reference signal time-frequency resources, wherein the orthogonal cover code codeword corresponding to the primary reference signal 1 is a codeword 0 to 1, and the orthogonal cover code codeword corresponding to the primary reference signal 2 is a codeword 2 to 3. Other primary reference signals correspond to other secondary reference signals which are transmitted by other time-frequency resources not overlapped with the secondary reference signal time-frequency resources corresponding to the two primary reference signals.

Another possible correspondence is as follows: secondary reference signals corresponding to multiple primary reference signals use a certain same time-frequency resource, and different primary reference signals correspond to non-overlapped sets of orthogonal cover code codewords.

It is to be noted that, the correspondence can be understood as follows: a certain characteristic (e.g., time-frequency resources, orthogonal cover code codewords or more) of the secondary reference signals can be determined by the primary reference signals.

In addition to that the discrete secondary reference signals are distinguished by orthogonal cover codes, the second secondary reference signals can be sequential reference signals. In this case, different secondary reference signals can be distinguished by the cyclic shift, the comb-like structure or more. In comparison with the solution in which the orthogonal cover code codeword is employed, in this solution, the orthogonal cover code codeword is replaced with a cyclic shift and/or a comb-like structure and/or an orthogonal cover code codeword.

The number of bearable terminals in the system is adjusted by changing the number of secondary reference signals corresponding to the primary reference signals; or, the number of secondary reference signals corresponding to the primary reference signals is changed according to the number of terminals to be borne in the system, and the number of available reference signals is thus adjusted. For example, when there are few terminals to be borne and the primary reference signals can satisfy the number of the borne terminals, the secondary reference signals are not needed; when the number of terminals to be borne is increased, since the number of borne terminals cannot be satisfied by only using the primary reference signals, the secondary reference signals are added to increase the number of available reference signals; and, when the number of terminals to be borne is increased continuously, a larger amount of secondary reference signals are used to bear more terminals.

It is to be noted that, the above process can be realized by measuring the number of loads of an access network, using the number of loads as a threshold and adjusting the configuration of the secondary reference signals according to the threshold. Specifically, a first threshold for the number of network loads is set, and only the primary reference signals are configured if the actual number of loads is less than the first threshold; if the actual number of loads is not less than the first threshold but less than a preconfigured second threshold, both the primary reference signals and the secondary reference signals are configured; and, if the actual number of loads is not less than the second threshold but less than a preconfigured third threshold, the primary reference signals and secondary reference signals with higher density are configured. Similarly, secondary reference signals of a different density are configured for a different number of network loads, to bear a different number of terminals.

The configuration content is configured by a higher-layer signaling or a downlink control channel. Meanwhile, the configuration content is applicable to a case of configuring reference signals for a single terminal or multiple terminals.

Embodiment 2

In Embodiment 2, the configuration information of the reference signals includes: characteristic-related parameters of the first reference signal, characteristic-related parameters of the second reference signal, and information about the correspondence between the first reference signal and the second reference signal. The characteristic-related parameters of the first reference signal include at least one of the following: sequence cyclic shift, comb-like structure and orthogonal cover code codeword; and/or, when the second reference signal is a discrete reference signal, the characteristic-related parameters of the second reference signal includes at least one of the following: time-frequency resources, time-frequency resource allocation information and orthogonal cover code codeword; and, when the second reference signal is a sequential reference signal, the characteristic-related parameters of the second reference signal includes at least one of the following: time-frequency resources, sequence cyclic shift, comb-like structure and orthogonal cover code codeword. The transmitting configuration information of the reference signals includes: notifying configuration information of the reference signals in any one of the following ways: an index, a combination of indexes, an index table and an index, and an index table and a combination of indexes. Meanwhile, the configuration information of the reference signals is different due to the different number of bearable UEs or the different number of currently used ports. During the notification of the configuration information of the reference signals, the number of bearable UEs or the number of currently used ports can also be notified.

In Embodiment 2, a design method for reference signals will be described with reference to a specific system. In Embodiment 2, the design method for reference signals described in Embodiment 1 is employed, that is, the reference signals include primary reference signals and secondary reference signals. In Embodiment 2, the notification and configuration method in the design method for reference signals will be described. The method employed in Embodiment 2 is also applicable to the notification and configuration of uplink reference signals and downlink reference signals.

In the design method for reference signals provided by this embodiment of the present invention, since the reference signals includes primary reference signals and secondary reference signals, during the configuration of reference signals, the parameters to be configured includes: characteristic-related parameters of the primary reference signals and characteristic-related parameters of the secondary reference signals.

Specifically, the characteristic-related parameters of the primary reference signals include at least one of the following: the sequence cyclic shift used by the primary reference signals, the comb-like structure used by the primary reference signals, and the orthogonal cover code codeword used by the primary reference signals. If there is only one symbol used for transmitting primary reference signals, the characteristic-related parameters of the primary reference signals can be indicated by the combination of the above three characteristics. For example, an index table containing the three characteristics is defined or configured (that is, each index in the index table contains a possible combination of the cyclic shift, the comb-like structure and the orthogonal cover code codeword), an index corresponding to each combination is defined, and a primary reference signal is notified and configured by the index. As another possible implementation, different characteristic-related parameters are configured and notified by independent indexes, that is, each characteristic-related parameter corresponds to an index table, and a primary reference signal is configured and notified by a combination of indexes of each index table.

If there are multiple symbols used for transmitting primary reference signals, the notification and configuration method will be different according to the structure of the selected primary reference signal. If the primary reference signals are generated by employing multiple sequences, the characteristic-related parameters of each sequence need to be notified and configured, that is, each sequence is configured by using an independent index. For example, for a primary reference signal consisting of N sequences, the configuration is performed by using the N indexes. Wherein, the characteristic-related parameters of the N sequences can also be described by a unified index. In this case, each primary reference signal uses one index to describe the characteristic-related parameters. In this configuration mode, it is possible to define only one index table to describe the characteristic-related parameters of the primary reference signals, wherein each index in the index table contains a possible combination of the cyclic shift, the comb-like structure and the orthogonal cover code codeword, and the characteristic-related parameters of each primary reference signals are described by one index. In addition, it is also possible to define a set of index tables for describing the characteristic-related parameters of the primary reference signals, wherein each index table is used for describing one characteristic-related parameter of the sequences used by the primary reference signals. For example, an index table 1 is defined to describe the cyclic shift, an index table 2 is defined to describe the comb-like structure, and an index table 3 is defined to describe the orthogonal cover code codeword. During the notification and configuration of the primary reference signals on each symbol, the characteristic-related parameters of the primary reference signals are described by a combination of indexes containing the indexes in each index table. Meanwhile, multiple sequences forming the primary reference signals can also be described by employing N combinations of indexes.

If the primary preference signals are generated by mapping one sequence to multiple symbols, it is only necessary to define one index table or a set of index tables containing the characteristic-related parameters of the primary reference signals, and the notification and configuration are performed by an index or a set of indexes.

If the primary reference signals are generated by code division (i.e., by employing orthogonal cover code codewords), it is possible to define an index table containing the cyclic shift, comb-like structure and orthogonal cover code codewords used by the primary reference signals, and the primary reference signals are notified and configured by an index. As another possible implementation, multiple index tables containing the characteristic-related parameters of the sequences used for describing the primary reference signals are defined. For example, an index table containing the cyclic shift and the comb-like structure is defined to describe the characteristics of the sequences used by the primary reference signal; and meanwhile, an index table for describing the orthogonal cover code codeword is further defined, and the used orthogonal cover code codeword is notified and configured by the index. For another example, each characteristic-related parameter uses an independent index table respectively, and the used cyclic shift, comb-like structure and orthogonal cover code codeword are notified and configured by indexes.

The contents to be notified of the secondary reference signals includes a correspondence between the secondary reference signals and the primary reference signals, and characteristic-related parameters of the secondary reference signals. Considering that the overhead of the secondary reference signals may be different when the number of borne terminals is different, the notification and configuration of the secondary reference signals need to consider the secondary reference signal design used when the number of borne terminals is different. That is, the configuration information of the reference signals is different due to the different number of bearable UEs and the different number of currently used ports.

As a simple implementation, the structure of the secondary reference signals, only when the number of borne terminals is maximal, is defined. For example, as a possible implementation, during the configuration of the primary reference signals, the time-frequency resource locations for the corresponding secondary reference signals are configured at the same time; in addition, the characteristic-related parameters of the secondary reference signals are configured and notified independently. Since there may be multiple time-frequency resource locations used for transmitting the secondary reference signals, it is necessary to predefine possible time-frequency resource locations and mark a serial number (or an index) for each possible time-frequency resource location; and during the configuration of primary reference signals, the time-frequency resource locations for secondary reference signals corresponding to the primary reference signals are configured at the same time.

FIG. 69 shows a possible example of the above description.

In FIG. 69, there are four possible time-frequency resource locations for secondary reference signals within a time unit (for example, a subframe, a slot or a mini slot), and the four possible time-frequency resource locations are numbered according to the time priority (indexes 1 to 4 in FIG. 68). Considering that each available time-frequency resource location for secondary reference signals contains two adjacent resource elements in the example of FIG. 69, each time-frequency resource location for secondary reference signals can support four different reference signals by orthogonal cover codes. It is to be noted that, each secondary reference signal uses only one time-frequency location therein, and the unused time-frequency resource locations are null and not used for data transmission.

In the method for notifying and configuring the sequences used by the primary reference signals by a single index, additional fields can be added in the index table to configure the time-frequency resource locations for secondary reference signals. Specifically, the index table contains the characteristic parameters of the primary reference signals and the indexes of the time-frequency resource locations for the corresponding secondary reference signals. The specific characteristic-related parameters (e.g., orthogonal cover code codewords) of the secondary reference signals can be configured and notified by an additional index table. For example, the used orthogonal cover cod codewords are configured and notified by an independent index table.

In the above way, the reference signals are configured and notified by two indexes (i.e., an index of the primary reference signals and an index of the secondary reference signals). Wherein, the index of the primary reference signals is used for configuring the characteristic-related parameters of the primary reference signals and the time-frequency resource locations for the secondary reference signals corresponding to the primary reference signals; and, the index of the secondary reference signals is used for configuring the characteristic-related parameters (e.g., orthogonal cover code codewords) of the secondary reference signals.

In the above way, it can be ensured that the transmission of reference signals and the channel estimation on the base station side can be performed by a proper combination of primary reference signals and secondary reference signals no matter how the number of borne terminals changes, and the configuration and notification are also simple. However, this simple way will result in the waste of resources during the allocation. For example, as shown in FIG. 69, at most 16 terminals are borne in the system, and there are total four primary reference signals; and, each primary reference signal corresponds to one time-frequency resource location for secondary reference signals, and each time-frequency resource location for secondary reference signals can support four secondary reference signals. Although at most 16 terminals can be borne in this configuration mode, when there are few loads in the system, the requirements of the borne terminals can be satisfied by using only the primary reference signals, and the time-frequency resource locations for secondary reference signals still need to be reserved, so that the waste of resources is caused.

To reduce the waste of time-frequency resources, the number of available time-frequency resources for the secondary reference signals can be adjusted according to the number of terminals to be borne. Specifically, different time-frequency resource locations for secondary reference signals can be defined according to the maximum number of bearable terminals. FIG. 70 shows a simple example.

In the example of FIG. 70, when there are few terminals, there are few terminals to be borne within each time unit, and the reference signals can be configured by an example a; however, when there are many terminals, the number of secondary reference signals can be adjusted according to the number of terminals to be borne, and the configuration is performed by an example b, c or d.

During the notification, the time-frequency resource locations for secondary reference signals need to be selected from the characteristic-related parameters of the primary reference signals according to the number of borne terminals. Table 5 shows a simple example.

TABLE 5

Schematic index table of the primary reference signals

| Index | Characteristics of the primary reference signals | Time-frequency resource location for secondary reference signals | | |
|---|---|---|---|---|
| | | Max. 2 | Max. 4 | Max. 8 |
| 0 | Combination 0 of characteristics | — | 0 | 0 |
| 1 | Combination 1 of characteristics | — | 0 | 1 |
| 2 | Combination 2 of characteristics | — | 1 | 2 |
| ... | ... | ... | ... | ... |

In the example shown in Table 5, Max.2 and Max.4 represent a case where the maximum number of borne terminals is 2 and a case where the maximum number of borne terminals is 4, respectively. Wherein, when the maximum number of borne terminals is 2, the requirements of the borne terminals can be satisfied by using only the primary reference signals, so that it is not necessary to use the secondary reference signals. It is to be noted that the maximum number of borne terminals can also be represented by other related terms, such as the number of ports. During the notification of the configuration of the reference signals, the maximum number of borne terminals or the number of ports needs to be notified at the same time, wherein the number of ports is preconfigured by the base station.

In this way, during the configuration of orthogonal cover code codewords, it is also necessary to configure the orthogonal cover code codewords according to the maximum number of borne terminals and the number of ports. Table 6 shows a simple example.

TABLE 6

Schematic notification of orthogonal cover code codewords

| | Orthogonal cover code codeword | | |
|---|---|---|---|
| Index | Max. 2 | Max. 4 | ... |
| 0 | — | [+1 +1] | ... |
| 1 | — | [+1 −1] | ... |
| 2 | — | [+1 +1] | ... |
| ... | ... | ... | ... |

In the example shown in Table 6, if the maximum number of borne terminals or the number of ports is 2, it is not necessary to use orthogonal cover codes; and, when the maximum number of borne terminals is increased, orthogonal cover code codewords having a length of 2 or orthogonal cover code codewords having a larger length are used. In this way, during the notification and configuration of the reference signals, the parameters to be transmitted includes the indexes of the primary reference signals, the indexes of the secondary reference signals, and the maximum number of borne terminals or the number of ports.

In another configuration and notification method, the indexes of the time-frequency resource locations for the secondary reference signals and the indexes of the characteristic-related parameters of the secondary reference signals are configured at the same time That is, an index table is preconfigured to describe the indexes of the time-frequency resource locations of the secondary reference signals and the used orthogonal cover code codewords. Table 7 shows a simple example.

TABLE 7

Schematic indexes of the secondary reference signals

| Index | Time-frequency resource location | Orthogonal cover code codeword |
|---|---|---|
| 0 | 0 | [+1 +1] |
| 1 | 0 | [+1 −1] |
| 2 | 1 | [+1 +1] |
| 3 | 1 | [+1 −1] |
| ... | ... | ... |

In Table 7, the time-frequency resource locations for the secondary reference signals and the orthogonal cover codes are notified at the same time.

Similar to the above examples, the time-frequency resource locations and the characteristic-related parameters of the secondary reference signals are determined by the maximum number of bearable terminals or the number of ports. That is, the time-frequency resource locations of the secondary reference signals determined according to the maximum number of bearable terminals or the number of ports and the corresponding orthogonal cover code codewords are added in a same index table. Table 8 shows a simple example.

TABLE 8

Determining secondary reference signals according to the number of ports

| | Max. 2 | | Max. 4 | | Max. 8 | | |
|---|---|---|---|---|---|---|---|
| Index | Time-frequency resource location | Orthogonal cover code | Time-frequency resource location | Orthogonal cover code | Time-frequency resource location | Orthogonal cover code | ... |
| 0 | — | — | 0 | [+1 +1] | 0 | [+1 +1 +1] | ... |
| 1 | — | — | 0 | [+1 −1] | 0 | [+1 +1 −1] | ... |
| 2 | — | — | 1 | [+1 +1] | 0 | [+1 −1 −1] | ... |
| 3 | — | — | 1 | [+1 −1] | 0 | [+1 −1 +1] | ... |
| ... | ... | ... | ... | ... | ... | ... | ... |

Wherein, different secondary reference signals are used according to the different number of ports. For example, if the number of ports is 2, no secondary reference signal is used, that is, there is no additional time-frequency resource location for secondary reference signals; if the number of ports is 4, each of the used time-frequency resources for the secondary reference signals contains two resource elements, and orthogonal cover code codewords having a length of 2 are used; and, if the number of ports is 8, each of the used time-frequency resources for the secondary reference signals contains three resource elements, and orthogonal cover code codewords having a length of 3 are used.

This method is also applicable to the notification and configuration of the primary reference signals by using a combination of indexes.

In the notification and configuration method using an index table, the index table can be directly notified, or the notification and configuration are performed by using an index table and corresponding indexes or a combination of indexes. Although the signaling overhead is large in this method, the configuration and notification are more flexible. In other words, in practical applications, as required, the configuration information of the reference signals can be notified in any one of the following ways: an index, a combination of indexes, an index table and an index, and an index table and a combination of indexes.

In other notification and configuration methods, the related information of the time-frequency resource locations for the secondary reference signals is notified independently. The related information can be configured by a preconfigured index table. For example, an index table containing the related information of time-frequency resource locations is preconfigured, and the time-frequency resource locations for the secondary reference signals of the terminal are indicated by notifying an index; or, the time-frequency resource locations for the secondary reference signals are determined jointly according to the index and the number of points (the maximum number of borne terminals).

This method can be combined with the terminal grouping to provide a greater gain for the system. Specifically, terminals are grouped according to the difference in channel state information. The difference in intra-group channel state information is small, while the difference in inter-group channel state information is large. During the allocation of reference signals, terminals in a same group use the same primary reference signals, and the terminals in this group are distinguished by secondary reference signals.

In addition to that the discrete secondary reference signals are distinguished by orthogonal cover code codewords, the secondary reference signals can be sequential reference signals. In this case, different secondary reference signals can be distinguished by the cyclic shift, the comb-like structure, the orthogonal cover code or more. In comparison with the solution in which the orthogonal cover code codeword is used, in this solution, the orthogonal cover code codeword is replaced with a cyclic shift, a comb-like structure, an orthogonal cover code codeword, a combination of any two of the three or a combination of the three.

In the configuration and notification method, it is necessary to configure a correspondence between the primary reference signals and the secondary reference signals. The parameter used for notifying the correspondence between the primary reference signals and the secondary reference signals can be interpreted as information about the correspondence between the primary reference signals and the secondary reference signals.

In other notification and configuration methods, the primary reference signals and the secondary reference signals can also be configured respectively. Therefore, the correspondence between the primary reference signals and the second reference signals are not notified and configured. Wherein, the method for configuring the primary reference signals and the secondary reference signals can be the method described in this embodiment.

The configuration information can be configured by a higher-layer signaling or downlink control information. The configuration content is applicable to a case of configuring reference signals for a single terminal or multiple terminals.

Embodiment 3

In Embodiment 3, a correspondence between reference signals and multiple access resources is configured, wherein the correspondence between reference signals and multiple access resources includes a correspondence among the first reference signal, the second reference signal and the multiple access resources. The correspondence between reference signals and multiple access resources includes the following situation: the first reference signal corresponds to a first multiple access resource information, and the second reference signal corresponds to a second multiple access resource information. The first multiple access resource information includes a bit-level interleaver, and the second multiple access resource information includes a grid mapping pattern; or, the first multiple access resource information includes a grid mapping pattern, and the second multiple access resource information includes a bit-level interleaver. The configuring a correspondence between the reference signals and multiple access resources includes: calculating indexes of the reference signals according to an index of the first reference signal and an index of the second reference signal; and configuring a correspondence between the indexes of the reference signals and multiple access resources.

In Embodiment 3, a method for designing reference signals applicable to a non-orthogonal multiple access technology will be described with reference to a specific system. In this embodiment, it is assumed that the system uses a non-orthogonal multiple access technology during the uplink data transmission, and allocates dedicated time-frequency resources for the non-orthogonal multiple access technology. That is, the system allocates dedicated resources, and multiple terminals transmit data on the time-frequency resources by the non-orthogonal multiple access technology.

The uplink data transmission employing the non-orthogonal multiple access technology can be scheduling-based data transmission or scheduling-free data transmission. If the scheduling-free data transmission is employed, a base station needs to blindly detect the received signals, to determine terminals for transmitting data and the data transmitted by these terminals. To simplify the blind detection process on the base station side, a correspondence between reference signals and multiple access resources needs to be established. The base station determines the reference signals used by the terminals by performing energy detection on the reference signals, so as to further determine multiple access resources which correspond to the used reference signals and are being used. Wherein, the multiple access resources include identifiers based on the non-orthogonal multiple access technology for distinguishing terminals, for example, a codebook, a spread spectrum sequence, an interleaver, a scrambler or more.

In Embodiment 3, the detection flow can be depicted in FIG. 71.

For a non-orthogonal multiple access technology, such as Interleaved-Grid Multiple Access (IGMA), a correspondence between the multiple access resources provided by the present invention and the reference signals provided by the present invention may be as follows.

The primary reference signals correspond to bit-level interleavers, and the secondary reference signals correspond to grid mapping patterns.

Specifically, the bit-level interleavers are numbered, and the serial numbers are known on both the base station side and the terminal side. Meanwhile, the primary reference signals are numbered or indexed. The serial number or index of a primary reference signal can be calculated according to the indexes of the primary reference signals in the foregoing embodiment (if the primary reference signals are notified and configured by a single index table) or according to a combination of indexes of the characteristic-related parameters of the primary reference signals. As a simple example, if the primary reference signals are configured by two index tables, i.e., an index table of the cyclic shift and an index table of the comb-like structure, and the corresponding configured indexes are $n_{cs}$ (which denotes the cyclic shift) and $n_{comb}$ (which denotes the comb-like structure), the index $n_{pri}$ of a primary reference signal can be calculated by:

$$n_{pri}=K_{cs}n_{comb}+n_{cs}$$

where the parameter $K_{cs}$ denotes the number of cyclic shifts. Or, the $n_{pri}$ can be expressed by:

$$n_{pri}=K_{comb}n_{cs}+n_{comb}$$

where the parameter $K_{comb}$ denotes the number of comb-like structures.

A one-to-one correspondence is established between the indexes $n_{pri}$ of the primary reference signals and the indexes of the bit-level interleavers. When a terminal selects a primary reference signal having a certain index or a base station configures a primary reference signal having a certain index, it is indicated that the bit-level interleaver corresponding to this primary reference signal is also selected.

Meanwhile, a correspondence is established between the secondary reference signals and the grid mapping. Specifically, grid mapping patterns are numbered (or indexed) by pre-configuration, by notification through a higher-layer signal or by notification through a downlink control channel. Meanwhile, the secondary reference signals are also numbered (or indexed). During the numbering of the secondary reference signals, the time-frequency resource locations and the used orthogonal cover code codewords also need to be taken into consideration. If no orthogonal cover code codewords are used, the serial numbers (or indexes) of the secondary reference signals are consistent with the time-frequency resource locations for the secondary reference signals; however, if orthogonal cover code codewords are employed, both the indexes of the time-frequency resource locations and the indexes of the orthogonal cover code codewords need to be taken into consideration during the numbering of the secondary reference signals. If the indexes of the time-frequency resource locations are denoted by $n_{tf}$ and the indexes of the orthogonal cover code codewords are denoted by $n_{occ}$, the indexes $n_{sec}$ of the secondary reference signals can be calculated by:

$$n_{sec}=K_{occ}n_{tf}+n_{occ}$$

where $K_{occ}$ denotes the number of orthogonal cover code codewords.

Or:

$$n_{sec}=K_{tf}n_{occ}+n_{tf}$$

where $K_{tf}$ denotes the number of time-frequency resource locations for the secondary reference signals.

A one-to-one correspondence is established between the indexes $n_{sec}$ of the secondary reference signals and the indexes of the grid mapping patterns. When a terminal selects a secondary reference signal having a certain index or a base station configures a secondary reference signal having a certain index, it is indicated that the grid mapping pattern corresponding to this secondary reference signal is also selected.

In addition to the above way, it is also possible to establish a one-to-one correspondence between the primary reference signals and the grid mapping patterns and establish a one-to-one correspondence between the secondary reference signals and the bit-level interleavers.

When a terminal selects a primary reference signal having a certain index or a base station configures a primary reference signal having a certain index, it is indicated that the grid mapping pattern corresponding to this primary reference signal is also selected. When a terminal selects a secondary reference signal having a certain index or a base station configures a secondary reference signal having a certain index, it is indicated that the bit-level interleaver corresponding to this secondary reference signal is also selected.

It is to be noted that the mapping method is applicable to a method for distinguishing terminals by two-level multiple access resources. For example, a one-to-one correspondence is established between the primary reference signals and the multiple access resources for distinguishing terminals in the first level, and a one-to-one correspondence is also established between the secondary reference signals and the multiple access resources for distinguishing terminals in the second level. When a terminal selects a primary reference signal having a certain index or a base station configures a primary reference signal having a certain index, it is indicated that the corresponding multiple access resource for distinguishing terminals in the first level is selected. When a terminal selects a secondary reference signal having a certain index or a base station configures a secondary reference signal having a certain index, it is indicated that the corresponding multiple access resource for distinguishing terminals in the second level is selected.

For the non-orthogonal multiple access technology for distinguishing terminals by a single multiple access resource, the correspondence between the reference signals and the multiple access resources can be established in the following way. Firstly, the indexes of the reference signals are calculated according to the indexes of the primary reference signals and the indexes of the secondary reference signals. Specifically, if the indexes of the primary reference signals are denoted by $n_{pri}$ and the indexes of the secondary reference signals are denoted by $n_{sec}$, the indexes of the reference signals can be calculated by:

$$n_{RS}=K_{sec}n_{pri}+n_{sec}$$

where $K_{sec}$ denotes the number of the secondary reference signals.
Or:

$$n_{RS}=K_{pri}n_{sec}+n_{pri}$$

where $K_{pri}$ denotes the number of the primary reference signals.

After the indexes of the reference signals are obtained, a one-to-one correspondence between the indexes of the reference signals and the multiple access resources is established.

It is to be noted that this method is also applicable to a multidimensional non-orthogonal multiple access method like IGMA. For the multidimensional non-orthogonal multiple access method, it is only necessary to calculate the indexes of corresponding multiple access resources according to the indexes of the multiple access resources in each dimension, and then associate indexes of the corresponding reference signals.

Additionally, in the multidimensional non-orthogonal multiple access method like IGMA, in addition that the correspondence between the reference signals and the multiple access resources is configured by corresponding indexes, in a case of distinguishing terminals in a certain dimension by only using multiple access resources in another dimension, it is also possible to establish a correspondence between the indexes of the reference signals and the indexes of the multiple access resources for distinguishing terminals. For example, if the bit-level interleavers in the IGMA are fixed, identical bit-level interleavers and different grid mapping patterns are allocated to terminals for performing data transmission on identical time-frequency resources. In this case, a correspondence between the indexes of the grid mapping patterns and the indexes of the reference signals is established. In another possible implementation, if the grid mapping patterns in the IGMA are fixed, identical grid mapping patterns and different bit-level interleavers are allocated to terminals for performing data transmission on identical time-frequency resources. In this case, a correspondence between the indexes of the bit-level interleavers and the indexes of the reference signals is established.

The correspondence is notified and configured by a higher-layer signaling or a downlink control channel. As a simple implementation, a calculation method for the indexes is predefined, and a correspondence is determined by the predetermined method which is known by both the base station and the terminal, so that the multiple access resources corresponding to the corresponding reference signals are obtained.

Embodiment 4

In Embodiment 4, a multiple access resource pool is configured, and configuration information of the multiple access resource pool is transmitted, wherein the multiple access resource pool includes any one of the following situations: a set of non-orthogonal multiple access time-frequency resources, and a correspondence between the reference signals and the set of non-orthogonal multiple access time-frequency resources; a set of orthogonal multiple access time-frequency resources, and a correspondence between the reference signals and the set of orthogonal multiple access time-frequency resources; and, a set of non-orthogonal multiple access time-frequency resources, a set of orthogonal multiple access time-frequency resources, a correspondence between the reference signals and the set of non-orthogonal multiple access time-frequency resources, and a correspondence between the reference signals and the set of orthogonal multiple access time-frequency resources.

In Embodiment 4, a method for designing reference signals suitable for a non-orthogonal multiple access technology will be described with reference to a specific system. In Embodiment 4, the application of the method of the present invention in a scheduling-free system and the allocation method for multiple access resources will be described.

The multiple access resources in the scheduling-free systems are allocated by the following two methods.

1. A multiple access resource pool is configured by a higher-layer signaling or a downlink control channel. A terminal equiprobably selects, from the multiple access resource pool, a multiple access resource for uplink data transmission.

2. Multiple access resources for scheduling-free transmission are configured semi-statically. A terminal performs data transmission by using the configured multiple access resources.

The first method of the two methods is applicable to terminals in the connected state, or the non-activated state or even the idle state, and even the uplink synchronization (i.e., the random access process) can be cancelled, so that the signaling overhead can be reduced more effectively. However, since a terminal randomly selects, from the multiple access resource pool, resources for uplink data transmission, the probability of collision cannot be controlled by the base station. In the second method, since a terminal needs to operate in the RRC_CONNECTED state, the degree of reduction of the signaling overhead is slightly lower than the degree of reduction of the signaling overhead in the first method. However, since the multiple access resources are controlled and allocated by the base station, the probability of collision is controllable, and the base station can dynamically or semi-statically adjust the allocation of multiple access resources according to the load condition.

In the method for designing reference signals provided by this embodiment of the present invention, the method for allocating multiple access resources for scheduling-free uplink data transmission is as follows.

The first method for allocating multiple access resources will be as follows.

The multiple access resource pool includes the following several possible situations: a set of time-frequency resources for non-orthogonal multiple access and a set of reference signals, or a set of time-frequency resources for orthogonal multiple access and a set of reference signals, or a set of time-frequency resources for non-orthogonal multiple access, a set of time-frequency resources for orthogonal multiple access and a set of reference signals. Wherein, it is necessary to provide the specific configuration of the reference signals to obtain the indexes of the reference signals, so that it is convenient to establish a correspondence between the reference signals and the multiple access resources.

Specifically, in the method provided by this embodiment of the present invention, the set of reference signals and the multiple access pool can be configured, respectively. Wherein, during the configuration of the reference signals, primary reference signals and corresponding secondary reference signals are configured, respectively. The corresponding reference signals and multiple access resources are selected according to the correspondence between the reference signals and the multiple access resources, which is predetermined or configured by the base station. The configuring the set of reference signals includes: configuring all available primary reference signals and corresponding secondary reference signals, specifically includes: configuring all available primary reference signals (including the cyclic shift and comb-like structure) and time-frequency resource locations for the corresponding secondary references. If there are corresponding orthogonal cover code codewords, further including: configuring the used orthogonal cover code codewords.

The terminal and the base station can determine corresponding reference signals according to the correspondence by using the selected multiple access resources, and then perform uplink data transmission.

As another implementation, during the configuration of the multiple access resource pool, the multiple access resources and the corresponding reference signals are configured at the same time. For example, during the configuration of multiple access resources in the multiple access resource pool, the reference signals corresponding to the multiple access resources are also indicated. In the method provided by this embodiment of the present invention, the sequence characteristics (including the cyclic shift, comb-like structure and possibly employed orthogonal cover code codewords) of the corresponding primary reference signals, the time-frequency resource locations of the secondary reference signals and the orthogonal cover codes (if any) used by the secondary reference signals need to be indicated. A simple example is as follows.

TABLE 9

Configuration example of the multiple access resource pool

| Index | Multiple access resource | Primary reference signal | Secondary reference signal |
|---|---|---|---|
| 0 | Resource 0 | Sequence 0 | Location 0 + codeword 0 |
| 1 | Resource 1 | Sequence 1 | Location 1 + codeword 1 |
| 2 | Resource 2 | Sequence 2 | Location 2 + codeword 2 |
| 3 | Resource 3 | Sequence 3 | Location 3 + codeword 3 |
| ... | ... | ... | ... |

In the possible implementation, the configuration of the multiple access resources is principal, and the configuration of the reference signals is complementary. In other possible implementations, it is possible that the configuration of the reference signals is principal and the configuration of the multiple access resources is complementary, that is, the corresponding multiple access resources are configured during the configuration of the reference signals.

The information of the multiple access resource pool is configured semi-statically by a higher-layer signaling or configured by a downlink control channel. Upon receiving the information of the multiple access resource pool, the terminal equiprobably selects multiple access resources and the corresponding reference signals for uplink data transmission.

The second method for allocating multiple access resources is as follows.

The base station configures, through a higher-layer signaling or a downlink control channel, corresponding multiple resources and corresponding reference signals for a terminal which needs to perform data transmission by using the non-orthogonal multiple access. When there is a data transmission demand, the terminal uses the configured multiple access resources and reference signals to perform uplink data transmission.

It is to be noted that, the base station can simultaneously notify the configuration information of the reference signals and the configuration information of the multiple access resources, or can notify the configuration information of the reference signals first and then notify the configuration information of the multiple access resources.

In the embodiments of the present invention, effective and sufficient reference signals are provided for UEs to be accessed, so that the number of available reference signals is increased greatly. Moreover, the accuracy of channel estimation, the overhead of reference signals and the capacity of reference signals all can be taken into consideration, and the channel estimation as accurate as possible will be performed in the premise of providing an acceptable number of reference signals. In addition, the method is also applicable to a case where the number of borne terminals changes, and the method can provide some flexible.

Another embodiment of the present invention provides a data transmission method, as shown in FIG. 72, includes the following steps: step 1010: receiving, from a base station, configuration information of reference signals, the reference signals including a first reference signal and a second reference signal, there being a correspondence between the first reference signal and the second reference signal; and, step 1020: determining the first reference signal and the second reference signal according to the configuration information, and performing, based on the first reference signal and the second reference signal, data transmission with the base station.

Preferably, the first reference signal is an orthogonal signal or a non-orthogonal signal; and/or, the second reference signal is an orthogonal signal.

Preferably, the second reference signal is discrete or sequential.

Preferably, the discrete second reference signal is distinguished in at least one of the following ways: frequency division, time division and code division; and, the sequential second reference signal is distinguished in at least one of the following ways: frequency division, time division, code division, cyclic shift, and comb-like structure.

Preferably, the step of determining the first reference signal and the second reference signal according to the configuration information includes: determining the first reference signal according to the configuration of reference signals, and determining the second reference signal according to the correspondence between the first reference signal and the second reference signal.

Preferably, the correspondence includes: a correspondence between at least one of the following characteristic-related parameters of the second reference signal and the first reference signal: time-frequency resources, cyclic shift, comb-like structure, and orthogonal cover code codeword.

Preferably, the step of receiving, from a base station, configuration information of reference signals includes: receiving, from a base station, configuration information of a reference signal resource pool. The step of determining the first reference signal and the second reference signal according to the configuration information comprises selecting, from the configuration information of a reference signal resource pool, the configuration information of reference signals, and determining the first reference signal and the second reference signal according to the selected configuration information of reference signals.

Preferably, the data transmission method further includes: receiving a correspondence between the reference signals and multiple access resources.

Preferably, the correspondence between the reference signals and multiple access resources includes: a correspondence among the first reference signal, the second reference signal and the multiple access resources; or, a correspondence between the indexes of the reference signals and multiple access resources, which is determined based on the indexes of reference signals calculated by an index of the first reference signal and an index of the second reference signal.

Preferably, the data transmission method further includes: receiving, from a base station, configuration information of a multiple access resource pool; and, the step of determining the first reference signal and the second reference signal according to the configuration information includes: selecting, from the configuration information of the reference signal resource pool, the configuration information of reference signals, and determining the first reference signal and the second reference signal according to the selected configuration information of reference signals.

The multiple access resource pool includes any one of the following situations: a set of non-orthogonal multiple access time-frequency resources, and a correspondence between the reference signals and the set of non-orthogonal multiple access time-frequency resources; a set of orthogonal multiple access time-frequency resources, and a correspondence between the reference signals and the set of orthogonal multiple access time-frequency resources; and, a set of non-orthogonal multiple access time-frequency resources, a set of orthogonal multiple access time-frequency resources, a correspondence between the reference signals and the set of non-orthogonal multiple access time-frequency resources, and a correspondence between the reference signals and the set of orthogonal multiple access time-frequency resources.

In the uplink transmission method provided by this embodiment of the present invention, a terminal, that will transmit data, can determine reference signals according to the configuration information of the allocated sufficient number of reference signals and then perform data transmission with a base station based on the reference signals. Accordingly, it is ensured that the terminal can perform data transmission timely.

Another embodiment of the present invention provides a base station, as shown in FIG. 73, including a configuring module 111 and a transmitting module 112.

Wherein, the configuring module 111 is configured to configure reference signals, and the transmitting modules 112 is configured to transmit configuration information of the reference signals, wherein the reference signals includes a first reference signal and a second reference signal, and there is a correspondence between the first reference signal and the second reference signal.

Another embodiment of the present invention provides a terminal, as shown in FIG. 74, including a receiving module 121 and a transmitting module 122.

Wherein, the receiving module 121 is configured to receive, from a base station, configuration information of reference signals, the reference signals including a first reference signal and a second reference signal, and there is a correspondence between the first reference signal and the second reference signal; and, the transmitting module 122 is configured to determine the first reference signal and the second reference signal according to the configuration information and perform, based on the first reference signal and the second reference signal, data transmission with the base station.

Another embodiment of the present invention provides a base station equipment, including: a processor; and, a memory configured to store machine-readable instructions which, when executed by the processor, enable the processor to execute the reference signal configuration method described above.

Another embodiment of the present invention provides a terminal equipment, including: a processor; and, a memory configured to store machine-readable instructions which, when executed by the processor, enable the processor to execute the data transmission method described above.

FIG. 75 schematically shows a block diagram of a computing system used for implementing the base station or the user equipment of the present disclosure according to the embodiments of the present disclosure.

As shown in FIG. 75, the computing system 1300 includes a processor 1310, a computer-readable storage medium 1320, an output interface 1330 and an input interface 1340. The computing system 1300 can execute the method described above with reference to FIG. 63 or 72, to configure reference signals and then perform data transmission based on the reference signals.

Specifically, for example, the processor 1310 can includes a general-purpose microprocessor, an instruction set processor and/or a related chipset and/or a dedicated microprocessor (e.g., an Application-Specific Integrated Circuit (ASIC), or more. The processor 1310 can further include an onboard memory for cache purpose. The processor 1310 can be a single processing unit or multiple processing units used for executing different actions in the method flow described with reference to FIG. 63 or 72.

For example, the computer-readable storage medium 1320 can be any medium capable of containing, storing, conveying, propagating or transmitting instructions. For example, the readable storage medium can include but be not limited to: electrical, magnetic, optical, electromagnetic, infrared or semiconductor systems, apparatuses, devices or propagation mediums. The specific examples of the readable storage medium include: a magnetic storage device, such as a magnetic tape or a Hard Disk Drive (HDD); an optical storage device, such as CD-ROM; a memory, such as a Random Access Memory (RAM) or a flash memory; and/or, a wired/wireless communication link.

The computer-readable storage medium 1320 can includes computer programs. The computer programs can include codes/computer-executable instructions which, when executed by the processor 1310, enable the processor 1310 to execute the method flow described above with reference to FIG. 63 or 72 and any transformation thereof.

The computer programs can be configured to have computer program codes, for example, including computer program modules. For example, in an exemplary embodiment, the codes in the computer programs can include one or more program modules, for example, module 1, module 2, . . . . It is to be noted that, the division mode and the number of modules are not fixed, and a proper program module or a combination of program modules can be used by those skilled in the art according to the actual situation. When the combination of program modules is executed by the processor 1310, the processor 1310 can execute the method flow described above with reference to FIG. 63 or 72 and any transformation thereof.

According to the embodiments of the present disclosure, the processor 1310 can use the output interface 1330 and the input interface 1340 to execute the method flow described above with reference to FIG. 63 or 72 and any transformation thereof.

It should be understood by those skilled in the art that the present invention involves devices for carrying out one or more of operations as described in the present invention. Those devices can be specially designed and manufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in a device (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the present invention may be alternated, changed, combined or deleted. Further, other steps, measures and solutions in the operations, methods and flows already discussed in the present invention can also be alternated, changed, rearranged, decomposed, combined or deleted. Further, the steps, measures and solutions of the prior art in the operations, methods and operations disclosed in the present invention can also be alternated, changed, rearranged, decomposed, combined or deleted.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

The invention claimed is:

1. A method performed by a transmitter in a wireless communication system, the method comprising:
    performing channel coding on a bit sequence to determine a coded sequence;
    performing a bit-level interleaving, scrambling, and spreading on the coded sequence;
    after performing the bit-level interleaving, scrambling, and spreading on the coded sequence, performing a multidimensional constellation modulation, based on multidimensional constellation information, on the bit-level interleaved, scrambled, and spread sequence, wherein the multidimensional constellation information comprises at least one of: a mother constellation or a constellation operator;
    performing a symbol-level complex spreading on the modulated sequence based on a complex spreading sequence, wherein the complex spreading sequence includes at least one symbol having a value of zero;
    performing a symbol-level interleaving and zero-inserting on the symbol-level complex spread sequence based on an interleaving pattern and a zero-inserting pattern to obtain a data, wherein the zero-inserting pattern is associated with a number of zero elements and a position of the zero elements; and
    transmitting the obtained data.

2. The method of claim 1, further comprising:
    acquiring an interleaving pattern information, scrambling pattern information, and the multidimensional constellation information.

3. The method of claim 2, wherein the acquiring the interleaving pattern information, the scrambling pattern information, and the multidimensional constellation information comprises:
    receiving the interleaving pattern information, the scrambling pattern information, and the multidimensional constellation information transmitted through a downlink control channel by a receiver; and
    acquiring, from a system resource pool, the interleaving pattern information, the scrambling pattern information, and the multidimensional constellation information.

4. The method of claim 3, further comprising:
    transmitting an access request to the receiver based on the acquired interleaving pattern information, the acquired scrambling pattern information, and the acquired multidimensional constellation information; and
    performing, based on a situation of receiving, a feedback message transmitted by the receiver within a preset time window, at least one of:
        in case that the feedback message transmitted by the receiver has been received within the preset time window, processing data to be transmitted based on the acquired interleaving pattern information, and the acquired scrambling pattern information, the acquired multidimensional constellation information;
        in case that the feedback message transmitted by the receiver has not been received within the preset time window:
            reacquiring from the system resource pool, the interleaving pattern information, the scrambling pattern information, and the multidimensional constellation information, and
            transmitting the access request to the receiver based on the reacquired interleaving pattern information, the reacquired scrambling pattern information, and the reacquired multidimensional constellation information, until the feedback message transmitted by the receiver is received within the preset time window; and
        in case that has not received the feedback message transmitted by the receiver within the preset time window, transmitting the access request to the receiver by lowering a modulation and coding strategy (MCS) until the feedback message transmitted by the receiver is received within the preset time window.

5. The method of claim 3, wherein the interleaving pattern information, the scrambling pattern information, and the multidimensional constellation information is acquired through at least one of a physical broadcast channel, a physical downlink control channel, or a physical downlink shared channel.

6. The method of claim 1,
wherein the mother constellation is in at least one of:
a cartesian product form having multiple quadrature amplitude modulation (QAM) constellations,
a multidimensional constellation having a special structure, or
a form of directly selecting constellation vector points in a multidimensional space based on a preset optimization criterion; and
wherein the constellation operator comprises at least one of a phase rotation or a power adjustment.

7. A method performed by a receiver in a wireless communication system, the method comprising:
receiving mixed signals from multiple transmitters, the mixed signals associated with a bit-level interleaving, a bit-level scrambling, a bit-level spreading, multidimensional constellation modulation, a symbol-level complex spreading, a symbol-level interleaving, and a symbol-level zero-inserting on a data corresponding to each of the multiple transmitters; and
decoding the mixed signals based on bit-level interleaving information, bit-level scrambling information, multidimensional constellation information, symbol-level complex spreading information, and symbol-level zero-inserting information corresponding to the each of the multiple transmitters to obtain the data,
wherein decoding of the each of the mixed signals based on interleaving information, the scrambling information, and the multidimensional constellation information corresponding to the data comprises performing multidimensional constellation demodulation on the mixed signals based on the multidimensional constellation information corresponding to each of the multiple transmitters, and the multidimensional constellation information comprises at least one of: a mother constellation or a constellation operator,
wherein the symbol-level complex spreading is associated with a complex spreading sequence, wherein the complex spreading sequence includes at least one symbol having a value of zero, and wherein the symbol-level interleaving and the symbol-level zero-inserting is associated with an interleaving pattern and a zero-inserting pattern, wherein the zero-inserting pattern is associated with a number of zero elements and a position of the zero elements.

8. The method of claim 7, wherein decoding of the each of the mixed signals based on interleaving information, the scrambling information, and the multidimensional constellation information corresponding to the data further comprises:
de-interleaving and de-scrambling the data, on which the multidimensional constellation demodulation is performed, based on the interleaving pattern and scrambling information corresponding to each of the multiple transmitters to obtain the data.

9. The method of claim 7, further comprising:
determining based on network loads, the interleaving scrambling pattern information, the scrambling pattern information, and the multidimensional constellation information used by the multiple transmitters; and
transmitting, to each of the multiple transmitters, the determined interleaving pattern information, the determined scrambling pattern information, and the determined multidimensional constellation information used by the multiple transmitters.

10. The method of claim 7, further comprising:
receiving signals from same transmitter, the signals associated with the interleaving, the scrambling, and the multidimensional constellation modulation from the same transmitter; and
decoding, based on the interleaving pattern, scrambling pattern information, and the multidimensional constellation information corresponding to each of multiple data streams, the signals to obtain the multiple data streams from the same transmitter.

11. The method of claim 10, wherein the multidimensional constellation modulation at least includes one of phase rotation or power adjustment.

12. A transmitter in a wireless communication system, the transmitter comprising:
a channel coder;
a transceiver; and
at least one processor coupled with the channel coder and the transceiver, wherein the at least one processor is configured to:
perform channel coding on a bit sequence to determine a coded sequence,
perform a bit-level interleaving, scrambling, and spreading on the coded sequence, after performing the bit-level interleaving, scrambling, and spreading on the coded sequence, perform a multidimensional constellation modulation, based on multidimensional constellation information, on the bit-level interleaved, scrambled, and spread sequence, wherein the multidimensional constellation information comprises at least one of: a mother constellation or a constellation operator,
perform a symbol-level complex spreading on the modulated sequence based on a complex spreading sequence, wherein the complex spreading sequence includes at least one symbol having a value of zero,
perform a symbol-level interleaving and zero-inserting on the symbol-level complex spread sequence based on an interleaving pattern and a zero-inserting pattern to obtain a data, wherein the zero-inserting pattern is associated with a number of zero elements and a position of the zero elements, and
transmit the obtained data.

13. The transmitter of claim 12, wherein:
the mother constellation is in at least one of a cartesian product form having multiple quadrature amplitude modulation (QAM) constellations, a multidimensional constellation having a special structure, or a form of directly selecting constellation vector points in a multidimensional space based on a preset optimization criterion; and
the constellation operator comprises at least one of a phase rotation or a power adjustment.

* * * * *